United States Patent
Bronicki et al.

(10) Patent No.: US 11,756,095 B2
(45) Date of Patent: Sep. 12, 2023

(54) FACILITATING CAMERA INSTALLATION AND MAINTENANCE USING EXTENDED REALITY

(71) Applicant: TRAX TECHNOLOGY SOLUTIONS PTE LTD., Singapore (SG)

(72) Inventors: Youval Bronicki, Los Altos, CA (US); May Masha Mordechay, Pardes Hanna (IL)

(73) Assignee: Trax Technology Solutions Pte Ltd., Singapore (SG)

( * ) Notice: Subject to any disclaimer, the term of this patent is extended or adjusted under 35 U.S.C. 154(b) by 0 days.

(21) Appl. No.: 17/817,424

(22) Filed: Aug. 4, 2022

(65) Prior Publication Data

US 2022/0383546 A1    Dec. 1, 2022

Related U.S. Application Data

(63) Continuation of application No. PCT/US2022/027426, filed on May 3, 2022.
(Continued)

(51) Int. Cl.
*G06T 19/00* (2011.01)
*G06Q 30/0601* (2023.01)
(Continued)

(52) U.S. Cl.
CPC ....... *G06Q 30/0627* (2013.01); *G06Q 10/087* (2013.01); *G06Q 20/20* (2013.01);
(Continued)

(58) Field of Classification Search
CPC .................................................. G06T 19/006
See application file for complete search history.

(56) References Cited

U.S. PATENT DOCUMENTS

| 2009/0182499 A1 | 7/2009 | Bravo |
| 2015/0356610 A1 | 12/2015 | Ponoth |

(Continued)

FOREIGN PATENT DOCUMENTS

| WO | WO 2018/002709 A2 | 1/2018 |
| WO | WO 2019/048924 A1 | 3/2019 |

OTHER PUBLICATIONS

International Search Report and Written Opinion in Application No. PCT/US2022/027426 dated Oct. 21, 2022 (17 pages).

*Primary Examiner* — Charles Tseng
(74) *Attorney, Agent, or Firm* — FINNEGAN, HENDERSON, FARABOW, GARRETT & DUNNER, LLP

(57) ABSTRACT

Systems and methods are provided for retail environments. In one implementation, a non transitory computer-readable medium may include instructions that when executed by a processor cause the processor to perform a method. The method may include receiving camera location information associated with a plurality of cameras deployed in a retail store, the camera location information being indicative of an actual position of each camera of the plurality of cameras; receiving, for each camera of the plurality of cameras, at least one camera status indicator; using the received camera location information and the received camera status indicators to generate a digital signal; and providing the generated digital signal to an extended reality device to thereby cause the extended reality device to display a visual representation of the at least one status indicator for each camera of the plurality of cameras relative to the actual position of the camera in the retail store.

19 Claims, 62 Drawing Sheets

Related U.S. Application Data

(60) Provisional application No. 63/254,290, filed on Oct. 11, 2021, provisional application No. 63/230,215, filed on Aug. 6, 2021, provisional application No. 63/183,872, filed on May 4, 2021.

(51) Int. Cl.
| | |
|---|---|
| *G06Q 10/087* | (2023.01) |
| *G06Q 30/0241* | (2023.01) |
| *G06Q 30/0283* | (2023.01) |
| *G06V 20/52* | (2022.01) |
| *G06Q 30/0242* | (2023.01) |
| *G06Q 30/0251* | (2023.01) |
| *G06V 10/44* | (2022.01) |
| *G06Q 20/20* | (2012.01) |
| *G06Q 30/0204* | (2023.01) |
| *G06T 7/80* | (2017.01) |
| *G06T 7/70* | (2017.01) |
| *H04N 17/00* | (2006.01) |
| *H04N 23/90* | (2023.01) |

(52) U.S. Cl.
CPC ....... *G06Q 20/203* (2013.01); *G06Q 30/0204* (2013.01); *G06Q 30/0241* (2013.01); *G06Q 30/0246* (2013.01); *G06Q 30/0255* (2013.01); *G06Q 30/0261* (2013.01); *G06Q 30/0283* (2013.01); *G06Q 30/0629* (2013.01); *G06Q 30/0631* (2013.01); *G06Q 30/0633* (2013.01); *G06Q 30/0639* (2013.01); *G06Q 30/0641* (2013.01); *G06Q 30/0643* (2013.01); *G06T 7/70* (2017.01); *G06T 7/80* (2017.01); *G06T 19/006* (2013.01); *G06V 10/454* (2022.01); *G06V 20/52* (2022.01); *H04N 17/002* (2013.01); *H04N 23/90* (2023.01); *G06T 2207/30232* (2013.01)

(56) References Cited

U.S. PATENT DOCUMENTS

| | | |
|---|---|---|
| 2016/0071149 A1 | 3/2016 | Farshori |
| 2017/0004140 A1* | 1/2017 | Wang .................. G06F 3/0488 |
| 2017/0322715 A1* | 11/2017 | Cohrt .................. G06F 3/04817 |
| 2019/0149725 A1* | 5/2019 | Adato ..................... H04N 1/00 |
| | | 348/158 |
| 2019/0244436 A1 | 8/2019 | Stansell et al. |
| 2020/0302510 A1 | 9/2020 | Chachek et al. |
| 2020/0357182 A1* | 11/2020 | Ahuja ....................... G06T 1/20 |

* cited by examiner

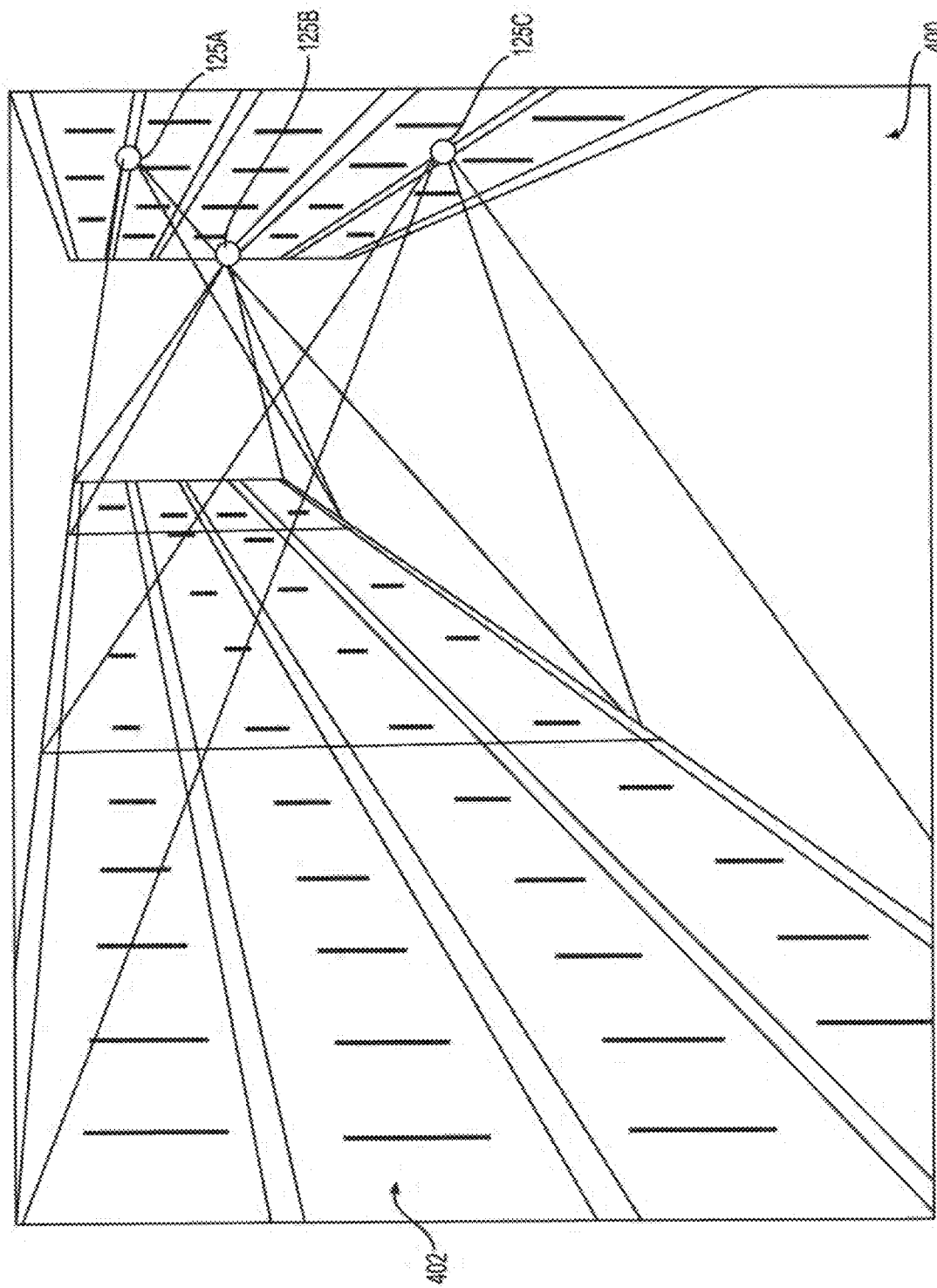

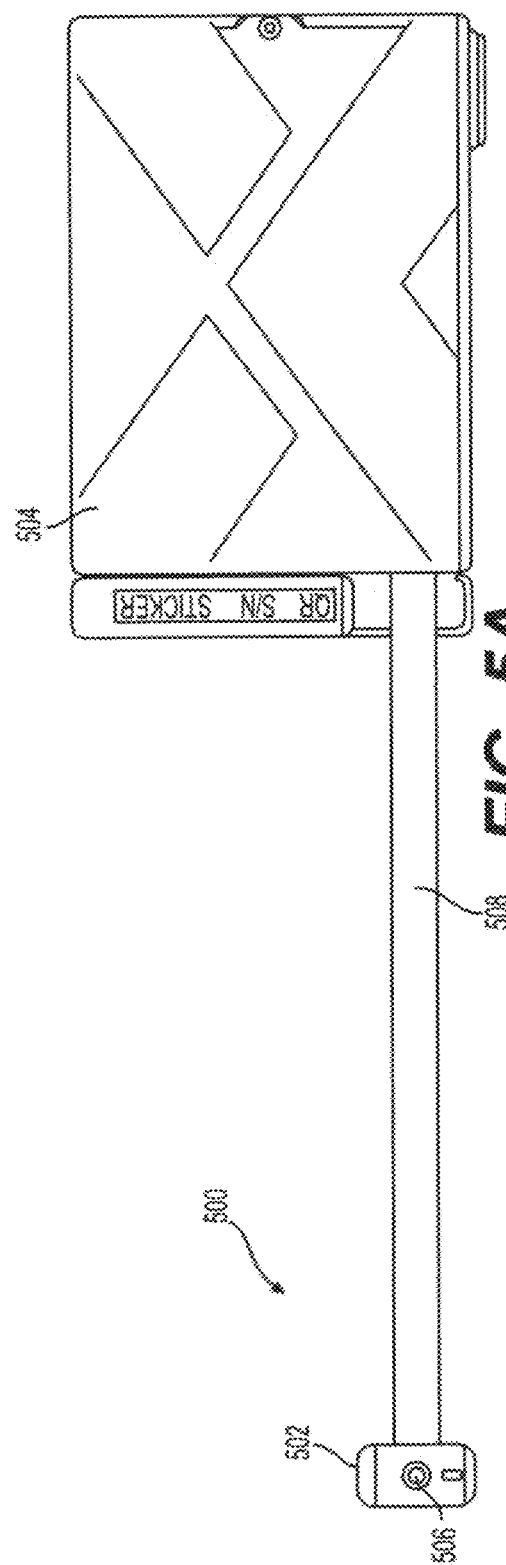
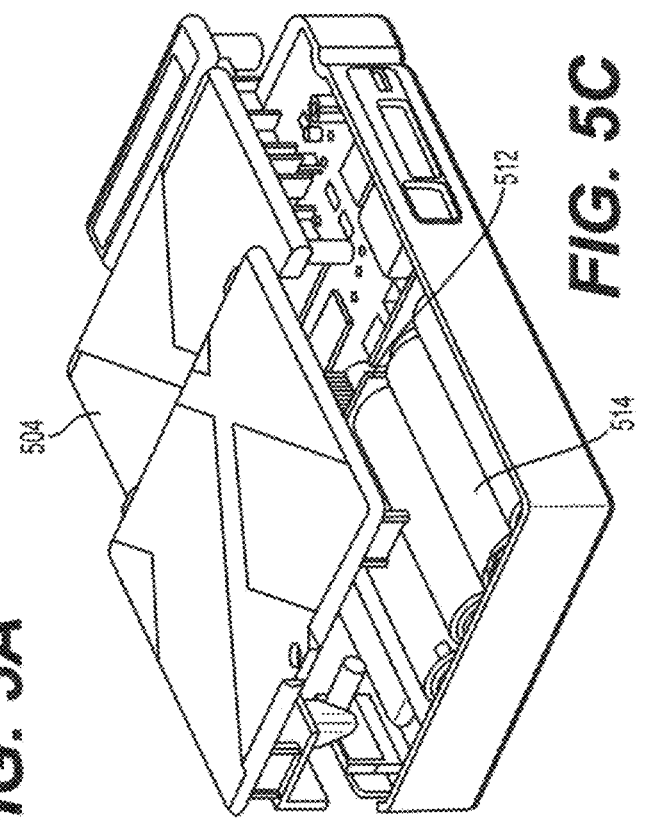
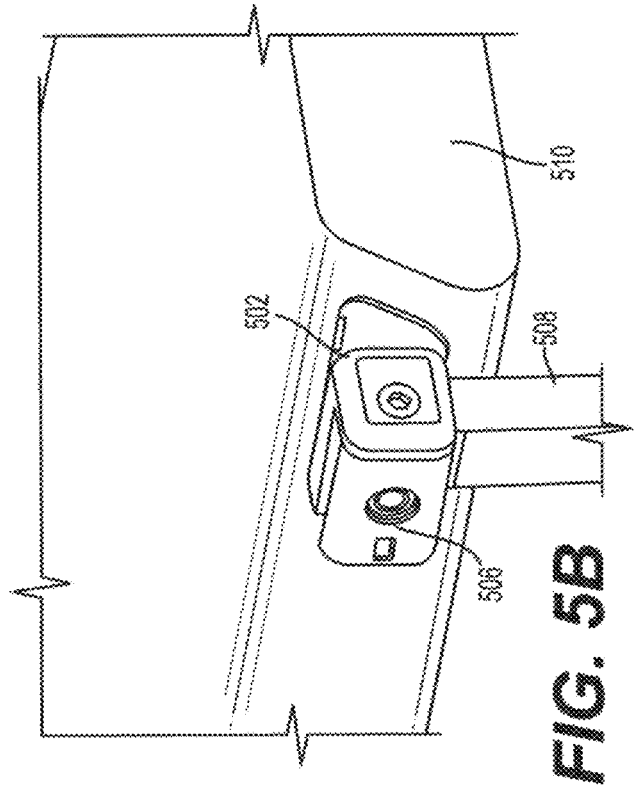

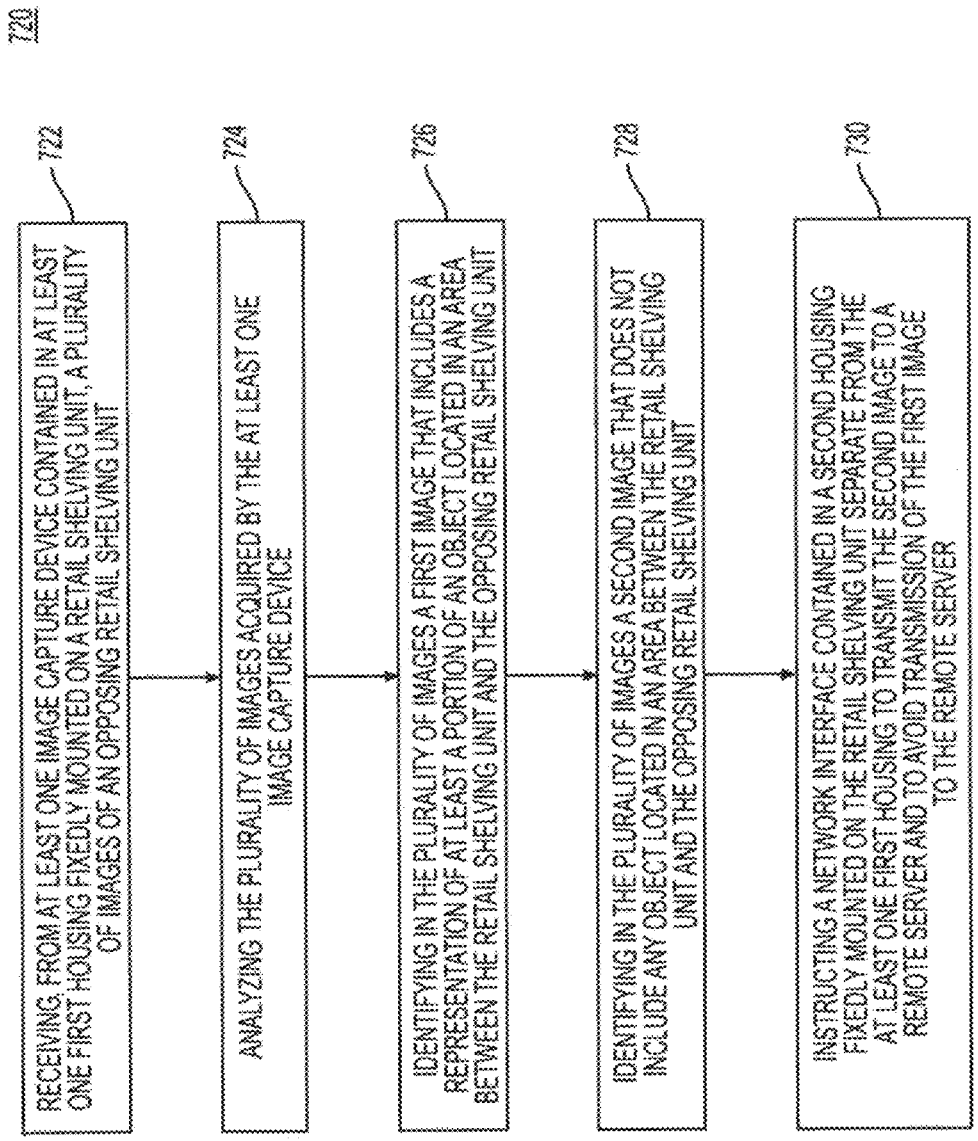

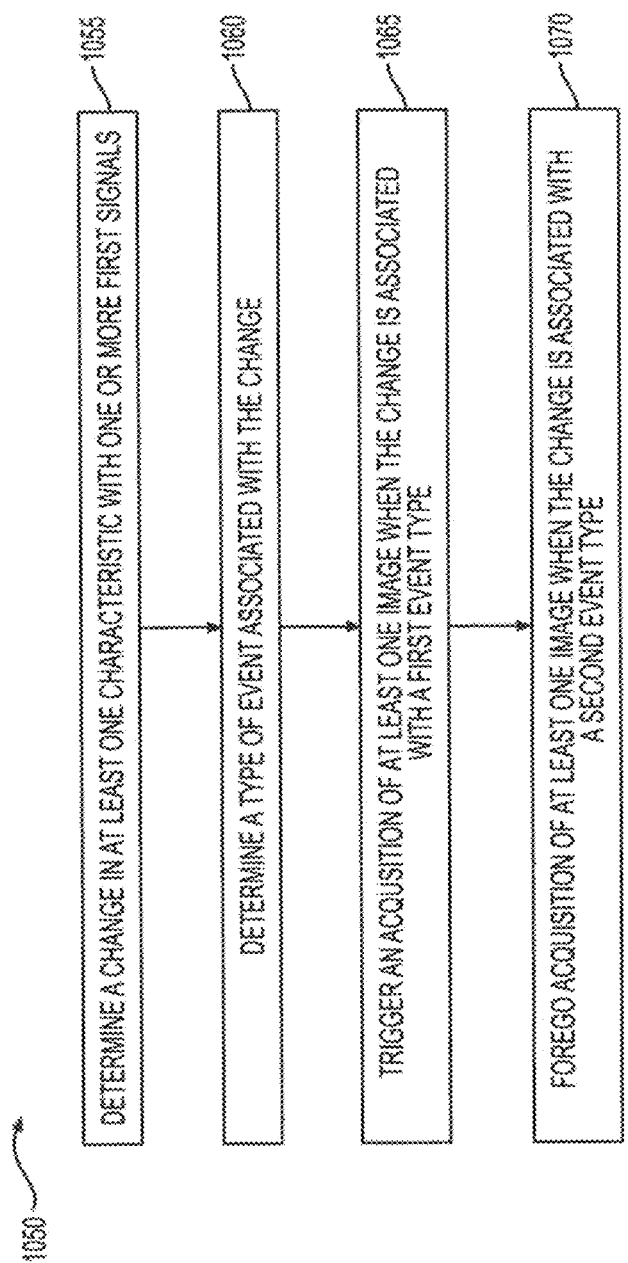

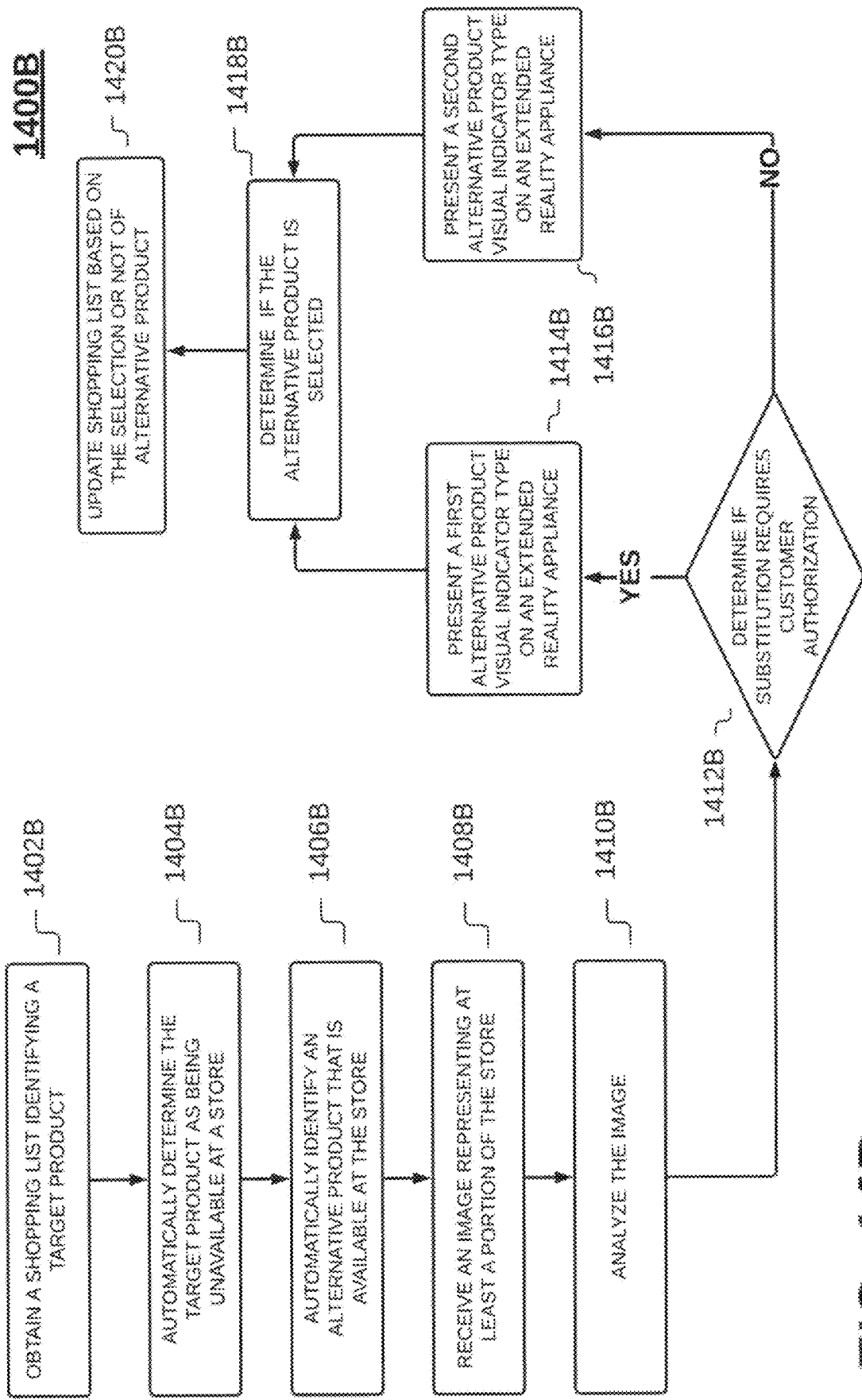

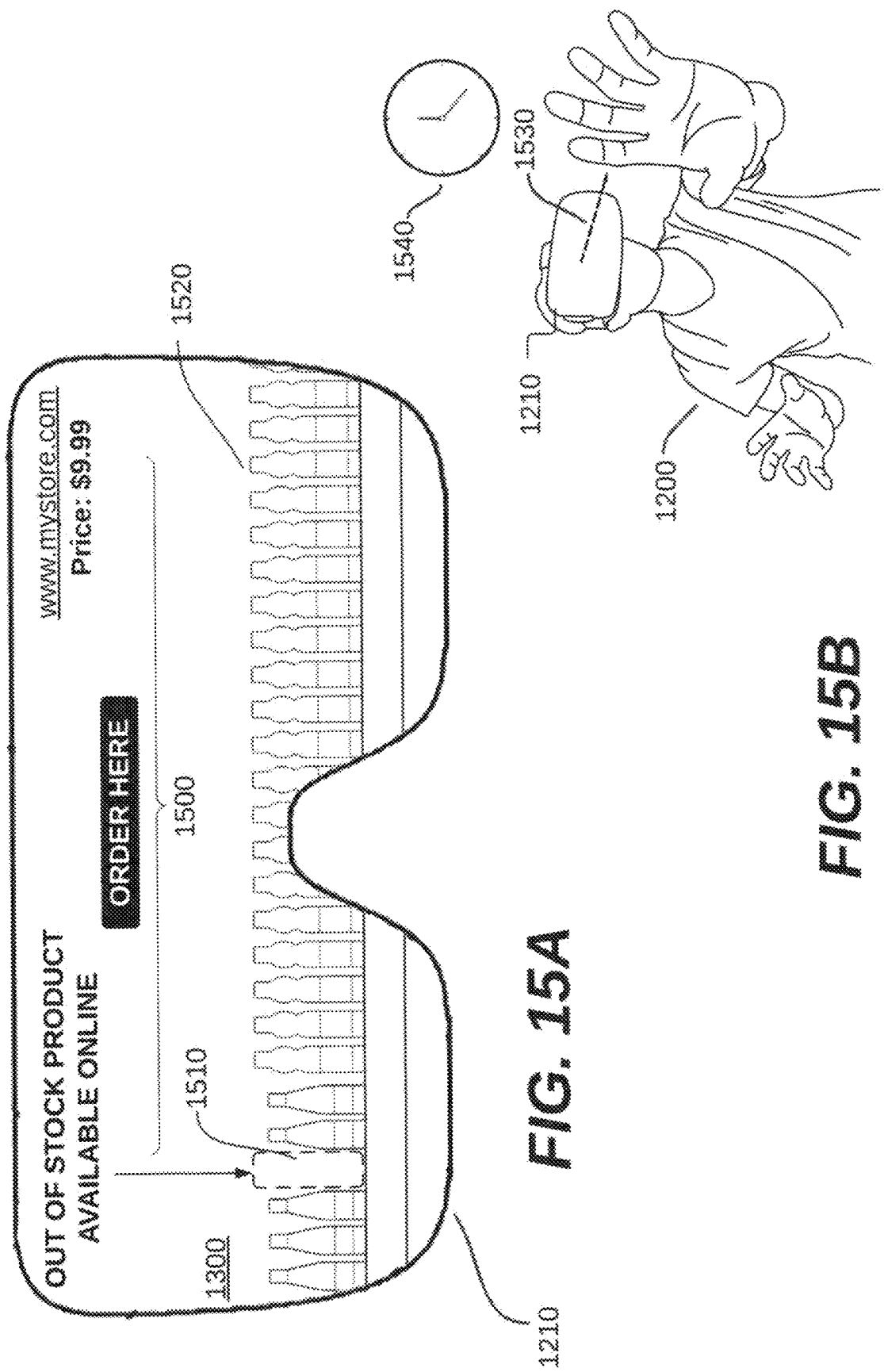

FIG. 25

FACILITATING CAMERA INSTALLATION AND MAINTENANCE USING EXTENDED REALITY

CROSS REFERENCES TO RELATED APPLICATIONS

This application is a continuation of PCT International Application No. PCT/US2022/027426, filed on May 3, 2022, which claims the benefit of priority of U.S. Provisional Application No. 63/183,872, filed on May 4, 2021; U.S. Provisional Application No. 63/230,215, filed on Aug. 6, 2021; and U.S. Provisional Application No. 63/254,290, filed on Oct. 11, 2021. The foregoing applications are incorporated herein by reference in their entirety.

BACKGROUND

Technical Field

The present disclosure relates generally to systems, methods, and devices for identifying products in retail stores, and more specifically to systems, methods, and devices for capturing, collecting, and automatically analyzing images of products displayed in retail stores for purposes of providing one or more functions associated with the identified products.

Background Information

Shopping in stores is a prevalent part of modern daily life. Store owners (also known as "retailers") stock a wide variety of products on store shelves and add associated labels and promotions to the store shelves. Typically, retailers have a set of processes and instructions for organizing products on the store shelves. The source of some of these instructions may include contractual obligations and other preferences related to the retailer methodology for placement of products on the store shelves. Nowadays, many retailers and suppliers send people to stores to personally monitor compliance with the desired product placement. Such a monitoring technique, however, may be inefficient and may result in nonuniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically monitor retail spaces. Such a solution, for example and among other features, may automatically determine whether a disparity exists between a desired product placement and an actual product placement.

The disclosed devices and methods are directed to providing new ways for monitoring retail establishments using image processing and supporting sensors.

SUMMARY

Embodiments consistent with the present disclosure provide systems, methods, and devices for capturing, collecting, and analyzing images of products displayed in retail stores. For example, consistent with the disclosed embodiments, an example system may receive an image depicting a store shelf having products displayed thereon, identify the products on the store shelf, and trigger an alert when disparity exists between the desired product placement and the actual product placement.

In an embodiment, a non-transitory computer-readable medium may include instructions that when executed by a processor cause the processor to perform a method. The method may include obtaining an electronic shopping list associated with a customer, the electronic shopping list identifying a target product; automatically determining that the target product is unavailable at a particular retail store; automatically identify an alternative product, available at the particular retail store, as a potential alternative to the target product; receiving at least one image representative of at least a portion of the particular retail store wherein the at least one image includes a representation of the alternative product; and analyzing the at least one image to cause an extended reality appliance to present to a shopper a visual indicator associated with the alternative product in the particular retail store.

In an embodiment, a system for providing augmented reality support to retail store pickers may include at least one computer processor configured to execute one or more operating instructions of a computer program located in a non-transitory computer readable medium to obtain an electronic shopping list associated with a customer, the electronic shopping list identifying a target product; automatically determine that the target product is unavailable at a particular retail store; automatically identify an alternative product, available at the particular retail store, as a potential alternative to the target product; receive at least one image representative of at least a portion of the particular retail store wherein the at least one image includes a representation of the alternative product; and analyze the at least one image to cause an extended reality appliance to present to a shopper a visual indicator associated with the alternative product in the particular retail store.

In an embodiment, a method of locating an available alternative product in a store may include the steps of using a computer processor to execute one or more operating instructions of a computer program located in a non-transitory computer readable medium to obtain an electronic shopping list associated with a customer, the electronic shopping list identifying a target product; automatically determine that the target product is unavailable at a particular retail store; automatically identify an alternative product, available at the particular retail store, as a potential alternative to the target product; receive at least one image representative of at least a portion of the particular retail store wherein the at least one image includes a representation of the alternative product; and analyze the at least one image to cause an extended reality appliance to present to a shopper a visual indicator associated with the alternative product in the particular retail store.

In an embodiment, a non-transitory computer-readable medium may include instructions that when executed by a processor cause the processor to perform a method for facilitating online shopping for customers in physical retail stores. The method may include making a first determination that a customer located in a physical retail store has engaged in at least one action associated with an interest in a category of products associated with the retail store; making a second determination that the at least one action is associated with a target product, included in the category of products, that is out of stock in the physical retail store; and in response to the first and second determinations, providing a notification to the customer, wherein the notification includes information regarding ordering the target product via an online platform.

In an embodiment, a system for facilitating customer access to retail products may include at least one processing unit configured to perform the steps of making a first determination that a customer located in a physical retail store has engaged in at least one action associated with an interest in a category of products associated with the retail store; making a second determination that the at least one action is associated with a target product, included in the category of products, that is out of stock in the physical retail store; and in response to the first and second determinations, providing a notification to the customer, wherein the notification includes information regarding ordering the target product via an online platform.

In an embodiment, a method for facilitating customer access to retail products may include making a first determination that a customer located in a physical retail store has engaged in at least one action associated with an interest in a category of products associated with the retail store; making a second determination that the at least one action is associated with a target product, included in the category of products, that is out of stock in the physical retail store; and in response to the first and second determinations, providing a notification to the customer, wherein the notification includes information regarding ordering the target product via an online platform.

In an embodiment, a non-transitory computer-readable medium may include instructions that when executed by at least one processor cause the at least one processor to perform a method for distributed shopping. The method includes accessing a virtual shopping list associated with a user, the virtual shopping list identifying a plurality of products. A first indicator associated with a prospective visit by the user to a first retail store is determined. A second indicator associated with a prospective visit by the user to a second retail store is determined. Pricing information for the plurality of products located at the first retail store and at the second retail store is received. Inventory information for the plurality of products located at the first retail store and at the second retail store is received. An updated virtual shopping list is automatically generated, including an indication of a location for purchasing each of the plurality of products. The indication of the location is associated with the first retail store or the second retail store. The updated virtual shopping list is generated based on a combination of the received pricing information and the received inventory information. The updated virtual shopping list is provided to the user.

In an embodiment, a system for distributing shopping may include at least one processing unit configured to perform the steps of: accessing a virtual shopping list associated with a user, the virtual shopping list identifying a plurality of products; determining a first indicator associated with a prospective visit by the user to a first retail store; determining a second indicator associated with a prospective visit by the user to a second retail store; receiving pricing information for the plurality of products located at the first retail store and at the second retail store; receiving inventory information for the plurality of products located at the first retail store and at the second retail store; automatically generating an updated virtual shopping list including an indication of a location for purchasing each of the plurality of products, the indication of the location being associated with the first retail store or the second retail store; wherein the updated virtual shopping list is generated based on a combination of the received pricing information and the received inventory information; and providing the updated virtual shopping list to the user.

In an embodiment, a method for distributing shopping may include accessing a virtual shopping list associated with a user, the virtual shopping list identifying a plurality of products. A first indicator associated with a prospective visit by the user to a first retail store is determined. A second indicator associated with a prospective visit by the user to a second retail store is determined. Pricing information for the plurality of products located at the first retail store and at the second retail store is received. Inventory information for the plurality of products located at the first retail store and at the second retail store is received. An updated virtual shopping list is automatically generated, including an indication of a location for purchasing each of the plurality of products. The indication of the location is associated with the first retail store or the second retail store. The updated virtual shopping list is generated based on a combination of the received pricing information and the received inventory information. The updated virtual shopping list is provided to the user.

In an embodiment, a non-transitory computer-readable medium may include instructions that when executed by a processor cause the processor to implement a frictionless shopping method based on estimated shopper integrity. The method includes receiving, from at least a first of a plurality of sensors associated with a retail store, first sensed data indicating a selection of a first product by a customer; determining, from the first sensed data, a first property associated with the first product; issuing a first query to the customer with respect to the first property associated with the first product and, in response, receiving first information from the customer; comparing the first information received from the customer with the first property associated with the first product; determining, based on the comparison between the first information received from the customer with the first property associated with the first product, an integrity indicator associated with the customer; receiving, from at least a second of the plurality of sensors associated with the retail store, second sensed data indicating a selection of a second product by the customer; determining, based on the integrity indicator, at least one action to take in order to determine a second property associated with the second product; and initiating the at least one action.

In an embodiment, a frictionless shopping system may include at least one processor configured with access to instructions that when executed by the at least one processor cause the at least one processor to implement a frictionless shopping method based on estimated shopper integrity. The method includes receiving, from at least a first of a plurality of sensors associated with a retail store, first sensed data indicating a selection of a first product by a customer; determining, from the first sensed data, a first property associated with the first product; issuing a first query to the customer with respect to the first property associated with the first product and, in response, receiving first information from the customer; comparing the first information received from the customer with the first property associated with the first product; determining, based on the comparison between the first information received from the customer with the first property associated with the first product, an integrity indicator associated with the customer; receiving, from at least a second of the plurality of sensors associated with the retail store, second sensed data indicating a selection of a second product by the customer; determining, based on the integrity indicator, at least one action to take in order to determine a second property associated with the second product; and initiating the at least one action.

In an embodiment, a frictionless shopping method based on estimated shopper integrity may include receiving, from at least a first of a plurality of sensors associated with a retail store, first sensed data indicating a selection of a first product by a customer; determining, from the first sensed data, a first property associated with the first product; issuing a first query to the customer with respect to the first property associated with the first product and, in response, receiving first information from the customer; comparing the first information received from the customer with the first property associated with the first product; determining, based on the comparison between the first information received from the customer with the first property associated with the first product, an integrity indicator associated with the customer; receiving, from at least a second of the plurality of sensors associated with the retail store, second sensed data indicating a selection of a second product by the customer; determining, based on the integrity indicator, at least one action to take in order to determine a second property associated with the second product; and initiating the at least one action.

In an embodiment, a non-transitory computer-readable medium may include instructions that when executed by a processor cause the processor to perform a method for associating online digital activities with conditions in a retail store. The method includes detecting a plurality of online digital activities including subject matter related to a retail store, wherein the plurality of online digital activities originate from customers in the retail store; receiving position information indicative of positions in the retail store from which each of the detected plurality of online digital activities originated; clustering the detected plurality of online digital activities based on the received position information to provide one or more clusters of detected online digital activities, wherein each of the one or more clusters is associated with a different region of the retail store; using an image acquisition device to capture one or more images representative of a particular region of the retail store associated with a particular cluster of detected online digital activities; analyzing the one or more captured images to detect a condition of the retail store associated with the particular cluster of detected online digital activities; and automatically initiating at least one remedial action to address the detected condition In an embodiment, a system may associate online digital activities with positions in retail stores. The system includes at least one processing unit configured to detect a plurality of online digital activities including subject matter related to a retail store, wherein the plurality of online digital activities originate from customers in the retail store; receive position information indicative of positions in the retail store from which each of the detected plurality of online digital activities originated; cluster the detected plurality of online digital activities based on the received position information to provide one or more clusters of detected online digital activities, wherein each of the one or more clusters is associated with a different region of the retail store; use an image acquisition device to capture one or more images representative of a particular region of the retail store associated with a particular cluster of detected online digital activities; analyze the one or more captured images to detect a condition of the retail store associated with the particular cluster of detected online digital activities; and automatically initiate at least one remedial action to address the detected condition.

In an embodiment, a method may associate digital activities with positions in retail stores. The method includes detecting a plurality of online digital activities including subject matter related to a retail store, wherein the plurality of online digital activities originate from customers in the retail store; receiving position information indicative of positions in the retail store from which each of the detected plurality of online digital activities originated; clustering the detected plurality of online digital activities based on the received position information to provide one or more clusters of detected online digital activities, wherein each of the one or more clusters is associated with a different region of the retail store; using an image acquisition device to capture one or more images representative of a particular region of the retail store associated with a particular cluster of detected online digital activities; analyzing the one or more captured images to detect a condition of the retail store associated with the particular cluster of detected online digital activities; and automatically initiating at least one remedial action to address the detected condition.

In an embodiment, a non-transitory computer-readable medium may include instructions that when executed by a processor cause the processor to perform a method for visualization of retail shelves. The method includes determining product availability data indicative of an availability of one or more products on at least one retail shelf in a retail store; using the product availability data to generate a synthetic visual representation of the one or more products on the at least one retail shelf; presenting the synthetic visual representation on a display; receiving from a user an input indicative of a selection of at least a portion of the synthetic visual representation; and in response to receiving the input, presenting on the display an actual image corresponding to the selected at least a portion of the synthetic visual representation, wherein the actual image was acquired with an image sensor.

In an embodiment, a system for visualization of retail shelves may include at least one processor. The at least one processor may be programmed to the steps of determining product availability data indicative of an availability of one or more products on at least one retail shelf in a retail store; using the product availability data to generate a synthetic visual representation of the one or more products on the at least one retail shelf; presenting the synthetic visual representation on a display; receiving from a user an input indicative of a selection of at least a portion of the synthetic visual representation; and in response to receiving the input, presenting on the display an actual image corresponding to the selected at least a portion of the synthetic visual representation, wherein the actual image was acquired with an image sensor.

In an embodiment, a method for visualization of retail shelves may include determining product availability data indicative of an availability of one or more products on at least one retail shelf in a retail store; using the product availability data to generate a synthetic visual representation of the one or more products on the at least one retail shelf; presenting the synthetic visual representation on a display; receiving from a user an input indicative of a selection of at least a portion of the synthetic visual representation; and in response to receiving the input, presenting on the display an actual image corresponding to the selected at least a portion of the synthetic visual representation, wherein the actual image was acquired with an image sensor.

In an embodiment, a non-transitory computer-readable medium may include instructions that when executed by a processor cause the processor to perform a method for facilitating camera system inspection in an extended reality environment. The method includes receiving camera location information associated with a plurality of cameras deployed in a retail store, the camera location information being indicative of an actual position of each camera of the plurality of cameras; receiving, for each camera of the plurality of cameras, at least one camera status indicator; using the received camera location information and the received camera status indicators to generate a digital signal; and providing the generated digital signal to an extended reality device to thereby cause the extended reality device to display a visual representation of the at least one status indicator for each camera of the plurality of cameras relative to the actual position of the camera in the retail store.

In an embodiment, a system for facilitating camera system inspection in an extended reality environment may include at least one processor. The at least one processor may be programmed to receive camera location information associated with a plurality of cameras deployed in a retail store, the camera location information being indicative of an actual position of each camera of the plurality of cameras; receive, for each camera of the plurality of cameras, at least one camera status indicator; use the received camera location information and the received camera status indicators to generate a digital signal; and provide the generated digital signal to an extended reality device to thereby cause the extended reality device to display a visual representation of the at least one status indicator for each camera of the plurality of cameras relative to the actual position of the camera in the retail store.

In an embodiment, a method for facilitating camera system inspection in an extended reality environment may include receiving camera location information associated with a plurality of cameras deployed in a retail store, the camera location information being indicative of an actual position of each camera of the plurality of cameras; receiving, for each camera of the plurality of cameras, at least one camera status indicator; using the received camera location information and the received camera status indicators to generate a digital signal; and providing the generated digital signal to an extended reality device to thereby cause the extended reality device to display a visual representation of the at least one status indicator for each camera of the plurality of cameras relative to the actual position of the camera in the retail store.

In an embodiment, a non-transitory computer-readable medium may include instructions that when executed by at least one processor cause the at least one processor to perform a method for triggering actions in response to point of sales data. The method includes obtaining point of sale data from a retail store, analyzing the point of sale data to identify at least one anomalous transaction, information configured to cause capturing of image data from the retail store, analyzing the image data relating to the at least one anomalous transaction to determine at least one condition associated with the at least one anomalous transaction in the retail store, and based on the analyzed image data relating to the at least one anomalous transaction, generating an indicator associated with the at least one condition.

In an embodiment, a method for triggering actions in response to sales information may include obtaining point of sale data from a retail store; analyzing the point of sale data to identify at least one anomalous transaction; in response to the identified at least one anomalous transaction, providing information configured to cause capturing of image data from the retail store; and analyzing the image data relating to the at least one anomalous transaction to determine at least one condition associated with the at least one anomalous transaction, generating an indicator associated with the at least one condition.

In an embodiment, a system for monitoring actions associated with a retail store or retail space may include at least one processor configured to execute instructions for performing a method. The method includes obtaining point of sale data from a retail store; analyzing the point of sale data to identify at least one anomalous transaction; in response to the identified at least one anomalous transaction, providing information configured to cause capturing of image data from the retail store; analyzing the image data relating to the at least one anomalous transaction to determine at least one condition associated with the at least one anomalous transaction in the retail store; and based on the analyzed image data relating to the at least one anomalous transaction, generating an indicator associated with the at least one condition.

In an embodiment, a non-transitory computer-readable medium may include instructions that when executed by at least one processor cause the at least one processor to perform a method for automatically maintaining a retail space. The method includes receiving image data captured from a retail store; analyzing the received image data to determine that, at a capturing time, a first product type is out of stock; in response to the determination that the first product type is out of stock at the capturing time, generating first information configured to cause at least one action in response to the determination that the first product type is out of stock; receiving point of sales data from the retail store, wherein the point of sales data indicates a purchase of the first product type occurring after the capturing time, but before initiation of the at least one action; and in response to the received point of sales data, generating second information configured to cancel the at least one action.

In an embodiment, a method for automatically maintaining a retail space may include receiving image data captured from a retail store; analyzing the received image data to determine that, at a capturing time, a first product type is out of stock; in response to the determination that the first product type is out of stock at the capturing time, generating first information configured to cause at least one action in response to the determination that the first product type is out of stock; receiving point of sales data from the retail store, wherein the point of sales data indicates a purchase of the first product type occurring after the capturing time, but before initiation of the at least one action; and in response to the received point of sales data, generating second information configured to cancel the at least one action.

In an embodiment, a system for automatically maintaining a retail space may include at least one processor configured to execute instructions for performing a method. The method includes receiving image data captured from a retail store; analyzing the received image data to determine that, at a capturing time, a first product type is out of stock; in response to the determination that the first product type is out of stock at the capturing time, generating first information configured to cause at least one action in response to the determination that the first product type is out of stock; receiving point of sales data from the retail store, wherein the point of sales data indicates a purchase of the first product type occurring after the capturing time, but before initiation of the at least one action; and in response to the received point of sales data, generating second information configured to cancel the at least one action.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a schematic illustration of an example configuration for capturing image data in a retail store, consistent with the present disclosure.

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 7B provides a flowchart of a method for acquiring images of products in retail store, consistent with the present disclosure.

FIG. 10B is illustrates an exemplary method for triggering image acquisition based on product events on a store shelf, consistent with the present disclosure;

FIG. 14B is a flowchart representing an exemplary method for locating an available alternative product in a store, consistent with disclosed embodiments.

FIG. 15A is an illustration of a display screen of a wearable extended reality appliance showing a shopper notification as described herein.

FIG. 15B is an illustration of a shopper with a wearable extended reality appliance as described herein.

FIG. 25 illustrates an exemplary implementation of a listing of online digital activities performed via multiple digital platforms, consistent with the present disclosure.

DETAILED DESCRIPTION

Figure 1:
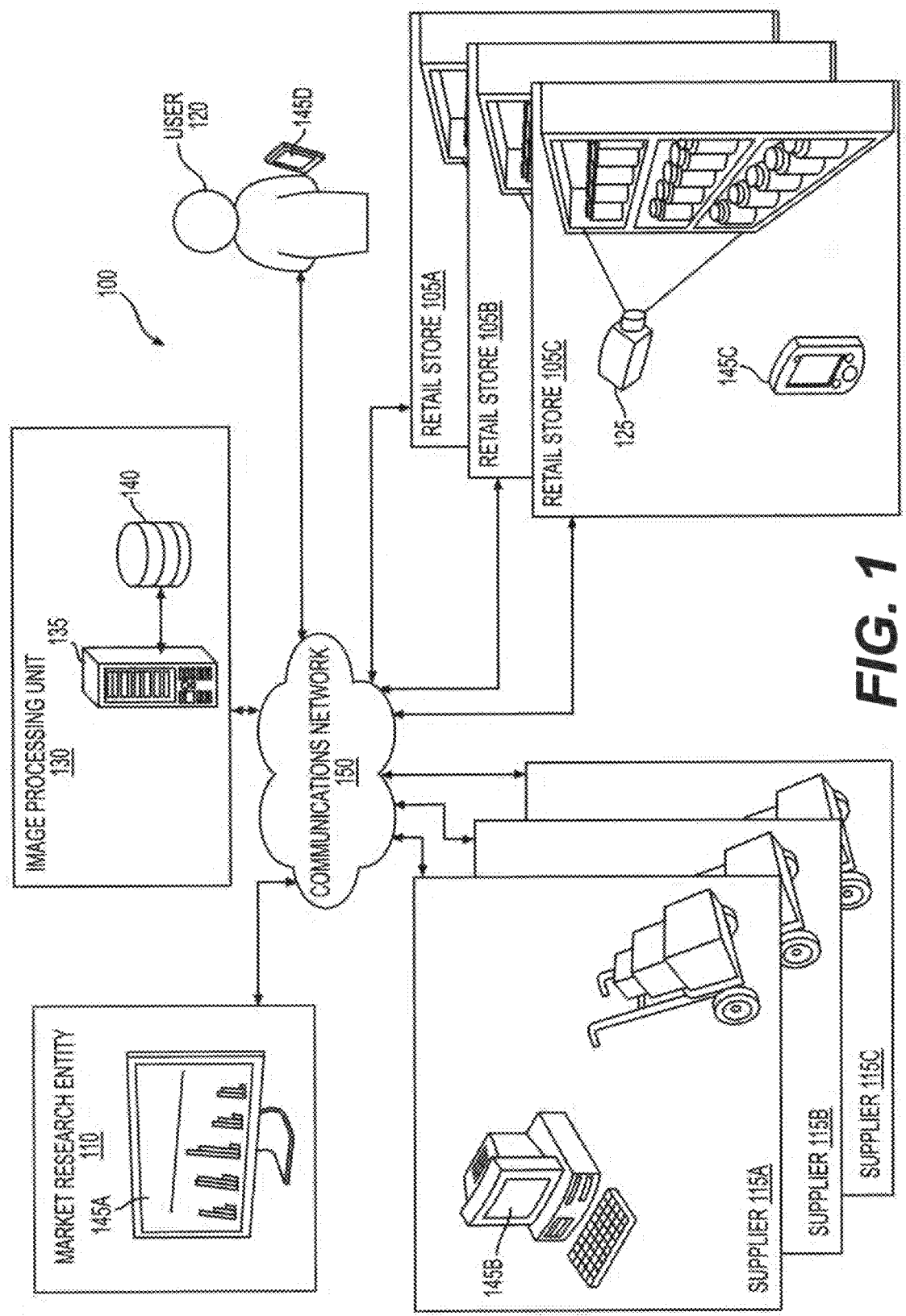
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, etc.). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalog. Additionally or alternatively, the term "identifying a product" may refer to determining a unique identifier associated with a specific category of products that allows inventory managers to uniquely refer to products, e.g., based on a specific category in a product catalog. In some embodiments, the identification may be made based at least in part on visual characteristics of the product (e.g., size, shape, logo, text, color, etc.). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

In some embodiments, machine learning algorithms (also referred to as machine learning models in the present disclosure) may be trained using training examples such as described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example, as described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, distance from an item depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two-dimensional convolution on one or more components of the image. In another example, calculating a convolution of an image may include stacking arrays from different components to create a three-dimensional array, and calculating a three dimensional convolution on the resulting three dimensional array. In some examples, a video may comprise one or more components (such as color components, depth component, etc.), and each component may include a three-dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store associate, data collection agent, etc.) about different products in retail stores 105. In one example, system 100 may receive images of products captured by user 120. In another example, system 100 may provide information to user 120 determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 may generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/802.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing devices 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 ounce Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as MongoDB and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C, and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
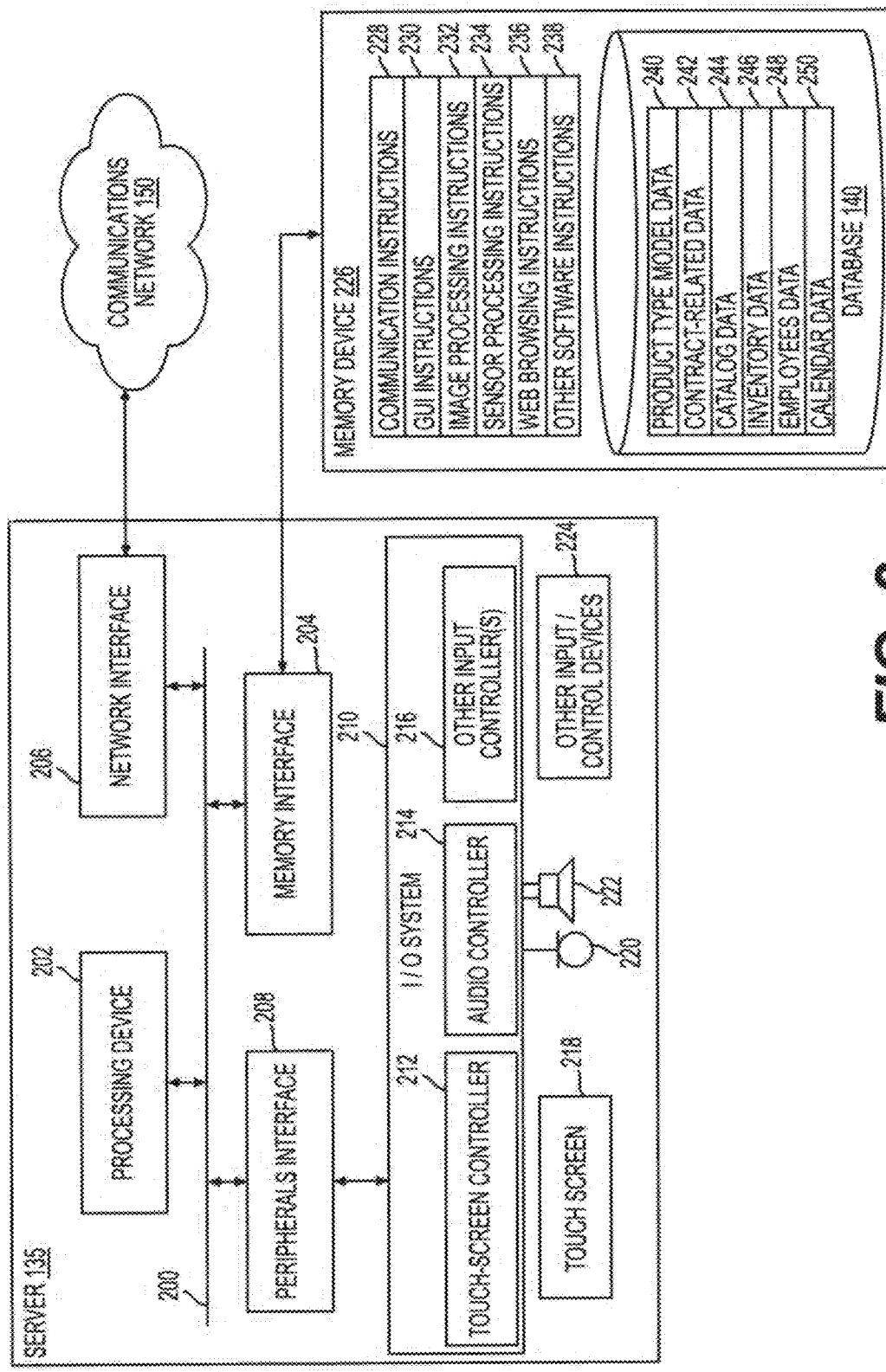
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual core, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums may be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, mixed reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumb-wheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™, Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific store associates to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226. Throughout this disclosure, the term store associate of a retail store may refer to any person or a robot who is tasked with performing actions in the retail store configured to support the operation of the retail store. Some non-limiting examples of store associates may include store employees, subcontractors contracted to perform such actions in the retail store, employees of entities associated with the retail store (such as suppliers of the retail store, distributers of products sold in the retail store, etc.), people engaged through crowd sourcing to perform such actions in the retail store, robots used to perform such actions in the retail store, and so forth.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
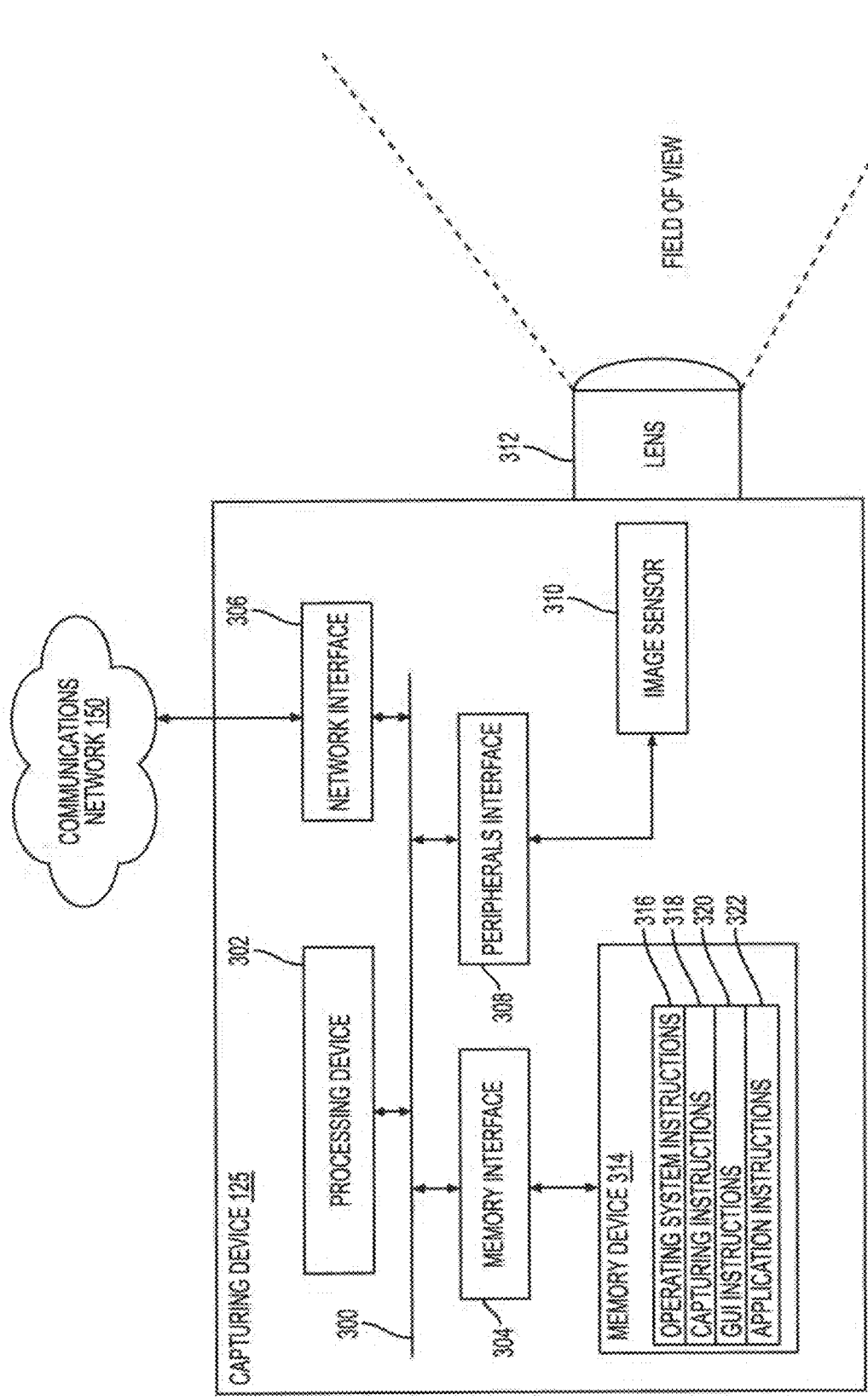
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components may be separated or may be integrated in one or more integrated circuits. The various components in capturing device 125 may be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, OS X, WINDOWS, or an embedded operating system such as VXWorkS. Operating system 316 may include instructions for handling basic system services and for performing hardware dependent tasks. In some implementations, operating system 316 may include a kernel (e.g., UNIX kernel, LINUX kernel, etc.). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

Figure 4B:
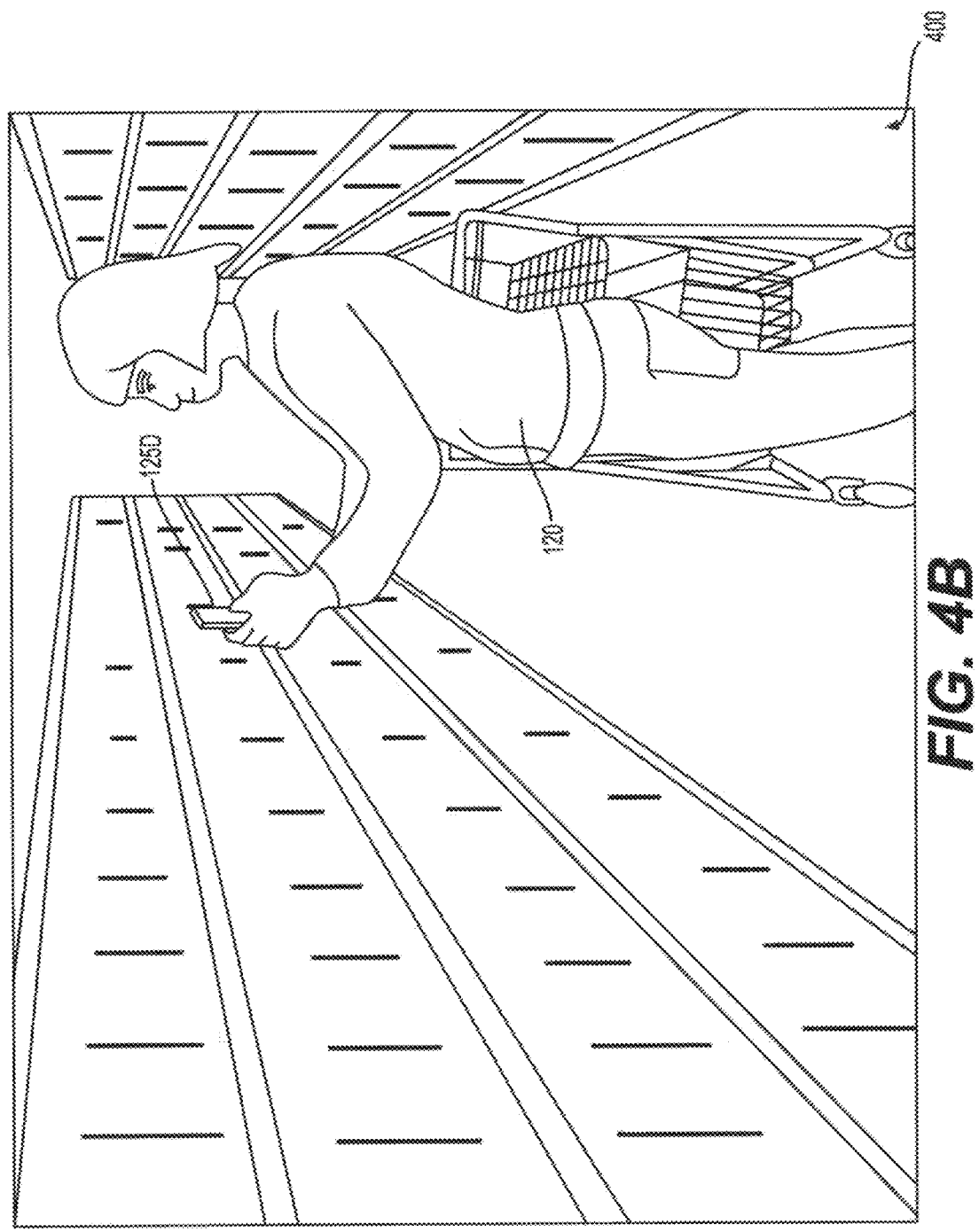
FIG. 4B is a schematic illustration of another example configuration for capturing image data in a retail store, consistent with the present disclosure.
Figure 4C:
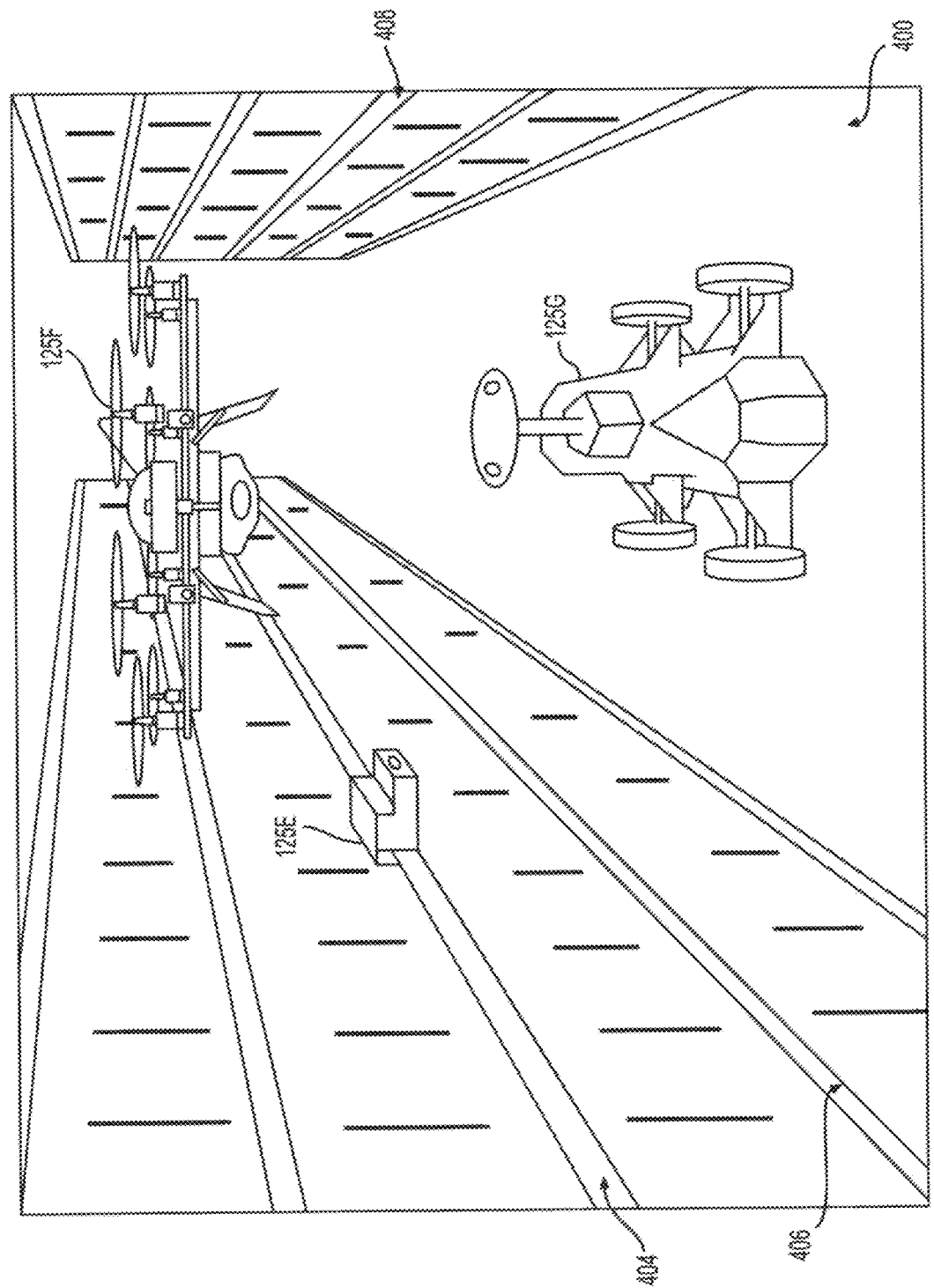
FIG. 4C is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the field of views of some of capturing devices 125. For example, the fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store associates. In one implementation, a handheld device of a store associate (e.g., capturing device 125D) may display a real-time video stream captured by the image sensor of the handheld device. The real-time video stream may be augmented with markings identifying to the store associate an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, etc.). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, etc.). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store associates. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, etc.). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel. In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between $1.1\times1.1$ $um^2$ and $1.7\times1.7$ $um^2$, for example, $1.4\times1.4$ $um^2$.

Figure 6A:
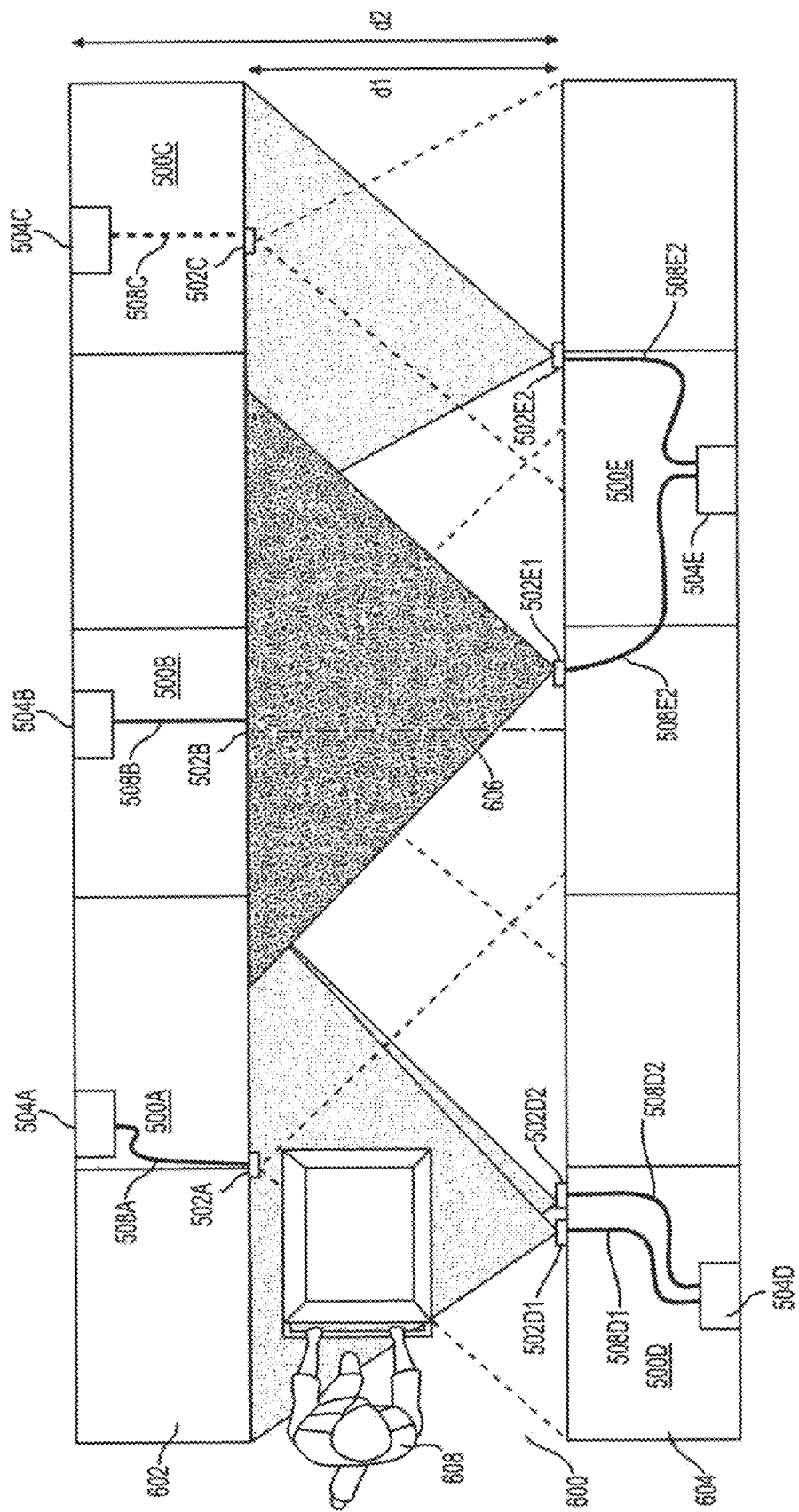
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g., planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
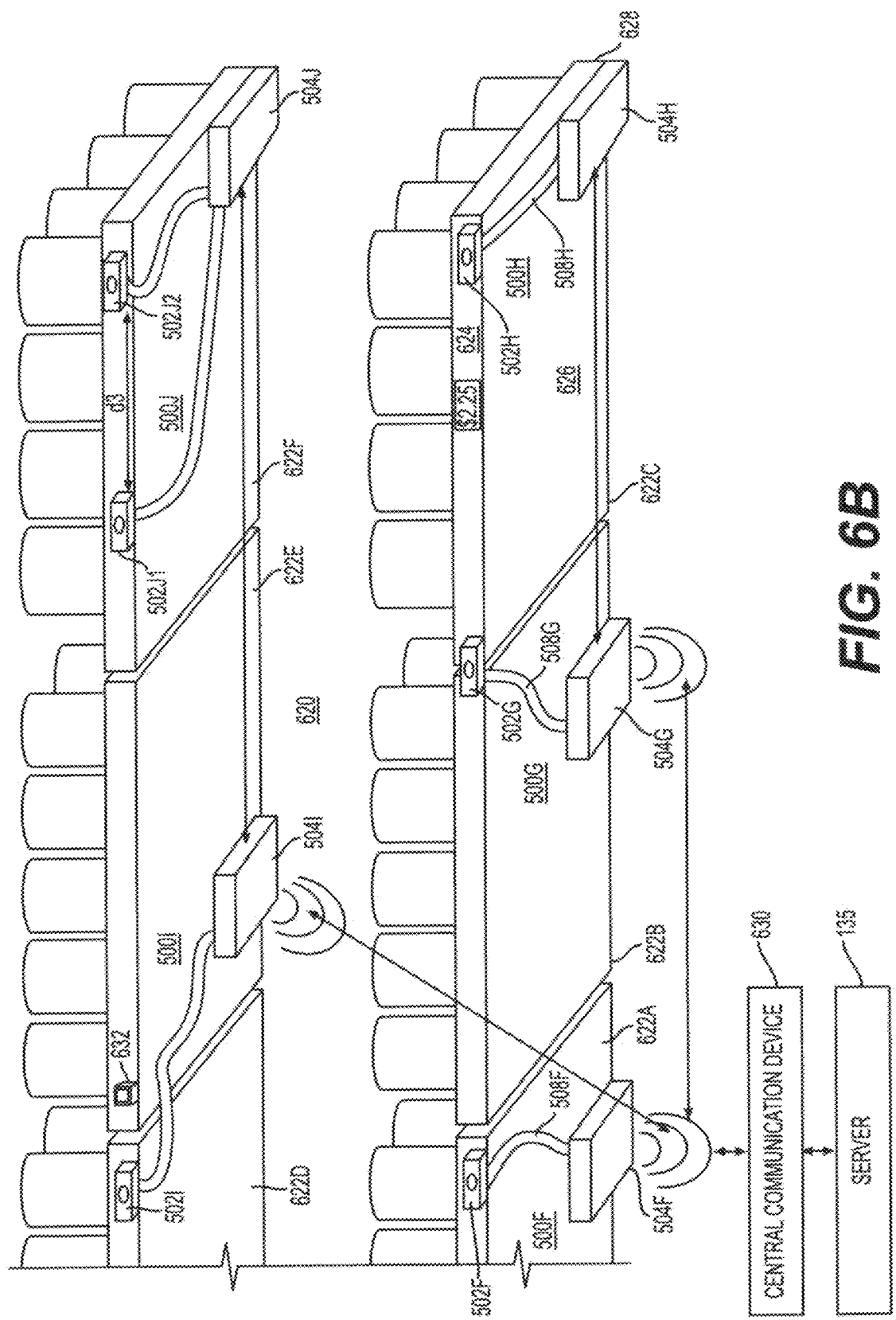
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, Wi-Fi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, etc.). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store associate. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of d1*log(d1) and/or d2*log(d2) such as a1*d1*log(d1) for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 5061 may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of d1*log(d1) and/or d2*log(d2) such as a1*d1*log(d1) for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when supplier 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
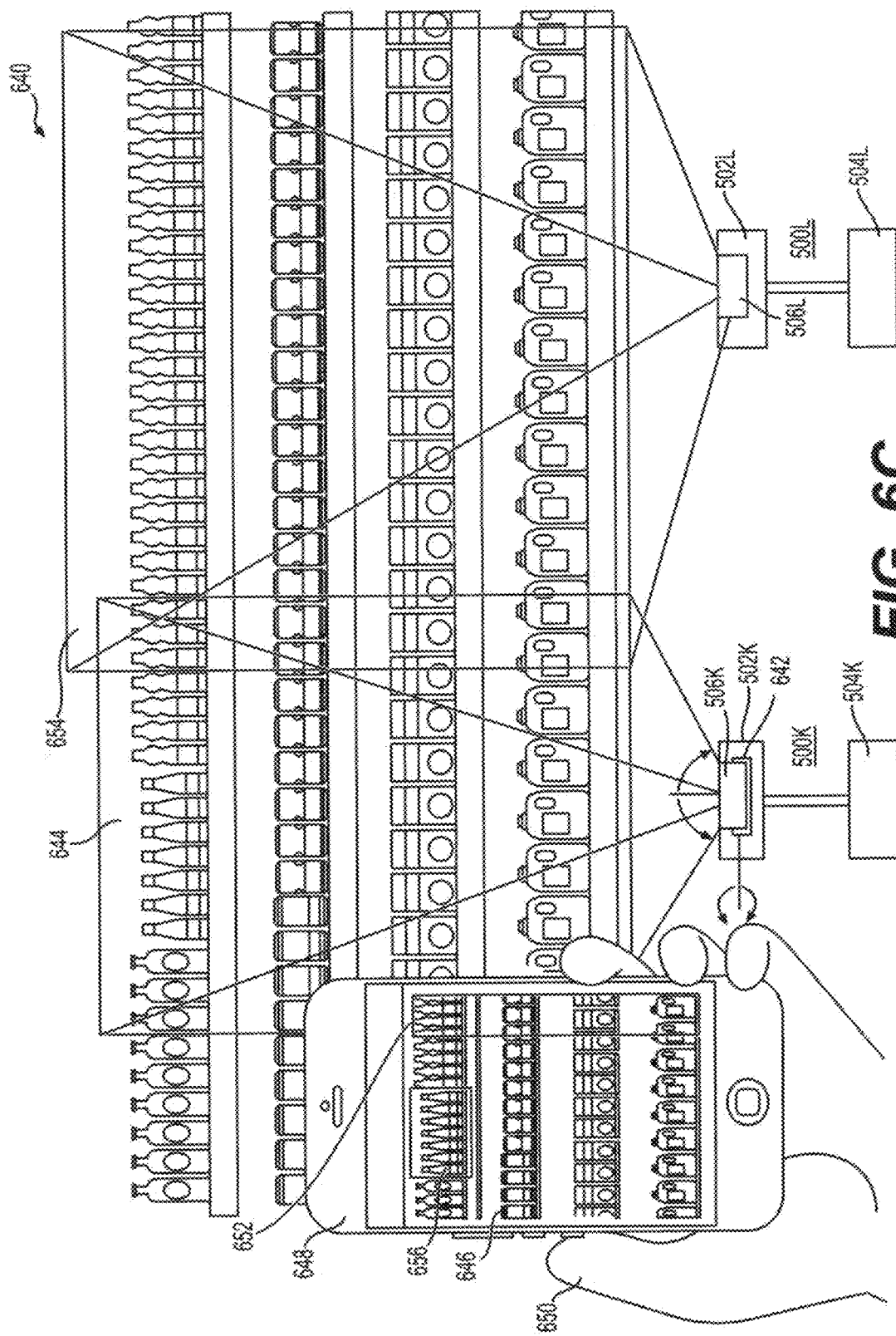
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of a person (such as a store associate) installing image capturing device 506K. Such an arrangement may provide the store associate/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, etc.). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the store associate/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
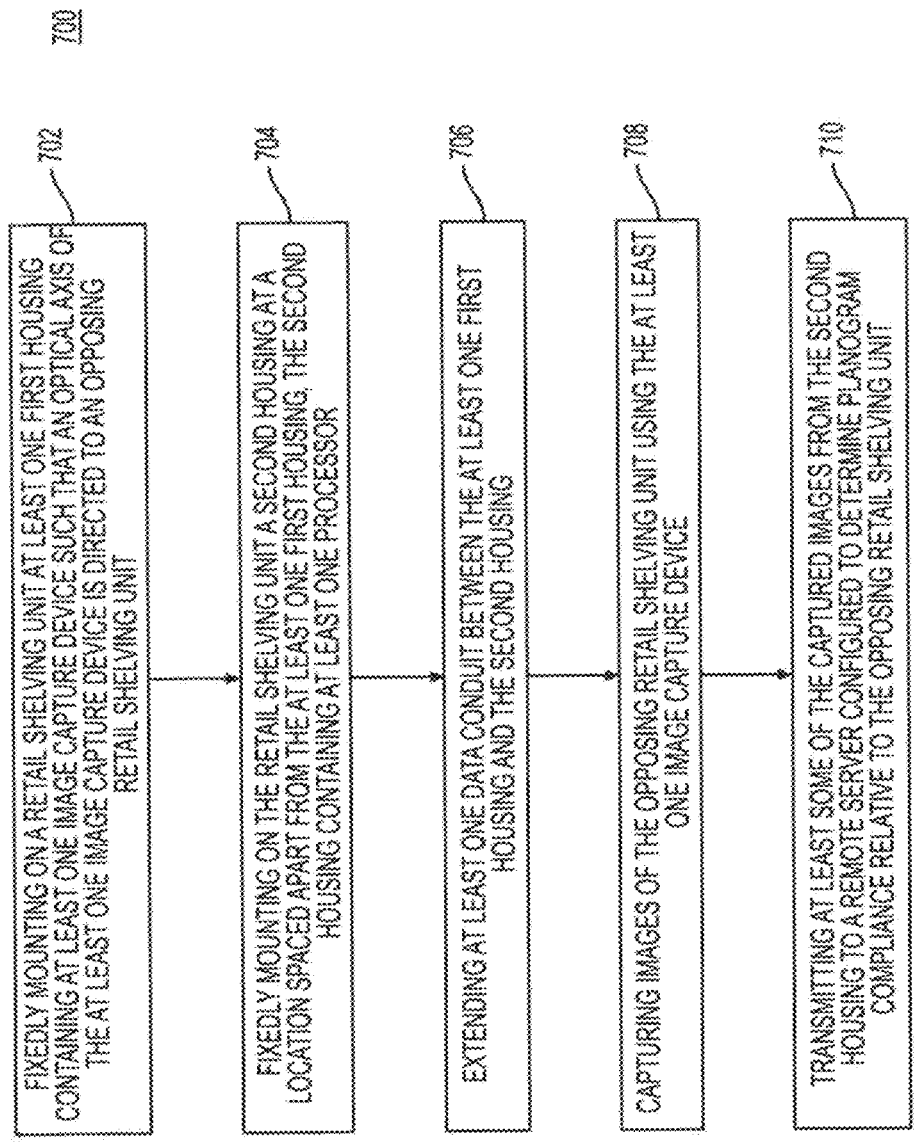
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method may be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1*d1*log(d1) for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method may be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store associate. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diode sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
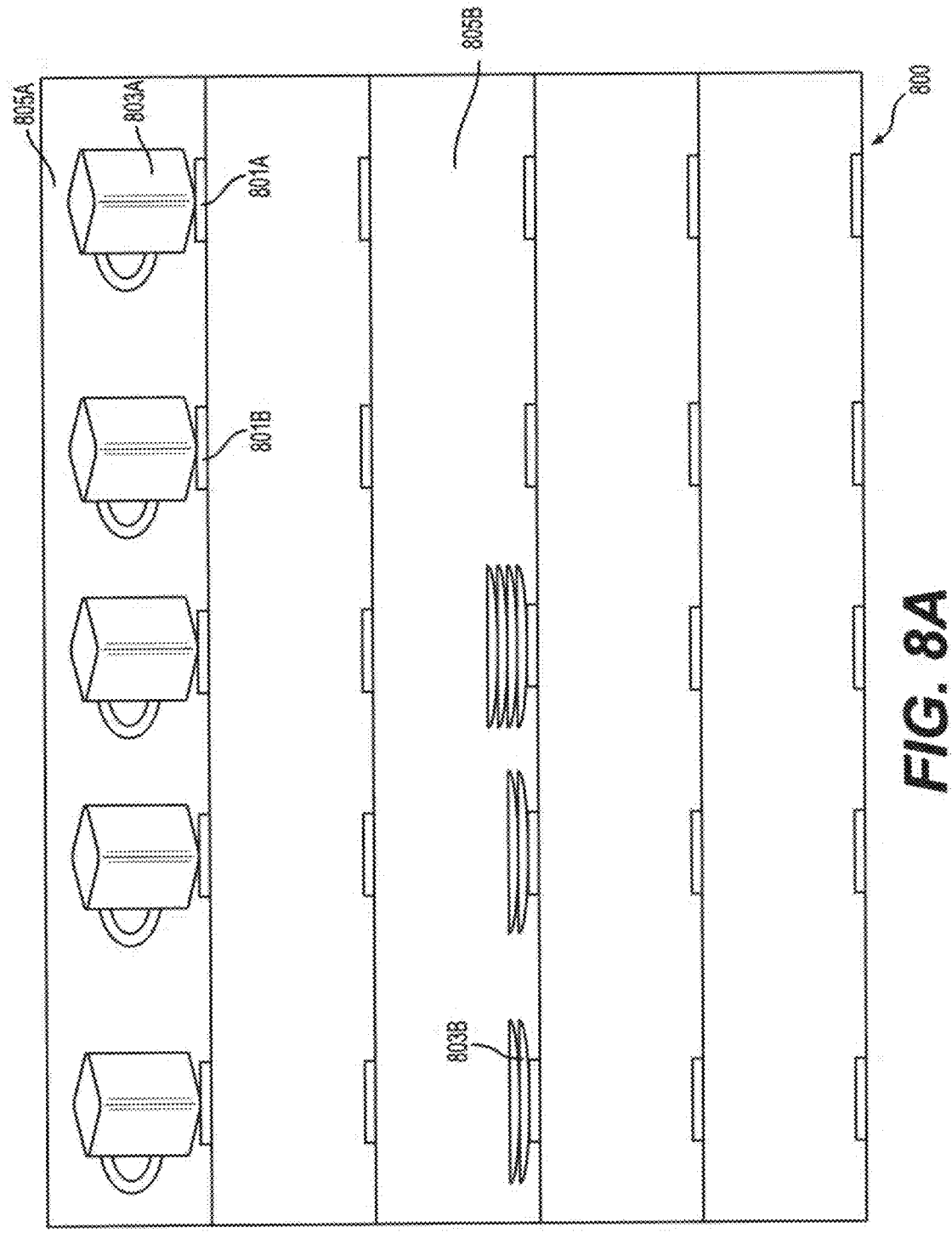
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, etc.). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include areas of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by a store associate due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

Figure 8B:
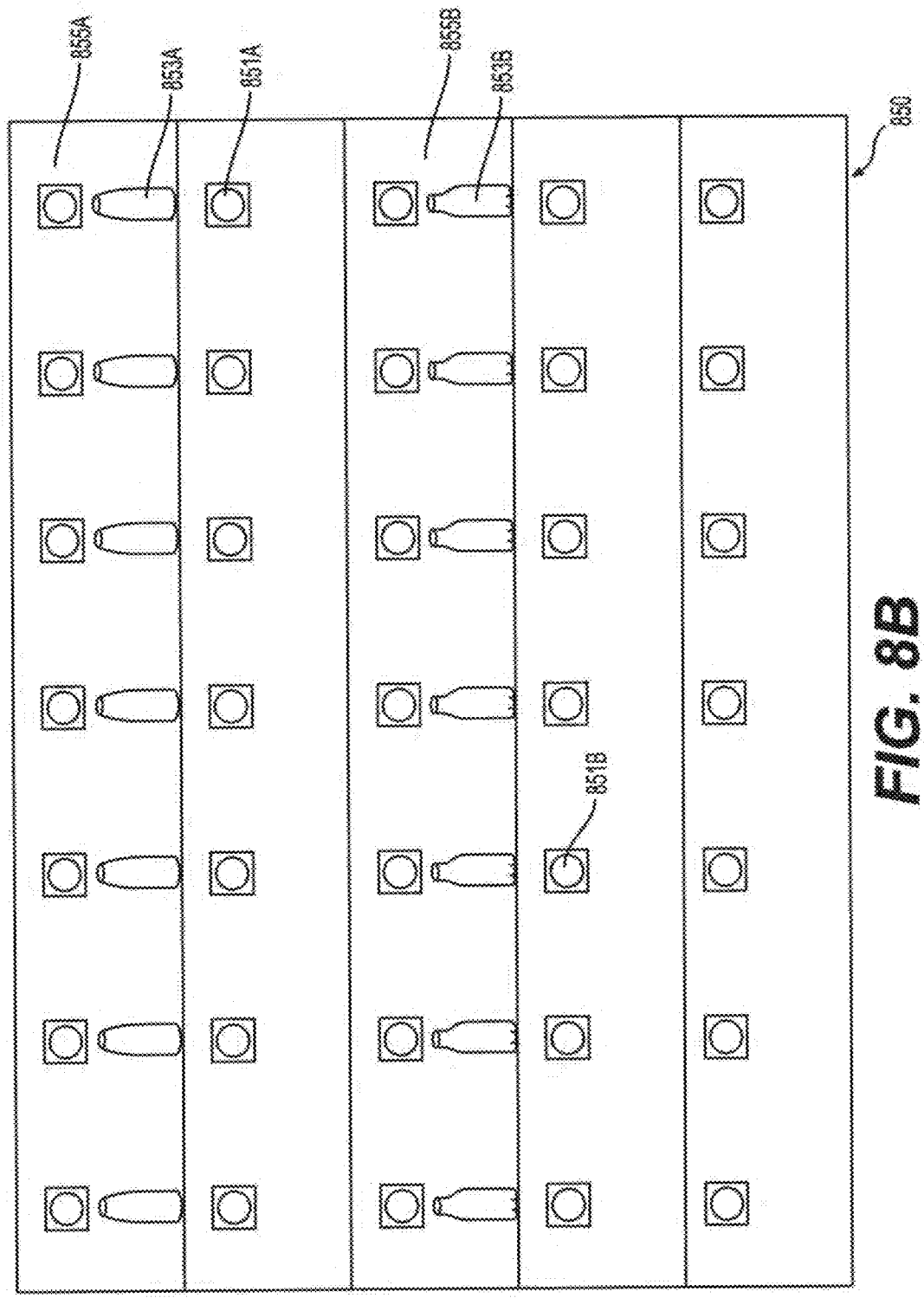
FIG. 8B is a schematic illustration of another example configuration for detecting products and empty spaces on a store shelf, consistent with the present disclosure.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
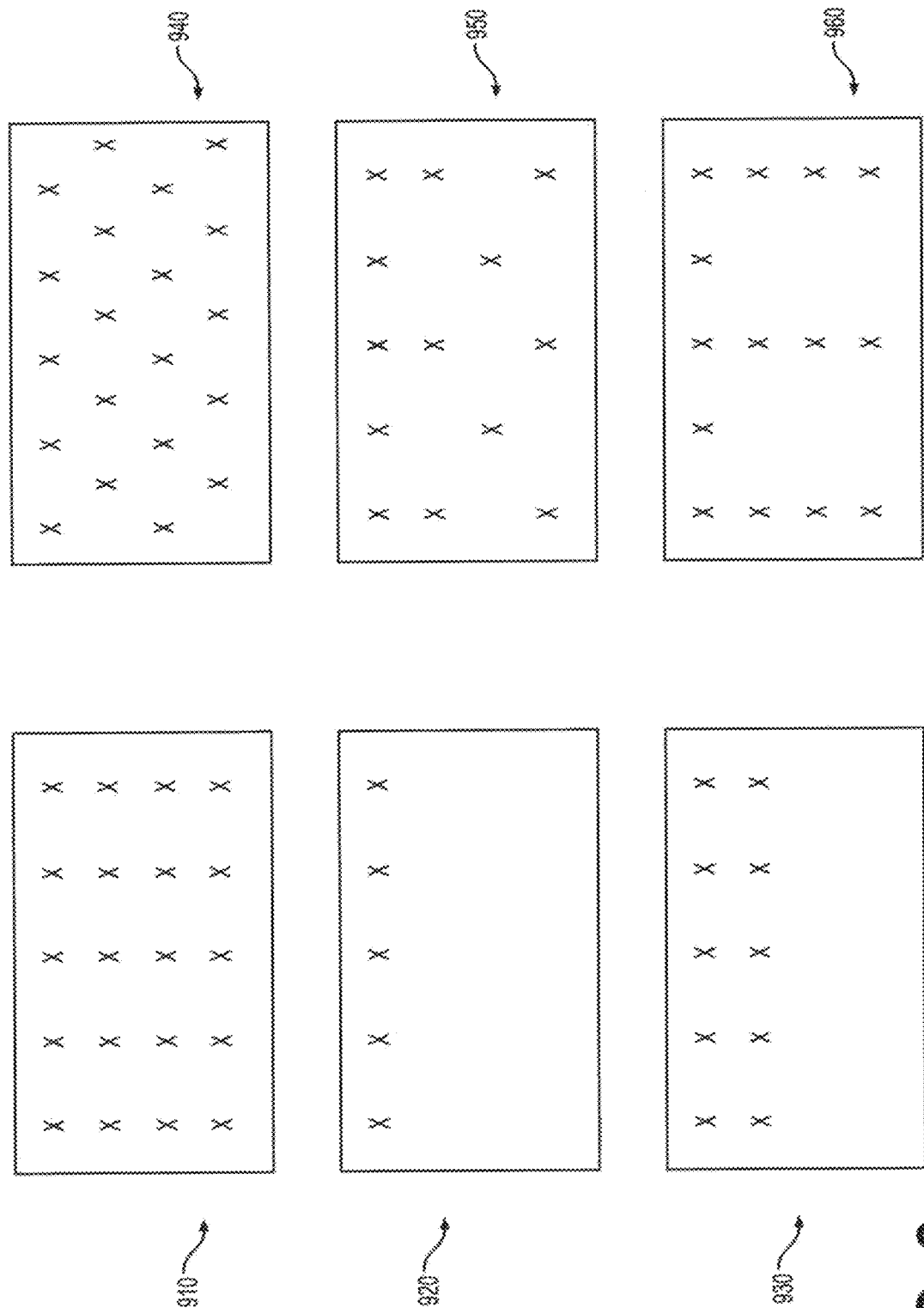
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes detection elements in a larger portion of the front of the shelf. Such arrangements may save power and processing cycles by having fewer detection elements on a back portion of the shelf. Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or a store associate, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

Figure 10A:
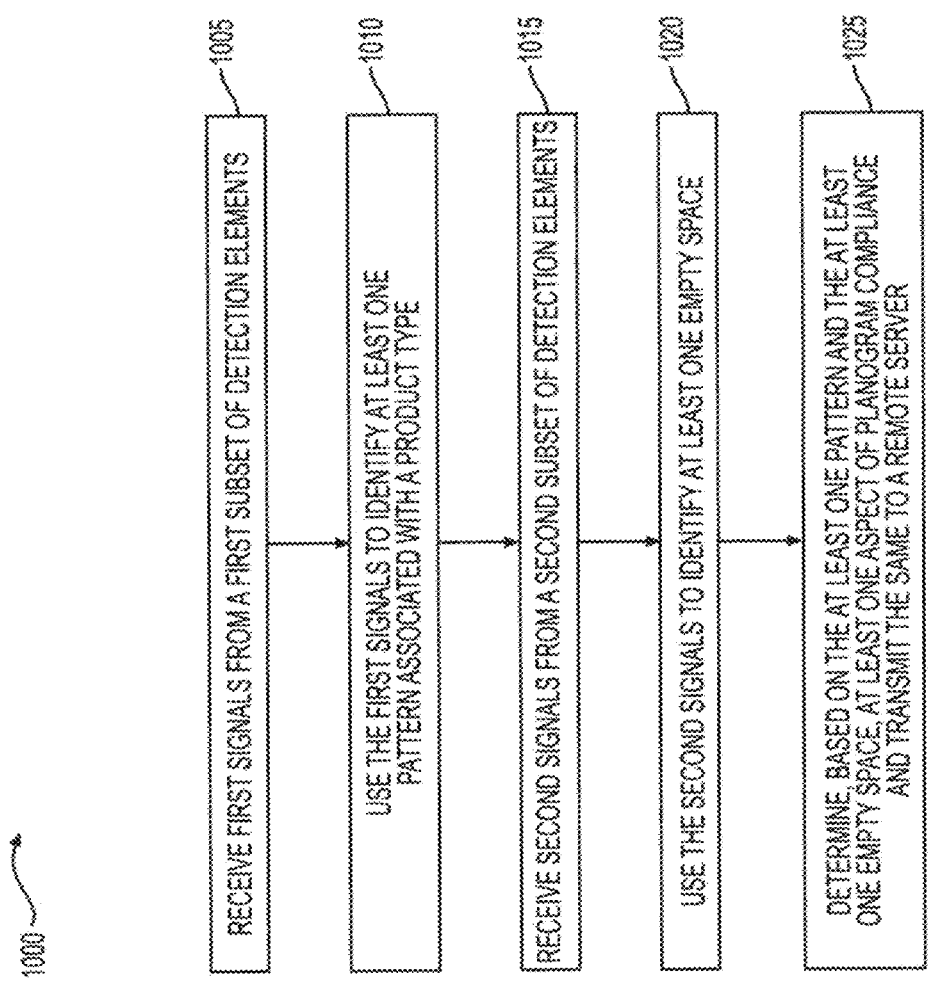
FIG. 10A illustrates an exemplary method for monitoring planogram compliance on a store shelf, consistent with the present disclosure.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf. Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), etc.). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 ounce bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, etc.). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that may be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf. In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for a store associate of the retail store.

Additionally or alternatively, method 1000 may be combined with method 1050 of FIG. 10B, described below, such that step 1055 is performed any time after step 1005.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B, and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for a store associate of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by a store associate, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
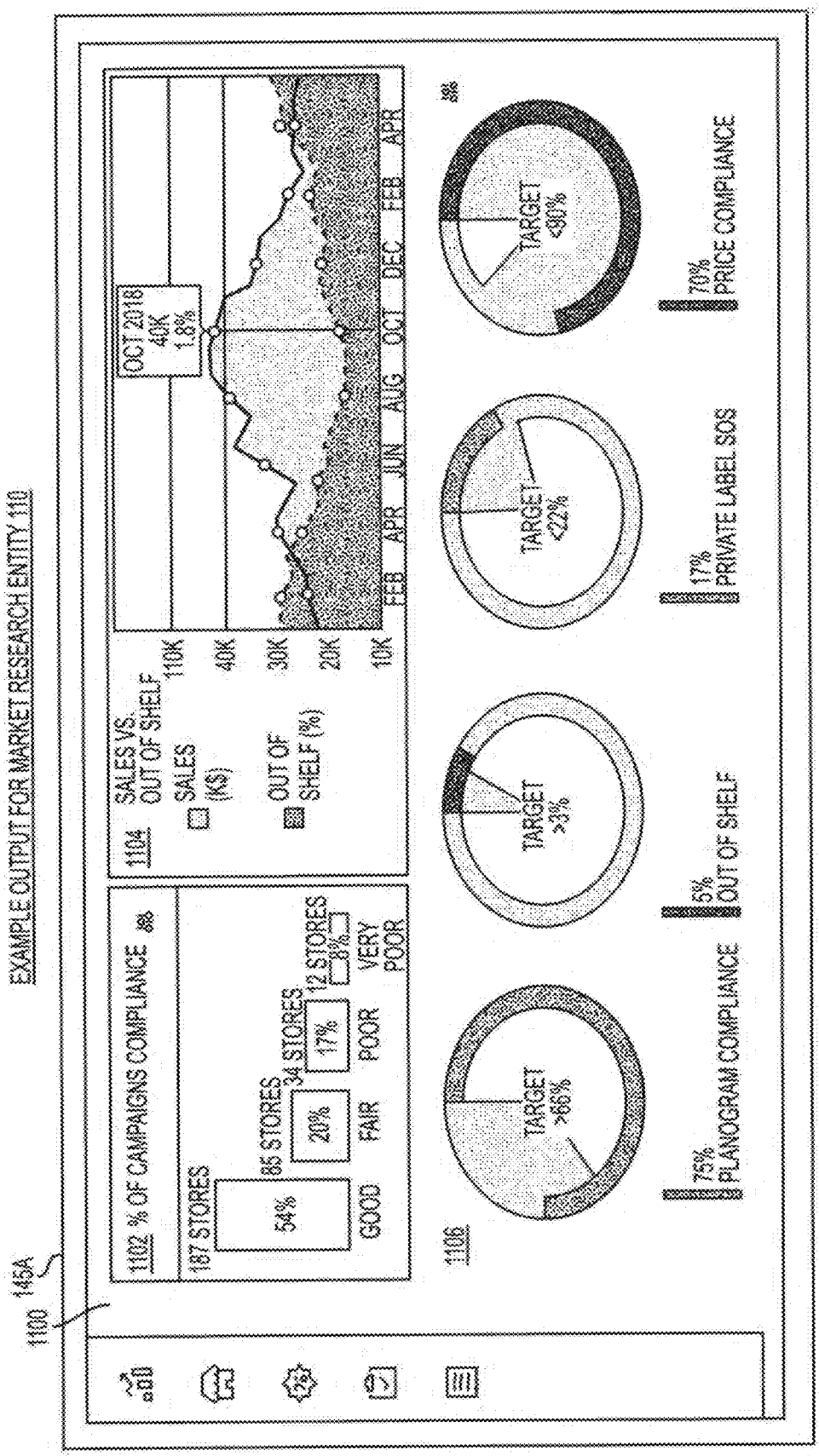
FIG. 11A is a schematic illustration of an example output for a market research entity associated with the retail store, consistent with the present disclosure.
Figure 11B:
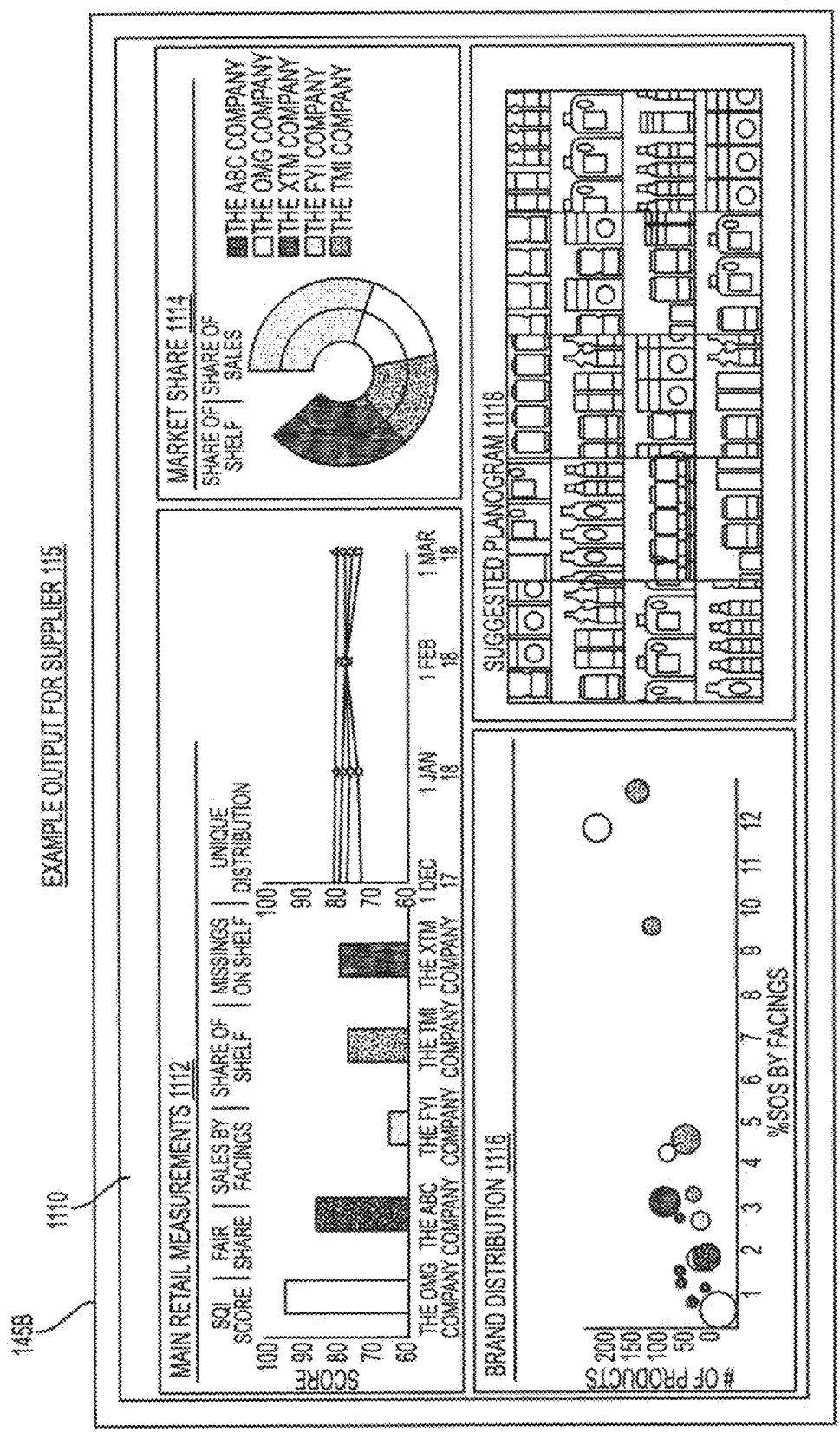
FIG. 11B is a schematic illustration of an example output for a supplier of the retail store, consistent with the present disclosure.
Figure 11C:
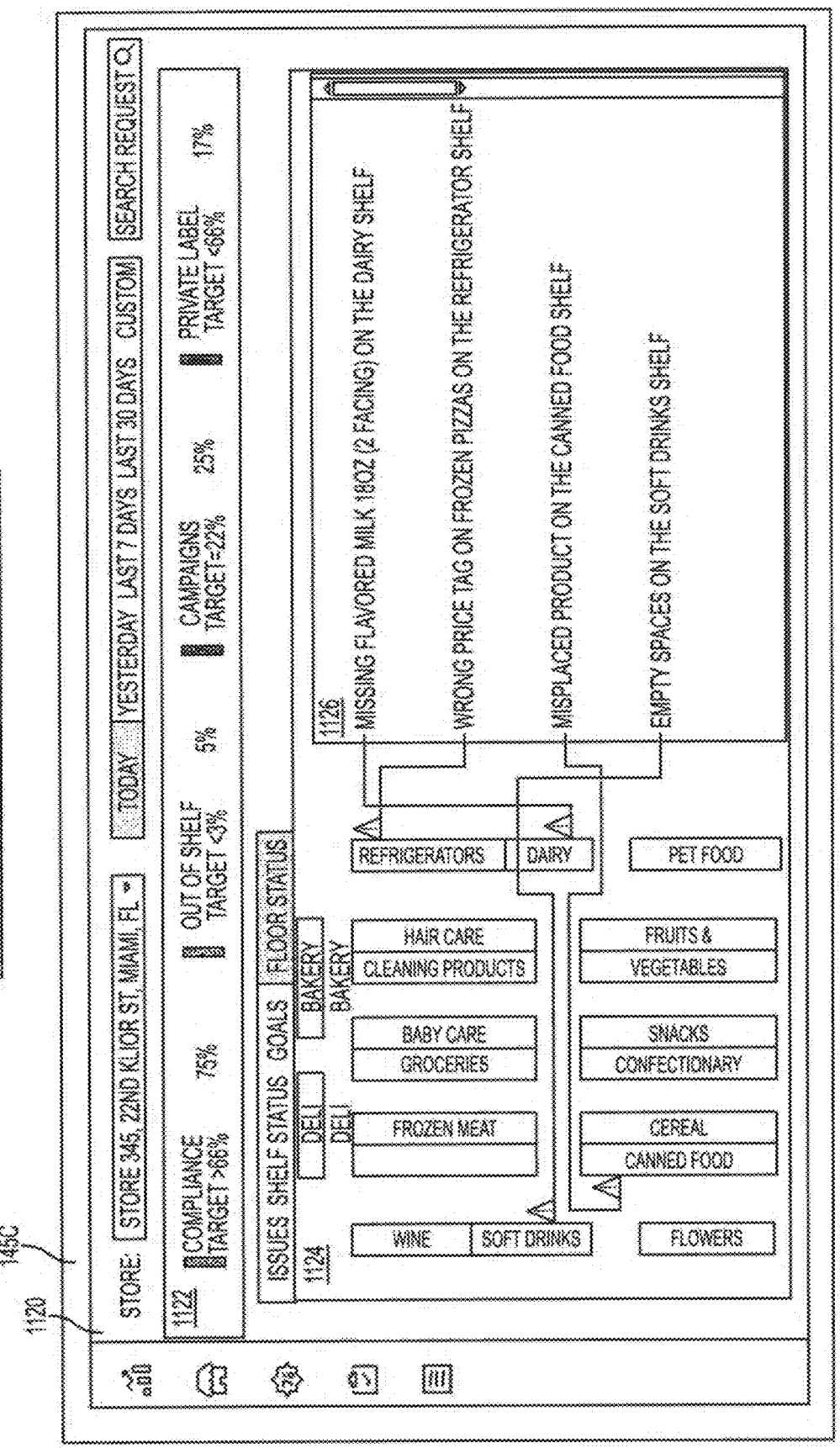
FIG. 11C is a schematic illustration of an example output for a manager of the retail store, consistent with the present disclosure.
Figure 11D:
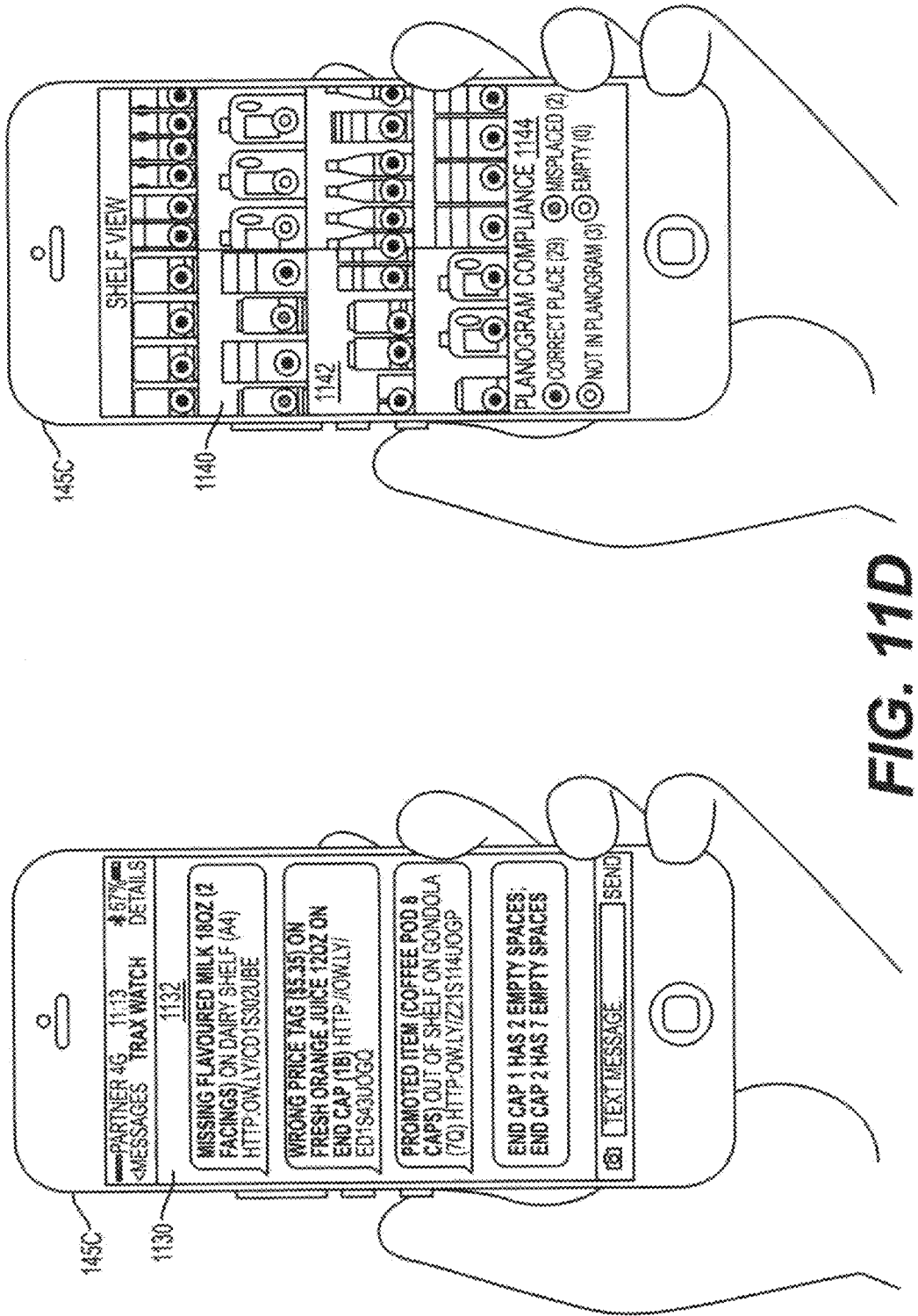
FIG. 11D is a schematic illustration of two examples outputs for a store associate of the retail store, consistent with the present disclosure.
Figure 11E:
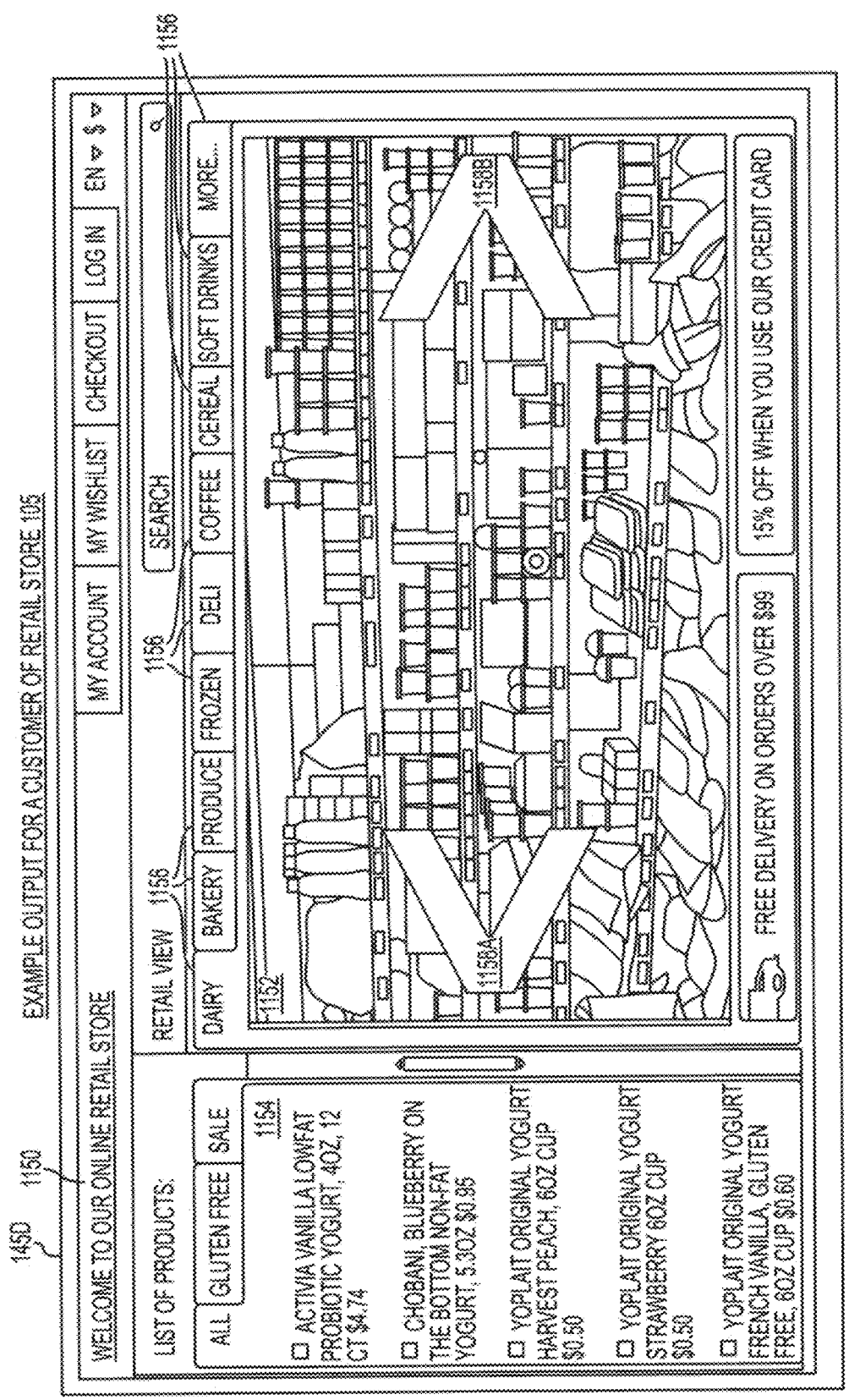
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for store associates of retail store 105. And FIG. 11E illustrates optional outputs for user 120.

FIG. 11A illustrates an example graphical user interface (GUI) 1100 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 may execute the plan. For example, the determined planogram may increase the probability that inventory is available for each retail store 105 and may be designed to decrease costs or to keep costs within a budget (such as inventory costs, restocking costs, shelf space costs, etc.). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, etc.).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by store associates of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign store associates to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help store associates of retail store 105 to quickly address situations that may negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents may be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer may virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

It has become more common for customers to order goods from local retail stores for home delivery, including but not limited to ordering groceries from a local grocery store for home delivery. In the exemplary case of groceries, the goods are often perishable and must be delivered in a timely manner from a retail store near the customer to ensure delivery without product spoilage due to time spent out of a climate-controlled environment (e.g., a refrigerator or freezer).

When a customer places an order for goods from a retail store, usually through an online ordering application or website, the order may be communicated as a customer shopping list to a shopper located in or near the retail store. The shopper is typically, though not necessarily, an individual human being. The customer's shopping list will contain a list of at least one target product that the customer is interested in having delivered from the retail store. In many cases, a target product will be specified by the customer as being a particular brand, size, weight, quantity, packaging etc. The shopper receiving the shopping list is then tasked with efficiently collecting target products on the shopping list from the retail store inventory in accordance with the shopping list specifications and then taking steps for the checkout and timely delivery to the customer of the specified target items.

The pace of store pickers (i.e., an in-store "shopper") is an important factor to the operational efficiency of retailers. As used herein, the term "store picker" and "shopper" may be used interchangeably, unless otherwise expressly indicated, to refer to an in-store individual who is retrieving products from in-store inventory for checkout and delivery into the possession and/or ownership of a customer. As used herein, the term "in-store" generally means to be physically located in or at a store. In some embodiments, it is contemplated that the shopper and customer may be the same. A main challenge to shoppers is out-of-stock items. Dealing with out-of-stock items is both time consuming and affects the quality of service to the end customer. Supporting in-store shoppers when an item is out-of-stock may therefore increase the efficiency of the shopper. Further, it may improve customer satisfaction by enabling the shopper to select more suitable replacement items. Therefore, suggesting alternative items for out-of-stock items in a natural and efficient way is desired. Described herein is a system for assisting in-store shoppers in locating an alternative product when a target product on a customer shopping list is unavailable in-store (i.e., is not part of the store's physical inventory at the time of shopping).

Figure 12:
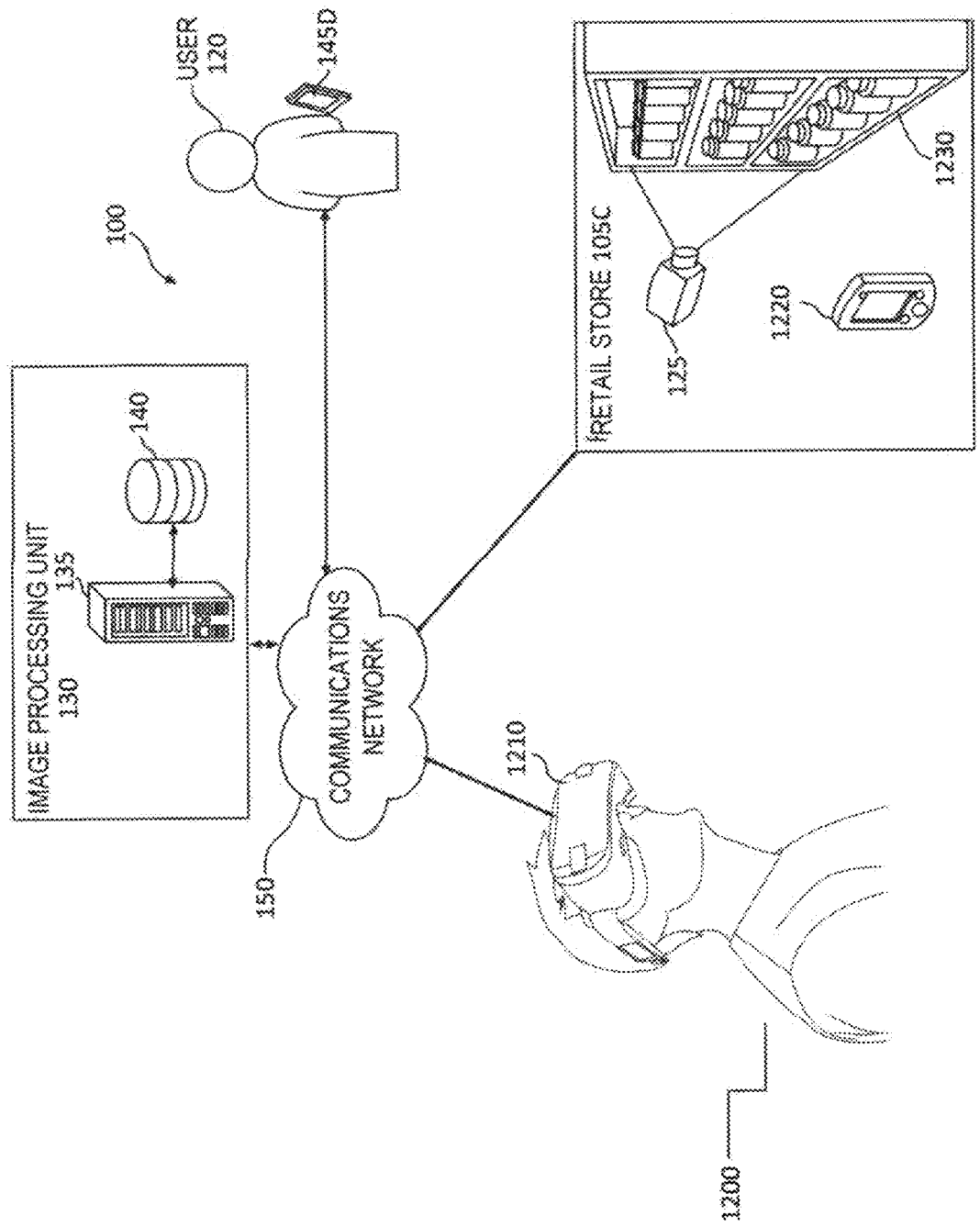
FIG. 12 is an illustration of an exemplary retail store product locator system.

FIG. 12 illustrates an exemplary embodiment of system 100 for locating an available alternative product in store 105c that includes at least one computer processor configured to execute one or more operating instructions of a computer program located in a non-transitory computer readable medium. As depicted in FIG. 12, server 135 may be communicatively coupled to one or more physical or virtual storage devices such as database 140. Server 135 may access database 140 to detect and/or identify products. The detection may occur through analysis of features in a store image using an algorithm and stored data.

As used herein, the term "store image" includes any data representative of the physical appearance, contents, and/or occupancy of at least a portion of the physical environment of store at a given moment in time, or during a given time span. For example, a store image may be captured by an in-store camera of shelf 1230. In an example embodiment, the system may capture the at least one store image by an image sensor included on a mobile device associated with a shopper. By way of example, a mobile device associated with a shopper may be correspond to devices 1210 or 1220 illustrated in FIG. 12. In another example embodiment, the at least one store image may be captured by a camera mounted in the particular retail store as part of the store infrastructure, such as the camera device 125 shown in FIG. 12.

The disclosed system may identify a product by analyzing product features in an image relative to one or more product models. Consistent with the present embodiment, the term "product model" refers to any type of algorithm or stored data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of product, such as, when two or more product models are used in combination to enable identification of a product. For example, in some cases, server 135 may use a first product model to identify a product category (such models may apply to multiple product types, e.g., shampoo, soft drinks, etc.), and server 135 may use a second product model to identify the product type, product identity, or other characteristics associated with a product. In some cases, server 135 may apply the product models together (e.g., in series, in parallel, in a cascade fashion, in a decision tree fashion, etc.) to reach a product identification. In other embodiments, server 135 may use a single product model to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include one or more suitable databases, ranging from small databases hosted on a workstation to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with a mobile device that is associated with a shopper. In some embodiments, the mobile device associated with the shopper is an extended reality appliance. FIG. 12 shows an exemplary embodiment of wearable extended reality appliance 1210. FIG. 12 also illustrates an alternative exemplary embodiment of hand-held extended reality appliance 1220. Whether wearable or hand-held, it is contemplated that an extended reality appliance will at least be a network device capable of communicating with a server (e.g., server 135) over one or more networks (e.g., via communications network 150).

The term "extended reality appliance" as used herein includes a device capable of generating and/or overlaying computer-generated or digital text, graphics, images, videos, animations, or three-dimensional holograms over a real-world scene or environment seen by a user from the point of view of the user. By way of example, an extended reality appliance may have a "heads-up" transparent display that presents data to the user's screen in front of the user's eyes, so that the user need not look away from their usual viewpoints. By way of another example, an extended reality appliance may display 3D holograms overlaid on the real world where the user is located to render a mixed reality experience to the user. The hologram image may be generated using light diffraction techniques. By way of another example, an extended reality appliance may be a head-worn device in the form of glasses or goggles, such as extended reality appliance 1210 illustrated in FIG. 12. By way of yet another example, an extended reality appliance may be a hand-held device, such as a mobile device, as shown for extended reality appliance 1220 illustrated in FIG. 12.

It is contemplated that an extended reality appliance of the disclosed system may be a dedicated and exclusive system component, or alternatively may be a multi-purpose device having features (i.e., hardware) and/or applications (i.e., software) that make it suitable for temporary use of the device in the system by a shopper as an extended reality appliance. For example, in a situation where the shopper is the customer, the personal mobile communications device of the shopper that is used as a part of the system may also be capable of being used as a temporary extended reality appliance ("TERA") component of the system for the time span that the shopper is in-store shopping for products. Such TERA functionality may be achieved, for example, by the customer downloading and installing onto a personal mobile communications device a temporary extended reality appliance software ("TERAS") application for use when shopping in-store.

An extended reality appliance may also be a dedicated system device that uses a common multi-purpose hardware platform specially configured for exclusive use in the system. Such an exclusive system extended reality appliance ("ESERA") may, for example, be in the form of a common hardware platform such as a mobile phone (e.g., an Apple iPhone, Google Pixel, Samsung Galaxy, etc.) or tablet device (e.g., an Apple iPad, Google Pixel Slate, Samsung Galaxy Tab, etc.). Such common hardware platform may be used as an ESERA by running an extended reality appliance software ("ERAS") application that is configured to only allow the device to be used with the system. It is contemplated that such ESERA devices may be provided to individuals who are employed or contracted as shoppers on the system.

In an example embodiment of the described system, a processor of server 135 executes one or more operating instructions located in a non-transitory computer readable medium to obtain an electronic shopping list associated with a customer, with the electronic shopping list identifying a target product. As used herein, the term "shopping list" means any data received from a customer identifying at least one target product. As used herein, a "target product" is any product specifically identified by a customer for acquisition from a particular store. In an example embodiment, the customer shopping list is obtained by the system over communications network 150 after being transmitted from customer 120 mobile device 145D.

In an example embodiment, the processor of server 135 may execute one or more operating instructions located in a non-transitory computer readable medium to receive at least one image representative of at least a portion of the particular retail store (i.e., a store image). The at least one image may include a representation of an alternative product. As used herein, the term "alternative product" means a product having a similar function and/or characteristics as a target product such that it may be considered a suitable replacement or substitute for the target product. In another example embodiment, the at least one image is a frame of a video feed. In another example embodiment, the at least one image includes a series of images. In such an embodiment, the series of images may be analyzed to determine whether the alternative product is selected by the shopper. After it is determined that the alternative product type has been selected by the shopper, the system may automatically update the shopping list to reflect a selection of the alternative product type by the shopper, and/or send a notification to the customer indicating a selection of the alternative product type by the shopper.

A processor of server 135 may execute one or more operating instructions located in a non-transitory computer readable medium to automatically determine that the target product is unavailable at a particular retail store. For example, a processor of server 135 may execute one or more operating instructions located in a non-transitory computer readable medium to automatically determine that the target product is unavailable at the particular retail store based on an analysis of the at least one image. For example, the at least one image may include a representation of a location in the retail store (e.g., such as a portion of a particular retail shelf) where the target product is supposed to be at, for example, based on a store map, based on a planogram, based on a realogram, based on analysis of previous images showing the target product at that location, based on a sign identifying the target product (e.g., textually, through a barcode or another visual code, by including an image of the target product, etc.) and corresponding to that location (e.g., a sign attached to the portion of the particular retail shelf), and so forth. Further, the at least one image may be analyzed to determine that no items of the target product are available at that location, for example using product recognition algorithm, and thereby determine that the target product is unavailable at the particular retail store. As another example, a processor of server 135 may execute one or more operating instructions located in a non-transitory computer readable medium to automatically determine that the target product is unavailable at the particular retail store based on analysis of inventory data associated with the particular retail store.

In some embodiments, a processor of server 135 may execute one or more operating instructions located in a non-transitory computer readable medium to automatically identify an alternative product, available at the particular retail store, as a potential alternative to the target product. For example, a processor of server 135 may execute one or more operating instructions located in a non-transitory computer readable medium to automatically identify an alternative product, available at the particular retail store, based on an analysis of the at least one image. In some examples, the at least one image may be analyzed using product recognition algorithms to identify products available at the particular retail store, and the alternative product may be selected from the identified products available at the particular retail store. For example, affinities (e.g., based on similarity among products, based on dissimilarities among products, for example based on characteristics of products obtained from a database and/or from an analysis of the at least one image) may be used to select as the alternative product the product with the highest affinity to the target products among the identified products available at the particular retail store. In another example, the at least one image may be analyzed to determine a quantity of items for each one of a plurality of products (e.g., using a regression model, using object counting algorithms, etc.), and a selection of a particular product as the alternative product may be avoided when the quantity of items corresponding to that product is below a selected threshold. The threshold may be different for different products or may be the same to all products. In yet another example, the at least one image may be analyzed to determine a price for each one of a plurality of products (e.g., by analyzing price labels using OCR algorithms), a sensitivity to price of the customer may be obtained (e.g., from the customer, from an analysis of previous purchases of the customer, etc.), and the alternative product may be selected based on the determined prices and the obtained sensitivity to price of the customer (e.g., avoiding selection of high priced products for a customer with high sensitivity to price, while selection a high priced product for a customer with low sensitivity to price). In other embodiments, a processor of server 135 may execute one or more operating instructions located in a non-transitory computer readable medium to automatically identify an alternative product, available at the particular retail store, based on analysis of inventory data associated with the particular retail store. For example, a selection of a particular product as the alternative product may be avoided when the quantity of items corresponding to that product is below a selected threshold. The threshold may be different for different products or may be the same to all products.

A processor of server 135 may execute one or more operating instructions located in a non-transitory computer readable medium to analyze the at least one image to cause an extended reality appliance to present to a shopper a visual indicator associated with the alternative product in the particular retail store. For example, the at least one image may be analyzed to determine a position (e.g., such as location, orientation, etc.) in the physical retail store to present the virtual visual indicator at. A digital signal may be provided to the extended reality appliance (e.g., through a digital communication device) to cause the extended reality appliance to present the visual indicator at the determined position. In one example, the digital signal may include an indication of the position (e.g., in a coordinate system relative to at least one of the world, the retail store, one or more objects within the retail store, or the extended reality appliance (for example, at a particular point in time). In another example, the at least one image may be analyzed to select of the visual indicator or of a characteristic of the visual indicator (e.g., such as size, color scheme, opacity, graphical content, textual content, and so forth). A digital signal may be provided to the extended reality appliance (e.g., through a digital communication device) to cause the extended reality appliance to present the visual indicator with the selected characteristic. For example, the digital signal may include a digital encoding of the selected characteristic. In some examples, a machine learning model may be trained using training examples to determine information associated with visual indicators (e.g., such as position information, visual indicator characteristic information, etc.) from images and/or videos. An example of such training example may include a sample image and/or a sample video, together with a label indicating the desired determination of information for the sample image and/or the sample video. The trained machine learning model may be used to analyze the at least one image to determine information associated with a visual indicator associated with the alternative product. Further a digital signal based on the determine information associated with a visual indicator associated with the alternative product may be provided to the extended reality appliance (e.g., through a digital communication device) to cause the extended reality appliance to present the visual indicator. For example, the digital signal may include a digital encoding of the determined information associated with a visual indicator associated with the alternative product. In some embodiments, extended reality appliance may be a head-mounted device as shown for example by device 1210 in FIG. 12. In other embodiments, the extended reality appliance may be a mobile communication device associated with the shopper, as shown for example by device 1220 in FIG. 12.

Figure 13A:
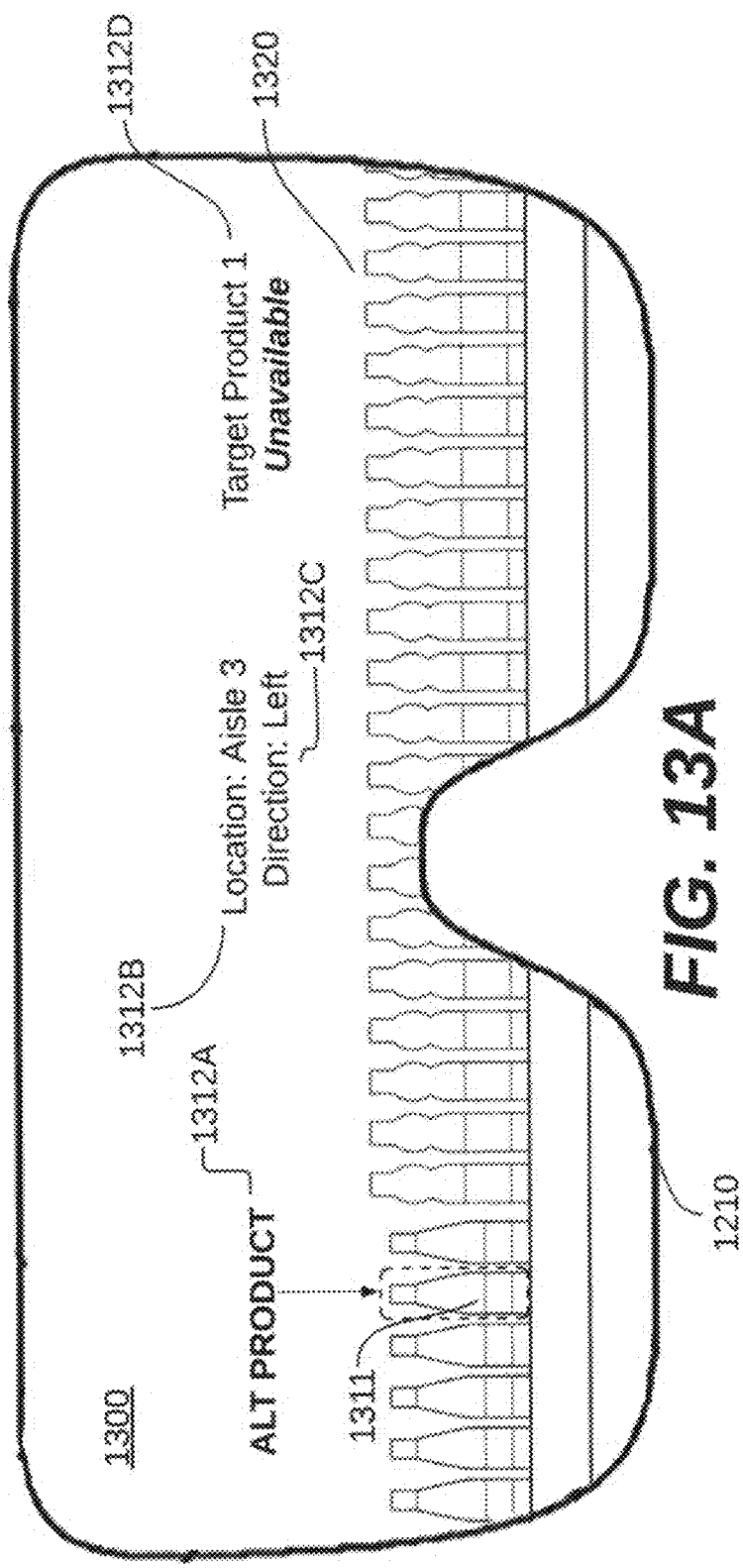
FIG. 13A is an illustration of a display screen for a head-worn extended reality appliance as described herein.
Figure 13B:
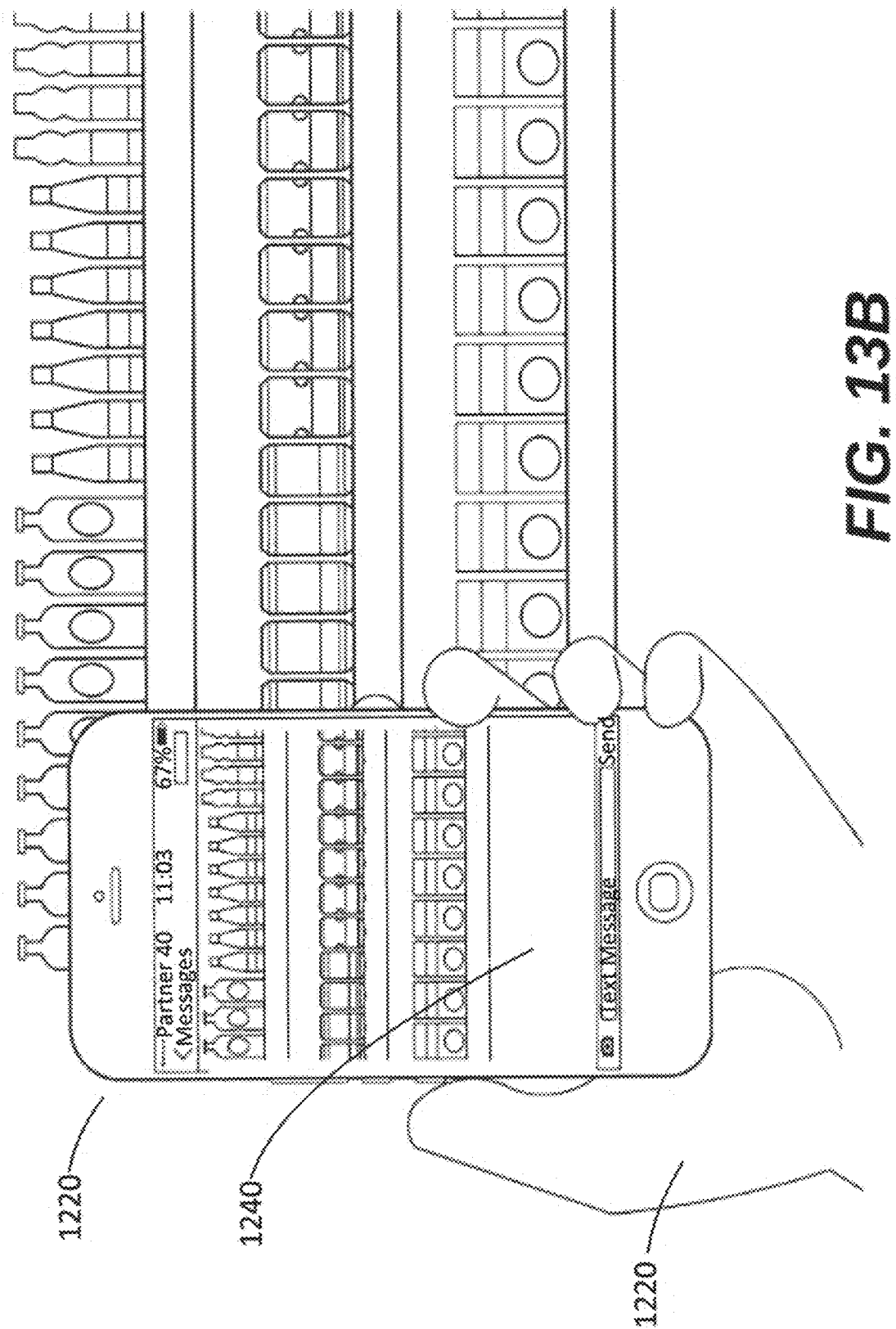
FIG. 13B is an illustration of a hand-held mobile communications embodiment of an extended reality appliance with a see-through screen as described herein.

A processor of server 135 may execute one or more operating instructions located in a non-transitory computer readable medium to cause a visual indicator associated with the alternative product in the particular retail store to be displayed to a shopper on an extended reality appliance. For example, the extended reality appliance may include a see-through display 1222, such as shown in FIG. 13B, and the analysis of the at least one image may be used to select a location on the see-through display 1222 so that a visual indicator is positioned in a correct location with respect to the alternative product.

Figure 13C:
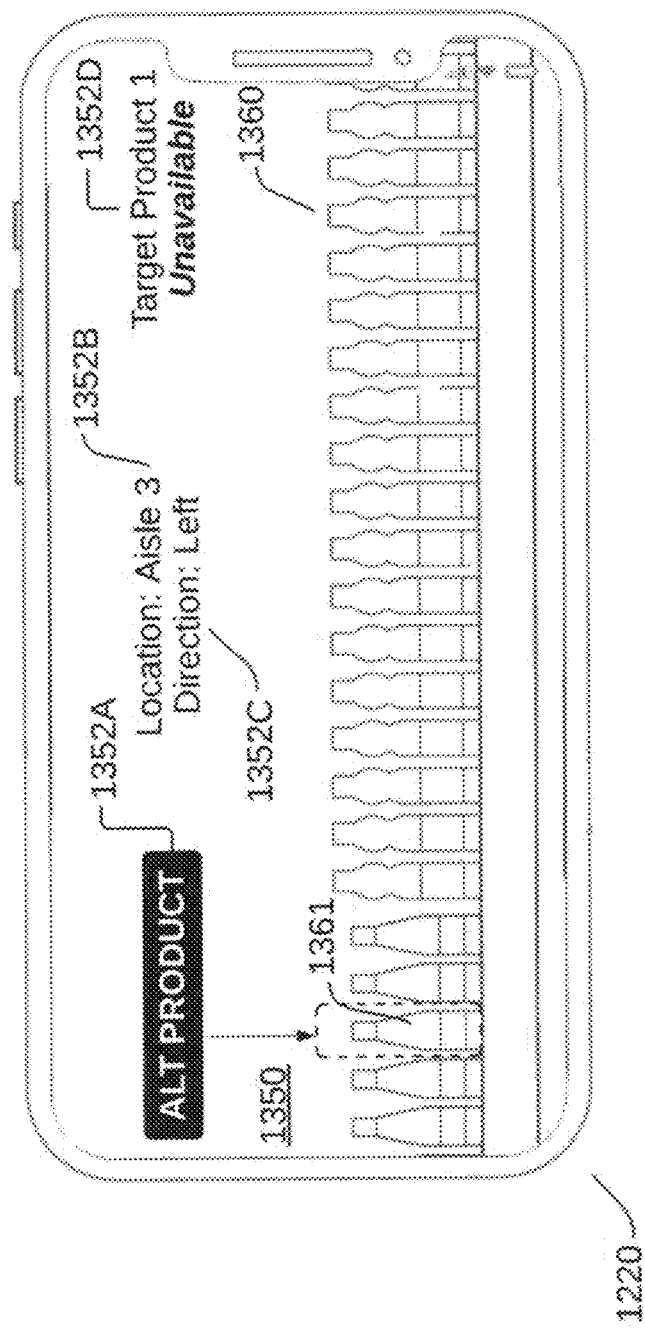
FIG. 13C is an illustration of a display screen of the extended reality appliance of FIG. 13B with a graphic overlay having visual indicators as described herein.

In some embodiments, the visual indicator may be presented as a first indicator type if substitution of the target product with the alternative product requires an authorization from the customer, and wherein the visual indicator may be presented as a second indicator type, different from the first indicator type, if substitution of the target product with the alternative product does not require an authorization from the customer. FIGS. 13A and 13C show examples of visual indicators. Specifically, with reference to FIG. 13A, wearable extended reality appliance 1210 includes a display screen 1310 and at least a portion of the at least one store image 1320 is displayed on display screen 1310 together with a graphic overlay 1312 comprised of various informational elements (1312A, 1312B, 1312C and 1312D), including visual indicator 1312A associated with a representation of alternative product 1311. As illustrated in FIG. 13A visual indicator 1312A is solid black text with no background. FIG. 13C shows a hand-held extended reality appliance 1220 having a display screen 1350. As illustrated in FIG. 13C, at least a portion of the at least one store image 1360 is displayed on display screen 1350 together with a graphic overlay 1352 including various informational elements (1352A, 1352B, 1352C and 1352D and visual indicator 1352A, which is associated with a representation of alternative product 1361. As illustrated in FIG. 13D, visual indicator 1352A is solid white text with a black background. Visual indicator 1312A and visual indicator 1352A are examples of different visual indicator types for communicating whether customer authorization is needed to select the identified alternative product. For example, a visual indicator with a solid black text and no background like visual indicator 1312A may represent a first type of visual indicator communicating that substitution of the target product with the alternative product requires customer authorization, while a visual indicator with a white text on a solid black background like the visual indicator 1352A may represent a second type of visual indicator communicating that substitution of the target product with the alternative product does not require customer authorization. The preceding are merely examples and in other embodiments, the visual indicators may differ from the illustrated examples and include graphical symbols, animated objects, etc.

As shown in FIG. 13A, a graphic overlay 1312 displayed on display 1300 of extended reality appliance 1210 may also include a visual indication 1312D that the target product is not available at the particular retail store. Similarly, referring to the example of FIG. 13C, a graphic overlay 1352 displayed on display 1350 of an extended reality appliance 1220 may also include a visual indication 1352D that the target product is not available at the particular retail store.

As shown in FIG. 13A, a graphic overlay 1312 displayed on display 1300 of extended reality appliance 1210 may also include a directional indicator 1312C for assisting in locating the alternative product within the particular retail store. Similarly, referring to the example of FIG. 13C, a graphic overlay 1352 displayed on display 1350 of an extended reality appliance 1220 may also include a directional indicator 1352C for assisting in locating the alternative product within the particular retail store. For example, in an embodiment where the shopper is displaced from the location of the alternative product, the system may capture an image of the alternative product and display the captured image to the shopper along with directions, directional arrows, etc. for locating the alternative product.

As shown in FIG. 13A, a graphic overlay 1312 displayed on display 1300 of extended reality appliance 1210 may also include an indication 1312B of a location in the particular retail store where the alternative product is located. Similarly, referring to the example of FIG. 13C, a graphic overlay 1352 displayed on display 1350 of an extended reality appliance 1220 may also include an indication 1352B of a location in the particular retail store where the alternative product is located.

Figure 14A:
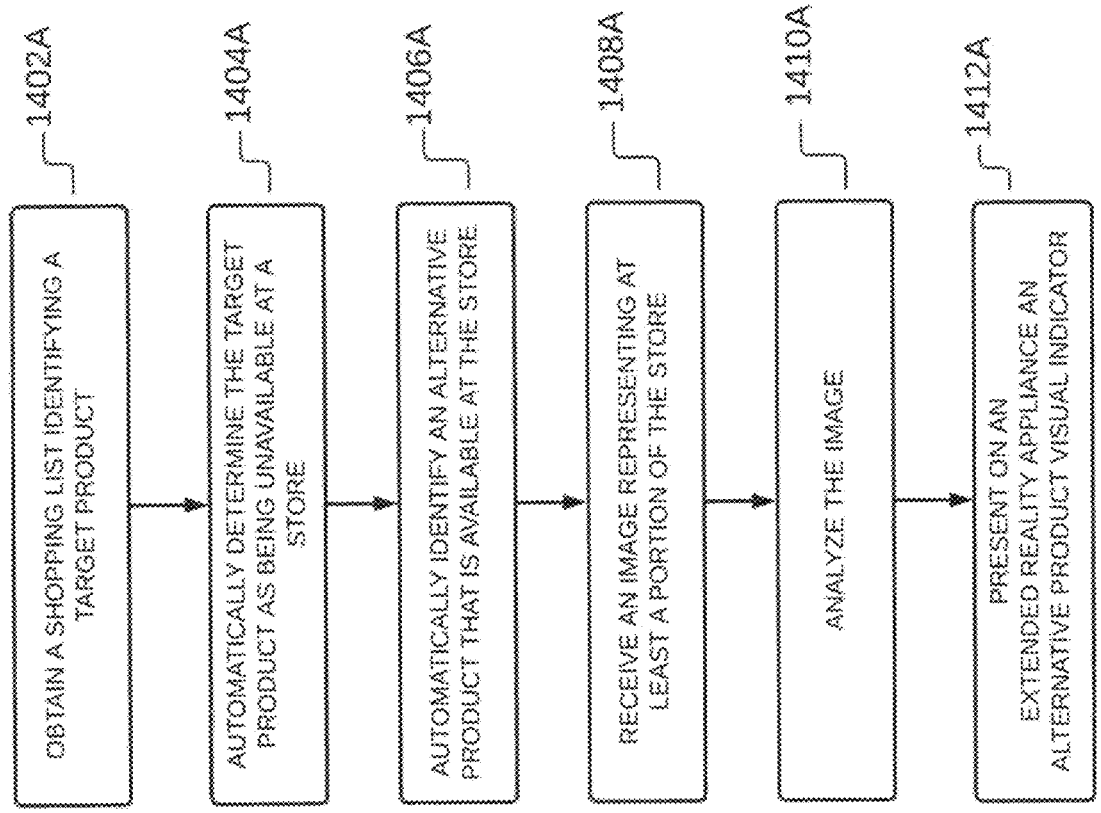
FIG. 14A is a flowchart representing an exemplary method for locating an available alternative product in a store, consistent with disclosed embodiments.

FIG. 14A includes a flowchart representing an exemplary method 1400A for locating an available alternative product in a store 105c in accordance with example embodiments of the present disclosure. For purposes of illustration, in the following description, reference is made to certain components of system 100 as deployed in the configuration depicted in FIGS. 12 and 13A-C. For example, method 1400A may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform method 1400A. Further, method 1400A is not necessarily limited to the steps shown in FIG. 14A, and any steps or processes of the various embodiments described throughout the present disclosure may also be included in method 1400A.

At step 1402A, method 1400A includes a processor of server 135 executing one or more operating instructions from a computer program located in a non-transitory computer-readable medium to obtain a shopping list over communications network 150 from user 120, where the shopping list identifies at least one target product for selection from the store 105c. The shopping list may be entered by a customer user of the system through a personal mobile communications device associated with the customer user.

At step 1404A, one or more operating instructions of the computer program are executed by a processor of server 135 to automatically determine the at least one target product as being an unavailable product at store 105c. Such an automatic determination may initially be done on receipt of the communicated shipping list by making a comparison to the most recent store inventory records in an electronic inventory database.

At step 1406A, one or more operating instructions of the computer program are executed by a processor of server 135 to automatically identify an available alternative product at the store 105c. Such an automatic determination may initially be done on identification of a target product being unavailable by querying the electronic inventory database for an identification of available products that are considered alternatives to the target product.

At step 1408A, one or more operating instructions of the computer program are executed by a processor of server 135 to receive at least one image from the store 105c including a representation of the alternative product. The received images may be from image capture devices that are part of the store infrastructure, such as wall mounted cameras, or may be mobile image capture devices, such as from devices carried by in-store shoppers or autonomous in-store mobile image capture devices like a drone.

At step 1410A, one or more operating instructions of the computer program are executed by a processor of server 135 to analyze the at least one image received from the store 105c. The at least one store image may be a captured still image, or a video frame, or a series of still images or video frames. The analysis of the at least one store image may be used to automatically identify a target product as being out of stock, such as through an image analysis identifying empty store shelf space where the target product would be expected to be located according to a store planogram. The availability of alternative products could be confirmed through analysis of a store image, or other sensor input, of the presence of the alternative product on a store shelf.

At step 1412A, one or more operating instructions of the computer program are executed by a processor of server 135 to display on an extended reality appliance 1210 a visual indicator 1312A of the alternative product at the store 105c. The visual indicator may be comprised of text and/or graphics identifying and showing the location and availability of the alternative product.

FIG. 14B includes a flowchart representing an exemplary method 1400B for locating an available alternative product in a store 105c in accordance with example embodiments of the present disclosure. For purposes of illustration, in the following description, reference is made to certain components of system 100 as deployed in the configuration depicted in FIGS. 12 and 12A-D. For example, method 1400B may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform method 1400B. Further, method 1400B is not necessarily limited to the steps shown in FIG. 14B, and any steps or processes of the various embodiments described throughout the present disclosure may also be included in method 1400B.

At step 1402B, method 1400B includes a processor of server 135 executing one or more operating instructions from a computer program located in a non-transitory computer-readable medium to obtain a shopping list over communications network 150 from user 120, where the shopping list identifies at least one target product for selection from the store 105c. The shopping list may be entered by a customer user of the system through a personal mobile communications device associated with the customer user.

At step 1404B, one or more operating instructions of the computer program are executed by a processor of server 135 to automatically determine the at least one target product as being an unavailable product at store 105c. Such an automatic determination may initially be done on receipt of the communicated shipping list by making a comparison to the most recent store inventory records in an electronic inventory database.

At step 1406B, one or more operating instructions of the computer program are executed by a processor of server 135 to automatically identify an available alternative product at the store 105c. Such an automatic determination may initially be done on identification of a target product being unavailable by querying the electronic inventory database for an identification of available products that are considered alternatives to the target product.

At step 1408B, one or more operating instructions of the computer program are executed by a processor of server 135 to receive at least one image from the store 105c including a representation of the alternative product. The received images may be from image capture devices that are part of the store infrastructure, such as wall mounted cameras, or may be mobile image capture devices, such as from devices carried by in-store shoppers or autonomous in-store mobile image capture devices like a drone.

At step 1410B, one or more operating instructions of the computer program are executed by a processor of server 135 to analyze the at least one image received from the store 105c. The at least one store image may be a captured still image, or a video frame, or a series of still images or video frames. The analysis of the at least one store image may be used to automatically identify a target product as being out of stock, such as through an image analysis identifying empty store shelf space where the target product would be expected to be located according to a store planogram. The availability of alternative products could be confirmed through analysis of a store image, or other sensor input, of the presence of the alternative product on a store shelf.

At step 1412B, one or more operating instructions of the computer program are executed by a processor of server 135 to determine if substitution of the in-store available alternative product as a replacement for the unavailable target product requires customer authorization. A customer user of the system, when inputting or communicating their shopping list, may provide an authorization indication or setting as to whether customer authorization is required for the substitution of a target product on the shopping list with an available alternative product. The authorization indication or setting may be stored by the system and used by the system when an alternative product is available for substitution.

At conditional step 1414B, one or more operating instructions of the computer program may be executed by a processor of server 135 to display on an extended reality appliance a first alternative product visual indicator type if it was determined at step 1412B that customer authorization was needed for substitution. The system may display such a first visual indicator in a particular visual style, such as plain text, or text of a certain color. At conditional step 1416B, one or more operating instructions of the computer program may be executed by a processor of server 135 to display on an extended reality appliance a second alternative product visual indicator type, distinctive in appearance from the first alternative product visual indicator type, if it was determined at step 1412B that customer authorization was not needed for substitution. The second alternative product visual indicator type should be readily distinguishable in appearance from the first visual indicator type, such as for example having a prominent contrasting background.

At step 1418B, one or more operating instructions of the computer program are executed by a processor of server 135 to determine if the alternative product has been selected by the shopper. This may be accomplished through the shopper taking an action through the extended reality appliance to indicate selection of the alternative product, or could be determined automatically through image analysis or sensor input showing a change in the shelf inventory of the alternative product.

At step 1420B, one or more operating instructions of the computer program are executed by a processor of server 135 to update the shopping list based on whether the alternative product was selected or not by the shopper.

With the increased use of internet-connected mobile communication devices by in-store shoppers there is also an increased opportunity for a store to still satisfy a customer's demand for an in-store product when the shopper encounters an out-of-stock situation at a store. The system and methods described herein provide for the automatic sensing of such a situation. Specifically, to facilitate online shopping for customers in retail stores, the system may receive indicators when a customer who is physically present in a retail store is interested in a category of products. The system may also receive indicators when a product targeted by the customer is out of stock. In response to these indicators, the system may send a notification to the customer suggesting purchasing the product online, e.g., via a mixed reality platform. For example, a customer may wish to buy a specific brand of detergent that is currently unavailable: Rather than purchase a different brand, the system may suggest that the customer purchase the detergent online, e.g., to preserve brand loyalty.

The system described herein, as illustrated by way of example in FIG. 12, may also provide an in-store shopper notification about the online ordering of an unavailable in-store product. Such a use of the system may apply to circumstances where the in-store shopper is also the customer.

FIGS. 15A and 15B illustrate an exemplary head-worn extended reality appliance 1210 and a display 1300 for extended reality appliance 1210. In an example embodiment, one or more operating instructions included in a non-transitory computer readable medium are executed by a processor of server 135 to present on display 1300 a contemporaneous store image from at least a portion of the store, such as a shelf space, which includes a representation of an unavailable in-store product 1510.

In an example embodiment, one or more operating instructions included in a non-transitory computer readable medium are executed by a processor of server 135 to make a first determination that a customer located in a physical retail store has engaged in at least one product category action associated with an interest in a category of products associated with the retail store. As used herein, the term "product category action" means any action of a shopper that is associated with a category of products (i.e., a product category). As used herein, the term "product category" means a collection of products that share a common function and/or characteristics. In some embodiments, one or more operating instructions included in a non-transitory computer readable medium are executed by a processor of server 135 to make the first determination based on automatic analysis of image data acquired by one or more cameras located in the physical retail store, where in some embodiments the one or more cameras are mounted within the physical retail store, and in other embodiments the one or more cameras are included on a device associated with the shopper. The device associated with the shopper may include a mobile device, a phone, glasses, etc. In some examples, the image data may capture the at least one action associated with the interest in the category of products associated with the retail store, the image data may be analyzed using an action recognition algorithm to detect the at least one action, and the first determination may be based on the detection of the at least one action. Some non-limiting examples of such actions for associated with the interest in the category of products may include picking up at least one product from among the category of products, reaching to at least one product from among the category of products, looking in a direction of at least one product from among the category of products, and so forth. In some examples, a machine learning model may be trained using training examples to determine whether customers are engaged in actions associated with interest in categories of products from images and/or videos. An example of such training example may include a sample image and/or a sample video of a sample customer in a sample retail store, together with a label indicating whether the sample customer is engaged in an action associated with an interest in a particular category of products associated with the sample retail store. The trained machine learning model may be used to analyze the image data and make the first determination. In some examples, a convolution of at least part of the image data may be calculated to obtain a result value of the calculated convolution. In one example, the first determination may be based on the result value of the calculated convolution. In one example, in response to the result value of the calculated convolution being a first value, the first determination may be made, and in response to the result value of the calculated convolution being a second value, making the first determination may be avoided.

In an example embodiment, one or more operating instructions included in a non-transitory computer readable medium are executed by a processor of server 135 to make the first determination based at least in part on a sensed location of the customer within the physical retail store. Extended reality appliance 1210, either alone or in conjunction with in-store infrastructure, may communicate to server 135 in-store shopper location information from which a first determination may be made of a product category action for the shopper. It is common in retail store environments for products that share a common function and/or characteristics to be grouped together at a particular in-store location. For example, paper products like toilet paper, tissue, and absorbent towels are typically displayed on adjacent shelves in a particular aisle of a store, while bread and other baked goods are typically displayed on adjacent shelves in a different aisle of the store. Accordingly, physical information about a shopper's in-store location may be collected and analyzed by the system in accordance with one or more operating instructions to make a first determination about the product category actions of an in-store shopper.

In an example embodiment, one or more operating instructions included in a non-transitory computer readable medium may also be executed by a processor of server 135 to make the first determination based at least in part on a looking direction (i.e., a viewing direction) 1530 of an in-store shopper 1505. The viewing direction 1530 of the shopper 1505 may be sensed based on an analysis of a image data acquired by one or more cameras associated with the physical retail store. For example, the image data may be analyzed using a gaze detection algorithm and/or using head pose estimation algorithm to determine viewing direction 1530. The view direction may also be determined from the sensors of an extended reality appliance, such as a magnetometer to provide compass readings (i.e., horizontal direction), and one or more accelerometers for level readings (i.e., vertical direction), for the extended reality appliance.

In another an example embodiment, one or more operating instructions included in a non-transitory computer readable medium may be executed by a processor of server 135 to make the first determination based at least in part on an amount of time the looking direction of the customer remains within a certain range of looking directions (i.e., a view direction time 1540). The view direction time may be determined by image analysis of the shopper in-store, or could also be determined from a combination of a clock and sensors of an extended reality appliance, where the time could be recorded which was spent by the extended reality appliance in a particular range of horizontal and vertical orientation as determined by a magnetometer to provide compass readings (i.e., horizontal direction), and one or more accelerometers for level readings (i.e., vertical direction), for the extended reality appliance.

Figure 15C:
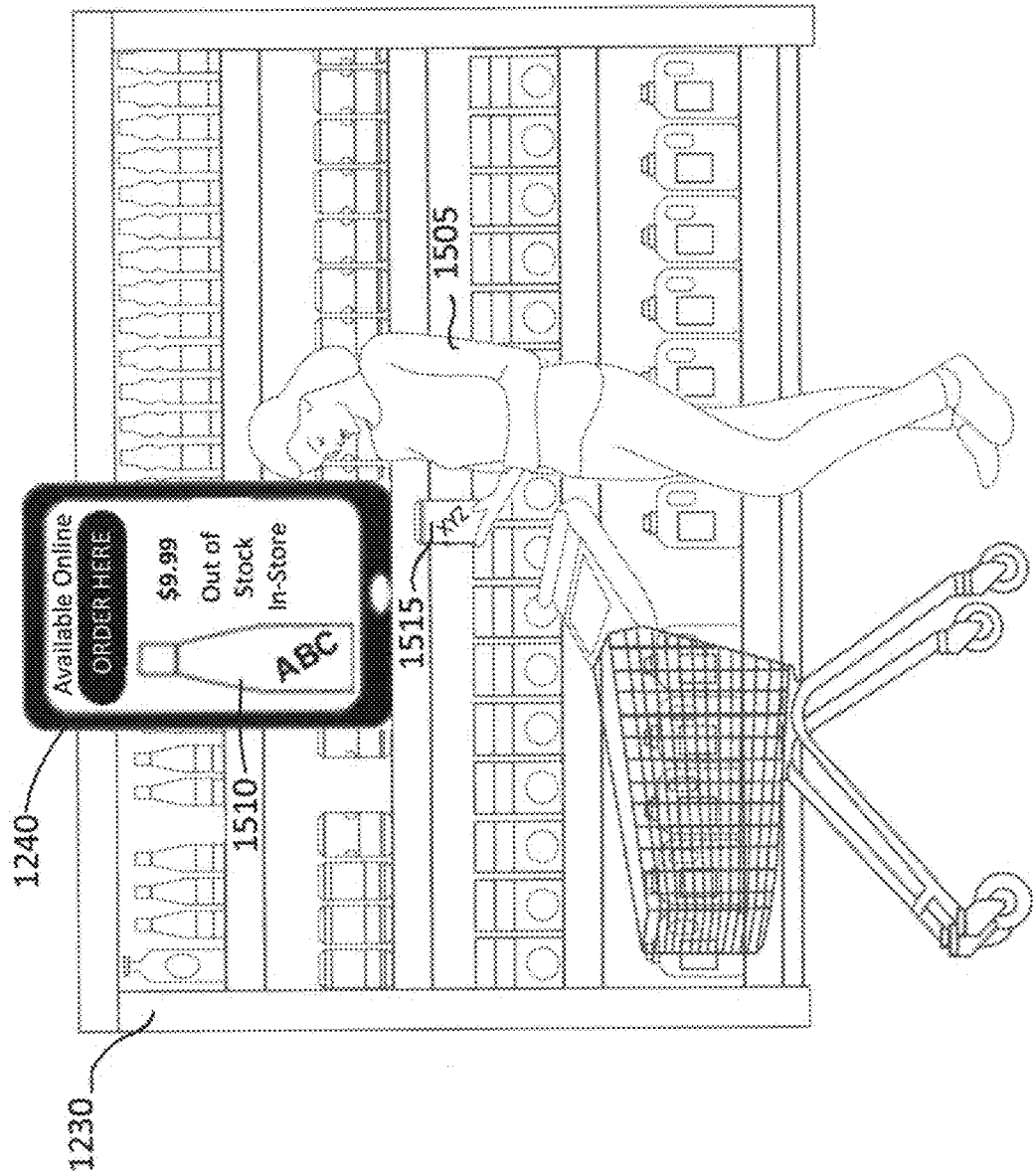
FIG. 15C is an illustration of an in-store infrastructure display screen mounted on a shelf-space for displaying a shopper notification as described herein.

Referring to FIG. 15C, in another example embodiment, one or more operating instructions included in a non-transitory computer readable medium may be executed by a processor of server 135 to make the first determination based at least in part on a sensed action by the customer relative to the category of products associated with the physical retail store, such as for example picking up at least one product 1515 from among the category of products. The determination of the picking up of at least one product may be determined through analysis of at least one image captured of the in-store shopper performing such an action, and/or analysis of sensor data regarding the presence or absence of product from a store shelf correlated with the proximity of the shopper to such store shelf.

In another example embodiment, one or more operating instructions included in a non-transitory computer readable medium may be executed by a processor of server 135 to make the first determination based at least in part on an automatic analysis of a virtual shopping list associated with the customer. A virtual shopping list may be a shopping list that a customer user of the system enters into a mobile communications device associated with the customer and communicates to the system server 135. The virtual shopping list identifies at least one target product that the customer user is interested in obtaining from the store, and the system may execute one or more operating instructions to analyze such shopping list to determine that a shopper located in the physical retail store has an interest in a target product that is part of a product category associated with the retail store. Such analysis may include an identification of the product category of a target product through reference to one or more inventory databases.

In another example embodiment, one or more operating instructions included in a non-transitory computer readable medium may be executed by a processor of server 135 to make the first determination based at least in part on an analysis of a previous shopping activity associated with the shopper. The system disclosed herein may store data associated with a shopper's prior shopping activity by maintaining data from a shopper's activities on previous visits to the physical retail store (e.g., what the shopping list was, and what was actually purchased, on such prior visits), or from prior activity of the shopper during a particular store visit, and execute one or more operating instructions to use such data in making a determination that at least one action of the shopper is associated with an interest in a product category.

Accordingly, physical information about a shopper's in-store location, shopper's view direction 145 (i.e., the direction the shopper is looking), the shopper's view direction time 146 (i.e., how much time the shopper spends looking in a particular direction), and the products the shopper is picking up and/or otherwise inspecting are examples of physical information the disclosed system may collect and analyze to make a first determination about the product category actions of an in-store shopper. The system may obtain this type of contemporaneous shopper physical information, in whole or in part, from in-store infrastructure such as in-store imaging cameras or other sensing equipment (e.g., RADAR, LIDAR, pressure sensors, acoustic sensors, etc.,) that may be mounted on in-store walls, ceilings, shelves, shopping carts etc. Such physical information can also be obtained, in whole or in part, from devices that are associated with the in-store shopper, such as a hand-held mobile communication device (e.g., a cell phone compass and/or level) or a wearable device such as an extended reality appliance headset or a smart watch using embedded technologies such as cameras, clocks, accelerometers, compasses (magnetometers), GPS positioning, Bluetooth, infrared, RFID, and location tracking. The system may, for example, use server 135 or a shopper device 1210 or 1220, to execute one or more operating instructions to determine at least one product category action by shopper based at least in part on an analysis of a store image 1520 captured by in-store infrastructure or a device associated with the shopper. For example, an image may be captured of the shelf space in the view direction of the shopper, and the system may analyze the captured image for empty shelf space showing that an in-store product is unavailable (i.e., is an out-of-stock item in-store). In addition to making the first determination of shopper product category actions from information about shopper physical actions and the shopper location or environment, non-physical information such as prior shopping activity and a shopping list associated with the shopper may also be used in making such product category action determinations.

The disclosed system may use in-store location information, view direction information, and/or view direction time information co make a first determination that at least one product category action has been taken by the in-store shopper. For example, by sensing where in a store aisle the shopper is located, and which shelf space is within the direction of view for the shopper, and how long the shopper has maintained the direction of view, the system can make a first determination that the in-store shopper is presently in the vicinity of and/or focused on a particular product category (i.e., certain types of products) and is taking at least one product category action. By way of example, a first product category action may be defined in the system as the in-store shopper having located themselves at a particular in-store product category location (e.g., a particular store aisle and shelf space), and had a particular view direction for at least a threshold view direction time. By way of another example, a second product category action may be defined by the shopper having located themselves at a particular in-store product category location (e.g., a particular store aisle and shelf space), had a particular view direction, and picked up an in-store product from a shelf. By way of yet another example, a third product category action may be defined by the shopper having located themselves at a particular in-store product category location (e.g., a particular store aisle and shelf space) and have an associated shopping list including a target product from the product category. There is no limit on the different number of contemporaneous physical information, historical shopper patterns, or shopper data input, combinations that may be used by the system in making the first determination of a shopper taking a product category action.

In an exemplary embodiment, once a first determination has been made of a shopper taking at least one product category action, the system may execute one or more operating instructions to make a second determination that the at least one product category action is associated with a presently unavailable (i.e., out-of-stock) in-store product. For example, one or more operating instructions included in a non-transitory computer readable medium may be executed by a processor of server 135 to make a second determination that the at least one action is associated with a target product, included in the category of products, that is out of stock in the physical retail store. The second determination that a shopper action in a product category is associated with a target product that is out of stock may be based on an analysis of the target products on a customer shopping list in combination with physical information about a shopper's in-store location, the shopper's view direction (i.e., the direction the shopper is looking), the shopper's view direction time (i.e., how much time the shopper spends looking in a particular direction), and the products the shopper is picking up and/or otherwise inspecting. In some embodiments the system may provide out-of-stock alert devices in proximity to the shelf-space that a product ordinarily occupies that a customer can activate to alert the system that a target product the customer is interested in is out of stock. For example, customer may push a button immediately proximate to shelf-space for a product to indicate the out-of-stock target product the customer is interested in. The pressing of such a button could be sensed by the system through an electronic communication between the button and system server, or the pressing of such a button could be determined by analysis of one or more images showing the customer pressing the button. In other embodiments, the customer may provide an indication of the desired target product that is out of stock through an interaction with an extended reality appliance, such as by clicking on the display of such extended reality appliance at location on a store image showing the empty shelf-space where the target product would be if it were in stock. As used herein, the term "in-store product" means any product that is ordinarily stocked by the store for purchase by in-store shoppers. In some embodiments, one or more operating instructions included in a non-transitory computer readable medium are executed by a processor of server 135 to make the second determination based on an automatic analysis of image data acquired by one or more cameras located in the physical retail store, where in some embodiments the one or more cameras are mounted within the physical retail store, and in other embodiments, the one or more cameras are included on a device (e.g., a mobile device, phone, glasses, etc.) associated with the shopper. The store image may be analyzed to identify any unavailable in-store product by the presence of empty shelf space where the in-store product would normally be available for retrieval by the shopper. In another exemplary embodiment, the second determination may be made without analysis of an image, but instead rely upon other sensor means as described elsewhere herein.

In some embodiments, one or more operating instructions included in a non-transitory computer readable medium are executed by a processor of server 135 to make the second determination based on an automatic analysis of an electronic inventory database associated with the physical retail store. Such an automatic analysis may be based on a comparison of a customer shopping list with the electronic inventory database to identify target products on the shopping list which are identified as being out-of-stock in the store.

In an exemplary embodiment, once the second determination is made that the at least one product category action of the shopper is associated with a presently unavailable in-store product, the system may transmit to a device with a display a shopper notification that contains online platform ordering information for the unavailable in-store product, or a substitute product. Thus, in an example embodiment, one or more operating instructions included in a non-transitory computer readable medium are executed by a processor of server 135 to, in response to the first and second determinations, provide a notification to the shopper, wherein the notification includes information regarding ordering the target product via an online platform.

Figure 16A:
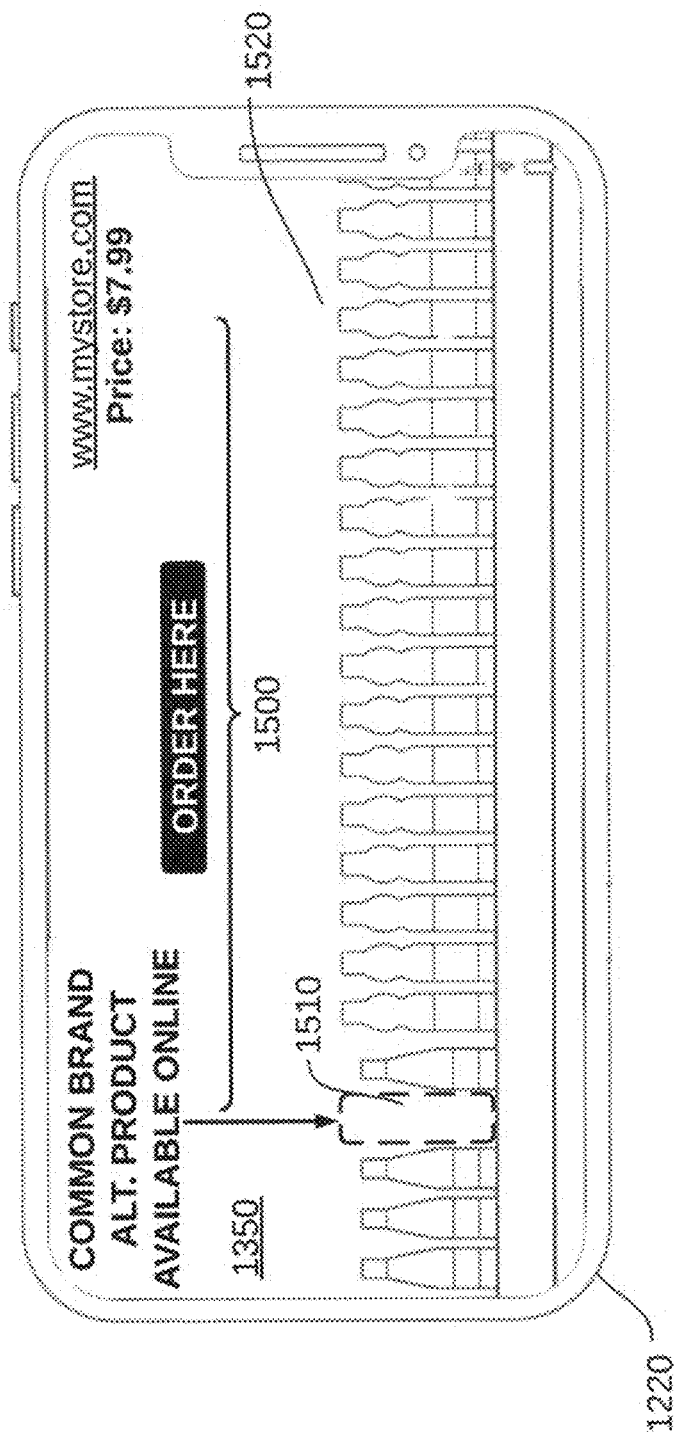
FIG. 16A is an illustration of a display screen of the mobile device of FIG. 12 displaying a shopper notification as described herein.
Figure 16B:
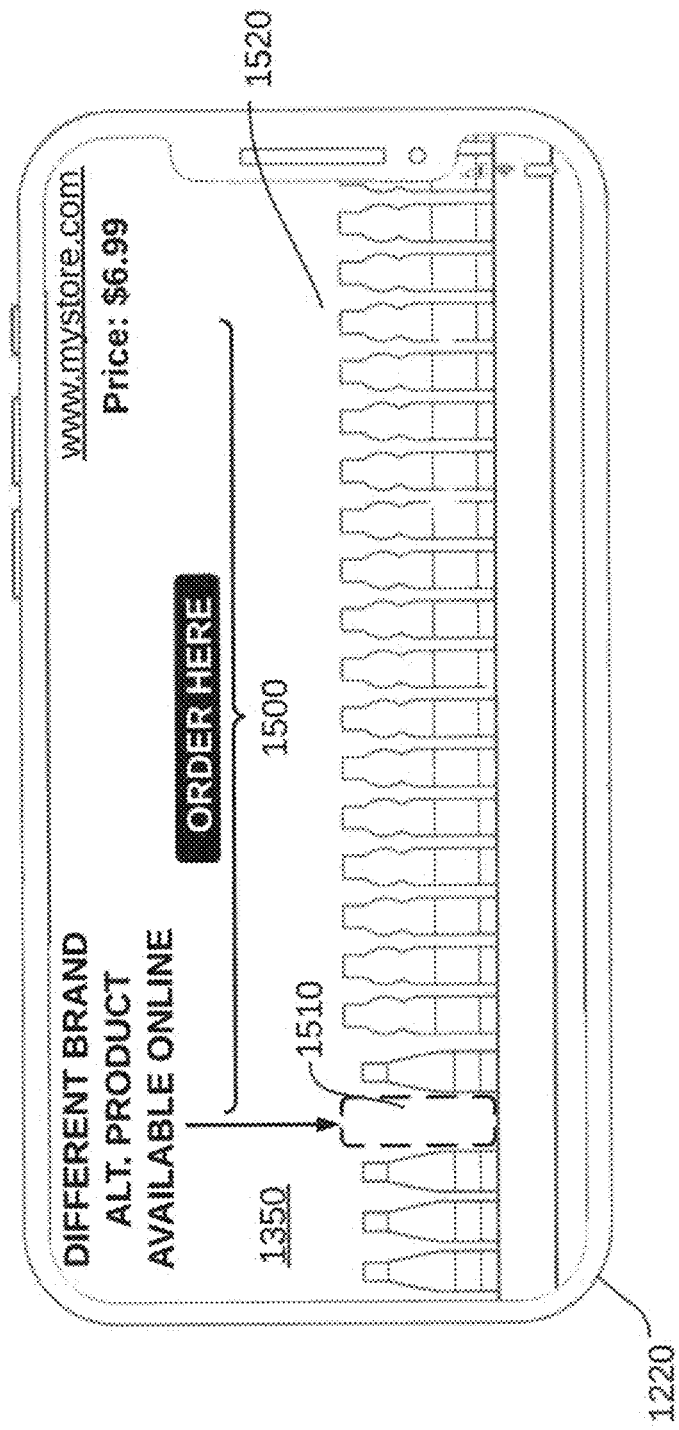
FIG. 16B is an illustration of a display screen of the mobile device of FIG. 12 displaying a shopper notification as described herein.

Referring to FIG. 15C, the shopper notification may be provided to the customer via infrastructure of the physical retail store in a location associated with the category of products. For example, in some exemplary embodiments, as illustrated in FIG. 15C, the shopper notification may be transmitted for display on a screen device 1240 that is near the shelf space 1230 used for the unavailable in-store product. Alternatively, referring to FIGS. 15A and 15B, in an example embodiment a shopper notification 1500 may be transmitted for display on screen 1300 of a wearable extended reality device 1210 associated with the shopper 1505. Referring to FIGS. 16A and 16B, in another exemplary embodiment, shopper notification 1500 may be transmitted for display on screen 1350 of a hand-held extended reality appliance 1210 associated with the shopper 1505.

As illustrated in FIGS. 15A, 15B, 15C, 16A and 16B, the shopper notification 1500 contains online platform ordering information for the unavailable in-store target product 1510. As illustrated, the unavailability of in-store product 1510 may be indicated with a graphic and/or text overlay of a contemporaneous display of an image of the empty shelf space where the target product would otherwise be expected to be if it were available in-store.

Shopper notification 1500 may in some embodiments, as illustrated, include a price for the target product on the online platform. In some embodiments, the notification includes a price for an alternative product on the online platform, wherein the alternative product is different from the target product, but wherein the alternative product and the target product are both associated with a common manufacturer brand.

In some embodiments, the price displayed in the shopper notification may be a special affinity price that is determined by the system based on a known affinity of the shopper for the particular unavailable in-store product and the in-store price of the particular unavailable in-store product. Such affinity pricing may be triggered, as illustrated in FIG. 15C. For example, in some embodiments, the at least one product category action may include picking up a particular product 1515 that is a direct alternative to the target product and is associated with a different manufacturer brand than the target product. In such a situation, for example in an effort to maintain shopper brand loyalty, the notification may include a price for the target product 1510, the price for the target product may be determined based on an affinity of the customer to the target product and/or on a price of the particular product in the physical retail store. In one example, the affinity of the customer to the target product may be indicative of loyalness of the customer to the target product, and may be determined based on an analysis of past purchases of the customer. In one example, a lower price for the target product may be selected when the customer has higher affinity to the target product (e.g., when the customer purchased the target product many times in the past and/or when the customer never or rarely ever purchased alternative products to the target product). In one example, a lower price for the target product may be selected when the price of the particular product in the physical retail store is lower.

In some embodiments, perhaps because the unavailable in-store product has been discontinued, and as illustrated in FIGS. 16A and 16B, the shopper notification 1500 may contain online platform ordering information for a substitute alternative product. The substitute product may be a same-brand substitute product (e.g., the manufacturer has introduced a new version of an unavailable in-store product). Alternatively, the substitute product may be an off-brand substitute product (e.g., because the goods of the manufacturer for unavailable in-store product are no longer available in-store or through the online platform).

In an example embodiment, where shopper notification 1500 is transmitted for display to a shopper mobile device with an online platform connection capability, shopper notification 1500 may, as illustrated, include a hyperlink ("Order Here") to the target product on the online platform.

Figure 17:
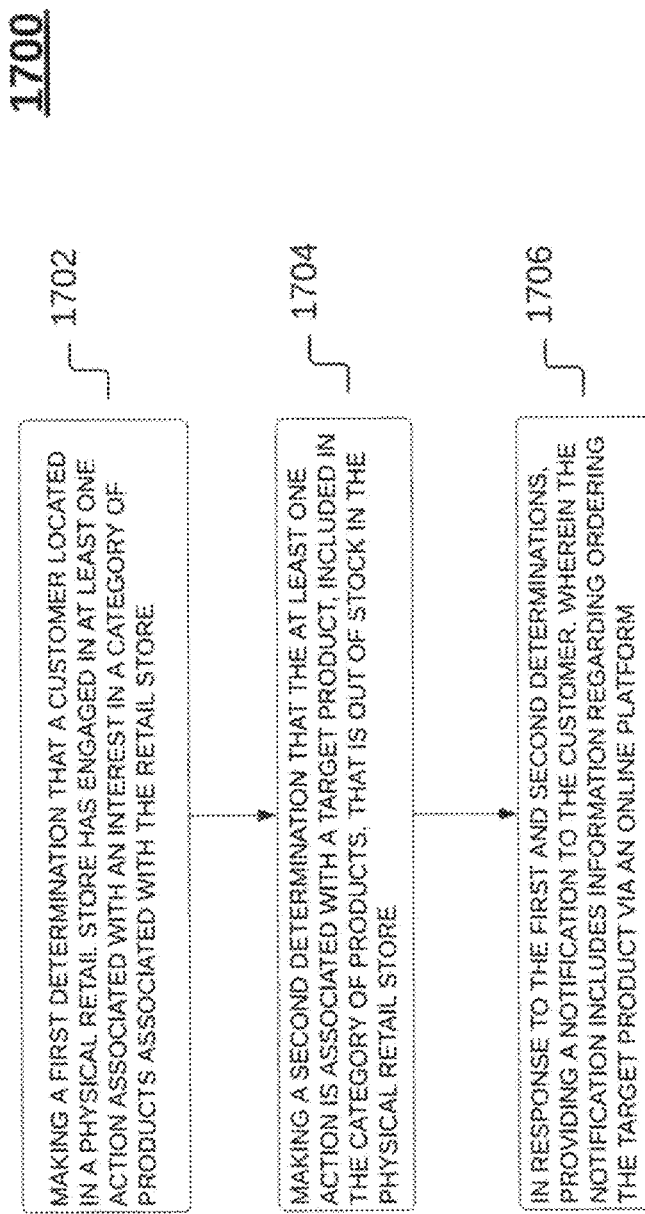
FIG. 17 is a flowchart representing an exemplary method for providing an in-store shopper notification about the online ordering of an unavailable in-store product, consistent with disclosed embodiments.

FIG. 17 is a flowchart representing an exemplary method 1700, in accordance with example embodiments of the present disclosure, for providing an in-store shopper notification for the online ordering of an unavailable in-store product. For purposes of illustration, in the following description, reference is made to certain components of system 100 as deployed in the configuration depicted in FIG. 12. For example, method 1700 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform method 1700. Further, method 1700 is not necessarily limited to the steps shown in FIG. 17, and any steps or processes of the various embodiments described throughout the present disclosure may also be included in method 1700.

At step 1702, method 1700 includes a processor of server 135 executing one or more operating instructions located in a non-transitory computer-readable medium to make a first determination that a customer located in a physical retail store has engaged in at least one product category action associated with an interest in a category of products associated with the retail store. For example, by sensing where in a store aisle the shopper is located, and which shelf space is within the direction of view for the shopper, and how long the shopper has maintained the direction of view, the system can make a first determination that the in-store shopper is presently in the vicinity of and/or focused on a particular product category (i.e., certain types of products) and is taking at least one product category action.

At step 1704, a processor of server 135 executing one or more operating instructions located in a non-transitory computer-readable medium to make a second determination that the at least one product category action is associated with a target product, included in the category of products, that is out of stock in the physical retail store. This second determination may be based upon an identification of a target product on a customer shopping list stored in the system, prior shopper activity, an automatic analysis of image data acquired by one or more cameras located in the physical retail store, analysis of an inventory database, and/or sensor input concerning movement or placement of products on store shelf by the shopper.

At step 1706, a processor of server 135 executing one or more operating instructions located in a non-transitory computer-readable medium to, in response to the first and second determinations, provide a notification to the customer, wherein the notification includes information regarding ordering the target product via an online platform. The shopper notification may be provided to the customer via infrastructure of the physical retail store, such as a shelf-mounted system display unit, or through an extended reality appliance associated with the in-store shopper. The shopper notification may include online price information as well as a hyperlink to place an order for the alternative product through the online platform.

Some shoppers may keep a virtual shopping list on their computer or on their mobile device (e.g., either stored directly on their computer, via a Web site accessible by the computer, on their mobile device, on an application running on the mobile device, or via a Web site accessible by the application running on the mobile device). The shopping experience may be enhanced if the shopper is able to know prior to going to a retail store whether the store has the lowest total price for all (or a certain percentage of) the products on their shopping list and/or whether the retail store has all (or a certain percentage of) the products on the shopping list. The shopper may prefer a particular retail store (e.g., a retail store close to the shopper's home), but the shopper may not mind traveling to a second retail store if they are able to save money and/or find products that are not available at their preferred retail store. By combining the pricing and inventory information collected by the methods and systems described herein with the shopper's virtual shopping list (in some instances, including shopper preferences for retail store and day and time of visiting the retail store), it may be possible to present retail store options to the shopper such that the shopper is able to save money on their total purchase and/or find all (or most of) the products on their virtual shopping list.

In some embodiments, a virtual shopping list of products is accessed by the disclosed systems and methods, and the products in the shopping list may be distributed over different retail stores. The distribution (or grouping of products from the list by retail store and an expected time window of a user's arrival at each retail store) may be based on a combination of information, including price information and inventory information for the products located at each retail store. For example, based on a determination of when a user is expected to frequent a particular retail store (e.g., based on shopping habits, user input, a schedule or planned route, etc.), the system can analyze product pricing and inventory information for the expected shopping times, cross-correlate that information with the products on the shopping list, and provide recommendations for where and when to purchase products on the shopping list.

In some embodiments, a customer of a shopping service may enter the shopping list, which may then be accessible by the user (e.g., a person shopping on behalf of the customer). In such embodiments, the systems and methods described herein would perform in a similar manner.

Some embodiments provide a method for distributed shopping. In some embodiments, a non-transitory computer-readable medium including instructions that when executed by a processor may cause the processor to perform the method. In some embodiments, the method may be performed by a system for distributed shopping, the system including at least one processing unit configured to perform the steps of the method. For example, as discussed above, the disclosed system may include one or more servers 135, which may include one or more processing devices 202. Processing device 202 may be configured to execute one or more instructions stored in a non-transitory computer-readable storage medium. As also discussed above, the non-transitory computer-readable medium may include one or more of random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same, etc.

In some embodiments, the method may include accessing a virtual shopping list associated with a user, the virtual shopping list identifying a plurality of products. As used herein, the terms "shopper" and "user" are interchangeable. In some embodiments, the virtual shopping list may be included on a mobile device associated with the user (e.g., output device 145D as shown in FIG. 1). In some embodiments, the user may access his or her shopping list via a computer (e.g., a desktop computer or a laptop computer) and the virtual shopping list may be included in a database on a remotely located server. For example, the user may access a Web site that stores a shopping list on the remotely located server. As another example, the user may access an application running on a mobile device and the shopping list may be stored on the mobile device or on the remotely located server. The plurality of products can include any products that the user wants to purchase or is contemplating purchasing. In some embodiments, a customer of a shopping service may enter the shopping list (i.e., the virtual shopping list is associated with the customer of the shopping service), which may then be accessible by the user (e.g., a person shopping on behalf of the customer).

In some embodiments, the method may include determining a first indicator associated with a prospective visit by the user to a first retail store and determining a second indicator associated with a prospective visit by the user to a second retail store. In some embodiments, the first retail store and the second retail store are associated with a common retailer. For example, the first retail store and the second retail store may be different stores for the same retailer (e.g., a grocery store chain). In some embodiments, the first retail store and the store retail store may be associated with different retailers (e.g., different grocery store chains, a grocery store and a bakery, a grocery store and a butcher shop, a grocery store and a clothing store, etc.). As used herein, the term "prospective visit" may include a known or expected visit by the shopper to the retail store. In some embodiments, a day and time for the prospective visit may be based on the user's prior shopping history, which may be accessible by the method if the user grants permission to access the shopping history. In some embodiments, the day and time for the prospective visit may be based on the user's prior travel history (e.g., daily commute time to work or if the user typically visits the retail store on the same day of the week, etc.), which may be accessible by the method if the user grants permission to access the travel history.

In some embodiments, the first indicator identifies a first time window associated with the prospective visit by the user to the first retail store and the second indicator identifies a second time window associated with the prospective visit by the user to the second retail store. In some embodiments, the first time window of the first indicator and the second time window of the second indicator are determined based on input provided by the user. For example, the user may input preferences for the time windows via a Web site or into an application running on their mobile device. As another example, the user may grant permission for the method to access a calendar, which may be stored on the user's mobile device or on a remote server (e.g., a cloud-based calendar application). As another example, the user may grant permission for the method to access the user's driving history or travel history, which may be stored on a mobile device (e.g., accessing information related to when the user travels to work).

In some embodiments, the first time window of the first indicator and the second time window of the second indicator are determined based on analysis of a prior shopping history associated with the user. For example, the user may grant permission for the method to access a shopping history associated with the first retail store and the second retail store. In some embodiments, the user's shopping history may be stored in a centrally located database (e.g., database 140) accessible by a server (e.g., server 135) that may be accessible to and used by the method. In some embodiments, the user's shopping history for retail stores may be stored on the user's mobile device (e.g., output device 145D) and the user may grant permission to the method to access the shopping history. In some embodiments, the user's shopping history for one or more retail stores may be stored separately on the user's mobile device (e.g., in an application specific to each retail store), and the user may grant permission to the method to access each of those applications to retrieve the shopping history.

In some embodiments, the method may include receiving pricing information for the plurality of products located at the first retail store and at the second retail store. In some embodiments, the pricing information may be received via one of the methods described above (e.g., the product model used by server 135 or catalog data 244). In some embodiments, the pricing information may be received directly from the first retail store and the second retail store.

In some embodiments, the first time window of the first indicator and the second time window of the second indicator are determined based on analysis of the received pricing information. In some embodiments, the price of a product may change depending on the time of day. So that the user may be able to purchase the product at a lowest possible price, the first time window and the second time window may be determined to coincide with a time of day when the first retail store and the second retail store offer the product at a low price. For example, with a perishable item (e.g., a freshly baked loaf of bread), a retail store may discount the price of the freshly baked loaf of bread after a certain time of day (e.g., after 5:00 pm) such that the retail store may sell the freshly baked loaves of bread made during the day, to ensure that the retail store may minimize or avoid discarding any unsold freshly baked loaves of bread. If the user has a freshly baked loaf of bread on their shopping list, and with knowledge of the retail store's price reduction after 5:00 pm, the method may determine the first time window and the second time window to be after 5:00 pm to enable the user to buy the freshly baked loaf of bread at a discounted price.

In some embodiments, the received pricing information applies to the first and second time windows. In some embodiments, the price of a product may change depending on the time of day. To ensure that the user has accurate price information for the time of day when the user is likely to visit the first retail store and/or the second retail store, the method may base the pricing information provided to the user based on the user's preferred time of day for shopping. Continuing with the above example of freshly baked loaf of bread being discounted after 5:00 pm, if the user's preferred time window for shopping is around 8:00 am, then the method may provide the normal price of the freshly baked loaf of bread. But if the user's preferred time window for shopping is after 5:00 pm, then the method may provide the discounted price of the freshly baked loaf of bread.

In some embodiments, the method may include receiving inventory information for the plurality of products located at the first retail store and at the second retail store. In some embodiments, the inventory information may be received via one of the methods described above (e.g., inventory data 246 or method 1000). In some embodiments, the inventory information may be received directly from the first retail store and the second retail store.

In some embodiments, the first time window of the first indicator and the second time window of the second indicator are determined based on analysis of the received inventory information. In some circumstances, the first retail store and/or the second retail store may sell out of a product that the user wants to buy or may have insufficient quantity on hand to fulfill the user's needs (e.g., the user wants four cans of vegetable soup, but the retail store has either sold out or has less than four cans available). For example, the first time window and the second time window may be determined based on whether the first retail store and/or the second retail store has a sufficient quantity of the particular product on the user's shopping list. For example, the first time window and/or the second time window may be adjusted to coincide with when the first retail store and/or the second retail store has at least four cans of vegetable soup available for purchase.

In some embodiments, the received inventory information applies to the first and second time windows. To ensure that the user has accurate inventory information for the time of day when the user is likely to visit the first retail store and/or the second retail store, the method may base the inventory information provided to the user on the user's preferred time of day for shopping. Continuing with the above example where the user wants to purchase four cans of vegetable soup, based on the user's preferred time window for shopping, the method may update the inventory information close to the time window (e.g., in near real-time) such that the user has an accurate indication of whether the first retail store or the second retail store has at least four cans of vegetable soup.

In some embodiments, the method may include automatically generating an updated virtual shopping list including an indication of a location for purchasing each of the plurality of products, the indication of the location being associated with the first retail store or the second retail store; wherein the updated virtual shopping list is generated based on a combination of the received pricing information and the received inventory information. The user's updated virtual shopping list may indicate which retail stores the user should visit to purchase certain products from the shopping list. For example, the updated virtual shopping list may include five products to be purchased from the first retail store and seven products to be purchased from the second retail store. In some embodiments, the grouping of products to be purchased at the first retail store and the second retail store may be adjusted so that the user's combined purchase price for all the products on the shopping list is minimized. In some embodiments, the grouping of products to be purchased at the first retail store and the second retail store may be adjusted so that the user is able to purchase all the products on the shopping list (e.g., if a product is not available at the first retail store, that product would be included in the list of products to be purchased from the second retail store).

In some embodiments, the method may include providing the updated virtual shopping list to the user. In some embodiments, the updated virtual shopping list may be provided to the user via the Web site where the user initially entered their shopping list. In some embodiments, the updated virtual shopping list is provided to the user via a mobile device associated with the user. For example, the updated virtual shopping list may be provided to the user via the application running on the user's mobile device where the user initially entered a shopping list. In some embodiments, the updated virtual shopping list is provided to the user via a server-based shopping account associated with the user. In some embodiments, the server-based shopping account may be accessed by the user via a Web site or an application running on the user's mobile device. In some embodiments where the customer of the shopping service enters the shopping list, the updated virtual shopping list may be provided to the user (e.g., the person shopping on behalf of the customer).

In some embodiments, the method may include receiving a forecast of prospective freshness levels for a particular product, among the plurality of products, in the first retail store at different points in time in the future. As used herein, the term "freshness level for a particular product" may refer to a particular product that has most recently been placed on display for sale. In other words, the more recently the particular product has been placed on display for sale, the higher the freshness level. For example, the shopper may prefer to buy produce that was recently placed out for sale as opposed to produce that has been sitting on the display for a period of time. In some embodiments, the forecast of the prospective freshness levels may be based on an analysis of an image of the particular product in the first retail store or the second retail store. The image analysis may be performed by any suitable method (e.g., by image processing unit 130 described above).

In some embodiments, a machine learning model may be trained using training examples to determine prospective freshness levels from images and/or videos. An example of such training may include a sample image and/or a sample video of a sample product, together with a label indicating a prospective freshness level of the product at one or more selected future time periods. In one example, the trained machine learning model may be used to analyze the images captured in at least one of the first retail store or the second retail store and determine the prospective freshness levels for the particular product. In some examples, a convolution of at least part of the images captured in at least one of the first retail store or the second retail store may be calculated to obtain a result value of the calculated convolution. In one example, the prospective freshness levels for the particular product may be determined based on the result value of the calculated convolution. In some examples, image classification algorithms may be used to analyze the images captured in at least one of the first retail store or the second retail store to classify products in at least one of the first retail store or the second retail store to different prospective freshness levels.

In some embodiments, the method may include selecting the first time window based on the prospective freshness levels. For example, the first time window may be selected based on when fresh produce has been placed out for sale at the first retail store. In another example, the first time window may be selected to a time when the prospective freshness levels are above a selected threshold level. For example, the prospective freshness levels may be used to determine that a freshness level of the particular product is predicted to drop below an accepted level at a particular hour during the day, and as a result, a time window earlier than that particular hour may be selected as the first time window.

In some embodiments, the determined first indicator includes a first time window associated with the prospective visit by the user to the first retail store. For example, the first time window may be determined based on the user's history of prior visits to the first retail store. In some embodiments, the user may grant permission for the method to access the user's prior shopping history at the first retail store, e.g., by providing access to an application running on the user's mobile device or by providing access to the user's travel history stored on their mobile device.

In some embodiments, the determined second indicator includes a second time window associated with the prospective visit by the user to the second retail store. For example, the second time window may be determined based on the user's history of prior visits to the second retail store in a similar manner as determined with the user's history of prior visits to the first retail store.

In some embodiments, the first time window and the second time window are automatically determined based on analysis of the virtual shopping list, the received pricing information, and the received inventory information. For example, the products from the virtual shopping list may be grouped by retail store location based on a cross-correlation of price and prospective inventory at the first retail store and the second retail store. In this manner, the user's trip to the first retail store and the second retail store may be optimized in that the user may be able to purchase at least some of the products on the virtual shopping list for a lowest possible total price while maximizing the likelihood of being able to purchase all or a majority of the products (e.g., not encountering a situation where a retail store has no inventory or insufficient inventory for one or more products) and the likelihood of obtaining the freshest possible products.

In some embodiments, at least one of the first time window or the second time window is determined at least in part on a planned price reduction for at least one of the plurality of products in either the first retail store or the second retail store. For example, based on an analysis of historical pricing information, it may be determined that the first retail store and/or the second retail store implements a price reduction on certain products at certain days and times. Using one of the examples above, the first retail store may discount the price of a freshly baked loaf of bread after a certain time of day (e.g., after 5:00 pm) such that the first retail store may sell most or all of the freshly baked loaves of bread made during the day, to ensure that the first retail store may minimize or avoid discarding unsold freshly baked loaves of bread. If the user has a freshly baked loaf of bread on a shopping list, and with knowledge of the first retail store's price reduction after 5:00 pm, the method may determine the first time window to be after 5:00 pm to enable the user to buy the freshly baked loaf of bread at a discounted price.

As another example, the second retail store may offer discounts on certain products on a certain day of the week (e.g., on Friday). With this knowledge, the method may be able to match products on the user's virtual shopping list with the products that will be discounted at the second retail store on Friday and may determine the second time window to be on Friday when the discounted products are available. As another example, if the second retail store offers different products at a discount on a certain day of the week (e.g., different products are discounted every Friday, not necessarily the same products each week), the method may be able to dynamically match products on the user's virtual shopping list with the products that will be discounted at the second retail store on Friday and may determine the second time window to be on Friday when the discounted products are available.

In some embodiments, at least one of the first time window or the second time window is determined at least in part on a planned increase in inventory for at least one of the plurality of products in either the first retail store or the second retail store. For example, the first retail store may receive delivery of certain products on a certain day of the week and those products may be placed on the shelves by a certain time of the delivery day. As an example, first retail store receives delivery of cans of soup every Wednesday and the shelves are stocked with the cans of soup by 11:00 am. If the user has one or more cans of soup on their virtual shopping list, the method may determine the first time window to be after 11:00 am on Wednesday so that the user may be able to purchase the cans of soup.

In some embodiments, the updated virtual shopping list is generated based on price comparison for a particular product, among the plurality of products, in the first retail store and the second retail store. For example, the updated virtual shopping list may be divided into products to be purchased at the first retail store and products to be purchased at the second retail store. The grouping of the products between the first retail store and the second retail store may be adjusted to minimize the total cost of products on the updated virtual shopping list. For example, if the second retail store has three products on the virtual shopping list at a lower price than the same three products at the first retail store, then those three products may be placed on the updated virtual shopping list associated with the second retail store.

In some embodiments, the user may set a threshold for the price difference between the two retail stores before the products are moved to the virtual shopping list for a different store. For example, the user may set a price difference of at least $0.25 between the first retail store and the second retail store as the threshold for moving products on the virtual shopping list. The user may find that it is not worth the extra time and travel costs to shop at two retail stores if the savings for traveling to the second retail store are insufficient. In some embodiments, the updated virtual shopping lists for the first retail store and the second retail store may be dynamically adjusted based on the price difference threshold and current travel times and/or current fuel costs.

In some embodiments, the updated virtual shopping list is generated based on prospective inventory levels for a particular product, among the plurality of products, in the first retail store and the second retail store. For example, the updated virtual shopping list may be divided into products to be purchased at the first retail store and products to be purchased at the second retail store. The grouping of the products between the first retail store and the second retail store may be adjusted to ensure that the user is able to purchase all or a majority of the products on the virtual shopping list, regardless of whether the products are purchased from the first retail store, the second retail store, or a combination of the first retail store and the second retail store. In some embodiments, the prospective inventory levels may be based on planned deliveries to the first retail store and the second retail store or a current rate of sales at the first retail store and the second retail store. In some embodiments, the virtual shopping list may be dynamically updated based on the prospective inventory levels at the user's preferred time window. For example, if the user usually shops on Wednesday after 6:00 pm, the list of products to be purchased from the first retail store and/or the second retail store may be adjusted to reflect the prospective inventory levels at the retail stores on Wednesday after 6:00 pm.

In some embodiments, the updated virtual shopping list may be adjusted such that the user is not purchasing only one product at the first retail store or the second retail store. For example, if a particular product is only available for purchase at the second retail store, the method may move some additional products on the updated virtual shopping list from the first retail store to the second retail store. In some embodiments, the additional products may be moved on the updated virtual shopping list from the first retail store to the second retail store if the products have the same price at both retail stores. In some embodiments, the additional products to be moved on the updated virtual shopping list from the first retail store to the second retail store may be based on user preferences. For example, the user may prefer to purchase certain products from the second retail store over purchasing the same or similar products from the first retail store. In some embodiments, the additional products to be moved on the updated virtual shopping list from the first retail store to the second retail store may be based on a combination of price, inventory, user preferences, and/or the time windows. In some embodiments, the user may be prompted to confirm that additional products on the updated virtual shopping list are to be moved from the first retail store to the second retail store. For example, the user may prefer to only shop at the first retail store even if there may be a cost savings by shopping for the one product at the second retail store.

In some embodiments, the virtual shopping list may be updated in near real-time to reflect the current inventory at the first retail store and the second retail store. For example, the virtual shopping list may be updated before the user begins shopping at the first retail store. If, while the user is shopping, the first retail store is sold out of a particular product, the method may update the virtual shopping list to move the particular product from the shopping list for the first retail store to the shopping list for the second retail store, so that the user is able to purchase the particular product. In some embodiments, the method may provide an alert to the user (e.g., via the user's mobile device) that one or more products have been moved on the virtual shopping list from the shopping list for the first retail store to the shopping list for the second retail store. In some embodiments, the user may override the movement of one or more products on the virtual shopping list from the shopping list for the first retail store to the shopping list for the second retail store. For example, if the user is currently shopping at the first retail store and has already placed a product in a shopping basket (and the inventory information for the first retail store is updated in near real-time to indicate that the first retail store is now sold out of the product), the user would not want that product moved to the shopping list for the second retail store. In such circumstances, the user may override moving that product to the shopping list for the second retail store.

In some embodiments, the updated virtual shopping list is generated based on a prospective freshness level for a particular product, among the plurality of products, in the first retail store and the second retail store. For example, the shopper may prefer to buy produce that was recently placed out for sale as opposed to produce that has been sitting on the display for a period of time. In some embodiments, the particular product (e.g., produce) may be moved on the updated virtual shopping list from the first retail store to the second retail store if the second retail store has more recently placed fresh produce out for sale. In some embodiments, the virtual shopping list may be updated dynamically close to the first time window or the second time window such that the virtual shopping list may be updated in near real-time to permit the user to buy the particular product at a highest freshness level (i.e., most recently placed on display for sale).

In some embodiments, the updated virtual shopping listed may be generated based on whether one or more products are perishable. For example, if the updated virtual shopping list indicates that the user is shopping at both the first retail store and the second retail store and the shopping list includes ice cream, the virtual shopping list may be updated to place the ice cream on the shopping list for the retail store where the user will be stopping last. For example, if the user is first shopping at the first retail store and then shopping at the second retail store, the virtual shopping list may be updated to place the ice cream on the shopping list for the second retail store so that the ice cream won't melt before the user is able to return home.

In some embodiments, the inventory information for the plurality of products is determined based on analysis of images captured in at least one of the first retail store or the second retail store. The image analysis may be performed by any suitable method (e.g., by image processing unit 130 described above). The image analysis may be performed periodically (e.g., as described above in connection with any one or more of FIG. 4A, 4C, 6A, 7A, or 7B). In some embodiments, the inventory information determined in this manner may be used to generate the updated virtual shopping list. For example, if the inventory information is determined in near real-time, then the virtual shopping list may be updated in near real-time. In this way, the user may have the most current information available so that the user may purchase all the products on the virtual shopping list.

In some embodiments, a machine learning model may be trained using training examples to determine inventory information from images and/or videos. An example of such training may include a sample image and/or a sample video captured from a sample retail store, together with a label indicating inventory information corresponding to the sample retail store. In one example, the trained machine learning model may be used to analyze the images captured in at least one of the first retail store or the second retail store and determine the inventory information for the plurality of products. In some examples, a convolution of at least part of the images captured in at least one of the first retail store or the second retail store may be calculated to obtain a result value of the calculated convolution. In one example, the inventory information for the plurality of products may be determined based on the result value of the calculated convolution. In another example, in response to the result value of the calculated convolution being a first value, a first inventory information for the plurality of products may be determined, and in response to the result value of the calculated convolution being a second value, a second inventory information for the plurality of products may be determined, the second inventory information may differ from the first inventory information. In some examples, product recognition algorithms may be used to analyze the images captured in at least one of the first retail store or the second retail store to recognize products in at least one of the first retail store or the second retail store, and the inventory information for the plurality of products may be determined based on the recognized products.

In some embodiments, the pricing information for the plurality of products is determined based on analysis of images captured in at least one of the first retail store or the second retail store. The image analysis may be performed by any suitable method (e.g., by image processing unit 130 described above). The image analysis may be performed periodically (e.g., as described above in connection with any one or more of FIG. 4A, 4C, 6A, 7A, or 7B). In some embodiments, the pricing information determined in this manner may be used to generate the updated virtual shopping list. For example, if the pricing information is determined in near real-time, then the virtual shopping list may be updated in near real-time. In this way, the user may have the most current information available so that the user may purchase all the products on the virtual shopping list for a lowest possible total price.

In some embodiments, a machine learning model may be trained using training examples to determine pricing information from images and/or videos. An example of such training may include a sample image and/or a sample video captured from a sample retail store, together with a label indicating pricing information corresponding to the sample retail store. In one example, the trained machine learning model may be used to analyze the images captured in at least one of the first retail store or the second retail store and determine the pricing information for the plurality of products. In some examples, a convolution of at least part of the images captured in at least one of the first retail store or the second retail store may be calculated to obtain a result value of the calculated convolution. In one example, the pricing information for the plurality of products may be determined based on the result value of the calculated convolution. In another example, in response to the result value of the calculated convolution being a first value, a first pricing information for the plurality of products may be determined, and in response to the result value of the calculated convolution being a second value, a second pricing information for the plurality of products may be determined, the second pricing information may differ from the first pricing information. In some examples, optical character recognition (OCR) algorithms may be used to analyze the images captured in at least one of the first retail store or the second retail store to identify prices in at least one of the first retail store or the second retail store, and the pricing information for the plurality of products may be determined based on the identified prices.

In some embodiments, the updated virtual shopping list is provided to the user together with a suggestion to purchase at least one of the plurality of products online. For example, if neither the first retail store nor the second retail store has a particular product in inventory, the method may suggest that the user purchase the particular product via an online store. In some embodiments, the online store is an online branch of either the first retail store or the second retail store. In some embodiments, the online store is not affiliated with either the first retail store or the second retail store.

In some embodiments, the virtual shopping list is updated based on the pricing information and a distance between the first retail store and the second retail store. For example, if the cost of driving from the user's home to the first retail store, then to the second retail store, and then to the user's home or other destination is greater than any cost savings by buying certain products at the second retail store, the virtual shopping list may indicate that all products should be purchased at the first retail store.

In some embodiments, an update to the inventory information for the plurality of products corresponding to an availability of a particular product at the second retail store may be received while the user is shopping at the first retail store. For example, the update to the inventory information may be received from a database. In another example, the update to the inventory information may be based on an analysis of an image captured in the second retail store while the user is shopping at the first retail store. The image analysis may include any of the techniques described above. In response to the received update to the inventory information, a notification may be provided to the user while the user is shopping at the first retail store. For example, the update may indicate an unexpected availability of the particular product at the second retail store, and as a result the notification provided to the user may include a recommendation to purchase the particular product at the second retail store even when the updated virtual shopping list originally indicated the location for purchasing the particular product as the first retail store. In one example, the notification may be provided to the user after the user picked the particular product at the first retail store, and the notification may include a recommendation to return the particular product. In an alternative example, the update may indicate an unexpected unavailability of the particular product at the second retail store, and as a result, the notification provided to the user may include a recommendation to purchase the particular product at the first retail store even when the updated virtual shopping list originally indicated the location for purchasing the particular product as the second retail store.

In some embodiments, an update to the pricing information for the plurality of products corresponding to an availability of a particular product at the second retail store may be received while the user is shopping at the first retail store. For example, the update to the pricing information may be received from a database. In another example, the update to the pricing information may be based on an analysis of an image captured in the second retail store while the user is shopping at the first retail store. The image analysis may include any of the techniques described above. In response to the received update to the pricing information, a notification may be provided to the user while the user is shopping at the first retail store. For example, the update may indicate a lower than expected price of the particular product at the second retail store, and as a result the notification provided to the user may include a recommendation to purchase the particular product at the second retail store even when the updated virtual shopping list originally indicated the location for purchasing the particular product as the first retail store. In one example, the notification may be provided to the user after the user picked the particular product at the first retail store, and the notification may include a recommendation to return the particular product. In an alternative example, the update may indicate a higher than expected price of the particular product at the second retail store, and as a result, the notification provided to the user may include a recommendation to purchase the particular product at the first retail store even when the updated virtual shopping list originally indicated the location for purchasing the particular product as the second retail store.

Figure 18:
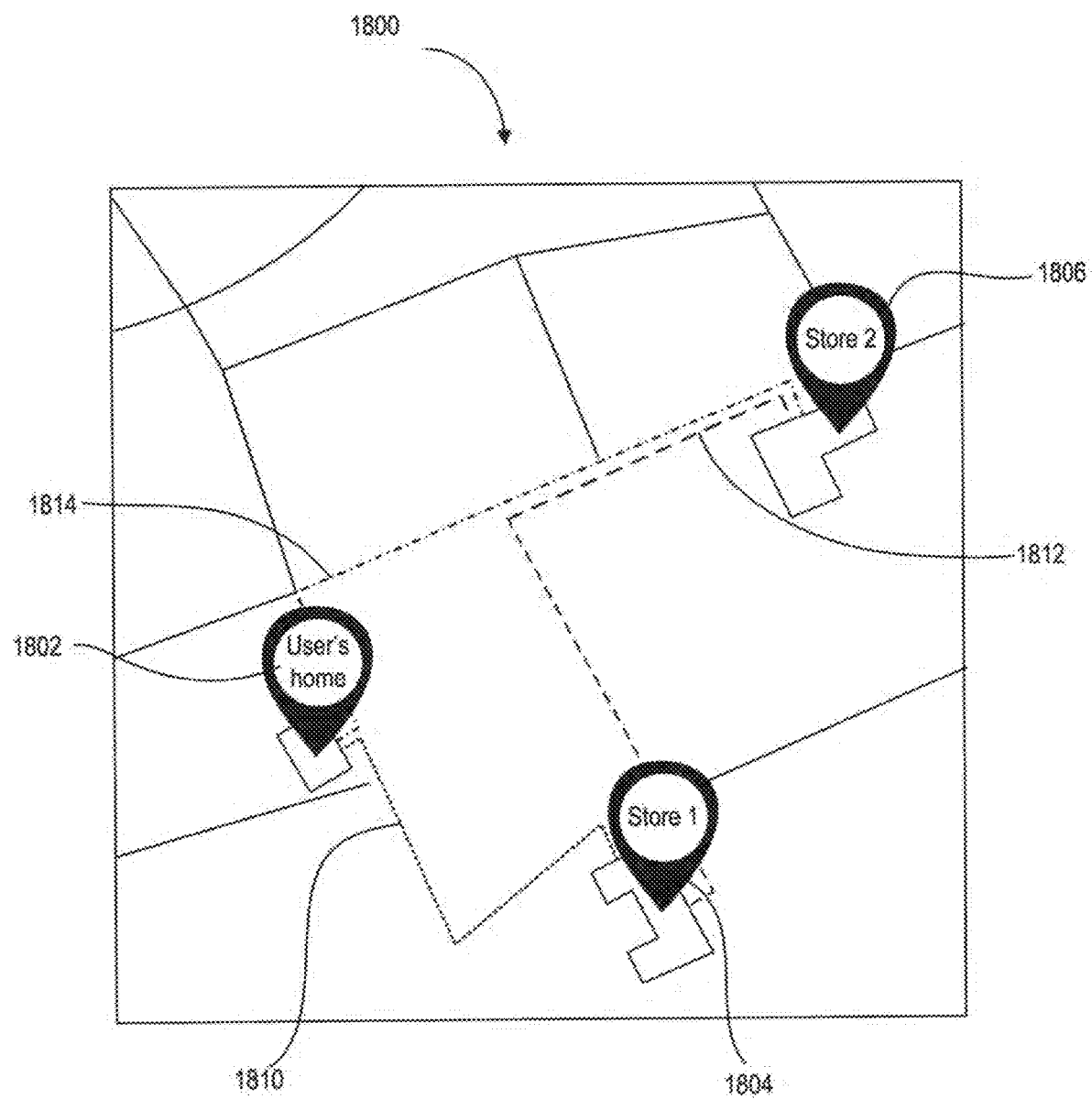
FIG. 18 is an example map showing possible routes for a user to take to visit a first retail store and a second retail store, consistent with the present disclosure.

FIG. 18 is an example map 1800 showing possible routes for a user to take to visit the first retail store and the second retail store. As shown in FIG. 18, the method may determine routes from the user's home 1802 to first retail store (Store 1) 1804 (e.g., route 1810), from first retail store 1804 to second retail store (Store 2) 1806 (e.g., route 1812), and from second retail store 1806 back to the user's home 1802 (e.g., route 1814). It is noted that routes 1810, 1812, and 1814 are exemplary and that other routes may be determined. The method may base the cost of the routes on various factors, for example, a cost of fuel and/or an amount of time it takes to drive the routes. For example, if the cost of driving routes 1812 and 1814 is more expensive than the potential cost savings by purchasing certain products at second retail store 1806, then the virtual shopping list may indicate that the user should purchase all or a majority of products on the shopping list at first retail store 1804. As another example, if the cost of driving routes 1812 and 1814 is less than the potential cost savings by purchasing certain products at second retail store 1806, then the virtual shopping list may indicate that the user should purchase some products at first retail store 1804 and other products at second retail store 1806.

In some embodiments, if the user has one or more perishable items (e.g., ice cream) on a shopping list, the method may update the virtual shopping list based on respective lengths of the routes 1810, 1812, and 1814. For example, if the pricing information indicates that the price of ice cream is cheaper at first retail store 1804 and if route 1814 is longer than route 1810, then the updated virtual shopping list may indicate that the user should travel to second retail store 1806 first and then travel to first retail store 1804 so that the user may return home as quickly as possible after purchasing the ice cream. It is noted that the designations "first retail store" and "second retail store" are not fixed and may be based on which retail store the user should visit first and which retail store the user should visit second. For example, a retail store located closest to the user's home 1802 may be designated as the first retail store if the user begins their shopping trip from home. But the retail store closest to the user's home 1802 may be designated as the second retail store if the user begins their shopping trip from another location (e.g., from work), such that another retail store (e.g., Store 2 1806) is closer to the user's starting point.

While FIG. 18 illustrates different routes using the user's home 1802 as the starting point, in some embodiments, different starting points may be used and the method will perform in a similar manner. For example, the starting point may be where the user works. As another example, the starting point may be a current geographical location of the user when the method is accessed or at a particular time of day. The user may provide an indication to the method that the user would like to begin their shopping trip (e.g., by clicking on a "shop now" button or similar user interface element). In some embodiments, the starting point may be automatically determined as the user's current geographical location based on the user pre-setting the time windows. For example, the user may set the first time window and/or the second time window to begin at 9:00 am on Sunday morning. At 9:00 am on Sunday morning, the method may automatically begin and may determine the user's geographic location at that time, receive the pricing information and the inventory information, and may generate the updated virtual shopping list to be provided to the user.

In some embodiments, the user may specify a different end point (i.e., the user does not start and end in the same location). For example, the user may do their shopping on their way home from work, such that the starting point is the user's place of work and the ending point is the user's home. In some embodiments, the method may prompt the user to confirm the ending point before generating the updated virtual shopping list. For example, a user interface element may appear on the user's mobile device and present one or more choices for the ending point to the user. Once the user selects the ending point, the method receives the pricing information and the inventory information, and generates the updated virtual shopping list.

Figure 19A:
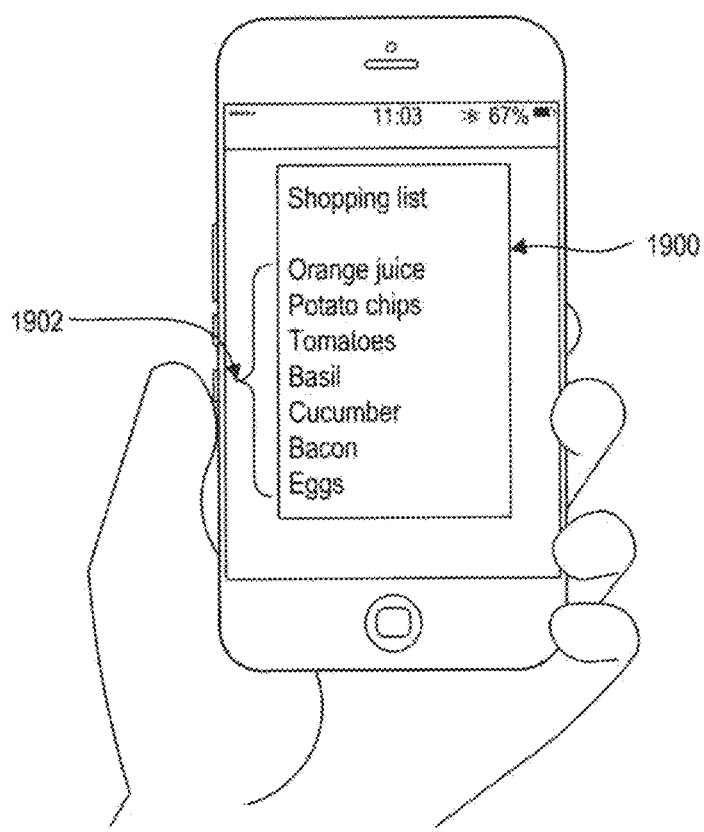
FIG. 19A is a schematic illustration of a shopping list, consistent with the present disclosure.

FIG. 19A is a schematic illustration of a shopping list. For example, the user may enter their shopping list 1902, identifying a plurality of products, in an application 1900 running on the user's mobile device (e.g., output device 145D). As another example, the user may enter shopping list 1902 on a computer or via a server-based shopping account associated with the user. As another example, a customer of a shopping service may enter the shopping list, which may then be accessible by the user (e.g., a person shopping on behalf of the customer).

Figure 19B:
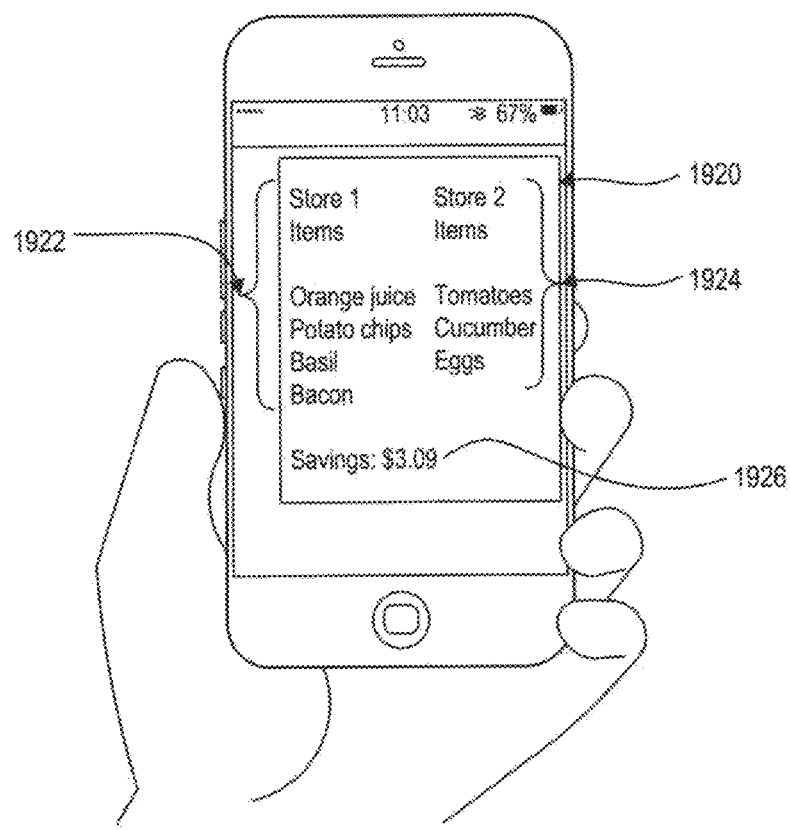
FIG. 19B is a schematic illustration of an exemplary output of a method for distributed shopping, consistent with the present disclosure.

FIG. 19B is a schematic illustration of an exemplary output of a method for distributed shopping. For example, an output screen 1920 may be provided to the user including a list of products 1922 to be purchased at the first retail store, a list of products 1924 to be purchased at the second retail store, and a message 1926 indicating an amount of savings to the user by shopping for the products as assigned by the method. In some embodiments, message 1926 may provide additional information or different information to the user. For example, message 1926 may indicate when the prices for the products were determined or when the inventory for the products was determined. In some embodiments, message 1926 may be highlighted with certain user interface elements to more readily distinguish message 1926 from the rest of output screen 1920. For example, message 1926 may be surrounded by a border, in a different font, in a different type size, in a different color, or with other graphic embellishments that may be defined by user interface guidelines associated with the device where the output screen 1920 is displayed (e.g., output device 145D).

Figure 19C:
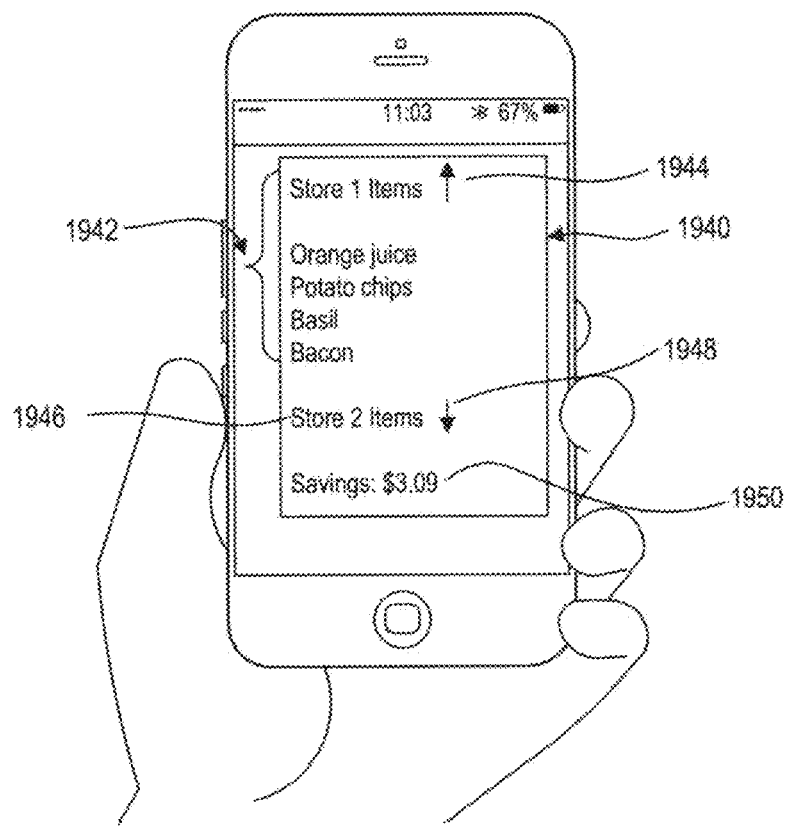
FIG. 19C is a schematic illustration of a second exemplary output of a method for distributed shopping, consistent with the present disclosure.

FIG. 19C is a schematic illustration of a second exemplary output of a method for distributed shopping. For example, an output screen 1940 may be provided to the user including a list of products 1942 to be purchased at the first retail store, a first user interface elements 1944 that may be used to condense list 1942, a condensed list of products 1946 to be purchased at the second retail store, a second user interface element 1948 that may be used to expand list 1946, and a message 1950 indicating an amount of savings to the user by shopping for the products as assigned by the method. In some embodiments, message 1950 may provide additional information or different information to the user, similar to message 1926 described above. In some embodiments, first user interface element 1944 and second user interface element 1948 may be any type of user interface element configured to expand or collapse a list of items, such as lists 1942, 1946. While first user interface element 1944 and second user interface element 1948 are shown in FIG. 19C as arrows, any type of user interface element may be used, consistent with user interface guidelines associated with the device where the output screen 1940 is displayed (e.g., output device 145D).

It is noted that output screen 1940 contains similar information as output screen 1920 but is displayed in a different format. The output format of lists 1942, 1946 may be based on output parameters or constraints of output device 145D or may be determined based on user preferences (e.g., the user may prefer to see a side-by-side comparison of the lists 1922, 1924 as shown in FIG. 19B or may prefer to see one list 1942, 1946 at a time as shown in FIG. 19C). Other possible formats for displaying lists 1942, 1946 to the user are possible and are not limited to the examples shown herein. The format used for displaying lists 1942, 1946 does not change the operation of the method described herein.

Figure 19D:
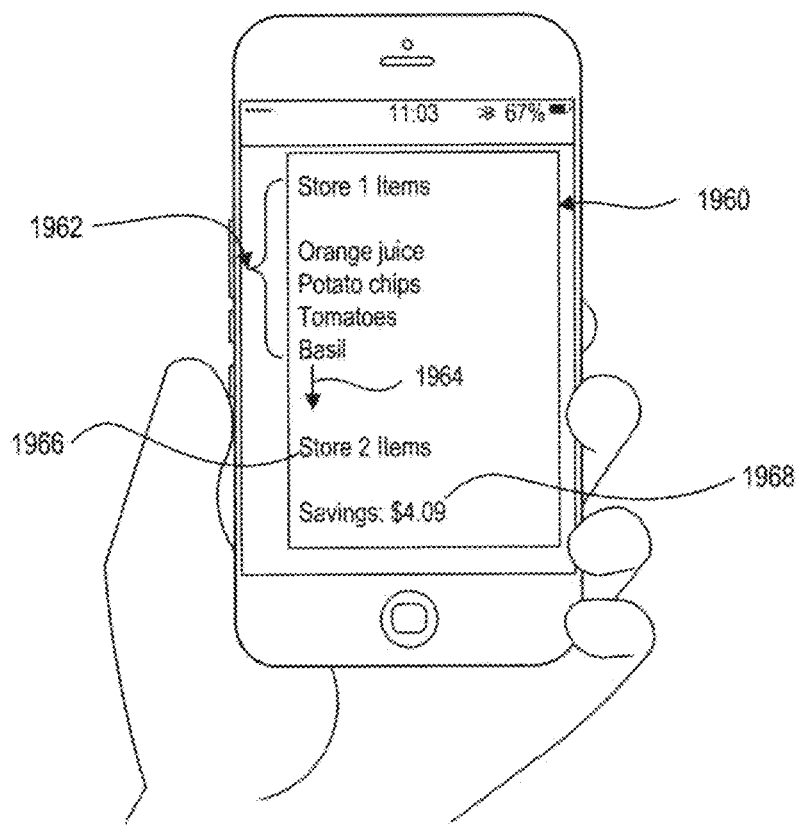
FIG. 19D is a schematic illustration of a third exemplary output of a method for distributed shopping, consistent with the present disclosure.

FIG. 19D is a schematic illustration of a third exemplary output of a method for distributed shopping. For example, an output screen 1960 may be provided to the user including a list of products 1962 to be purchased at the first retail store. As shown in FIG. 19D, the items on the virtual shopping list are to be purchased from the first retail store. In some embodiments, list of products 1962 may not be fully displayed (i.e., condensed) and may include a user interface element 1964 to enable the user to see the rest of the products on list of products 1962. An indicator 1966 of the second retail store may be provided for completeness of output screen 1960. In some embodiments, indicator 1966 may be surrounded by a border, in a different font, in a different type size, in a different color, or with other graphic embellishments that may be defined by user interface guidelines associated with the device where the output screen 1960 is displayed (e.g., output device 145D). In some embodiments, indicator 1966 is optional and may not be shown on output screen 1960. In such embodiments, not showing indicator 1966 may reduce visual clutter on output screen 1960 and may reduce the possibility of user confusion.

A message 1968 may be provided in output screen 1960, indicating an amount of savings to the user by shopping for the products as assigned by the method. In some embodiments, message 1968 may provide additional information or different information to the user, similar to message 1926 described above. In some embodiments, message 1968 is optional and may not be shown on output screen 1960.

Figure 20:
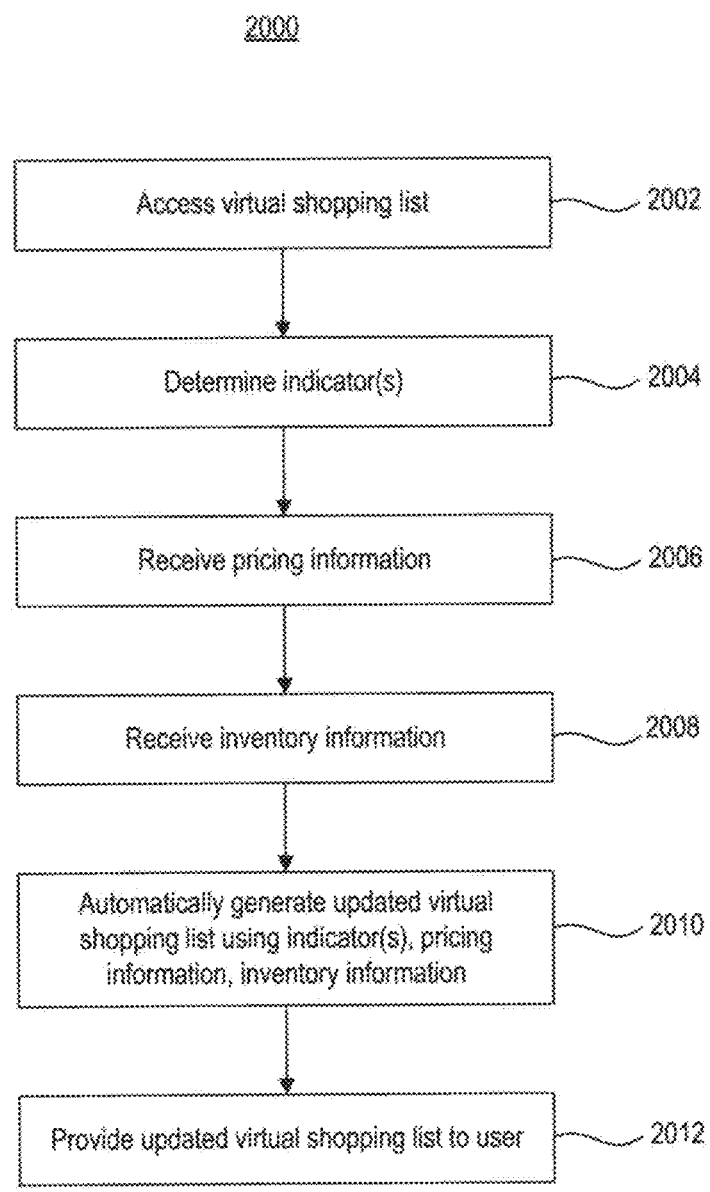
FIG. 20 is a flowchart of an exemplary method for distributed shopping, consistent with the present disclosure.

FIG. 20 is a flowchart of an exemplary method 2000 for distributed shopping. Method 2000 may be performed by at least one processor or at least one processing unit, such as processing unit 130, processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform method 2000. Further, method 2000 is not necessarily limited to the steps shown in FIG. 20, and any steps or processes of the various embodiments described throughout the present disclosure may also be included in process 2000.

In step 2002, method 2000 accesses a user's virtual shopping list. As described above, the virtual shopping list is associated with the user, for example via a Web site or the user's mobile device. The virtual shopping list identifies a plurality of products that the user wishes to purchase. In some embodiments, a customer of a shopping service may enter the shopping list, which may then be accessible by the user (e.g., a person shopping on behalf of the customer).

In step 2004, method 2000 determines one or more indicators. For example, a first indicator may be associated with a prospective visit by the user to a first retail store and a second indicator may be associated with a prospective visit by the user to a second retail store. As noted above, the first indicator may identify a first time window when the user may visit the first retail store and the second indicator may identify a second time window when the user may visit the second retail store.

In step 2006, method 2000 receives pricing information for the plurality of products. The pricing information may be received for products located at the first retail store, products located at the second retail store, or products located at both the first retail store and the second retail store such that a price comparison may be performed.

In step 2008, method 2000 receives inventory information for the plurality of products. The inventory information may be received for products located at the first retail store, products located at the second retail store, or products located at both the first retail store and the second retail store such that an inventory comparison may be performed.

In step 2010, method 200 automatically generates an updated virtual shopping list. The updated virtual shopping list may be generated using one or more of the first indicator, the second indicator, the pricing information, or the inventory information. In some embodiments, the combination of the first time window, the second time window, the pricing information, and the inventory information may be used to determine a first subset of the plurality of products to be purchased at the first retail store and a second subset of the plurality of products to be purchased at the second retail store (i.e., distribute the shopping between the first retail store and the second retail store) to minimize the total purchase price for all or a majority of the plurality of products. As another example, the combination may be used to distribute the shopping between the first retail store and the second retail store to ensure that the user is able to purchase all the plurality of products.

In step 2012, method 2000 provides the updated virtual shopping list to the user. As described above, the updated virtual shopping list may be provided to the user via a computer (and a server-based shopping account associated with the user) or via a mobile device (e.g., via an application running on the user's mobile device).

Practical frictionless shopping systems are not 100% accurate. For example, a system may fail to identify the product type of a product selected or returned by a customer. In such situations, it may be useful to query the customer about the product type, rather than imposing a non-frictionless solution. However, customers may vary in terms of trustworthiness. In some embodiments, a test event may be used to estimate a customer's trustworthiness, and based on the outcome of the test event (i.e., whether the customer is determined to be trustworthy or untrustworthy), an appropriate action may be selected in response to a future, ambiguous product selection event. For example, where a test event includes querying a customer about a recognized product selection event (e.g., regarding price, quantity, product type, etc.), and the customer responds accurately, that customer may be provided with a frictionless shopping option (e.g., a query and trusted response by the customer) in response to future ambiguous selection events. On the other hand, if a customer does not provide an accurate response to the test event query, a less frictionless approach may be employed in response to future ambiguous selection events.

Some embodiments provide a frictionless shopping method based on estimated shopper integrity. In some embodiments, a non-transitory computer-readable medium including instructions that when executed by a processor may cause the processor to perform the method. In some embodiments, the method may be performed by a system for frictionless shopping, the system including at least one processor configured to perform the steps of the method. For example, as discussed above, the disclosed system may include one or more servers 135, which may include one or more processing devices 202. Processing device 202 may be configured to execute one or more instructions stored in a non-transitory computer-readable storage medium. As also discussed above, the non-transitory computer-readable medium may include one or more of random access memory (RAM), read-only memory (ROM), volatile memory, non-volatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same, etc.

In some embodiments, the method may include receiving, from at least a first of a plurality of sensors associated with a retail store, first sensed data indicating a selection of a first product by a customer. The plurality of sensors may include any type of sensors described herein, such as an image sensor (e.g., as a part of an image capture device such as image capture device 506), a motion sensor, a sound sensor, a proximity sensor, a temperature sensor, a biometric sensor, a pressure sensor, a weight sensor, a light sensor, a resistive sensor, a capacitive sensor, an inductive sensor, a vacuum pressure sensor, a high pressure sensor, a conductive pressure sensor, an infrared sensor, a photo resistor sensor, a photo-transistor sensor, a photo-diode sensor, an ultrasonic sensor, or the like. The plurality of sensors may be placed in multiple locations throughout the retail store (e.g., on each retail shelf or product display) and/or be placed in a shopping cart used by a customer (e.g., the sensors may be physically connected to the shopping cart).

In some embodiments, the plurality of sensors associated with the retail store may include a camera, and wherein the first sensed data may include image data. For example, the camera may include image capture device 506 described herein. In some embodiments, the plurality of sensors may include multiple cameras and the cameras may be placed in various locations in the retail store, such as along a retail shelf as shown in FIGS. 4A, 4C, 6A, and 6B). As another example, the camera may be physically connected to a shopping cart used by the customer. In one example, the image data included in the first sensed data may include at least one of: an image of the customer picking one or more items of the first product, an image of the customer placing one or more items of the first product in a container (such as a shopping cart, a bag, a basket, and so forth), or an image of the customer holding one or more items of the first product. In another example, the image data included in the first sensed data may include an image of one or more items of the first product in a container (such as a shopping cart, a bag, a basket, and so forth). In yet another example, the image data included in the first sensed data may include an image of one or more items of the first product on a retail shelf and/or an image of an empty space on a retail shelf where one or more items are supposed to be placed and/or were previously placed on a retail shelf. In some examples, a machine learning model may be trained using training examples to determine properties associated with products from images and/or videos. An example of such training may include sample image data associated with a sample product, together with a label indicative of a property associated with the sample product. In one example, the trained machine learning model may be used to analyze the image data included in the first sensed data and determine the first property associated with the first product. In some examples, a convolution of at least part of the image data included in the first sensed data may be calculated to obtain a result value of the calculated convolution. In one example, the result value of the calculated convolution may be used to determine the first property associated with the first product. In one example, in response to the result value of the calculated convolution being a first value, the first property associated with the first product may be determined to have one value, in response to the result value of the calculated convolution being a second value, the first property associated with the first product may be determined to have a different value.

In some embodiments, the plurality of sensors associated with the retail store may include a pressure sensor. In some embodiments, there may be multiple pressure sensors. For example, the pressure sensors may include detection elements 801A, 801B as shown in FIG. 8A. In some embodiments, the first sensed data may include a change in pressure associated with at least one region of a product display. As described in connection with FIG. 8A, the pressure sensor may operate based on physical contact (or lack thereof) with products placed on the at least one region of the product display. For example, if the product is removed from the product display by a shopper, the pressure sensor can detect the change in pressure.

In some embodiments, the plurality of sensors may include at least one barcode scanner. In some embodiments, there may be multiple barcode scanners and the scanners may be placed in various locations in the retail store, such as along a retail shelf. In some embodiments, the barcode scanner may be implemented by an image capture device (e.g., image capture device 506). In some embodiments, the barcode scanner may be configured to scan a variety of barcode types, such as one-dimensional barcodes (e.g., Code 39, Code 128, Universal Product Code (UPC), International Article Number (EAN), and the like) or two-dimensional barcodes (e.g., PDF417, Data Matrix, Quick Response (QR) Codes, and the like).

In some embodiments, the plurality of sensors associated with the retail store may include a sensor configured with at least one of a retail shelf or a shopping cart of the retail store. As discussed above, the sensors may be placed in various location in the retail store, such as along a retail shelf or a product display. In some embodiments, the sensors may be placed in a shopping cart (e.g., the sensors may be physically connected to the shopping cart). In some embodiments, one or more pressure sensors may be located at a bottom portion of the cart basket, such that the pressure sensors can detect a total weight of all the products placed in the shopping cart. For example, the pressure sensor may be configured as a single pressure pad or as a plurality of individual pressure sensors arranged in a grid or other pattern.

In some embodiments, one or more image capture devices may be connected to various locations of the shopping cart such that the image capture devices may take pictures or scan barcodes of all the products placed in the shopping cart. For example, if the image capture device is configured to scan a barcode, by placing multiple image capture devices around a perimeter of the shopping cart (and facing toward an interior of the shopping cart), the barcode may be scanned regardless of the orientation of the product when placed in the shopping cart. In other words, the customer does not have to manually scan the barcode of each product placed in the shopping cart by positioning the barcode of the selected product to face a particular image capture device.

In some embodiments, the method may include determining, from the first sensed data, a first property associated with the first product. In some embodiments, the property associated with the first product may include one or more characteristics of the product, such as one or more visually discernable features attributed to the product or one or more features that may be detected by one or more of the plurality of sensors (e.g., size of the product, shape of the product, information on a label associated with the product, weight of the product, etc.). In some embodiments, multiple properties associated with the first product may be determined from the first sensed data. For example, if the first sensed data includes a barcode of the first product, it may be possible to determine multiple properties associated with the first product, such as product type, brand, weight, and price. In some examples, a machine learning model may be trained using training examples to determine properties associated with products from sensed data. An example of such training may include sample sensed data associated with a sample product, together with a label indicative of a property associated with the sample product. In one example, the trained machine learning model may be used to analyze the first sensed data and determine the first property associated with the first product.

In some embodiments, the first property may be indicative of a product type associated with the first product. In some embodiments, the product type associated with the first product may include a broad category of the product type, e.g., a bottle of soda, a loaf of bread, a notepad, or the like.

In some embodiments, the first property may be indicative of a quantity associated with the first product. For example, the first property may indicate that the customer selected a six-pack of soda cans or a package of three cans of vegetable soup. In one example, the first property may indicate whether the customer selected a first number of units or a second number of units (for example, five or six, one or two, etc.) of the first product. In one example, the first property may indicate a weight of the first product. For example, the first product may be a custom-made product that may have different weights, and the first property may indicate a weight of the first product. In one example, the first property may indicate a volume of the first product. For example, the first product may be a custom-made product that may have different volumes, and the first property may indicate a volume of the first product.

In some embodiments, the first property may be indicative of a price associated with the first product. For example, the first property may be the "shelf price" of the first product, where the "shelf price" is the price of the first product as posted on the retail shelf. In some embodiments, the first property may be a discounted price of the first product if, for example, the first product is currently being sold at a discount by the retail store. In some embodiments, the first property may be a discounted price of the first product if, for example, the customer is identified as a "frequent shopper" at the retail store (e.g., via a retail store loyalty program) and the retail store provides a discounted price to customers identified as "frequent shoppers."

In some embodiments, the method may include issuing a first query to the customer with respect to the first property associated with the first product and, in response, receiving first information from the customer. The first query may be a "test event" to estimate the customer's trustworthiness based on the received first information. The customer's trustworthiness may be used to determine an action to be taken in a future product selection event, as will be described in further detail below.

In some embodiments where multiple properties associated with the first product may be determined from the first sensed data (e.g., based on a scanned barcode of the first product), the first query may be based on any one of the properties associated with the first product. In some embodiments, the property of the first product to be included in the first query may be predetermined. For example, the method may be set such that the first query relates to a price of the first product. In some embodiments, the property of the first product to be included in the first query may be determined at random from the multiple properties.

In some embodiments, the first information received from the customer may include a selection of at least one of a plurality of options presented to the customer. For example, the customer may be prompted to answer a question about the first product. In some embodiments, the first information may be received from a mobile device associated with the customer. For example, the customer may receive a question about the first product on the mobile device and may be presented with a plurality of options to select from. In some embodiments, the first information may be received from a communication device physically connected to a shopping cart. Similar to the above example, the customer may receive a question about the first product on the communication device connected to the shopping cart and may be presented with a plurality of options to select from.

In some embodiments, the first information received from the customer may indicate at least one of a price, a selected quantity, or a product type for the first product. For example, the first query may prompt the customer to confirm the "shelf price" of the first product. As another example, the first query may prompt the customer to confirm whether the first product was a package of three cans of vegetable soup. As another example, the first query may prompt the customer to confirm whether the first product was a box of cookies or a box of pasta.

In some embodiments, the first query may be presented as a multiple-choice question to enable easy customer response. For example, if the first query prompts the customer to confirm the price of the first product, the first query may present two or more choices for the price of the first product. In some embodiments, the number of choices may be limited based on the screen size of the device where the first query is displayed. For example, if the first query is displayed on the customer's mobile device, the number of choices may be limited to two or three. As another example, if the first query is displayed on the communication device connected to the shopping cart, the number of choices may be limited to four. In some embodiments, the first query may prompt the customer to enter a number, for example, if the first query is about the quantity of the first product selected by the customer. The customer may then be prompted to enter a number on a numeric keypad displayed adjacent to the first query. It is noted that the format of the first query and how the customer enters the first information in response to the first query as described herein may be presented in any format capable of being used by the customer's mobile device or the communication device connected to the shopping cart. For example, the format for the display may be based on graphical user interface elements defined by the display device or by an operating system running on the display device. For example, the graphical user interface elements may include buttons, radio buttons, or a text field.

In some embodiments, the method may include comparing the first information received from the customer with the first property associated with the first product. The comparing may be performed by any known comparison means. For example, the comparing may be performed by a remote server that receives the first information. As another example, the comparing may be performed by the customer's mobile device if the customer received the first query on the mobile device. As another example, the comparing may be performed by the device connected to the shopping cart if the customer received the first query on the device. As another example, the comparing may be performed by a server located in the retail store.

In some embodiments, the method may include determining, based on the comparison between the first information received from the customer with the first property associated with the first product, an integrity indicator associated with the customer. The integrity indicator may be any type of value that may be used to track a characteristic of the customer. In some embodiments, the integrity indicator may include a value, an index, a measure, a flag, or the like. For example, the integrity indicator may be a binary flag (e.g., a single bit that may be one of two possible values) such that the flag signifies whether the customer provided an accurate response or an inaccurate response. As another example, the integrity indicator may be a value within a range of possible values, e.g., based on how accurate or inaccurate the first information is to the correct answer. As another example, integrity indicator may be a value that indicates a percentage difference between the first information and the correct answer. For example, if the first query requires the customer to respond with a price of the first product, the integrity indictor may be an absolute difference between the first information (i.e., the price provided by the customer) and the actual price of the first product or may be a percentage difference between the price provided by the customer and the actual price of the first product.

In some embodiments, how the integrity indicator is determined may be based on a characteristic of the first product. For example, if the first sensed data (e.g., a barcode scan) indicates that the price of the first product is greater than a threshold amount (e.g., greater than $10), then the first query may include asking the customer to confirm the price of the first product and if the first information (e.g., the price provided by the customer) is within 2% of the actual price of the first product, the integrity indicator may indicate that the customer is trustworthy. As another example, if the price of the first product is less than a threshold amount (e.g., less than $2), the first query may include asking the customer to confirm the price of the first product and if the first information (e.g., the price provided by the customer) is within 5% of the actual price of the first product, the integrity indicator may indicate that the customer is trustworthy. As another example, if the price of the first product is greater than a threshold amount (e.g., greater than $10), then the first query may include asking the customer about a different characteristic of the first product (e.g., about any property other than the price of the first product). The above examples may be expanded upon to include many variations based on thresholds relating to certain product characteristics without changing the overall operation of the method. For example, there may be a price threshold, a weight threshold, or a quantity threshold and the first query may relate to the same threshold (e.g., if using a price threshold, the first query may relate to the price of the first product) or the first query may relate to a different product characteristic.

In some embodiments, the integrity indicator may be stored temporarily, e.g., for a current shopping "session" while the customer is physically located in the retail store and the integrity indicator may be reset to a default value when the customer leaves the retail store. In some embodiments, the integrity indicator may be stored for a longer period of time, e.g., the integrity indicator may be a cumulative indicator associated with the customer over time (e.g., hours, days, weeks, months, years). For example, if the integrity indicator indicates that the customer provides an accurate response based on a threshold number of queries, the method may randomly determine whether to issue the first query to the customer. In some embodiments, the threshold number of queries may be an absolute value, e.g., the customer has provided at least 50 accurate responses. In some embodiments, the threshold number of queries may be a relative value, e.g., the customer has provided accurate responses to at least 95% of all queries. In some embodiments, the threshold number of queries may include both an absolute value and a relative value, e.g., the customer has provided accurate responses to at least 95% of all queries and has been queried at least 50 times.

In some embodiments, the method may include receiving, from at least a second of the plurality of sensors associated with the retail store, second sensed data indicating a selection of a second product by the customer. The second sensed data indicating the selection of the second product may be performed similarly to the method described above in connection with receiving the first sensed data indicating the selection of the first product by the customer. It is noted that the designations "first product" and "second product" do not necessarily require that these are the first and second products selected by the customer while in the retail store, though that is a possible designation. For example, the "first product" may be the fifth product selected by the customer and the "second product" may be the tenth product selected by the customer. In some embodiments, the second product may be selected a predetermined number of products after the customer selects the first product. For example, the second product may be the fifth product after the customer selects the first product. As another example, the first product may be the fifth product selected by the customer and the second product may be the next product selected by the customer (i.e., the sixth product selected by the customer). In some embodiments, the second product may be selected a predetermined period of time after the customer selects the first product. For example, the second product may be selected two minutes after the first product even if the customer has selected other products in the two-minute period.

In some embodiments, the method may include determining, based on the integrity indicator, at least one action to take in order to determine a second property associated with the second product. In some embodiments, different actions may be taken based on whether the integrity indicator indicates that the first information received from the customer is accurate or inaccurate. Some of the different actions that may be taken are described in further detail below. In some embodiments, the method may include initiating the at least one action.

In some embodiments, the second property may be indicative of a product type associated with the second product. In some embodiments, the product type associated with the second product may include a broad category of the product type, e.g., a bottle of soda, a loaf of bread, a notepad, or the like.

In some embodiments, the second property may be indicative of a quantity associated with the second product. For example, the second property may indicate that the customer selected a six-pack of soda cans or a package of three cans of vegetable soup. In one example, the second property may indicate whether the customer selected a first number of units or a second number of units (for example, five or six, one or two, etc.) of the second product. In one example, the second property may indicate a weight of the second product. For example, the second product may be a custom-made product that may have different weights, and the second property may indicate a weight of the second product. In one example, the second property may indicate a volume of the second product. For example, the second product may be a custom-made product that may have different volumes, and the second property may indicate a volume of the second product.

In some embodiments, the second property may be indicative of a price associated with the second product. For example, the second property may be the "shelf price" of the second product, where the "shelf price" is the price of the second product as posted on the retail shelf. In some embodiments, the second property may be a discounted price of the second product if, for example, the second product is currently being sold at a discount by the retail store. In some embodiments, the second property may be a discounted price of the second product if, for example, the customer is identified as a "frequent shopper" at the retail store (e.g., via a retail store loyalty program) and the retail store provides a discounted price to customers identified as "frequent shoppers."

In some embodiments, the first property and the second property may relate to a common product characteristic. For example, the first property and the second property may both be the product type associated with the first product and the second product, the quantity associated with the first product and the second product, or the price associated with the first product and the second product.

In some embodiments, the first property and the second property may relate to different product characteristics. For example, the first property may be the quantity associated with the first product and the second property may be the price associated with the second product. Various combinations of product characteristics of the first product and the second product are possible. The combination of product characteristics of the first product and the second product used by the method does not change the overall operation of the method.

In some embodiments, when the integrity indicator associated with the first information received from the customer indicates that the first information is accurate, the determined at least one action includes issuing a second query to the customer, receiving second information from the customer in response to the second query, and determining the second property based on the second information received from the customer. In some embodiments, the second query may be issued to the customer in a similar manner as the first query described above. In some embodiments, the second information may be received from the customer in a similar manner as the first information described above. In some embodiments, determining the second property may be performed in a similar manner as determining the first property as described above.

In some embodiments, at least one of the first query or the second query is provided to the customer via a personal mobile communication device of the customer. In some embodiments, at least one of the first query or the second query is provided to the customer via a communication device physically connected to a shopping cart.

In some embodiments, the second information may be received from the customer in a similar manner as the first information described above, e.g., via the customer's mobile device or via the communication device connected to the shopping cart. As discussed above, the second property may be indicative of a product type associated with the second product, a quantity associated with the second product, or a price associated with the second product.

In some embodiments, when the integrity indicator associated with the first information received from the customer indicates that the first information is inaccurate, the determined at least one action may include requiring the customer to scan a barcode associated with the second product. If the integrity indicator associated with the first information indicates that the first information was inaccurate (i.e., that the customer may not be trustworthy), then the method may require the customer to perform an action to verify the second property of the second product. In some embodiments, the customer may scan the barcode associated with the second product using the customer's mobile device. In some embodiments, the customer may scan the barcode associated with the second product using the communication device connected to the shopping cart. In some embodiments, the customer may scan the barcode associated with the second product using a sensor (e.g., a barcode scanner) physically connected to the shopping cart.

In some embodiments, when the integrity indicator associated with the first information received from the customer indicates that the first information is inaccurate, the determined at least one action may include requiring the customer to capture an image of the second product. In some embodiments, the customer may capture the image of the second product using the customer's mobile device. In some embodiments, the customer may capture the image of the second product using the communication device connected to the shopping cart. In some embodiments, the customer may capture the image of the second product using an image sensor physically connected to the shopping cart.

In some embodiments, when the integrity indicator associated with the first information received from the customer indicates that the first information is inaccurate, the determined at least one action may include causing a store associate associated with the retail store to confirm the second property associated with the second product. In some embodiments, the store associate may confirm the second property associated with the second product using the customer's mobile device. In some embodiments, the store associate may confirm the second property associated with the second product using the communication device connected to the shopping cart. In some embodiments, the store associate may confirm the second property associated with the second product using a handheld device of the store associate (e.g., capturing device 125D).

In some embodiments, when the integrity indicator associated with the first information received from the customer indicates that the first information is inaccurate, the determined at least one action may include requiring the customer to engage in a non-frictionless checkout process. In some embodiments, the non-frictionless checkout process may include the customer going to a checkout station to complete the checkout process. In some embodiments, the checkout station may be "self-service," such that the customer scans the products in the shopping cart. In some embodiments, the checkout station may be staffed by a store associate who may assist the customer to complete the checkout process. For example, the store associate may scan the products in the shopping cart. In some situations, the customer and the store associate may each scan a portion of the products selected by the customer. In some embodiments, the store associate may scan the products in the shopping cart using a handheld device. In some embodiments, the customer may unload the products from the shopping cart to a conveyor belt and the store associate may scan the products using a scanning device positioned adjacent to the conveyor belt (i.e., a "traditional" checkout station).

In some embodiments, the method may include analyzing the second sensed data to determine a plurality of alternative plausible values for the second property associated with the second product. In some embodiments, the second sensed data may be sent to a remote server for analysis. In some embodiments, the method may include further basing the selection of the at least one action on the determined plurality of alternative plausible values.

In some embodiments, the second sensed data may be used to determine possible values of the second property and then the selected action may be based on the possible values to determine what the second property is. For example, if a shape of a container is analyzed in an image, and the shape appears to be a container of a certain size and the sensed data may also be analyzed to determine that the customer is in an aisle in the retail store with refrigerated shelving units or milk products, the selected action may be to query the customer, "Did you select a gallon of milk?" The selected action may be less specific if the sensed data reveals fewer details. For example, if all that is known about the container is the shape (e.g., the container may include milk, water, or soda), the selected action may be to ask the customer to pick the product the customer selected from a list of drink categories. In some embodiments, more than one selected action may be needed to refine what the second property is if the sensed data is limited (e.g., issue a first query whether the customer selected a beverage and, if so, issue a second query to ask if the customer selected one of the beverages on a list).

In some embodiments, the method may include analyzing the second sensed data to determine a plurality of likelihoods, each likelihood of the plurality of likelihoods is associated with a different alternative plausible value for the second property associated with the second product. In one example, each likelihood may represent a probability that the plausible value for the second property is the second property. In another example, each likelihood may represent a degree of likelihood (such as 'high', 'low', etc.) that the plausible value for the second property is the second property. In some examples, the likelihood may represent uncertainty in the determination of the second property associated with the second product. For example, data from a plurality of sensors may be analyzed, and analysis of data from different sensors may suggest different values for the second property. In this example, the likelihood associated with a particular plausible value for the second property may be determined based on a prior confidence in the sensor corresponding to the particular plausible value, may be determined based on the number of sensors corresponding to the particular plausible value, and so forth. In another example, the second sensed data may be analyzed using a plurality of algorithms (for example, a plurality of trained machine learning models, each trained using a different training set), and different algorithms may suggest different values for the second property. In this example, the likelihood associated with a particular plausible value for the second property may be determined based on a prior confidence in the trained machine learning model corresponding to the particular plausible value, may be determined based on the number of trained machine learning models corresponding to the particular plausible value, and so forth. In some embodiments, each likelihood may be represented by a numerical value. For example, a value between 0 and 1, a positive number, a real number, and so forth. In some embodiments, the method may include further basing the selection of the at least one action on a distribution of the determined plurality of likelihoods. For example, the selection of the at least one action may be based on a variance or a standard deviation of the distribution. In another example, the selection of the at least one action may be based on a histogram of the distribution. In yet another example, the selection of the at least one action may be based on any parameter of the distribution. For example, in response to a particular parameter of the distribution having a first value, a first action may be selected, and in response to the particular parameter of the distribution having a second value, a second action may be selected, the second action may differ from the first action. In some examples, a machine learning model may be trained using training examples to select actions based on distributions. An example of such training may include a sample distribution, together with a label indicating a desired selection of actions in response to the sample distribution. The trained machine learning model may be used to analyze the distribution of the determined plurality of likelihoods and select the at least one action. Some non-limiting examples of such a distribution of the determined plurality of likelihoods may include a discrete distribution, a continuous distribution, a normal distribution, a finite distribution, an infinite distribution, a Yule-Simon distribution, a Polya-Eggenberger distribution, and so forth. In some embodiments, the plausible value for the second property having a highest likelihood may be used to select the at least one action.

In some embodiments, the second sensed data may be used to determine a probability (i.e., likelihood) of several different possible values of the second property and then the selected action may be based on the probability distribution to determine what the second property is. For example, if a shape of a container is analyzed in an image, and based on the probabilities, the shape may be determined to be a container of a certain size. The sensed data may also be analyzed to determine that the customer is in an aisle (in some embodiments, the customer's location within the retail store may be based on a probability that the customer is in a particular aisle of the retail store) with refrigerated shelving units or milk products, the selected action may be to query the customer, "Did you select a gallon of milk?" The selected action may be less specific if the sensed data reveals fewer details. For example, if all that is known about the container is the shape (e.g., the container may include milk, water, or soda), the selected action may be to ask the customer to pick what product the customer selected from a list of drink categories. In some embodiments, more than one selected action may be needed to refine what the second property is if the sensed data is limited. For example, a first action may include issuing a first query whether the customer selected a beverage and, if so, a second action may include issuing a second query to ask if the customer selected one of the beverages on a list.

In some embodiments using the preceding example, the answer options associated with the first query and the second query may be based on the probability distribution. For example, if the probability distribution indicates that the customer is most likely to have selected milk or orange juice (as opposed to soda), then the answer options may be limited to "milk" and "orange juice." In some embodiments, the answer options associated with the first query and the second query may be included if the probability associated with the answer option exceeds a threshold (e.g., greater than 10%). For example, if the probability distribution indicates a 50% probability that the customer selected milk, a 45% probability that the customer selected orange juice, and a 5% probability that the customer selected soda, the 5% probability may be below the threshold and the answer options may then be limited to "milk" and "orange juice."

Figure 21A:
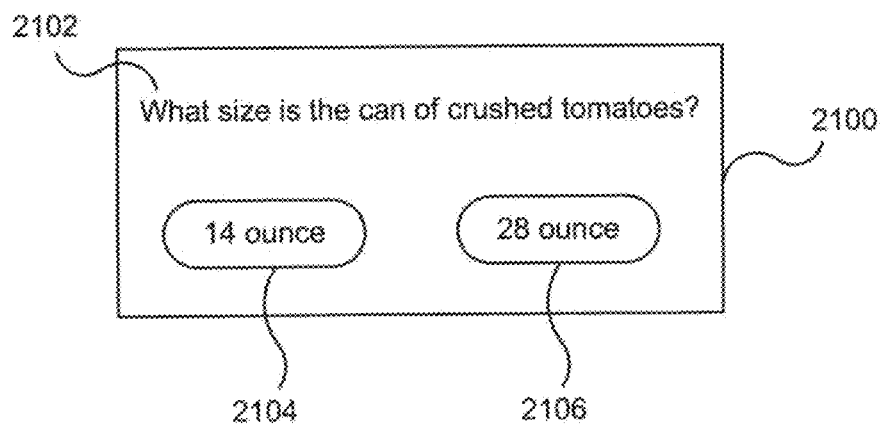
FIG. 21A is an exemplary screenshot of a customer query displayed on a display attached to shopping cart, consistent with the present disclosure.

FIG. 21A is an exemplary screenshot 2100 of a customer query displayed on a display attached to shopping cart, consistent with the present disclosure. The screenshot 2100 includes a query 2102 relating to a product selected by the customer. In some embodiments, query 2102 may relate to the first product or the second product selected by the customer. A first answer choice 2104 and a second answer choice 2106 are presented as possible responses to query 2102. Selecting first answer choice 2104 or second answer choice 2106 provides the first information from the customer. As discussed above, the number of answer choices presented to the customer in response to query 2102 may vary according to the size of the display.

As an example, if the customer selected a can of crushed tomatoes, query 2102 may ask the customer to confirm the size of the can of crushed tomatoes, "What size is the can of crushed tomatoes?" Based on query 2102, the displayed answer choices may relate to possible answers to query 2102. As shown in FIG. 21A, first answer choice 2104 is a first possible size for a can of crushed tomatoes (14 ounce) and second answer choice 2106 is a second possible size for the can of crushed tomatoes (28 ounce). In some embodiments, if multiple answer choices are displayed, one or more of the displayed answer choices may not be a valid answer choice (e.g., a 20 ounce can of crushed tomatoes, when such a size can does not exist). In some embodiments, if multiple answer choices are displayed, one or more of the displayed answer choices may be close to another answer choice (e.g., one answer choice is "27 ounce" and a second answer choice is "28 ounce"). In some embodiments, providing answer choices that are not valid or are close to existing answer choices, may enable different ways to determine the customer's integrity.

Figure 21B:
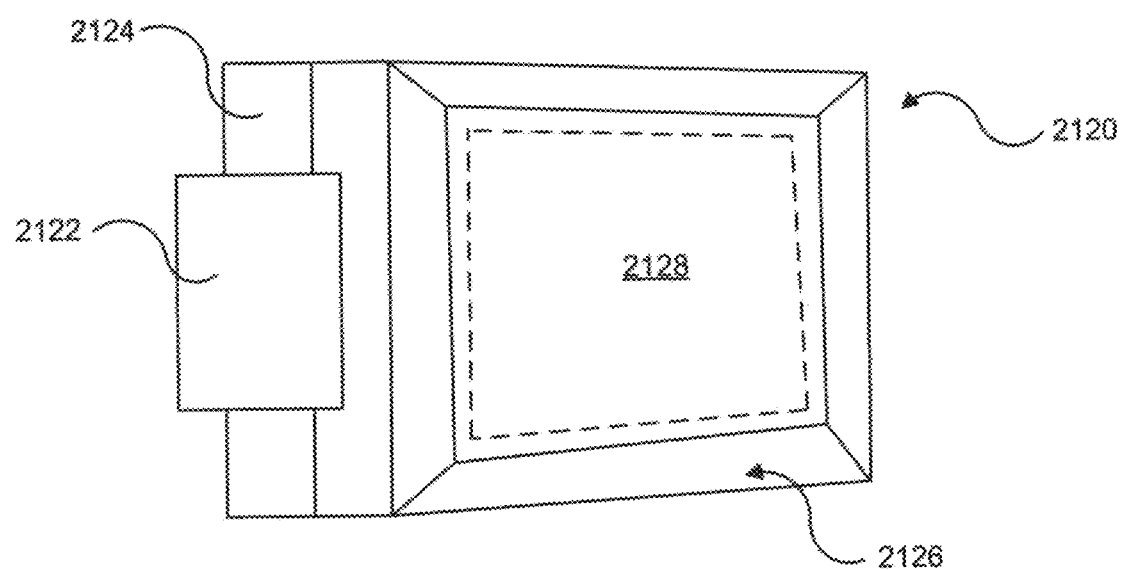
FIG. 21B is a top plan view of a shopping cart, including one or more sensors and a display screen attached to the shopping cart, consistent with the present disclosure.

FIG. 21B is a top plan view of a shopping cart 2120, including one or more sensors and a display screen attached to the shopping cart, consistent with the present disclosure. Shopping cart 2120 includes a display 2122 connected to a handle 2124. An interior 2126 of shopping cart 2120 includes a bottom having one or more sensors 2128 connected thereto. In some embodiments, display 2122 may be connected to a different portion of shopping cart 2120 such that display 2122 is visible to a customer while pushing the shopping cart via handle 2124. In some embodiments, sensors 2128 may include a single large sensor (e.g., a weight pad) or one or more individual sensors. In some embodiments in which individual sensors are used, the sensors may have a uniform size and may be arranged in a pattern (e.g., a grid) to enable sensing of a majority of the bottom of shopping cart 2120. In some embodiments in which individual sensors are used, the sensors may vary in size and may be arranged in a pattern (e.g., a grid) to enable sensing of a majority of the bottom of shopping cart 2120. In some embodiments, shopping cart 2120 may have a different size or/shape than the example shown in FIG. 21B. For example, as shown in FIG. 21B, interior 2126 of shopping cart 2120 may have a trapezoidal shape. In other examples, interior 2126 of shopping cart 2120 may be rectangular, square, or other quadrilateral shape.

Figure 22A:
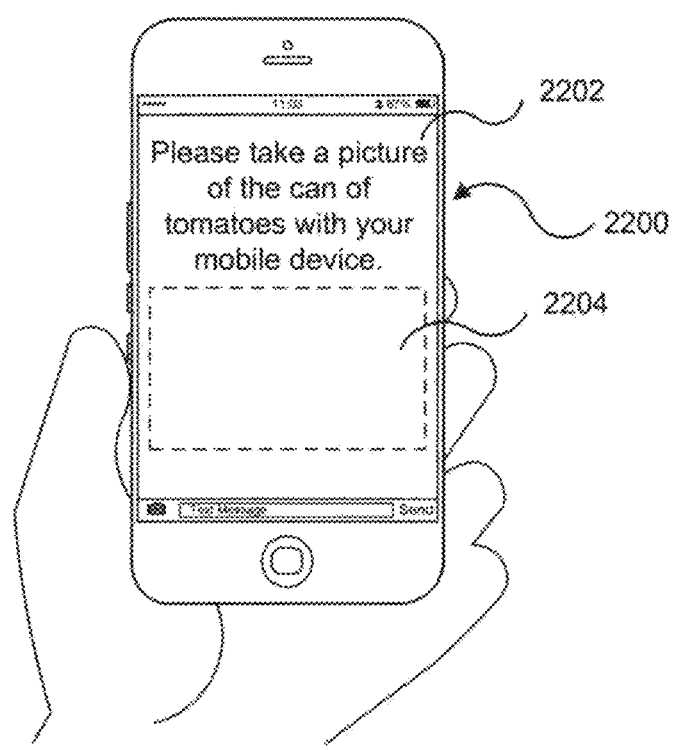
FIG. 22A is an exemplary screenshot of a customer query displayed on the customer's mobile device, consistent with the present disclosure.

FIG. 22A is an exemplary screenshot 2200 of a customer query displayed on the customer's mobile device, consistent with the present disclosure. The screenshot 2200 includes a query 2202 relating to a product selected by the customer. In some embodiments, query 2202 may relate to the first product or the second product selected by the customer. In the example shown in FIG. 22A, query 2202 asks the customer to take a picture of the product (e.g., a can of tomatoes) with the customer's mobile device. In some embodiments, the camera of the customer's mobile device may be automatically activated and an image capture area 2204 may be shown to enable the customer to align the picture of the product within the image capture area 2204. Image capture area 2204 is optional, and in some embodiments, image capture area 2204 may not be shown on screenshot 2200. In some embodiments, the camera of the customer's mobile device may be activated with the customer's permission. In some embodiments, the customer's permission may be generally provided for a particular application running on the customer's mobile device (e.g., an application issued in connection with the retail store) to enable camera access by the application. In some embodiments, the customer's permission may be required each time the camera is to be accessed. In some embodiments, how and whether the camera is accessed may be determined by a setting on the customer's mobile device.

Figure 22B:
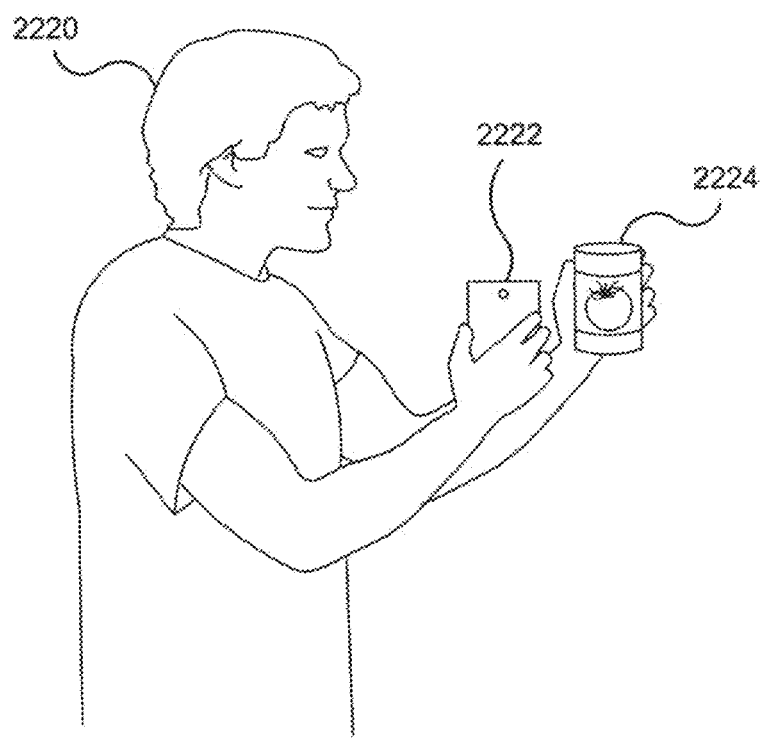
FIG. 22B is a schematic illustration of a customer taking a picture of a product with the customer's mobile device, consistent with the present disclosure.

FIG. 22B is a schematic illustration of a customer taking a picture of a product with the customer's mobile device, consistent with the present disclosure. Continuing the example of query 2202, a customer 2220 uses the customer's mobile device 2222 to take a picture of the product 2224.

Screenshot 2100 shown in FIG. 21A and screenshot 2200 shown in FIG. 22A are exemplary and as described above, many different queries may be issued to the customer. For example, if display 2122 connected to shopping cart 2120 is configured to include a camera, query 2202 may be issued to the customer via display 2122 and the customer may position the product such that an image of the product can be captured by the camera of display 2122. As another example, query 2102 may be issued to the customer's mobile device and the customer may select answer choice 2104 or 2106 via the mobile device.

Figure 23:
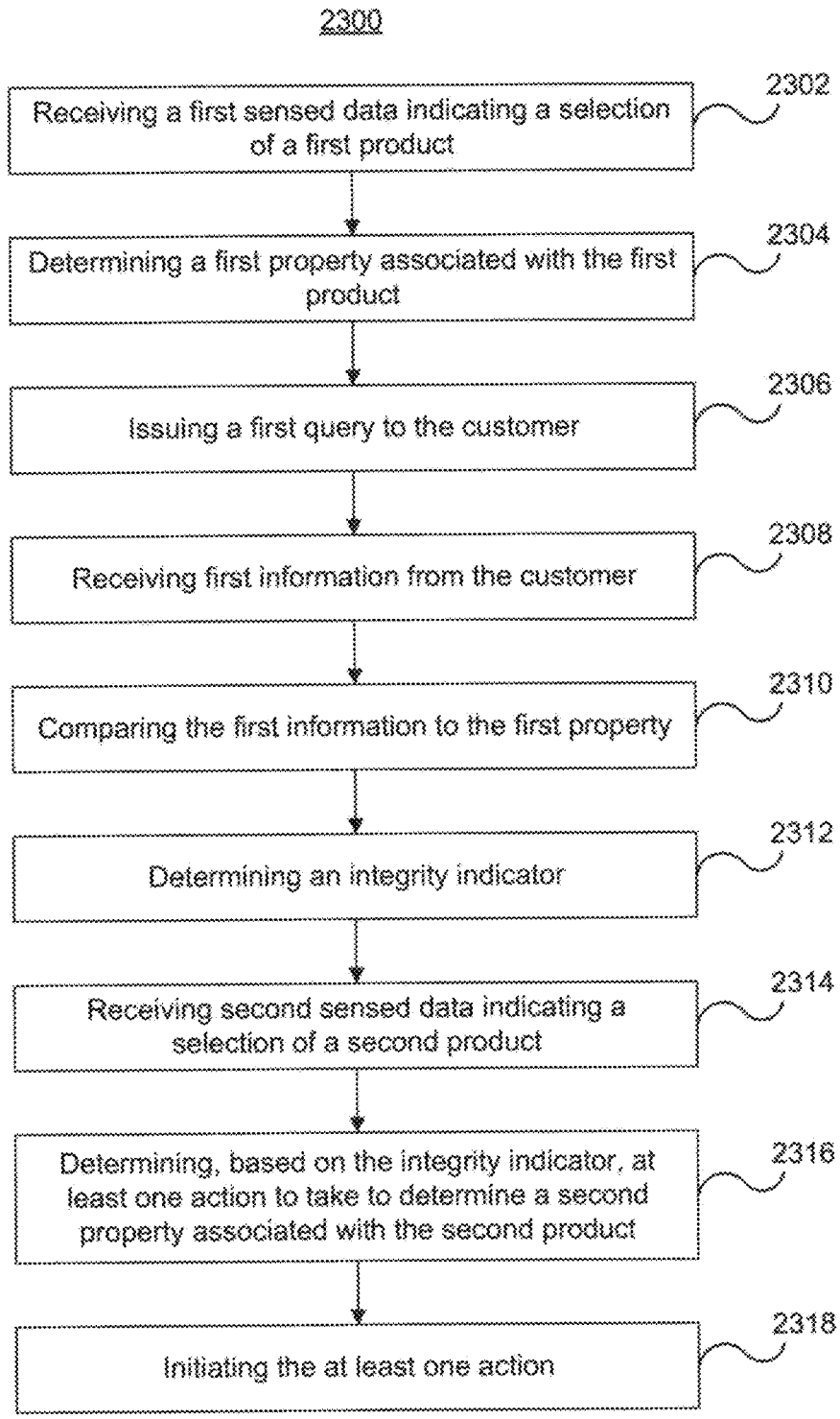
FIG. 23 is a flowchart of an exemplary method for frictionless shopping based on estimated shopper integrity, consistent with the present disclosure.

FIG. 23 is a flowchart of an exemplary method 2300 for frictionless shopping based on estimated shopper integrity, consistent with the present disclosure. Method 2300 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform method 2300. Further, method 2300 is not necessarily limited to the steps shown in FIG. 23, and any steps or processes of the various embodiments described throughout the present disclosure may also be included in method 2300.

In step 2302, method 2300 receives, from at least a first of a plurality of sensors associated with a retail store, first sensed data indicating a selection of a first product by a customer. The plurality of sensors may include any type of sensors described herein, such as an image sensor (e.g., as a part of an image capture device such as image capture device 506), a motion sensor, a sound sensor, a proximity sensor, a temperature sensor, a biometric sensor, a pressure sensor, a weight sensor, a light sensor, a resistive sensor, a capacitive sensor, an inductive sensor, a vacuum pressure sensor, a high pressure sensor, a conductive pressure sensor, an infrared sensor, a photo resistor sensor, a photo-transistor sensor, a photo-diode sensor, an ultrasonic sensor, or the like. The plurality of sensors may be placed in multiple locations throughout the retail store (e.g., on each retail shelf or product display) and/or be placed in a shopping cart used by a customer (e.g., the sensors may be physically connected to the shopping cart).

In step 2304, method 2300 determines, from the first sensed data, a first property associated with the first product. In some embodiments, the property associated with the first product may include one or more characteristics of the product, such as one or more visually discernable features attributed to the product or one or more features that may be detected by one or more of the plurality of sensors (e.g., size of the product, shape of the product, information on a label associated with the product, weight of the product, etc.).

In step 2306, method 2300 issues a first query to the customer with respect to the first property associated with the first product. The first query may be a "test event" to estimate the customer's trustworthiness based on the received first information. For example, the first query may be displayed to the customer via screenshot 2100 (shown in FIG. 21A) or screenshot 2200 (shown in FIG. 22A).

In step 2308, method 2300 receives first information from the customer. The first information may include the customer's response to the first query. For example, in response to query 2102 (shown in FIG. 21A), the first information may include the customer's answer choice in response to query 2102 (e.g., first answer choice 2104 or second answer choice 2106). As another example, in response to query 2202 (shown in FIG. 22A), the first information may include the image of the product taken by the customer.

In step 2310, method 2300 compares the first information received from the customer with the first property associated with the first product. The comparing may be performed by any known comparison means.

In step 2312, method 2300 determines, based on the comparison between the first information received from the customer with the first property associated with the first product, an integrity indicator associated with the customer. The integrity indicator may be any type of value that may be used to track a characteristic of the customer.

In step 2314, method 2300 receives, from at least a second of the plurality of sensors associated with the retail store, second sensed data indicating a selection of a second product by the customer. The second sensed data indicating the selection of the second product may be performed similarly to receiving the first sensed data indicating the selection of the first product by the customer.

In step 2316, method 2300 determines, based on the integrity indicator, at least one action to take to determine a second property associated with the second product. In some embodiments, different actions may be taken based on whether the integrity indicator indicates that the first information received from the customer is accurate or inaccurate.

In step 2318, method 2300 initiates the at least one action as determined in step 2316.

Digital activities of users may reveal information about dynamically changing situations in a retail store. Conventional methods for overseeing retail stores, such manually inspecting aisles, or designating one or more human supervisors to physically circuit through each region of a retail store, may be costly and impractical, particularly for large stores with many aisles and departments. Information gleaned from digital activities of users while in the retails store may thus provide convenient and timely updates on the status or condition of areas in the retail store and may facilitate the store to promptly address situations that require attention in a cost effective and efficient manner. For example, customers may post updates on social media or share images with friends when encountering a mispriced or mislabeled product, a mishap (e.g., a spill), a promotion, a delay (e.g., due to long checkout queues or shelf restocking), availability of a product, and the like. Technology may be provided to monitor digital activities in a retail store and cluster such activities to identify patterns associating particular areas of the retail store with a given cluster of online activity. The cluster may be further analyzed to troubleshoot a problem in the particular area. Information published on digital platforms (e.g., online digital activities) from within the retail store may thus allow the store to automatically alleviate problems efficiently and accurately.

According to some embodiments, a method may be implemented to associate online digital activities with conditions in a retail store. The method may include detecting a plurality of online digital activities corresponding to subject matter related to a retail store. For example, a plurality of customers may post images or videos captured in the retail store on a social media account and may tag the post with a hashtag identifying the retail store. The plurality of online digital activities may originate from customers in the retail store. For example, the customers may be located in the vicinity of a particular condition. At least one processor may receive position information indicative of positions in the retail store from which each of the detected plurality of online digital activities originated. The at least one processor may cluster the detected online digital activities based on the received position information to provide one or more clusters of online digital activities. Each of the one or more clusters may be associated with a different region of the retail store. Further, an image acquisition device may capture one or more images of a particular region of the retail store associated with a particular cluster of detected online digital activities. The captured images may be analyzed (e.g., by at least one processor) to detect a condition of the retail store associated with the particular cluster of detected online digital activities. At least one remedial action may be automatically initiated to address the detected condition.

Figure 24A:
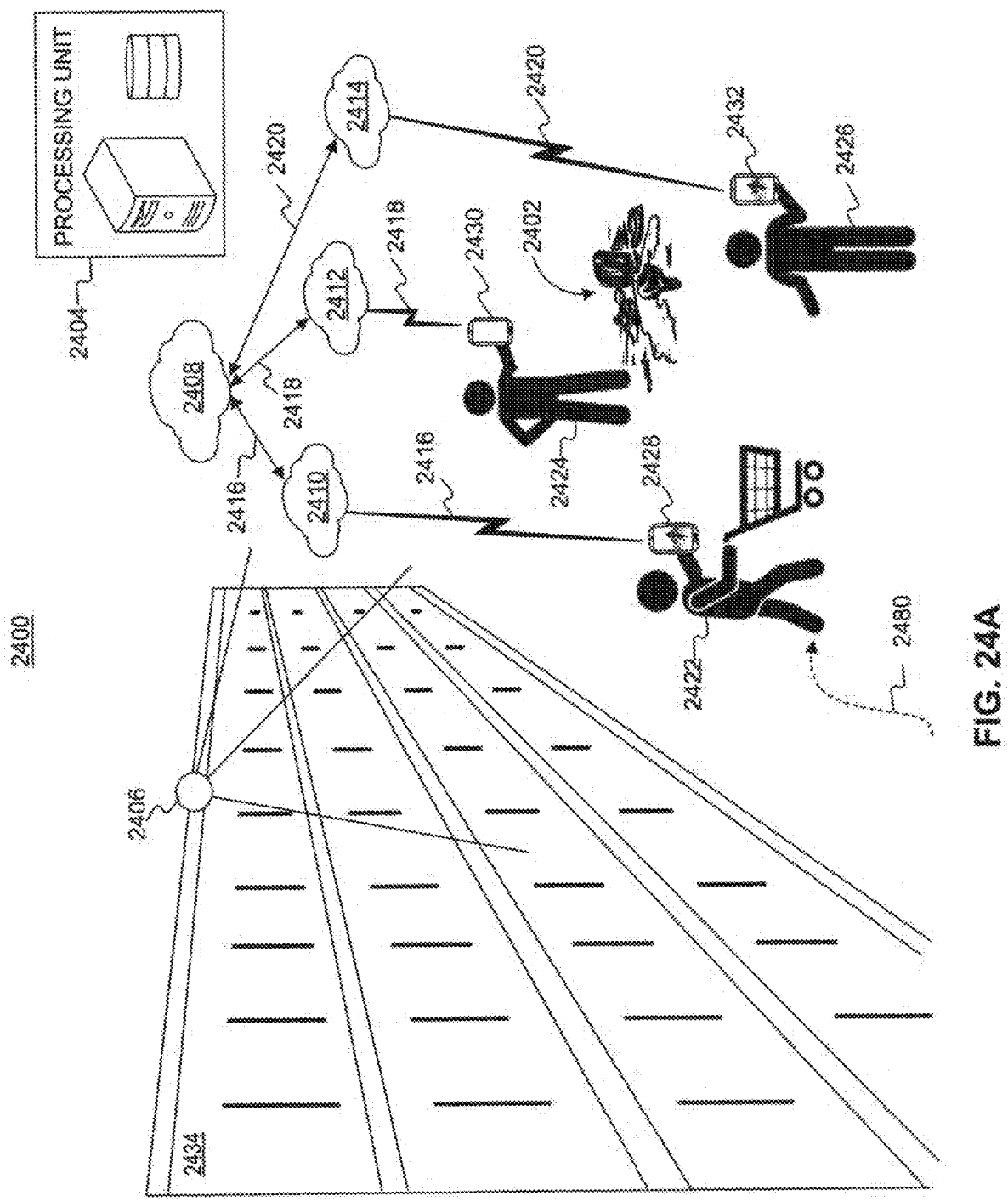
FIGS. 24A and 24B illustrate an exemplary implementation of a system for associating online digital activities with conditions in a retail store, consistent with the present disclosure.
Figure 24B:
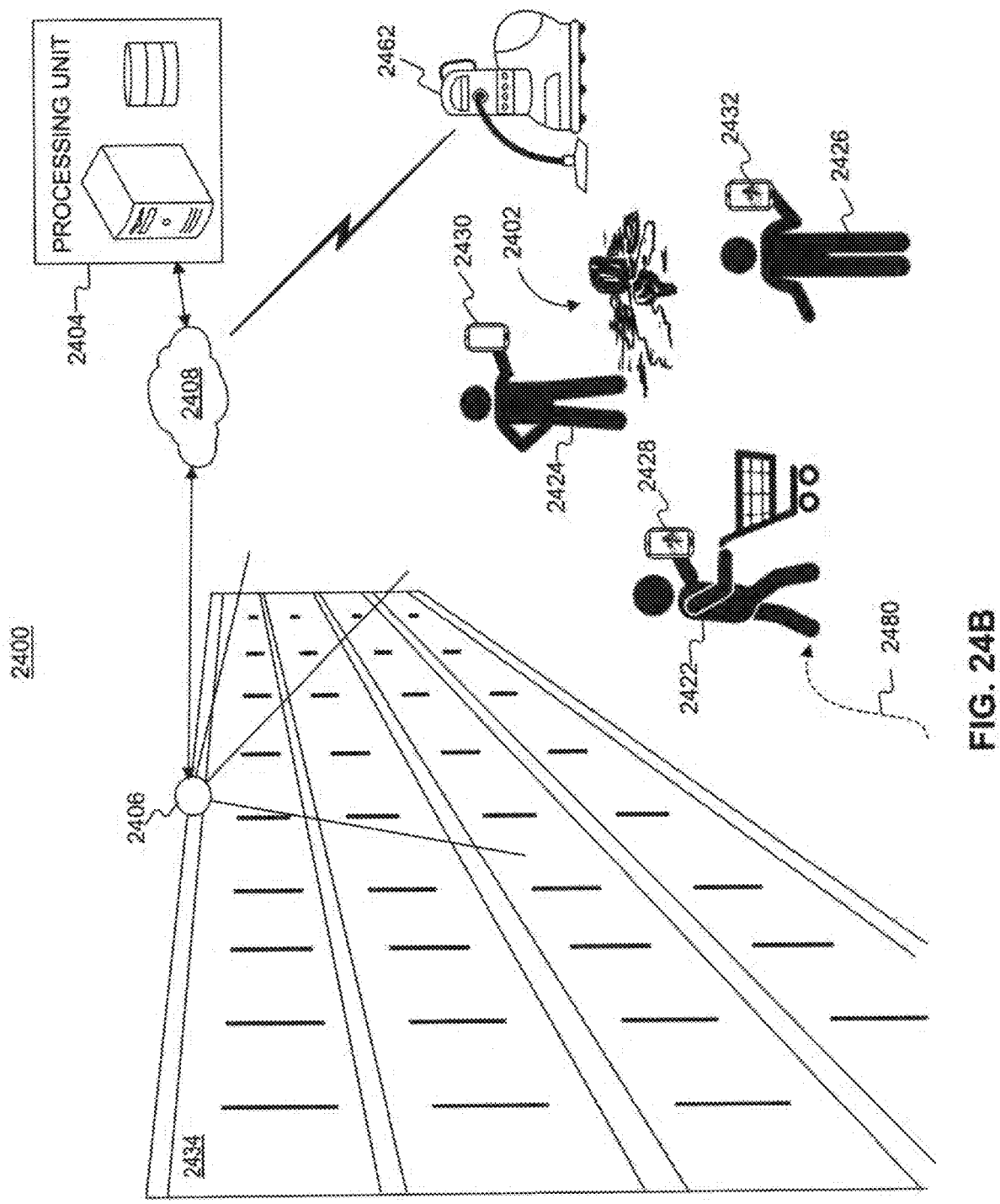

FIGS. 24A and 24B, together, illustrates an exemplary implementation of a system 2400 for associating online digital activities with conditions in a retail store, consistent with some disclosed embodiments. System 2400 includes at least a processing unit 2404 (e.g., one or more of image processing unit 130 of FIG. 1), at least one sensor 2406 (e.g., corresponding to at least one of sensors 125A, 125B, 125C of FIG. 4A) and a communications network 2408 (e.g., communications network 150 of FIG. 1). In some embodiments, processing unit 2404 may include one or more of servers 135 and one or more databases 140 of FIG. 1. At least one sensor 2406 may include one or more detectors to detect signals, such as radio signals (e.g., WiFi, BlueTooth, Zigbee, RFID signals), optical signals (e.g., visible light as images and/or video, infrared, and/or lidar signals), acoustic signals (e.g., ultrasound and/or audio), vibrations signals, and/or any other means for detection within the retail store. Sensor 2406 may be associated with a unique identifier allowing processing unit 2404 to associate data received from sensor 2406 with a position in the retail store, such as a specific aisle, counter, or any other specific region within the retail store. Processing unit 2404 may receive sensed data captured by sensor 2406 via communications network 2408. Communications network 2408 may additionally be communicatively coupled to cloud servers 2410, 2412, and 2414, respectively, via any combination of wired and/or wireless communications means. Cloud servers 2410, 2412, and 2414 may be associated with one or more digital platforms (e.g., social networks) configured for online digital activities via communications networks 2416, 2418, and 2420, respectively. Although cloud servers 2410, 2412, and 2414 may each be associated with a different digital platform and/or communications network, this is not required. While each of customers 2422, 2424, and 2426 is shown associated with a different communications network and cloud server, this is not intended to be limiting, and two or more customers may conduct their online activity via the same cloud server and/or communications network.

Customers 2422, 2424, and 2426 may use mobile devices 2428, 2430, and 2432 while in the retail store to perform online digital activities via cloud servers 2410, 2412, and 2414 and communications networks 2416, 2418, and 2420, respectively. For example, customers 2422, 2424, and 2426 may acquire images of a condition 2402 (e.g., a spill requiring clean-up or maintenance) via mobile devices 2428, 2430, and 2432, and share the acquired images on one or more digital platforms associated with cloud servers 2410, 2412, and 2414, respectively. Customers 2422, 2424, and 2426 may share the acquired images in association with additional data, such as location data, a time stamp, text content such as a hashtag associated with the retail store, or any other data that may provide a way to associate the online digital activities of customers 2422, 2424, and 2426 with condition 2402 in the retail store. Processing unit 2404 may continually monitor online digital activities, e.g., occurring on the online digital platforms associated with cloud servers 2410, 2412, and 2414, and thereby detect the online digital activities performed by customers 2422, 2424, and 2426 in association with condition 2402. Processing unit 2404 may analyze the detected online digital activities and determine a correlation between the online digital activities, e.g., based on one or more common characteristics determined by analyzing the online digital activities, such as by comparing location data, a time stamp, text content, image content, or any other digital content indicating a correlation between the online digital activities of customers 2422, 2424, and 2426. Based on the analysis of the online digital activities, processing unit 2404 may cluster the online digital activities of customers 2422, 2424, and 2426, e.g., in relation to condition 2402.

Additionally and/or concurrently, sensor 2406 affixed to a display area 2466 in proximity to condition 2402 may sense data relating to condition 2402. For example, sensor 2402 may continually acquire images of the region surrounding display area 2466, and thereby acquire images related to condition 2402. Optionally, sensor 2402 may acquire images of customers 2422, 2424, and 2426 performing the online digital activities relating to condition 2402. Processing unit 2404 may receive the data sensed by sensor 2402 in association with the unique identifier of sensor 2402 and thereby associate data received from sensor 2402 with the region surrounding display area 2466.

Based on the clustering of the online digital activities of customers 2422, 2424, and 2426 in relation to condition 2402 and the data received by sensor 2402, processing unit 2404 may detect condition 2402 as a situation that needs to be addressed. In response to the detection, processing unit 2404 may initiate an automated remedial action, such as to command via communications network 2408 a cleaning robot 2462 (FIG. 24B) to remedy condition 2402. Thus, the monitoring of the online digital activities of customers 2422, 2424, and 2426 while in the retail store, may facilitate the detection of condition 2402 by processing unit 2404. Consequently, condition 2402 may be addressed conveniently and efficiently by automatically initiating a remedial action for condition 2402.

Some embodiments involve a non-transitory computer-readable medium including instructions that when executed by a processor cause the processor to perform a method for associating online digital activities with conditions in a retail store. The term "processor" may include one or more hardware processors (e.g., processing device 202 of FIG. 2) and/or emulated computing processors configured to operate in a distributed manner. The term "online" may refer to an association with a public and/or private computer network, such as an intranet, virtual private network, and the Internet. The term "online digital activities" may refer to actions or activities performed using at least one computer (e.g., digital activities) that is connected to at least one other computer via a network, e.g., the Internet. For example, an online digital activity may include any of publishing, authoring, editing, digitally reacting to (e.g., commenting on, liking or disliking a post), or sharing digital content (e.g., authored by others), such as text, image, audio or video content on a digital platform, such as a social media platform. The term "retail store" may refer to an establishment offering products for sale, as described earlier. The term "conditions in a retail store" may refer to a state, situation, or set of circumstances in a retail store that may affect a shopping experience of a customer in the retail store. The condition in the retail store may relate to an item or object, (e.g., a product for restocking or repricing, a cart, a ladder or stool, a cleaning machine, or robot), an issue (e.g., a price, quantity, availability, shortage, promotion, exhibit or display for a product, a bottleneck at a counter or checkout queue, a number of functioning or malfunctioning counters and/or checkout queues, or an accessibility of an area within the retail store), a problem (e.g., a hazard, broken glass, danger, fire, spill, and obstruction due to a shopping or loading cart, or topped display), or any other matter that may affect a shopping experience and/or location in the retail store.

As shown in FIG. 24A, a retail store may have a condition 2402, such as a spill, or hazard obstructing a shopping aisle of the retail store. Customers 2422, 2424, and 2426, may be aware of condition 2402, such as by observing (e.g., by seeing, hearing, smelling, tasting, feeling, sensing or gaining awareness) condition 2402 or via any other communicating means, such as by receiving a notification, message, image, video, or phone call about condition 2402. Customers 2422, 2424, and 2426 may each perform one or more online digital activities via mobile devices 2428, 2430, and 2432, for example by publishing a post related to condition 2402 via cloud servers 2410, 2412, and 2414 and communications networks 2416, 2418, 2420, respectively. At least some of the online digital activities may be associated with condition 2402 in the retail store.

Accordingly, some embodiments involve detecting a plurality of online digital activities including subject matter related to a retail store. The term "detecting a plurality of online digital activities" may refer to recognizing, identifying, or otherwise determining a plurality of online digital activities. The detection may be implemented via a hardware device (e.g., sensor, or peripheral device), via software (e.g., an analysis of data received from one or more hardware device), or a combination of hardware and software detection. For example, the detecting may involve scanning, searching, or crawling social media platforms for location data, images, hashtags, names, identifiers, or textual content associated with the retail store. The term "subject matter related to a retail store" may include textual content (e.g., a name, phrase, or hashtag), metadata (e.g., location data, time, identifying tags, etc.), visual content (e.g., an image or video) audio content (e.g., a voice recording, song, melody, jingle, etc.) or any other information at least partially associated with the retail store. The association may be based on any aspect of the retail store, such as a product, brand, promotion, event, time period, display, price, inventory (e.g., availability or shortage) access, delay, queue (e.g., insufficient or malfunctioning queue), a physical aspect (e.g., a particular shelf, floor area, door, or aisle, an issue with lighting, heating, or cooling), a safety hazard (e.g., smoke, broken glass, spill), an obstruction (e.g., loading cart, collapsed product display), and any other issue pertaining to the retail store. The subject matter may assist in differentiating between online digital activities that are related to (e.g., associated with) the retail store versus online digital activities that are unrelated to the retail store. For example, a plurality of shoppers may each upload a post to a social media account while inside the retail store. Some posts may be unrelated to the retail store, while some posts may include subject matter related to the retail store, e.g., as a hashtag identifying the retail store, visual or audio content (e.g., an image or video) captured from the interior of the retail store, location data corresponding to the location of the retail store, and any other digital content related to the retail store. The posts may be uploaded from inside the retail store via a wireless communication network (e.g., a mobile or cellular communications network, radio such as WiFi, BlueTooth, Zigbee, infrared, microwave communication, satellite communication) and one or more cloud servers. At least one processor may monitor (e.g., by executing a software application) one or more digital platforms for digital content potentially containing subject matter related to the retail store.

Figure 25:
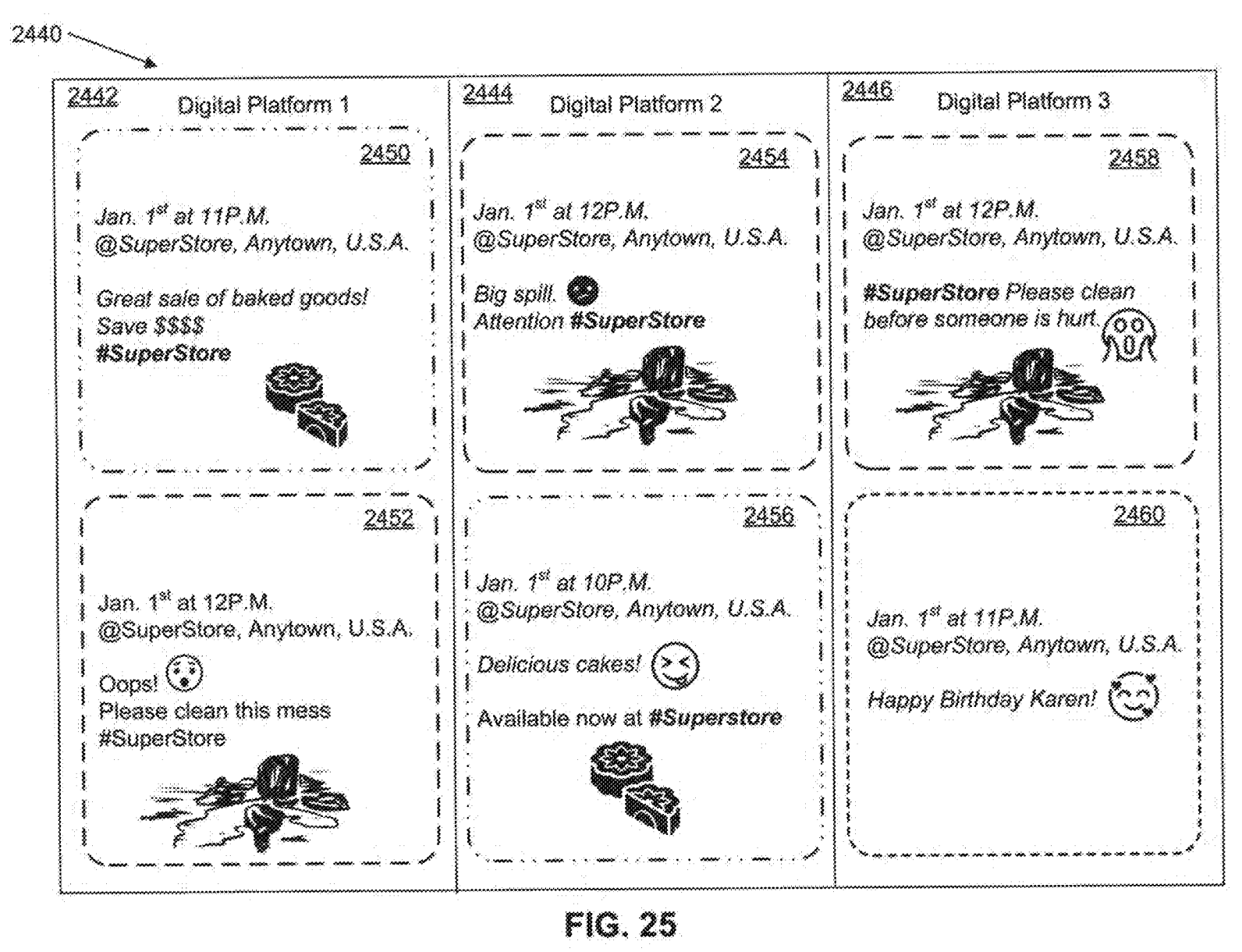

FIGS. 24A, 24B, and 25 together, illustrate an exemplary implementation for detecting a plurality of online digital activities including subject matter related to a retail store, consistent with some disclosed embodiments. Referring to FIG. 24A, on becoming aware of condition 2402, customers 2422, 2424, and 2426 may each upload a post on one or more social media platform via cloud servers 2410, 2412, and 2414 and communications networks 2416, 2418, 2420, respectively. For example, processing unit 2404 may execute a software application that monitors (e.g., by continually crawling, scanning, querying, or searching) the digital platforms on cloud servers 2410, 2412, and 2414 for content (e.g., online digital activities) associated with the retail store. As one example, processing unit 2404 may search for content including location data corresponding to the location of the retail store, to generate a listing of online digital activities. Referring to FIG. 25, an exemplary listing of online digital activities 2440 is shown for digital platforms 2442, 2444, and 2446, e.g., associated with cloud servers 2410, 2412, and 2414 (FIGS. 24A and 24B), respectively. Listing 2440 may include posts 2450 and 2452 published on platform 2442, posts 2454 and 2456 published on platform 2444, and posts 2458 and 2460 published on platform 2460. Posts 2450 to 2460 include location data associated with the retail store (e.g., "Superstore, Anytown, U.S.A.") and may thus include subject matter potentially related to the retail store. The use of location data to detect the online digital activities is intended as exemplary only, and other identifying information may be used as well or instead. Processing unit 2404 may detect posts 2450 to 2458 as online activities that include subject matter related to the retail store, e.g., based on the inclusion of the hashtag #SuperStore, and may determine that post 2460 lacks subject matter related to the retail store, e.g., based on an absence of digital content associated with the retail store.

Accordingly, the plurality of online digital activities may originate from customers in the retail store. The term "originate" may refer to a source for the online digital activity, such as the creator or author of digital content associated with the online digital activity, a photographer or videographer that captured an image or video associated with the online digital activity, or any other individual (or robot) associated with creating, authoring, sharing or uploading digital content associated with the online digital activities. Thus, online digital activities originating from customers inside the retail store may be distinguished from online digital activities originating from users outside the retail store.

While in the retail store, customers 2422, 2424, and 2426 (FIG. 24A) may publish digital content 2452, 2454, and 2458 (FIG. 25) to digital platforms 2442, 2444, and 2446 via cloud servers 2410, 2412, and 2414 and communications networks 2416, 2418, 2420, respectively. For example, digital content 2442, 2446, and 2448 may include any of location data for the retail store, a hashtag for the retail store, image data from within the retail store, and any other data identifying the retail store, to indicate the origination of digital content 2442, 2446, and 2448 by customers 2422, 2424, and 2426, respectively inside the retail store.

Some embodiments may involve receiving position information indicative of positions in the retail store from which each of the detected plurality of online digital activities originated. The term "position information" may refer to one or more of position, orientation, or location (e.g., geospatial) data such as may be acquired via one or more of GPS networks, cellular networks (e.g., 4G, 5G), RFID trackers, radio (e.g., radar), infrared (e.g., LIDAR), optic (e.g., cameras), or acoustic (e.g., ultrasound) sensors, inertial measuring units (IMUs), and any other technological means for acquiring position, location and orientation data. For example, a mobile device may be equipped with a GPS receiver for transmitting tracking data to a server associated with a digital platform. When the user of the mobile device performs an online digital activity on the digital platform, the server may include the tracking data, allowing the server to associate the online digital activity with the current location of the user. A computer associated with the retail store may receive the position information in response to querying the digital platforms for digital content related to the retail store. Additionally, or alternatively, one or more sensors (e.g., optic cameras, LIDAR sensors, ultrasound sensors, RFID sensors) positioned in the retail store may provide position information indicating positions in the retails store from which the online digital activities originated. For example, the position information may include acquired image data, and the method may further include analyzing the acquired image data to determine the positions in the retail store from which each of the detected plurality of online digital activities originated. The image data may be acquired by one or more cameras positioned in the retail store, each associated with a unique identifier that associates each image with a position in the retail store. The images may be transmitted with the unique identifier (e.g., as metadata) to a computer for analysis to identify one or more features in the images corresponding to the online digital activity, allowing to determine positions from which each of the online digital activities originated.

In some embodiments, processing unit 2404 may query cloud servers 2410, 2412, and 2414 for digital content associated with the retail store (e.g., by searching on location data). In response to the query, processing unit 2404 may receive position information (e.g., GPS, cellular, WiFi, BlueTooth, Zigbee location data) with each of posts 2450 to 2460. The position information may indicate positions within the retail store from which the detected online digital activities originated. Additionally, or alternatively, processing unit 2404 may receive the position information from sensor 2406. For example, sensor 2406 may capture images, e.g., of condition 2402 and customers 2422, 2424, and 2426 as location data. Additionally, or alternatively, sensor 2406 may include a beacon for sensing the locations of mobile devices 2428, 2430, 2432 as a radio signal. Sensor 2406 may transmit the sensed position information to processing unit 2404, which may analyze the position information (e.g., as images and/or radio signals) to detect customers 2422, 2424, and 2426 and condition 2402. Processing unit 2404 may compare condition 2402, detected via sensor 2406, with the digital content included in posts 2452, 2454, and 2458, and determine that the received position information indicates positions in the retail store from which posts 2452, 2454, and 2458 originated. In a similar manner, processing unit 2404 may determine that the captured images received from sensor 2406 do not indicate a position in the retail store from which post 2460 originated.

According to some embodiments, the position information may further indicate at least a portion of a path traversed by at least one customer in the retail store. For example, a customer may be tracked while shopping in the retail store. The tracking may be performed using data received from any of one or more sensors (e.g., image, infrared, acoustic, WiFi, BlueTooth, Zigbee) positioned in the retail store, e.g., on a shelf, ceiling, wall, shopping cart, or any other object in the retail store. Additionally, or alternatively, the customer may be tracked via an application installed on a mobile device. The tracking data may enable determining at least a portion of a path traversed by the customer in the retail store. For example, mobile device 2412 of customer 2422 may be configured with a tracking application that tracks path 2480 of customer 2422. Additionally, sensor 2406 may track the path of customer 2422. Processing unit 2404 may receive data indicative of path 2464 from the tracking application and/or sensor 2406 as position information for customer 2422.

According to some embodiments, the position information may be generated by one or more mobile devices. The mobile devices may be personal devices, e.g., carried or worn by the customers in the retail store. Additionally or alternatively, one or more mobile devices may belong to the retails store, e.g., configured with a shopping cart or bag or an automated drone or robot operating in the retail store. In some embodiments, mobile devices 2428, 2430 and 2432 may each be configured with a software application to track customers 2422, 2424, and 2426, in the retail store respectively. The software application may transmit the tracking data to processing unit 2404 as position information. Thus, referring to FIG. 24A, one or more of mobile devices 2628, 2630 and 2632 may be configured with a software application to track any of customers 2622, 2624, and 2426, in the retail store, respectively. The software application may transmit tracking data to processing unit 2404 as position information via communications network 2408.

According to some embodiments, the position information may further indicate an orientation of the one or more mobile devices during generation of one or more of the plurality of online digital activities. For example, one or more of the mobile devices may be provided with one or more of an inertial measuring unit (IMU), e.g., including a gyroscope, compass, or accelerometer for determining the orientation and position of the mobile device. The orientation of the mobile device may facilitate in determining the position of each mobile device with respect to the condition. For example, each of mobile devices 2428, 2430, and 2432 may include an IMU detecting the orientation and position of mobile device, e.g., with respect to condition 2402. Processing unit 2404 may receive the IMU data from each of mobile devices 2428, 2430, and 2432 and determine that customer 2422 is positioned south-west of condition 2402, customer 2424 is positioned north of condition 2402, and customer 2426 is positioned south of condition 2402.

According to some embodiments, the position information may include GPS coordinates. For example, one or more of the mobile devices may be provided with a GPS receiver for receiving location information from one or more GPS satellites, and determining, e.g., via triangulation, a location and position of the mobile devices. For example, each of mobile devices 2428, 2430, and 2432 may include a GPS receiver receiving GPS coordinates from one or more GPS satellites (not shown). Processing unit 2404 may receive the GPS coordinates from each of mobile devices 2428, 2430, and 2432 to determine the relative positions for each of customers 2422, 2424, and 2426.

According to some embodiments, the position information may include network traffic data, and the method may further include analyzing the network traffic data to determine the positions in the retail store from which each of the detected plurality of online digital activities originated. For example, the retail store may have an internal communications network, such as a WiFi network that customers and staff may use to communicate while inside the retail store. The retail store may deploy a software application to monitor the traffic on the WiFi network to detect a cluster of online digital activity. For example, a sudden surge in network traffic may indicate the occurrence of an accident, special promotion, hazard, or any other condition in the retail store. The WiFi network may include multiple nodes (e.g., antennas and/or beacons) distributed in the retail store, each having a unique identifier associating each node with a specific area in the retail store. Data traffic sensed by the nodes in the retail store may be analyzed to detect data traffic surges associated with a specific node or nodes, thereby associated the traffic with a specific area in the retail store. The data traffic surge may indicate a cluster of online digital activity associated with the specific area and may thus allow determining the positions in the retail store from which each detected online digital activity originated.

Some embodiments may involve clustering the detected plurality of online digital activities based on the received position information to provide one or more clusters of detected online digital activities. The term "clustering" may refer to grouping, binning, or otherwise defining a collection based on an association. For example, data may be grouped according to a criterion, such as location data, time frame, content type, content size, image analysis, text analysis, or any other shared characteristic to form a cluster. The received position information may be used to group or bin (e.g., cluster) the detected online digital activities, for example to detect a pattern or trend. In one example, a spatial clustering algorithm may be used to cluster the detected online digital activities based on the received position information to provide one or more clusters of detected online digital activities. In one example, a mathematical graph may be constructed based on the received position information, and a graph cutting algorithm, or a graph clustering algorithm may be used to cluster the detected plurality of online digital activities based on the mathematical graph to provide one or more clusters of detected online digital activities. For example, each node of the mathematical graph may correspond to one of the online digital activities, and a weight of an edge of the mathematical graph connecting two nodes (e.g., corresponding to two online digital activities) may be determined based on at least one of a distance between the positions corresponding to the two online digital activities, or similarities between subject matter associated with each of the two online digital activities. In one example, a mathematical hypergraph may be constructed based on the received position information, and a hypergraph clustering algorithm may be used to cluster the detected plurality of online digital activities based on the mathematical hypergraph to provide one or more clusters of detected online digital activities. For example, each node of the mathematical hypergraph may correspond to one of the online digital activities, and a weight of an hyperedge of the mathematical graph connecting three or more online digital activities may be based on at least one of distances between the positions corresponding to the three or more nodes (e.g., corresponding to three online digital activities), or similarities between subject matter associated with the three or more online digital activities.

FIG. 25 illustrates an exemplary implementation for clustering the detected plurality of online digital activities based on the received position information to provide one or more clusters of detected online digital activities, consistent with some disclosed embodiments. Processing unit 2404 (FIG. 24A) may cluster posts 2452, 2454, and 2458 based on received position information to provide a first cluster of detected online digital activity, e.g., associated with condition 2402. The first cluster is indicated by evenly dashed lines. Similarly, processing unit 2404 may cluster posts 2450 and 2456 into a second cluster of detected online digital activity, e.g., associated with a bakery in the retail store, indicated with uneven dashed lines.

According to some embodiments, each of the one or more clusters may be associated with a different region of the retail store. For example, one cluster may be associated with a specific aisle, and another cluster may be associated with a service counter, such as a bakery or butcher. As show in FIG. 25, posts 2452, 2454, and 2458, indicated by evenly dashed bold lines, constitute a first cluster associated with condition 2402 in a specific aisle of the retail store, and posts 2450 and 2456, indicated by unevenly dashed bold lines, constitute a second cluster associated with a bakery of the retail store.

Some embodiments may involve using an image acquisition device to capture one or more images representative of a particular region of the retail store associated with a particular cluster of detected online digital activities. The term "image acquisition device" may include any device configured to acquire image data, such as the capturing device described earlier. Once a cluster is identified, an image acquisition device may capture one or more images of a particular region in the retail store associated with a particular cluster.

As discussed earlier, sensor 2406 may include one or more cameras for capturing images of customers 2422, 2424, and 2426 and condition 2402 at a particular region of the retail store, e.g., in proximity to sensor 2406. The particular region may be associated with posts 2452, 2454, and 2458 (FIG. 25) constituting a particular cluster of detected online digital activity. Similarly, referring to FIG. 26, sensor 2406 may include one or more cameras for capturing images of customers 2622, 2624, and 2626 while waiting in a queue or shopping at a particular region of the retail store (e.g., in a crowded aisle or in proximity to checkout counters). Images acquired by sensor 2406 may be associated with the cluster of digital activities associated with the crowded aisle or queue.

Some embodiments may involve analyzing the one or more captured images to detect a condition of the retail store associated with the particular cluster of detected online digital activities. The analyzing may include image analysis (e.g., pattern recognition, facial recognition), metadata analysis (e.g., based on a timestamp and/or location data of the capture images, image format, type, size) and any other analysis of data associated with captured images. The images may be analyzed to detect a shared attribute (e.g., as a cause for the particular cluster of detected online digital activities). For example, the images may be analyzed to detect a spill, obstruction, shortage of products, long queue, or any other condition that may prompt a cluster of online digital activity in the retail store. In one example, the one or more captured images may be analyzed using a visual classification algorithm to classify the one or more images into one of a plurality of alternative classes. Each alternative class may correspond to a different type of condition to thereby detect the condition of the retail store associated with the particular cluster of detected online digital activities. In some examples, the one or more captured images may be analyzed based on the subject matter related to the retail store and included in the online digital activities corresponding to the particular cluster to detect a condition of the retail store associated with the particular cluster of detected online digital activities. For example, a machine learning model may be trained using training examples to detect conditions from images and/or subject matter information. An example of such training example may include a sample image of a sample retail store and/or a sample subject matter information together with a label indicating a condition of the sample retail store associated with the sample subject matter information. The trained machine learning model may be used to analyze the one or more captured images based on the subject matter related to the retail store and included in or associated with the online digital activities corresponding to the particular cluster to detect a condition of the retail store associated with the particular cluster of detected online digital activities. In some examples, the online digital activities may be analyzed to determine the subject matter related to the retail store and included in the online digital activities. For example, an online digital activities may include communication with a remote system, the remote system may be determined (e.g., by an intermediate communication system used for the communication with the remote system or by the remote system), and the subject matter may be determined based on the remote system (e.g., a remote system for online shopping may indicate an online ordering, remote system for online price comparison may indicate an online price comparison, and remote system for online nutrition data may indicate an health concern). In another example, the online digital activities may be performed using a software application (or app) associated with the retail store, and the software application may determine the subject matter based on the activity in the software application.

In some embodiments, processing unit 2404 may receive images capture by sensor 2406 and analyze the received images to detect condition 2402. Condition 2402 may thus be associated with a particular cluster of detected online digital activities, e.g., posts 2452, 2454, and 2458 of FIG. 25.

According to some embodiments, the particular region of the retail store may include one or more aisles of the retail store. In some embodiments, the particular region of the retail store may include a display area for a particular product in the retail store. For example, a first camera positioned in an aisle may capture one or more images of the aisle associated with the cluster of online digital activities related to the aisle. A second camera positioned in proximity to the bakery counter may capture one or more images of a display of baked goods associated with the cluster of online digital activities related to the bakery. Referring to FIG. 24A, sensor 2406, associated with a particular aisle of the retail store, may capture one or more images of the aisle. The aisle may include a display area 2434 for a particular product in the retail store.

According to some embodiments, the online digital activities may include online digital activities for checking a price of the particular product. For example, a customer may inquire about the price of a specific product sold in the retail store on a digital platform. Referring to FIG. 24A, customer 2422 may post a query for the price of a product sold in the retail store on a social media account via cloud server 2410 and communications network 2416.

According to some embodiments, the online digital activities may include online digital activities for ordering the particular product. For example, on noticing a shortage of a particular product in the retail store, a customer may place an order for the product via a site associated with the retail store. Referring to FIG. 24A, customer 2422 may place an order for a product missing in the retail store on a digital platform via cloud server 2410 and communications network 2416.

According to some embodiments, the detected condition may be associated with the particular product. For example, the condition may be associated with a shortage, spoilage, breakage, promotion, availability of the particular product. Referring to FIG. 24A, condition 2402 may be associated with a particular product that fell and broke, causing a spill.

According to some embodiments, the detected condition may be associated with a price of the particular product. For example, a discount, promotion, or dramatic price increase may be subject matter for sharing on a digital platform. Referring to FIG. 25, post 2450 may be associated with a price for a particular product (e.g., baked goods) sold in the retail store.

According to some embodiments, the detected condition may be associated with an availability of the particular product. For example, a customer may share digital content associated with a shortage of a particular product. Referring to FIG. 24A, condition 2402 may be associated with an availability of a particular product, e.g., that is no longer available after falling and breaking.

According to some embodiments, the detected condition may be associated with an obstruction in the retail store. For example, a customer may share digital content associated with an obstruction, e.g., in an aisle of the retail store. The obstruction may be caused by a spill, breakage, shopping cart, loading cart, special promotion, long queue, and any other issue that may cause an obstruction in the retail store. Referring to FIG. 24A, condition 2402 may be associated with an obstruction due to a product falling and breaking, causing a spill.

According to some embodiments, the detected condition may be associated with a presentation of the particular product. For example, a customer may share digital content associated with how a particular product is displayed, e.g., to alert that a product is positioned out of reach of the customer or to give feedback on the visual esthetics of the display. Turning to FIG. 24A, condition 2402 may be associated with a presentation of product on display area 2434, such as the height where the product is positioned on a shelf, e.g., to alert an employee that the particular product is out of reach, located on an incorrect shelf, or located in an incorrect aisle.

According to some embodiments, the detected condition may be associated with a potential hazard in the retail store. For example, a customer may share digital content associated with a hazard in the retail store. Referring to FIG. 24A, condition 2402 may be associated a hazard caused by a product falling and breaking.

According to some embodiments, the detected condition may be associated with a queue of customers in the retail store. For example, a customer may share digital content associated with a long delay in a queue of the retail store, e.g., to request that another queue be opened. On detecting the condition, an alert may be issued to open a new checkout or service counter.

According to some embodiments, the detected condition may be associated with a promotion for a product in the retail store. For example, a customer may share digital content associated with a promotion of a product, such as availability of a new, scarce, or seasonal product (or lack thereof), availability of freshly baked goods from the bakery, or a promotional price for a product.

Some embodiments may involve automatically initiating at least one remedial action to address the detected condition. The term "automatically" may refer to directly, spontaneously, or consequent to, e.g., without intervention or necessitating an action by an external agent, such as a human operator. Thus, the remedial action may be initiated automatically, e.g., directly and consequent to detecting the condition, without intervention by an external agent and/or component. The term "remedial action" may include issuing an alert, sending a notification, sounding an alarm, invoking a robot, or performing any other action to address the detected condition. The remedial action may be implemented electronically as a control signal targeting a device in the retail store, such as a robot, drone, cash register, sprinkler or fan system, or any other electronically controlled device in the retail store, as a notification, e.g., to an emergency service, a supplier of a product, as an announcement to alert or inform the customers, as a query to a database, e.g., an inventory database, or any other technique for initiating the remedial action. For example, if the detected condition is a shortage of a product, the remedial action may notify an employee of the retail store to restock a shelf.

FIG. 24B illustrates an exemplary implementation for automatically initiating at least one remedial action to address the detected condition, consistent with disclosed embodiments. On detecting condition 2402 in association with the cluster constituted by posts 2452, 2454, and 2458 of FIG. 25, processing unit 2404 may automatically invoke a cleaning robot 2462 to remedy the hazard posed by condition 2402.

According to some embodiments, the at least one remedial action may selected based on sales data associated with the particular product and the retail store. For example, sales data for a particular product may indicate supply and/or demand for the product, consumption patterns for the product (e.g., seasonal, time of day, quantities, customer reactions to promotional discounts). Thus, when determining a remedial action for the condition, sales data may be used to tailor the remedial action for the specific circumstances of the condition. Referring to FIG. 24B, after invoking cleaning robot 2462 to address condition 2402, processing unit 2404 may automatically place an order to restock a product associated with condition 2402 based on a demand expectation learned from sales data associated with the product.

According to some embodiments, the at least one remedial action may include a prompt to restock a product display shelf in the retail store. For example, the condition may be associated with the inventory for the particular product (e.g., a request to restock a shelf with the particular product). The retail store may perform the remedial action by restocking the shelf (e.g., using an automated robot). Referring to FIG. 24B, processing unit 2404 may automatically place an order to restock the product associated with condition 2402.

According to some embodiments, the at least one remedial action may include a prompt to increase a number of available checkout locations. For example, the condition may be associated with a long checkout queue, e.g., after customers post complaints on social media. To remedy the condition, a prompt may be issued to open another checkout counter, or a new checkout counter may be opened automatically (e.g., electronically).

According to some embodiments, the at least one remedial action may include a prompt to clean a spill in the retail store. For example, the condition may be associated with a spill in the retail store, and the remedial action may prompt a crew or robot to clean the spill. Referring to FIG. 24B, processing unit 2404 may prompt robot 2462 to clean a spill, e.g., to address condition 2402.

According to some embodiments, the at least one remedial action may include a prompt to adjust a price associated with at least one product in the retail store. For example, the condition may be associated with an incorrectly priced product in the retail store. To remedy the condition, a prompt may be issued to correct the price, e.g., by adding correct labels to the product.

Figure 26:
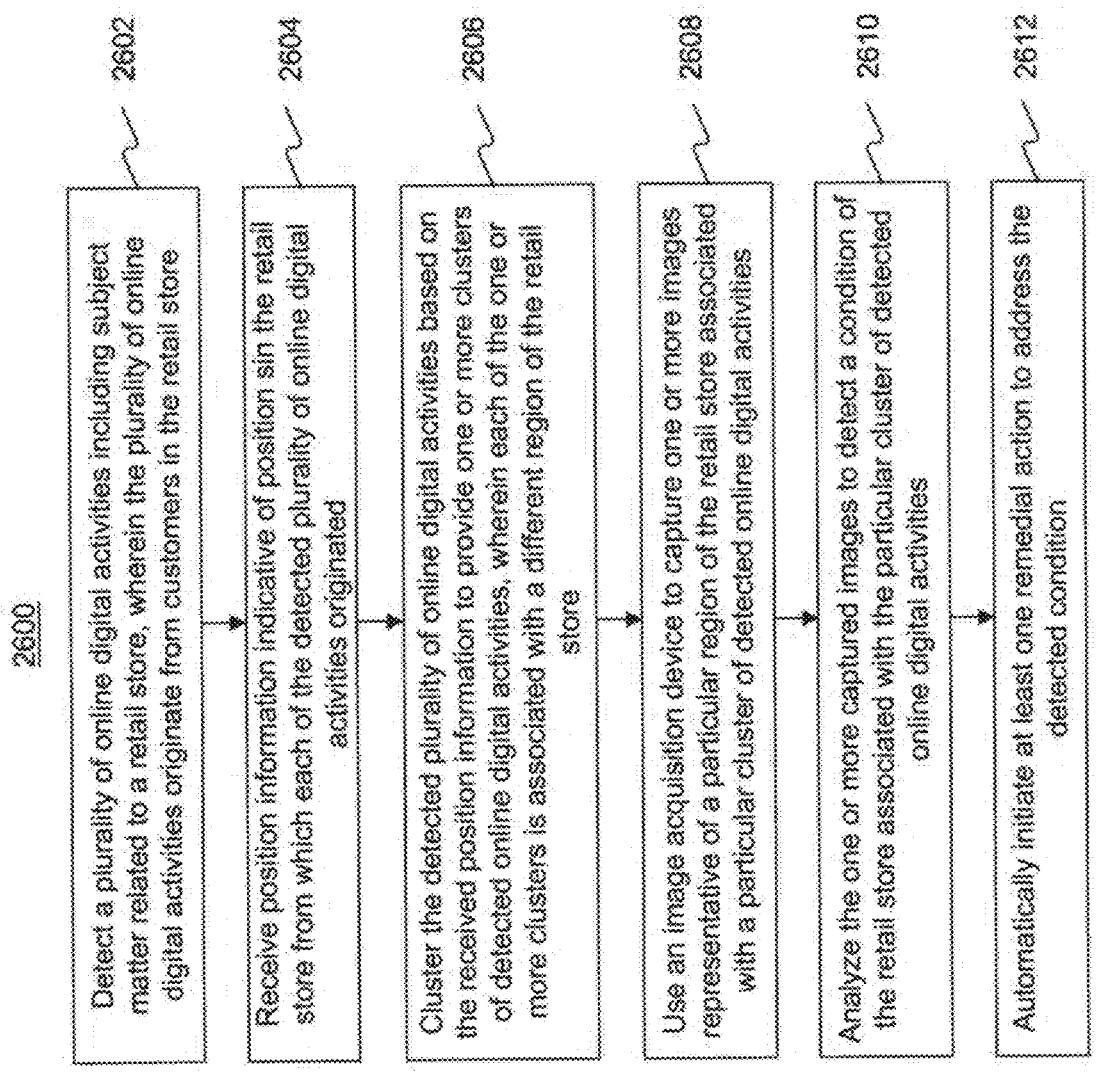
FIG. 26 is a flowchart of an example process for associating digital activities with positions in retail stores, consistent with the present disclosure.

FIG. 26 is a flowchart of an example process 2600 for associating digital activities with positions in retail stores, consistent with some embodiments of the present disclosure. Process 2600 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 2600. Further, process 2600 is not necessarily limited to the steps shown in FIG. 26, and any steps or processes of the various embodiments described throughout the present disclosure may also be included in process 2600.

In step 2602, process 2600 detects a plurality of online digital activities including subject matter related to a retail store, wherein the plurality of online digital activities originate from customers in the retail store. Referring to FIG. 24A, processing unit 2404 may detect a plurality of online digital activities (e.g., posts 2452, 2454, and 2458 of FIG. 25) including subject matter related to a retail store, such as an identifying hashtag and image content capture from inside the retail store. Online digital activities 2452, 2454, and 2458 may originate from customers 2422, 2424, and 2426 in the retail store.

In step 2604, process 2600 receives position information indicative of positions in the retail store from which each of the detected plurality of online digital activities originated. Referring to FIG. 24A, processing unit 2404 may receive position information (e.g., from one or more of sensor 2406 and mobile devices 2428, 2430, and 2432 via communications network 2408). The position information may be indicative of positions of customers 2422, 2424, and 2426 in the retail store from which each of posts 2452, 2454, and 2458 of FIG. 25 originated.

In step 2606, process 2600 clusters the detected plurality of online digital activities based on the received position information to provide one or more clusters of detected online digital activities, wherein each of the one or more clusters is associated with a different region of the retail store. Referring to FIG. 24A, processing unit 2404 may cluster posts 2452, 2454, and 2458 in a first cluster, and posts 2450 and 2456 in a second cluster, based on the received position information, thereby providing one or more clusters of detected online digital activities.

In step 2608, process 2600 uses an image acquisition device to capture one or more images representative of a particular region of the retail store associated with a particular cluster of detected online digital activities. Referring to FIG. 24A, sensor 2406 may include an image acquisition device to capture one or more images of the region in the retail store where customers 2422, 2424, and 2426 are situated, and associated with the first cluster of detected online digital activities (e.g., 2452, 2454, and 2458 of FIG. 25).

In step 2610, process 2600 analyze the one or more captured images to detect a condition of the retail store associated with the particular cluster of detected online digital activities. Referring to FIG. 24A, processing unit 2404 may analyze one or more images received from sensor 2406 via communications network 2408 to detect condition 2402 in the retail store associated with the cluster consisting of posts 2452, 2454, and 2458 of FIG. 25.

In step 2612, process 2600 automatically initiates at least one remedial action to address the detected condition. Referring to FIG. 24B, processing unit 2404 may automatically invoke cleaning robot 2462 to address condition 2462.

As described herein, the disclosed embodiments may provide various interfaces to allow a user to view products displayed in a retail store. In some applications, users may be interested in additional information than what can be gleaned from images of products on store shelves. For example, users may wish to track conditions of products on display in a retail store, such as quantities available, a time remaining until an expiration date, or various other information. This can be useful for retailers wishing to maintain product displays within intended parameters, customers wishing to acquire information on products for purchase, or various other users as described herein. These and other types of information may not be readily apparent from captured images or live video feeds.

To provide an improved interface for viewing products, the disclosed embodiments may include a hybrid visualization of retail shelves. This hybrid visualization may include generating a synthetic image representative of one or more retail shelves to provide to a user. The synthetic image may include a computer-generated representation of products on a shelf together with supplementary information, such as product quantity, placement (e.g., physical location in the retail store), type, price, condition, orientation, etc. In response to input from the user, an actual image associated with a selected region of the synthetic image (e.g., a specific shelf, a specific product representation, etc.) may be provided to the user. The actual image may be provided in place of the synthetic image on a user interface or may be superimposed on a portion of the synthetic image. Accordingly, the disclosed embodiments provide, among other advantages, improved efficiency, convenience, and functionality over existing electronic retail environment visualization systems.

Figure 27A:
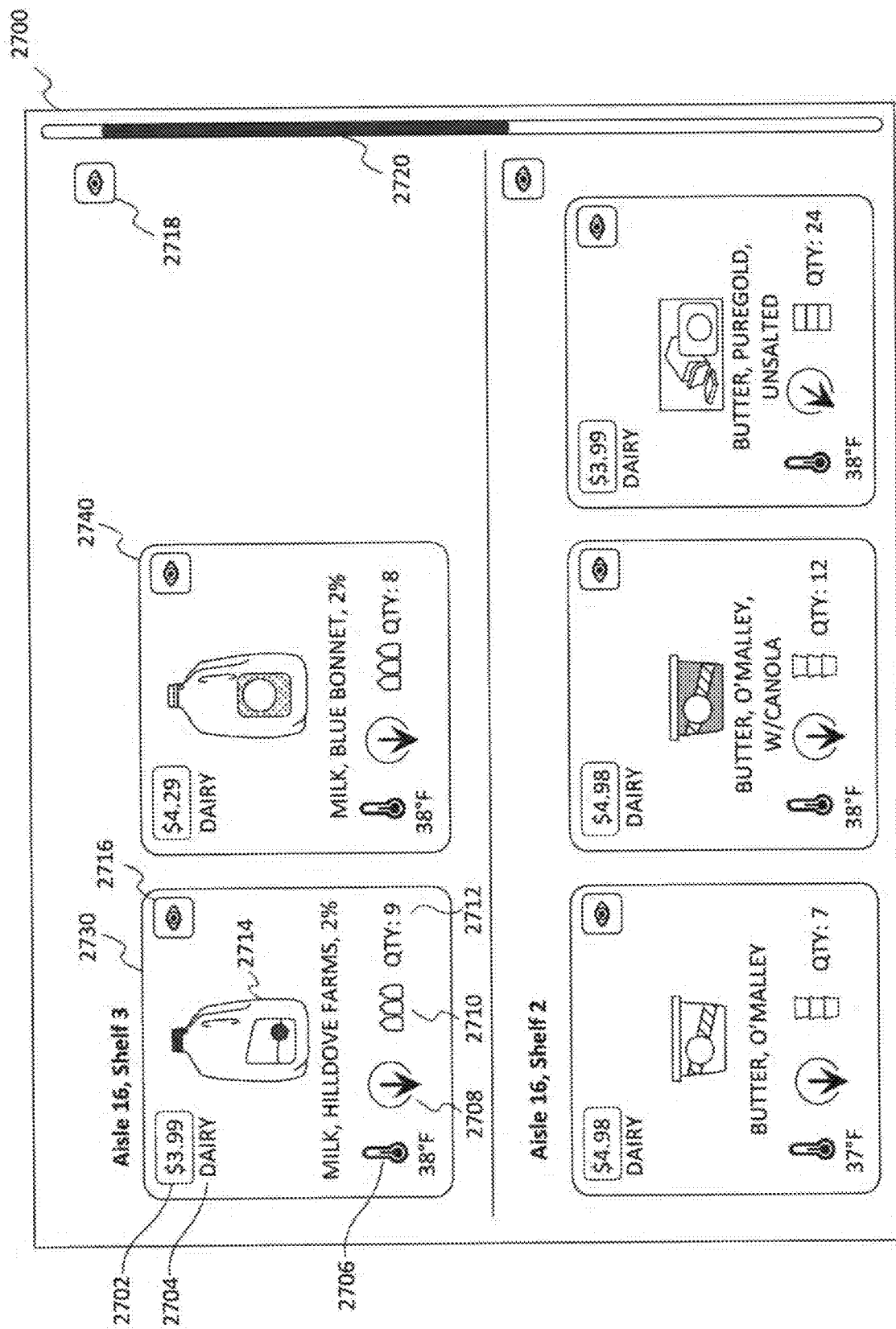
FIG. 27A illustrates an example hybrid visualization interface that may be displayed to a user, consistent with the present disclosure.

FIG. 27A illustrates an example hybrid visualization interface 2700 that may be displayed to a user, consistent with the present disclosure. Hybrid visualization interface 2700 may be an interface configured to display a combination of product images as well as synthetic image representations of the products. Hybrid visualization interface 2700 may be displayed on one or more devices to user 120, which may include a customer, a store associate, a data collection agent, a product or brand representative, or various other individuals associated with a retail environment. Accordingly, hybrid visualization interface 2700 may be displayed on one or more of devices 145A, 145B, 145C, and 145D. In some embodiments, hybrid visualization interface 2700 may be a standalone user interface presented to a user. Alternatively or additionally, it may be embedded or otherwise incorporated into another user interface, such as GUI 1130 or GUI 1140, described in further detail above. Accordingly, hybrid visualization interface 2700 may be used in combination with various other display elements or features described throughout the present disclosure.

Hybrid visualization interface 2700 may include a synthetic visual representation of one or more products on a retail shelf. For example, this may include synthetic visual representation 2730 and synthetic visual representation 2740, as shown in FIG. 27A. Synthetic visual representation 2730 and synthetic visual representation 2740 may each be considered a synthetic visual representation of a respective product or may collectively be referred to as a synthetic visual representation of multiple products. As used herein, a synthetic visual representation may include any form of computer-generated graphical element representing a product. For example, a synthetic visual representation may include an icon, a card (i.e., a region of associated graphical elements), a pane, a button, or various elements that may be used to represent a product. In the example, shown in FIG. 27A, synthetic visual representation 2730 may represent a first milk product and synthetic visual representation 2740 may represent second milk product on a retail display. In this example, synthetic visual representations 2730 and 2740 may be grouped based on their location within a store. For example, synthetic visual representations 2730 and 2740 may represent milk products displayed on shelf 3 of aisle 16 in a retail environment. Hybrid visualization interface 2700 may include various other synthetic visual representations of products from other shelves, such as shelf 2 of aisle 16, as indicated in FIG. 27A. Hybrid visualization interface 2700 may include one or more navigation elements, such as scrollbar element 2720, which may allow a user to navigate through multiple synthetic visual representations within hybrid visualization interface 2700.

While hybrid visualization interface 2700 displays the arrangement of synthetic visual representations of products by shelf by way of one example, various other arrangements may be used to present synthetic visual representations of products. For example, this may include arranging the synthetic visual representations by popularity, proximity to a user, quantity available, price, location within a retail store, product name (e.g., alphabetically, etc.), favorite items selected by a user, products in a user's virtual shopping cart, or any other attributes that may be associated with a product. In some embodiments, the arrangement of synthetic visual representations within hybrid visualization interface 2700 may be configurable by a user. For example, hybrid visualization interface 2700 may include one or more interactive elements allowing user 120 to change the arrangement of synthetic visual representations according to the various example arrangements described above, or any other arrangements. In some embodiments, hybrid visualization interface 2700 may be filterable by a user. For example, hybrid visualization interface 2700 may allow a user to filter products within particular price ranges, products within a certain time period of an expiration date, products having a quantity below a specified threshold, or any other properties associated with a product.

In some embodiments, a synthetic visual representation may include a graphical representation of the product. For example, this may include an image 2714, as shown in FIG. 27A. In some embodiments, image 2714 may be a generic image of the product, such as an image of the product provided by a manufacturer, a stock image, or the like. In some embodiments, image 2714 may be extracted from an image captured within the retail environment. For example, image 2714 may be an actual image of the product captured previously using a camera 125, which may be used to represent the product within synthetic visual representation 2730. Alternatively or additionally, image 2714 may be a vector graphic, an icon, or any other form of graphical element.

The synthetic visual representation of a product may further include information about a represented product. Synthetic visual representation 2730 includes various examples of information about a product that may be displayed. In some embodiments, this may include product availability data, which may include any form of data or information indicating an availability of a product. In some embodiments, the product availability data may include a binary indication of whether a product is available (e.g., in stock, available from a manufacturer, available from other retail stores, etc.) or not available (out of stock, out of production, etc.). In some embodiments, the product availability data may include a quantity of the product, which may be a quantity placed on a retail shelf, an overall inventory of the product, or any other quantity that may be relevant to user 120. In some embodiments, the product availability data may include other information, such as a product type, a brand, a manufacturer or other product attributes. For example, synthetic visual representation 2730 may include a quantity 2712 of the product represented by synthetic visual representation 2730. In this example, quantity 2712 is presented as a number of products on the shelf. In some embodiments, the quantity may be represented as an icon or other graphical element to show the number of products on a shelf, as described further below.

As shown in FIG. 27A, synthetic visual representation 2730 may include a price 2702. In some embodiments, this may include a price specified by a manufacturer, retailer, or other entity associated with product or retail store. Accordingly, price 2702 may be obtained from a database, an online data source, or other data source. As another example, price 2702 may be extracted from an image of the product in the retail environment. For example, the price may be extracted from an image of a price tag through OCR or similar techniques. Additional details regarding the source of various information presented in synthetic visual representation 2730 are provide below. In some embodiments, synthetic visual representation 2730 may include a product type 2704. This may include a product category or any other classification of a product. In this example, because the product represented by synthetic visual representation 2730 is a milk product, product type 2704 may indicate the product is a dairy product, as shown.

Synthetic visual representation 2730 may further include product condition information 2706. As used herein, product condition information may refer to any information indicating a current state or condition of one or more products. In the example shown in FIG. 27A, product condition information 2706 may include a temperature of the product, which may be obtained from one or more sensors positioned within the retail store. Various other types of sensor data may be displayed as part of condition information 2706, such as humidity, pressure, weight, lighting, or the like. In some embodiments, the condition information may include a physical condition of a product. For example, this may include an indication whether one or more items of the product have been damaged, are leaking, etc. In some embodiments, the product condition information may be a time associated with the product. For example, this may be a duration the product has been on the shelf, a time remaining until a specified expiration or sell-by date, a time until a next shipment of the product arrives, or any other time-related value. In some embodiments, synthetic visual representation 2730 may represent more than one instance of a product on a shelf. Accordingly, the product condition information (or any other type of information displayed on synthetic visual representation 2730) may be an average, a minimum, a maximum, or any other statistical value representing multiple instances of a product. Alternatively or additionally, multiple values may be presented, each corresponding to a different instance of the product. For example, product condition information 2706 shown in synthetic visual representation 2730 may represent an average condition for all products, and selecting product condition information 2706 may cause a pop-up window or other element to be displayed, which lists product condition information for each instance of the product.

As further shown in FIG. 27A, synthetic visual representation 2730 may include a product orientation information 2708, which may indicate the direction a product is facing on a shelf. This may be determined based on an image of the product on the shelf or various other data described herein. In this example, product orientation information 2708 may be an icon indicating the approximate angle of the product on the shelf (e.g., from a top-down view). Product orientation information 2708 may be presented in various other forms, such as a text-based indicator (e.g., "Forward," "Side," "Askew," "Upside Down," etc.), a binary indicator of whether the orientation is correct or not (e.g., according to a planogram, etc.), or the like.

In some embodiments, synthetic visual representation 2730 may include product arrangement information 2710, which may be any form of information indicating how the product is arranged on the shelf. For example, this may include an intended or planned arrangement of the product or an actual product arrangement on the shelf. In some embodiments, product arrangement information 2710 may be an icon-based representation of the product arrangement. In this example, product arrangement information 2710 may indicate an arrangement of the product from a view facing the shelf, which may indicate that the products are arranged side-by-side. In some embodiments, product arrangement information 2710 may represent a top-down view, or various other ways of representing the arrangement of products. Product arrangement information 2710 may be presented in various other forms, such as a text-based indicator (e.g., "side-by-side," "stacked," etc.), dimension information (e.g., indicating width, depth, and height for the number of products) a binary indicator of whether the arrangement is correct or not (e.g., according to a planogram, etc.), a graphical indication (e.g., as shown in FIG. 27A) or the like. In some embodiments, the product arrangement information 2710 may be a more detailed view of how products are arranged on the shelf. For example, product arrangement information 2710 may be a graphical representation showing the possible positions of products on the shelf (similar to the arrangements shown in FIG. 9) with indicators to show which positions currently include an instance of the product. This view may be displayed within synthetic visual representation 2730 (e.g., in place of product arrangement information 2710) or may be displayed as a pop-up window or other element based on interaction with another element (e.g., based on selection of product arrangement information 2710 or quantity 2712).

In some embodiments, synthetic visual representation 2730 may further include product facing information, which may indicate the number of items of the product on the shelf that are turned out toward a customer. Product facing information may be presented in various forms, such as a text-based indicator (e.g., "three products wide," etc.), a number, a binary indicator of whether the product facing is correct or not (e.g., according to a planogram, etc.), a graphical indicator, or the like. In some embodiments, the product facing information may be integrated with other information in synthetic visual representation 2730. In this example, product facing information may be represented through product arrangement information 2710.

While FIG. 27A provides an illustrative example of information that may be displayed within a synthetic visual representation, one skilled in the art would recognize that various other types of information. This may include sales data, historical data, product ratings, product reviews, recall information, product dimensions, or any other data that maybe relevant to a user. Further, any of this data, including product availability data, product condition information, or any other information displayed in association with synthetic visual representation 2730 may be obtained from a variety of sources. In some embodiments, this may include information stored in a database, such as database 140. For example, product availability information may be determined based on sales information stored in the database, based on information associated with restocking events of the retail shelf stored in the database, based on return events stored in the database, based on inventory information stored in the database, and so forth. Alternatively or additionally, the information may be determined based on image analysis of one or more images captured with a camera, such as capturing device 125. This may include application of various image processing algorithms or techniques (which may include application of a neural network) as described herein, for example, using image processing unit 130. In some embodiments, the data may be collected using a sensor, such as a pressure sensor, a weight sensor, a light sensor, a resistive sensor, a capacitive sensor, an inductive sensor, a vacuum pressure sensor, a conductive pressure sensor, an infrared sensor, a photo-resistor sensor, a photo-transistor sensor, a photo-diodes sensor, an ultrasonic sensor, or any other sensor described herein.

Consistent with the present disclosure, hybrid visualization interface 2700 may be configured to present an actual image corresponding to at least a portion of the synthetic visual representation of the one or more products. The actual image may include one or more image frames acquired by an image sensor, such as one or more of capturing devices 125, including representations of a product. In some embodiments, the actual image may be a single frame including a representation of a shelf. This may be an image captured previously (e.g., the most recent image captured, etc.) or may be an image captured dynamically in real time (e.g., based on an interaction with hybrid visualization interface 2700). In some embodiments, the actual image may be presented as a video or series of images, which may be a live video feed or a previously recorded video.

In some embodiments, the actual image may be displayed based on an interaction with (e.g., a selection of) at least a portion of a synthetic visual representation. In some embodiments, this may include a selection of a particular product represented in the synthetic visual representation, such as synthetic visual representation 2730. For example, a user may click, tap, or otherwise interact with synthetic visual representation 2730 to cause an actual image to be displayed within hybrid visualization interface 2700. In some embodiments, this may include selecting a specific element of synthetic visual representation 2730, such as image 2714. As another example, hybrid visualization interface 2700 may include a dedicated element to toggle between a synthetic visual representation view and an actual image view. For example, this may include a toggle element 2716 associated with synthetic visual representation 2730 or a toggle element 2718 associated with multiple synthetic visual representations 2730 and 2740 (e.g., an entire shelf, etc.).

Figure 27B:
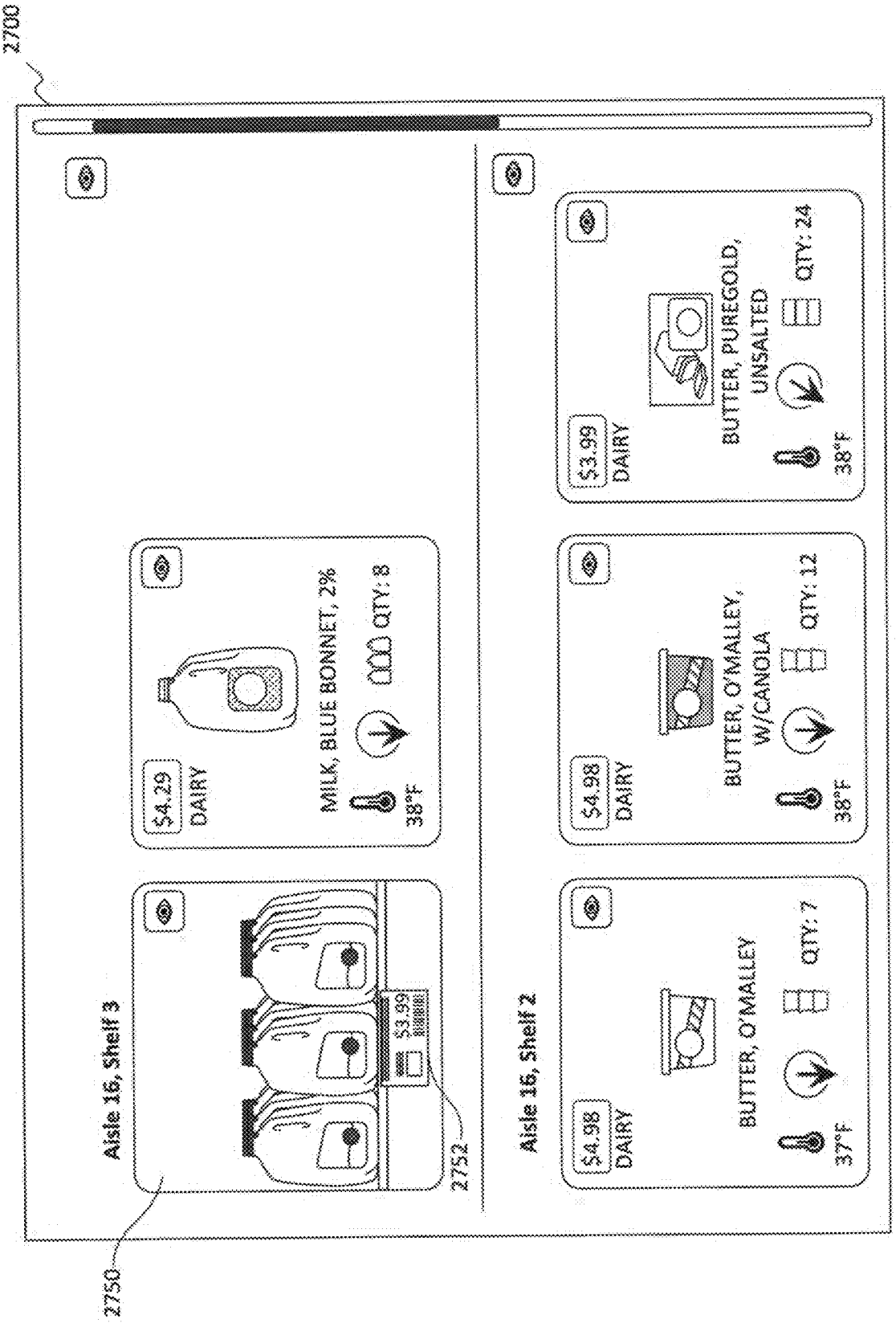
FIG. 27B illustrates an example hybrid visualization interface displaying an actual image associated with a product, consistent with the present disclosure.

The actual image may be an entire image captured by capture device 125 or may be a region of an image associated with a particular synthetic visual representation or portion of a synthetic visual representation. In some embodiments, the actual image may be associated with a particular product. FIG. 27B illustrates an example hybrid visualization interface 2700 displaying an actual image 2750 associated with a product, consistent with the present disclosure. In this example, actual image 2750 may be an image showing the product represented by synthetic visual representation 2730. For example, a user may select toggle element 2716, which may cause actual image 2750 to be displayed in place of synthetic visual representation 2730. Displaying actual image 2750 may allow a user to view the current condition, arrangement, orientation, product facing, quantity, and/or other information about a product. For example, actual image 2750 may include a depiction of a physical price tag 2752. Selecting toggle element 2716 again may cause hybrid visualization interface 2700 to return to a view in which synthetic visual representation 2730 is displayed in place of actual image 2750. While FIG. 27B illustrates actual image 2750 being displayed in place of synthetic visual representation 2730, in some embodiments, the actual image may be superimposed on a portion of synthetic visual representation 2730. For example, actual image may be displayed in place of image 2714, or otherwise superimposed on synthetic visual representation 2730. As another example, actual image 2750 may be displayed as a pop-up window, alongside synthetic visual representation 2730, in a separate interface, or through various other forms.

In the example shown in FIG. 27B, each product represented within hybrid visualization interface 2700 may be toggled between a synthetic visual representation and an actual image independently. In some embodiments, the actual image may correspond to more than one product. For example, a user may select a region of a synthetic visual representation corresponding to a specific shelf (or a portion of a shelf) and the actual image may include a representation of the shelf.

Figure 28A:
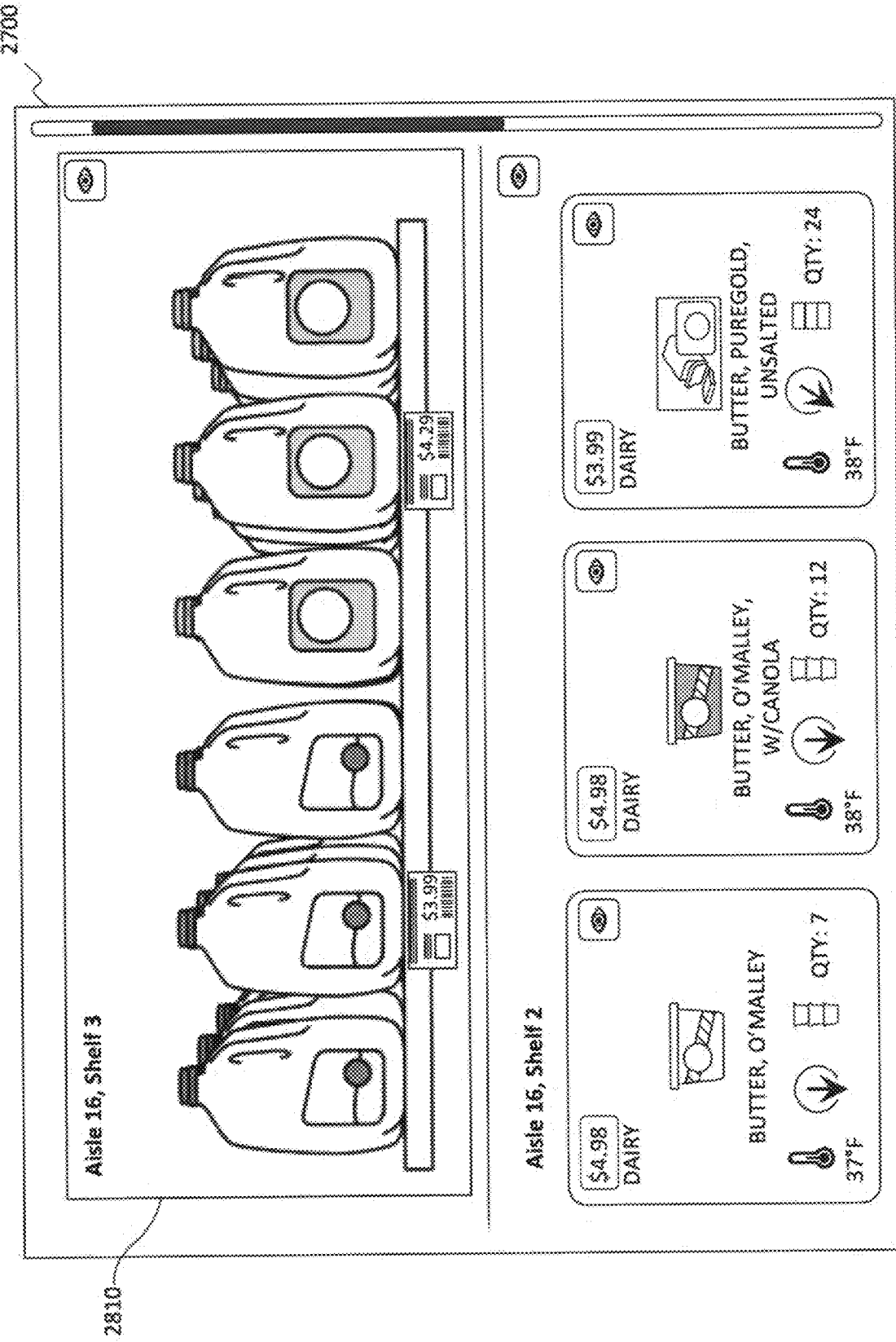
FIG. 28A illustrates an example hybrid visualization interface displaying an actual image associated with a shelf, consistent with the present disclosure.

FIG. 28A illustrates an example hybrid visualization interface 2700 displaying an actual image 2810 associated with a shelf, consistent with the present disclosure. For example, a user may select toggle element 2718 associated with a shelf, which may cause actual image 2810 to be displayed in place of the synthetic visual representation of products on the shelf. Similar actual images may be displayed for full shelving or display units (e.g., having multiple shelves), full aisles, or any portions thereof. As with actual image 2750, in some embodiments, actual image 2810 may be superimposed over a synthetic visual representation.

In some embodiments, hybrid visualization interface 2700 may represent various data as a progression over time. For example, hybrid visualization interface 2700 may include a synthetic visual representation conveying a progression of product availability data or other information over time. Actual images displayed through hybrid visualization interface 2700 may similarly convey information over time. For example, the actual image may be a series of actual images captured at different points in time using an image sensor. These actual images may show the progression of product availability over time.

Figure 28B:
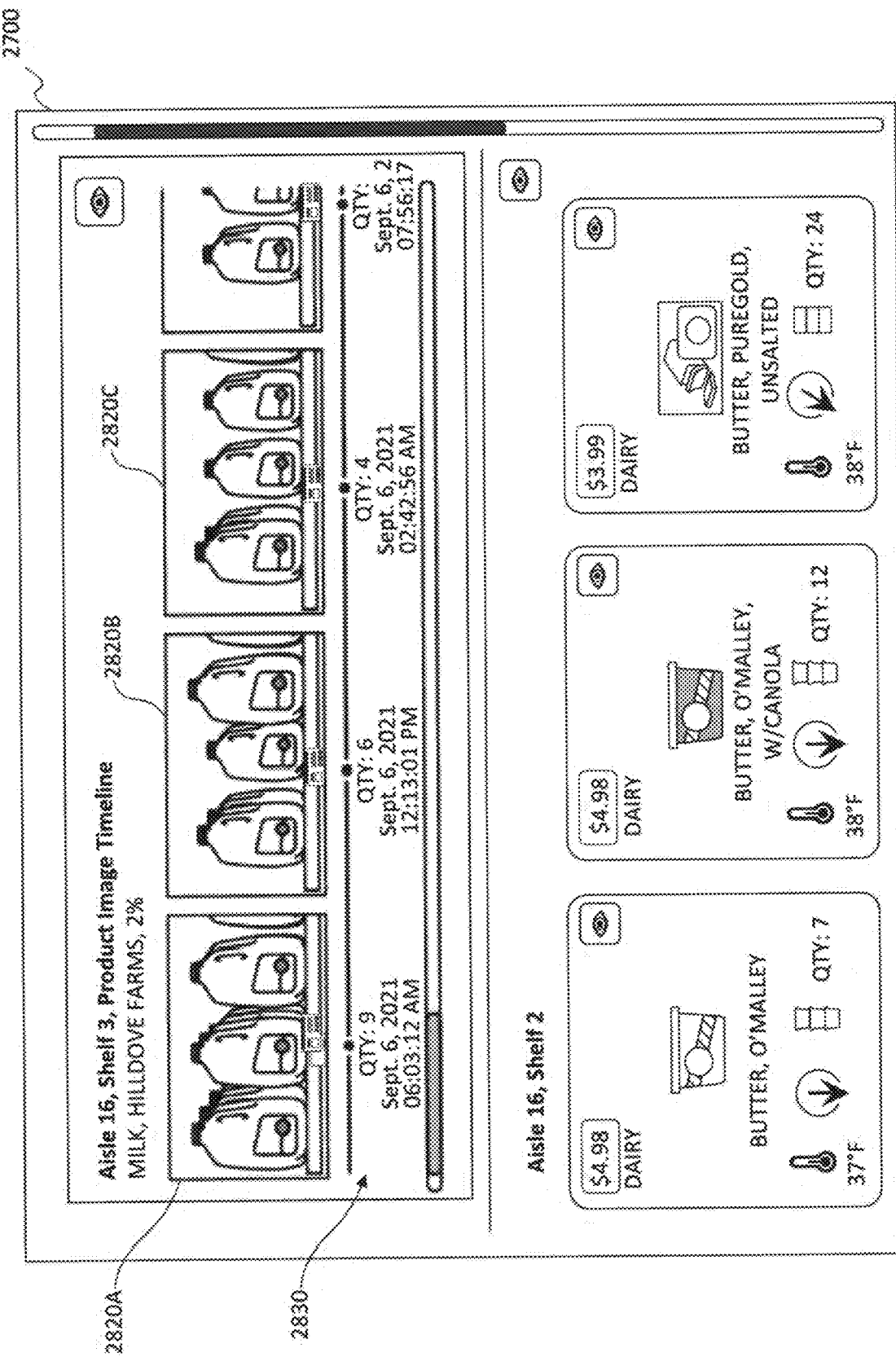
FIG. 28B illustrates an example hybrid visualization interface displaying a plurality of actual images associated with a product, consistent with the present disclosure.

FIG. 28B illustrates an example hybrid visualization interface 2700 displaying a plurality of actual images 2820A, 2820B, and 2820C associated with a product, consistent with the present disclosure. Actual images 2820A, 2820B, and 2820C may be images captured by one or more capture devices 125 at various points in time. Actual images 2820A, 2820B, and 2820C may allow a user to view product availability or other information over time. In some embodiments, hybrid visualization interface 2700 may also display information associated with each image over time. For example, this may include displaying product availability data (e.g., quantities, etc.) or various other information described above at a time each image was captured. In the example shown in FIG. 28B, actual images 2820A, 2820B, and 2820C may be superimposed on a portion of a synthetic visual representation, which may include a timeline 2830. Timeline 2830 may include a graphical representation of when actual images 2820A, 2820B, and 2820C were captured over time, including timestamp information and quantities at each capture time. While a timeline view is provided by way of example, actual images 2820A, 2820B, and 2820C may be presented in various other formats. In some embodiments, actual images 2820A, 2820B, and 2820C may be displayed sequentially as an animation, video, or the like. As another example, actual images 2820A, 2820B, and 2820C may be presented based on an interaction with a user. For example, actual images 2820A, 2820B, and 2820C may be displayed in a single frame, similar to actual image 1750, and a user may progress through actual images 2820A, 2820B, and 2820C by moving a mouse across the actual image portion of hybrid visualization interface 2700. Various other elements or interfaces may be used to progress through the actual images. This timeline or progression view may be displayed based on various forms of interactions with a user. In some embodiments, the view shown in FIG. 28B may be displayed based on interaction with toggle element 2716 (e.g., instead of the view shown in FIG. 27B, in series with the view shown in FIG. 27B, or the like). Alternatively or additionally, a separate toggle element may be included in synthetic visual representation 2730 to bring up the view shown in FIG. 28B. As another example, the view shown in FIG. 28B may be displayed based on selection of another element, such as quantity 2712.

The actual images included in the series of images may be selected in various ways and may cover various time periods. For example, actual images 2820A, 2820B, and 2820C may cover a default period of the previous 5 minutes, 8 hours, 24 hours, 1 week, 1 month, or any other suitable range. In some embodiments, the period covered by actual images 2820A, 2820B, and 2820C may be adjusted by a user, either dynamically through hybrid visualization interface 2700 or through various settings or options. In some embodiments, actual images 2820A, 2820B, and 2820C may represent all images captured during the time period. Alternatively or additionally, hybrid visualization interface 2700 may display a subset of captured images. For example, this may include actual images spaced apart by a specified time interval, associated with an event (e.g., a change in product availability or other data, etc.), or various other criteria.

Figure 29:
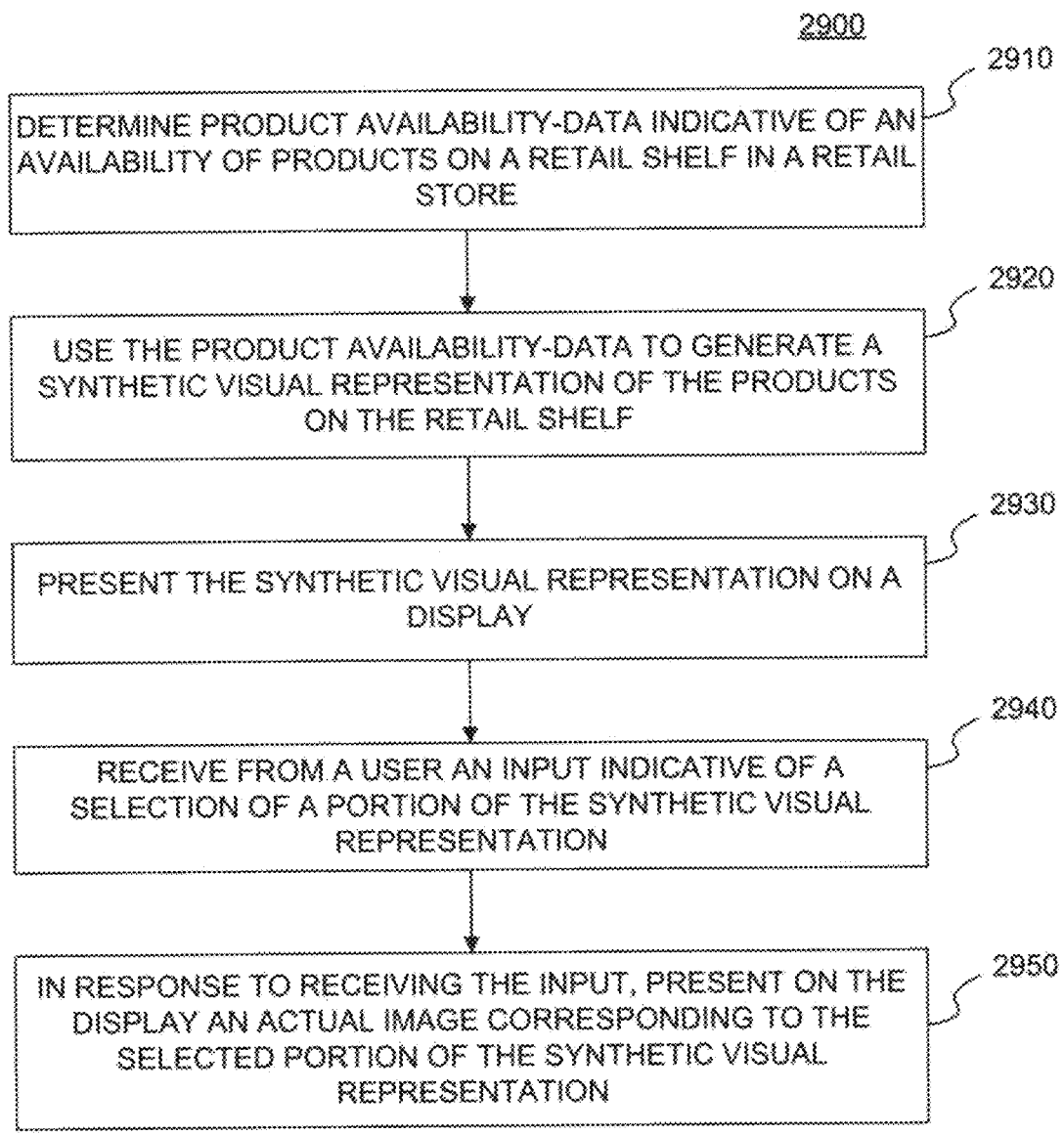
FIG. 29 is a flowchart of an exemplary process for visualization of retail shelves, consistent with the present disclosure.

FIG. 29 is a flowchart of an exemplary process 2900 for visualization of retail shelves, consistent with the present disclosure. Process 2900 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 2900. Further, process 2900 is not necessarily limited to the steps shown in FIG. 29, and any steps or processes of the various embodiments described throughout the present disclosure may also be included in process 2900.

In step 2910, process 2900 includes determining product availability data indicative of an availability of one or more products on at least one retail shelf in a retail store. The product availability may be determined in various ways. For example, at least a portion of the product availability data may be determined based on image analysis of one or more images captured with a camera, such as images captured using capture device 125. This may include application of a visual product recognition model, an image processing algorithm, a machine learning model (e.g., a trained neural network, etc.). In one example, the one or more images may include a representation of at least a portion of the at least one retail shelf in the retail store, may capture products placed on the at least one retail shelf in, and so forth. In some examples, a machine learning model (e.g., such as a generative model, a generative adversarial model, etc.) may be trained using training examples to generate availability data of products on retail shelves from images and/or videos. An example of such training example may include a sample image and/or a sample video of a sample retail shelf, together with a desired determination of availability data of one or more sample products on the sample retail shelf. The trained machine learning model may be used to analyze the one or more images captured with the camera and determine the product availability data. Alternatively or additionally, at least a portion of the product availability data may be determined based on information stored in a database. For example, this may include data stored in database 140, as described above.

In step 2920, process 2900 includes using the product availability data to generate a synthetic visual representation of the one or more products on the at least one retail shelf. For example, this may include generating one or more of synthetic visual representation 2730 and synthetic visual representation 2740. As described above, this may include generating synthetic visual representation 2730 to include quantity 2712 or various other forms of product availability data. As described above, the synthetic visual representation may convey other forms of information associated with a product. For example, process 2900 may further include determining one or more of product-facing information, product condition information, product arrangement information, product orientation information, a quantity, a price, a product type, or any other information associated with a product, which may be conveyed via the synthetic visual representation. Additional examples of information that may be conveyed via the synthetic visual representation are provided above. In some embodiments, the synthetic visual representation may be generated at least partially using a neural network. For example, a neural network may be trained to extract information about a product, such as a quantity, a product arrangement, or the like, which may be conveyed via the synthetic visual representation. In one example, a machine learning model (e.g., such as a generative model, a generative adversarial model, etc.) may be trained using training examples to generate synthetic visual representation of the products on the retail shelves from product availability data. An example of such training examples may include a sample product availability data, together with a desired synthetic visual representation corresponding to the sample product availability data. The trained machine learning model may be used to analyze the product availability data and generate the synthetic visual representation of the one or more products on the at least one retail shelf.

In step 2930, process 2900 includes presenting the synthetic visual representation on a display. For example, this may include presenting the synthetic visual representation via a display of an output device 145 (including devices 145A, 145B, 145C, and 145D). In some embodiments, the synthetic visual representation may be presented to the user via a user interface shown on the display, such as hybrid visualization interface 2700, as shown in FIG. 27A.

In step 2940, process 2900 includes receiving from a user an input indicative of a selection of at least a portion of the synthetic visual representation. In some embodiments, the input may include a selection of a region of the synthetic visual representation, which may correspond to the one or more products. For example, this may include a selection of synthetic visual representation 2730 or toggle element 2716, as described above. In some embodiments, the selected region may correspond to the at least one retail shelf, such as an area including both synthetic visual representation 2730 and synthetic visual representation 2740, toggle element 2718, or the like.

In step 2950, process 2900 includes presenting on the display an actual image corresponding to the selected at least a portion of the synthetic visual representation, which may be presented in response to receiving the input in step 2940. The actual image may have been acquired with an image sensor, such as image sensor 310. For example, step 2950 may include displaying one or more of actual images 2750 or 2810, as described above. In some embodiments, the actual image may be presented on the display in place of the synthetic visual representation, as shown in FIG. 27B. Alternatively or additionally, the actual image may be presented as superimposed on a portion of the synthetic visual representation. For example, an image matting algorithm may be used to stitch the actual image (or portions thereof) into the synthetic visual representation. In some examples, the actual image may be selected of a plurality of alternative actual images corresponding to the at least a portion of the synthetic visual representation. In one example, the selection of the actual image may be based on a mode selected by the user. For example, in a 'current status' mode, the most recent actual image corresponding to the at least a portion of the synthetic visual representation may be selected of the plurality of alternative actual images, while in a 'worst observed status', the actual image corresponding to worst observed status of the plurality of alternative actual images may be selected. In another example, an image that receives a highest (or lowest) score of the plurality of alternative actual images may be selected. Some non-limiting examples of such score may include sharpness score, a score associated with image quality, a score associated with planogram compliance, a score associated with actual sales data, and so forth. In some embodiments, the synthetic visual representation may convey a progression over time of the product availability data and the actual image may include a plurality of actual images corresponding to the selected at least a portion of the synthetic visual representation captured at different points in time using the image sensor. For example, this may include displaying actual images 2820A, 2820B, and 2820C, as described above. Accordingly, the plurality of actual images may show the progression over time of the product availability data.

As described herein, one or more image capture devices may be placed in a retail store to determine information associated with products displayed in the retail store. As store operators and customers increasingly rely on data acquired from these image capture devices, it may be beneficial to ensure the devices are installed correctly and are properly maintained. For example, some retail stores may provide a frictionless shopping experience in which the checkout process a customer must complete to make a purchase is expedited or even eliminated by tracking a customer's product selections throughout their visit. Accordingly, it may be beneficial to ensure that image capture devices are placed to provide sufficient coverage of the retail store and that the image capture devices are working properly.

This installation and maintenance of image capture devices may be difficult for store associates. When initially placing image capture devices, it may be difficult to estimate what field of view the image capture device will cover. Accordingly, an associate or other installer may perform an iterative process of placing one camera, examining an image captured by the camera, and adjusting a camera position, which may be repeated multiple times. This may also require several iterations to ensure that proper coverage is achieved when using multiple cameras (e.g., with minimal overlap, with no blind spots, etc.). Further, using conventional techniques, it may be difficult for an associate or other individual to easily ascertain the status or other operating parameters of image capture devices after they are installed, especially from within an aisle or other area where the image capture devices are placed.

To address these and other issues, the disclosed embodiments leverage the use of extended reality technology to assist with the placement and maintenance of cameras in a retail space. The disclosed system can transmit camera status information to a user's extended reality device. For example, this camera status information may include whether one or more cameras are operational, camera locations, a field of view of one or more cameras, a camera pointing direction, a frame rate, a resolution, or the like. This information may be overlaid on the retail store environment through the extended reality device to assist an associate with new camera placements, camera upgrades, camera adjustments, or various other camera maintenance or installation operations. Accordingly, the disclosed embodiments provide, among other advantages, improved efficiency, convenience, and functionality over existing electronic retail environment maintenance systems.

Figure 30A:
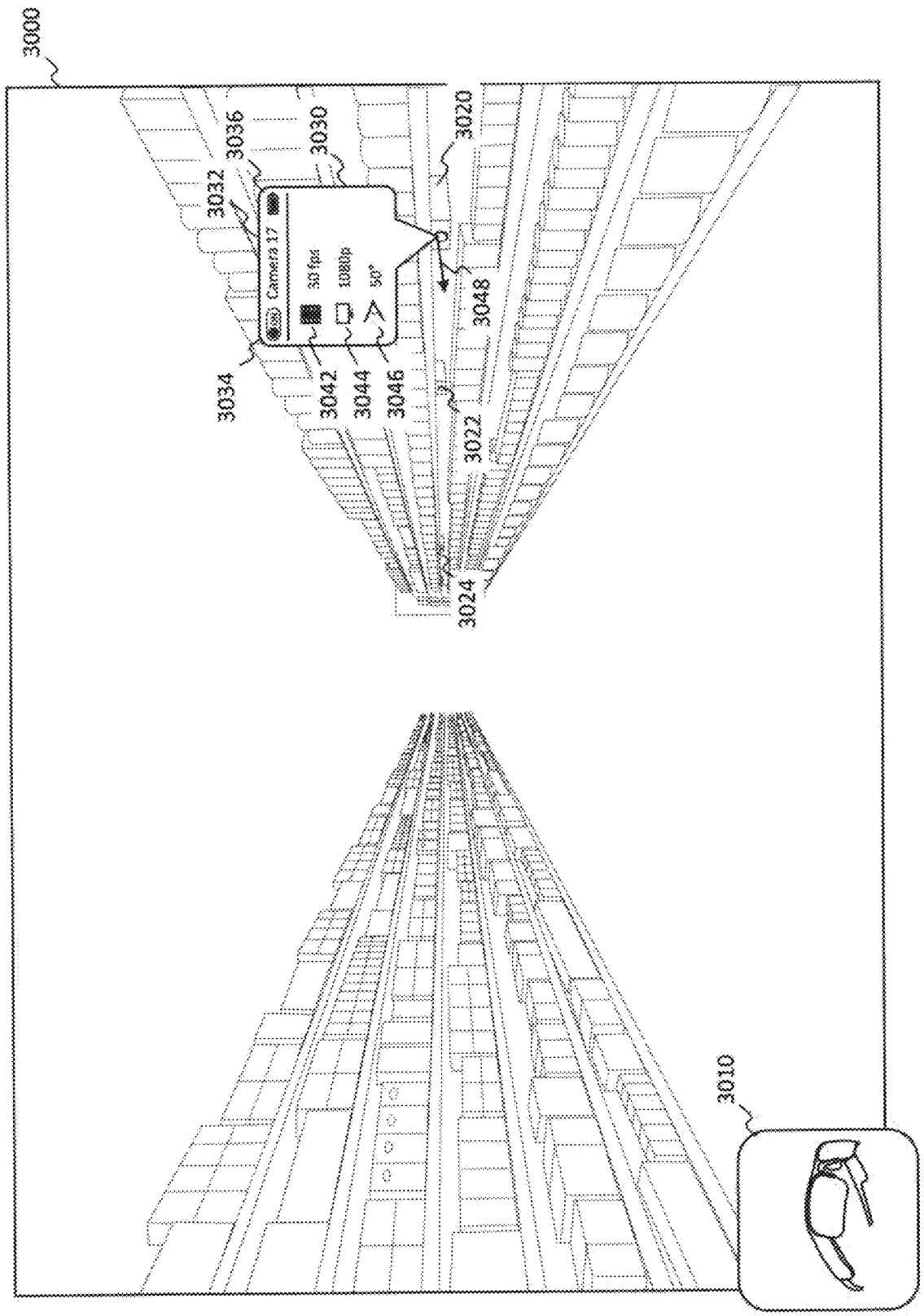
FIG. 30A illustrates an example view of a retail store that may be enhanced by an extended reality device, consistent with the disclosed embodiments.

FIG. 30A illustrates an example view 3000 of a retail store that may be enhanced by an extended reality device 3010, consistent with the disclosed embodiments. View 3000 may represent a view from the point of view of an associate using extended reality device 3010. View 3000 may be enhanced through extended reality device 3010 to overlay a visual element, such as status indicator 3030 relative to the physical location of cameras in the retail store, as described further below.

As used herein, an extended reality device may include any device enabling the combined visualization of real and virtual elements. For example, extended reality may include one or more of augmented reality, mixed reality, and virtual reality, or any similar form of mediated or hybrid reality. In some embodiments, extended reality device 3010 may include a see-through display in which status information or other visual elements are projected on or otherwise displayed on a see-through medium. This may include a handheld device including see-through display, a head-mounted device, or any other form of optical see-through display. For example, extended reality device 3010 may include a pair of smart glasses, an add-on device for conventional glasses, a pair of smart contact lenses, a helmet, a heads up display (HUD), or the like. Accordingly, view 3000 may represent the view of an associate through a see-through display and status indicator 3030 and other information may be projected onto or otherwise presented through the see-through display. As another example, extended reality device 3010 may include a handheld device including a display screen and a camera. The handheld device may be configured to display images captured using the camera in real time (or near real time) and overlay additional visual elements on the captured images. This form of device may also be referred to as a video see-through display device. For example, this may include a tablet or mobile device, which a store associate may carry when installing or maintaining cameras. Accordingly, view 3000 may represent a video display screen displaying a captured image frame with status indicator 3030 and other information overlaid on the image. In some embodiments, extended reality device 3010 may correspond to output device 145C described in further detail above. Accordingly, any details or embodiments described above with respect to output device 145C may equally apply to extended reality device 3010.

The disclosed systems may receive, access, or otherwise acquire camera location information associated with a plurality of cameras deployed in a retail store. For example, camera location information may be stored in database 140 and may be accessed by server 135. Alternatively or additionally, camera location information may be received through communications network 150 from another device or entity within system 100, such as a device associated with retail store 105. The camera location information may be any information indicating the physical location of one or more cameras in the retail store. For example, this may include horizontal position information (e.g., relative to floorplan or map of a retail store), height information, orientation information, shape information, or any other information that may define a physical position of a camera. In some embodiments, the location information may be defined relative to a coordinate system of a retail environment. As another example, the location information may be presented in a format indicating an aisle number, shelf number, lateral shelf position, pointing direction, or other similar information. Various other forms of location information, including GPS data, or other information may be used.

The disclosed systems may also receive or access camera status indicators for one or more cameras. In some embodiments, the camera status information may be stored in database 140 and may be accessed by server 135. Alternatively or additionally, the camera status information may be received through communications network 150 from another device or entity within system 100. For example, server 135 may communicate (either directly or indirectly) with one or more capturing devices 125. The camera status indicators may include a wide variety of information associated with a camera. This may include power information (e.g., on/off status, power consumption, battery level, battery health, etc.), a camera mode (e.g., actively capturing, standby mode, etc.), camera or sensor properties (e.g., frame rate, resolution, number of images captured, image file size, sensor type, zoom level, aperture, focal length, angle of view, etc.), field of view information, image data, orientation information, or any other information associated with a camera. This status information may include current information, maximum or minimum information, average values, or any other form of statistical information associated with a camera. In some embodiments, the status information (or location information) may include 3D shape data representing a physical shape and/or appearance of the camera, which may be used to represent the camera in an extended reality view.

The camera location information and camera status indicators may be used to generate a digital signal, which may be provided to extended reality device 3010 either directly or through various intermediate devices. The digital signal may cause extended reality device 3010 to display a visual representation of a status indicator for one or more cameras. Accordingly, the digital signal may include instructions to extended reality device 3010 to display information associated with one or more cameras. The digital signal may further include information from which a visual representation may be derived. For example, the digital signal may include the camera location information and camera status indicators for one or more cameras in a retail store associated with extended reality device 3010. Extended reality device 3010 may be configured to process this data to generate a visual representation of the status indicators to display to the user. Alternatively or additionally, some or all of the processing of the camera location information and status indicator information may be processed by server 135. For example, this may include extracting status information, correlating it to camera location information, and presenting the information in a format that is recognized by extended reality device 3010.

Consistent with the disclosed embodiments, the visual representation of the status indicators may be displayed relative to the actual positions of camera in the retail store. Accordingly, extended reality device 3010 may be configured to monitor the area of a retail store included in view 3000 and adaptively display the visual representation of status indicators relative to the position of the cameras in view 3000. As one skilled in the art would recognize, this may include analyzing accelerometer data, beacon device data, orientation sensor data, image data, or various other forms of data or combinations thereof to determine a position and orientation of view 3000.

As shown in FIG. 30A, view 3000 may include various cameras 3020, 3022, and 3024 positioned within the retail store. Cameras 3020, 3022, and 3024 may be configured to capture images of products displayed within the retail store, as described herein. For example, cameras 3020, 3022, and 3024 may correspond to capturing devices 125. Server 135 may access camera location information and status indicators associated with cameras 3020, 3022, and 3024, and generate a digital signal as described above. Extended reality device 3010 may receive the digital signal and display status indicator 3030. As shown in FIG. 30A, status indicator 3030 may be a graphical element including various status information associated with camera 3020. Status indictor 3030 may be presented in various other forms, as described further below. Status indicator 3030 may be presented at a location within view 3030 corresponding to camera 3020, as shown. This may help a user of extended reality device 3010 locate camera 3020 within the retail store and quickly access relevant information about camera 3020.

As described above, the status information may include a variety of information about camera 3020, any of which may be included in status indicator 3030. For example, as shown in FIG. 30A, status indicator 3030 may include an identifier 3032 of camera 3020. This may include a name, a number, an alphanumeric string, or any other identifier assigned to camera 3020, which may help a user of extended reality device 3010 identify which cameras are placed in which locations. In some embodiments, status indicator 3030 may include a power status 3034 of camera 3020. In this example, power status 3034 may indicate that camera 3020 is powered on. Power status 3034 may indicate various other power information, such as an offline status, a standby status, a power-saving status, or the like. Status indicator 3030 may further include a battery level 3036, which may indicate a remaining battery level of camera 3020. Various other forms of power-related information may also be conveyed, including a battery health status, a charging status, a time since last charge, power usage information (e.g., voltage, current, amperage, etc.), or the like. As another example, status indicator 3030 may include data connectivity information, such as whether a communication can be established with camera 3020, a data transfer rate, a signal strength, a signal type (e.g., Wi-Fi™, Zigbee™, Z-wave™, wired, etc.), or various other forms of connectivity information.

In some embodiments, status indicator 3030 may include operating parameters associated with camera 3020. This may include current or measured values, or nominal or specified operating parameters, such as maximum or minimum operating parameters, target operating parameters, or the like. In some embodiments, status indicator 3030 may include a camera frame rate identifier 3042, which may convey a current frame rate, a nominal frame rate, or the like. As another example, status indicator 3030 may include a camera resolution identifier 3044, which may indicate a resolution of images captured using camera 3020. As with other operating values, this may include a current resolution setting, a maximum resolution (e.g., of an image sensor), or the like. In some embodiments, status indicator 3030 may include a camera angular direction identifier 3046, which may indicate a field of view angle of camera 3020 as well as an indication of the direction of camera 3020. In some embodiments, extended reality device 3010 may display a direction indicator 3048 in the form of an arrow, a set of simulated axes, an angular identifier, or other directional indicator. Direction indicator 3048 which may be overlaid on a lens or other portion of camera 3020 indicating the direction camera 3020 is facing.

The information conveyed in status indicator 3030 is provided by way of example, and various other information associated with a camera may also be displayed. For example, this may include a camera installation date, a date maintenance was performed on the camera, a make or model number, a camera type, an indication of one or more events detected using the camera, or any other information that may be useful to a store associate or other user of extended reality device 3010. Further, while status indicator 3030 is shown relative to camera 3020 only in FIG. 30A for purposes of clarity, it is to be understood that visual representations of status indicators may also be displayed for other cameras, including cameras 3022 and 3024. In some embodiments, visual representations of status indicators may be displayed for a subset of cameras in the retail store. For example, extended reality device 3010 may only display visual representations of status indicators for cameras that are currently in view 3000 (which may be determined based on analysis of images captured by extended reality device 3010, etc.), cameras within a predetermined distance from extended reality device 3010, cameras meeting specified status criteria (e.g., cameras needing maintenance, cameras that are powered on or off, etc.), or various other criteria. In some embodiments, cameras may be associated with certain products or product categories based on which products are included in a field of view of the camera. Accordingly, extended reality device 3010 may allow a user to view visual representations of status indicators associated with specified products or product types. Various other forms of filters may be applied, such as cameras associated with a particular aisle, a particular supplier, a particular region of the retail store, or the like.

Figure 30B:
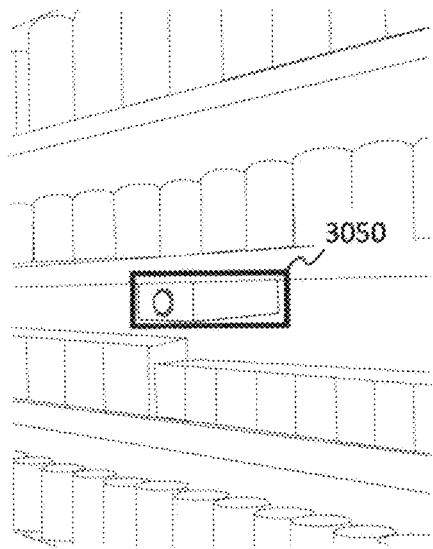
FIGS. 30B, 30C, and 30D illustrate example information that may be displayed within an extended reality view using an extended reality device, consistent with the disclosed embodiments.
Figure 30C:
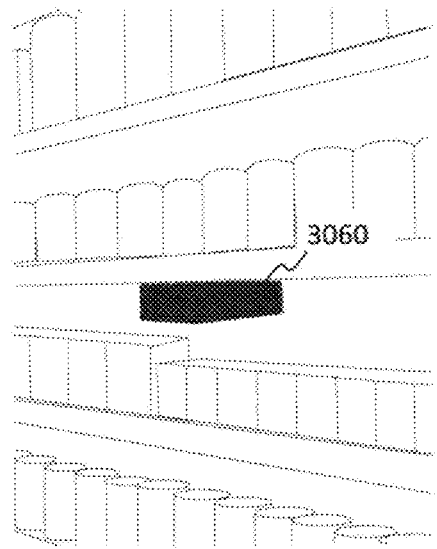
Figure 30D:
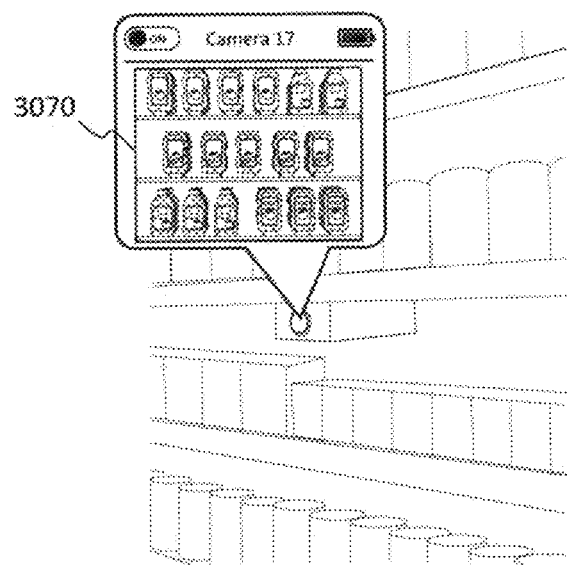

Various other forms of information may be displayed through extended reality device 3010. FIGS. 30B-30D illustrate various other example information that may be displayed within view 3000 using extended reality device 3010, consistent with the disclosed embodiments. In some embodiments, this may include virtual position indicators showing the actual positions of the cameras. This may allow a user of extended reality device 3010 to quickly and easily locate cameras within the retail environment. For example, as shown in FIG. 30B, a bounding box 3050 may be displayed around camera 3020 so that it may be easily identified by a user of extended reality device 3010. While a box is shown in FIG. 30B by way of example, this may include a triangle, circle, oval, or other form of geometric shape. In some embodiments, the position indicator may be a bounding shape configured to trace an outline of camera 3020. This shape may be determined based on analysis of an image captured using extended reality device 3010, 3D shape data received as part of camera location information or status information, or any other data that may indicate the portion of view 3030 that includes camera 3020.

As another example, the position indicator may include a shape 3060 overlaid on camera 3020, as shown in FIG. 30C. Shape 3060 may include a color to highlight the position of camera 3020 in view 3000. In some embodiments, the color may reflect status information. For example, a green highlighting may indicate camera 3020 is powered on and operating correctly, a yellow highlighting may indicate that camera 3020 needs adjustment or other maintenance, and a red highlighting may indicate that camera 3020 is offline or not operating correctly. Various other information may be conveyed through a color of shape 3060. As another example, the position indicators may include a pointer, an icon, or another graphic displayed relative to camera 3020 (e.g., overlaid on the camera, above the camera, below the camera, to the side of the camera, etc.). In some embodiments, the position indicators may be expanded to display additional status information, similar to status indicator 3030 shown in FIG. 30A. For example, this may include expanding position indicators for cameras within a predetermined range of extended reality device 3010, cameras requiring attention from a user, based on the position of the cameras in view 3000 (e.g., to avoid overlapping status indicators, etc.), based on a product or product category included in a field of view of the camera, or the like. In some embodiments, a position indicator may be expanded based on an input from a user of extended reality device 3010. For example, a user may select a position indicator through a hand gesture, a voice command, interacting with a physical display, or the like, which may cause an expanded view to appear.

In some embodiments, the visual representation of a status indicator for a camera may include an image captured by a camera. For example, as shown in FIG. 30D, extended reality device 3010 may display an image 3070 captured using camera 3020. This may allow a user of extended reality device 3010 to assess a field of view of camera 3020, which may assist with aligning camera 3020, verifying camera coverage areas, assessing image quality, or the like. In some embodiments, image 3070 may be a representative image previously captured using camera 3020. For example, this may include an image captured when camera 3020 was installed, the last image captured using camera 3020, an image captured based on a use of extended reality device 3010 (e.g., when camera 3020 comes into view 3000, an input from a user, when an expanded view is displayed, etc.), or any other images captured using camera 3020. Alternatively or additionally, image 3070 may be a live video feed from camera 3020.

In some embodiments, the visual representation of the status indicator may provide a visual representation of a field of view of a camera. FIGS. 31A-31D illustrate example visual representations of a field of view of one or more cameras, consistent with the disclosed embodiments. As used herein, a visual representation of the field of view may be any visual element that at least partially conveys which portion of a retail store is represented in images captured using a camera. In some embodiments, the field of view of a camera may be determined based on a known angle of view of a camera (e.g., based on a make and model of a camera and associated technical specifications) and a location of the camera. As another example, the field of view may be determined based on images captured by a camera. For example, extended reality device 3010 or server 135 may correlate objects detected in an image captured using camera 3020 with representations of objects detected in view 3000. Various other means for determining a field of view of a camera may be used.

Figure 31A:
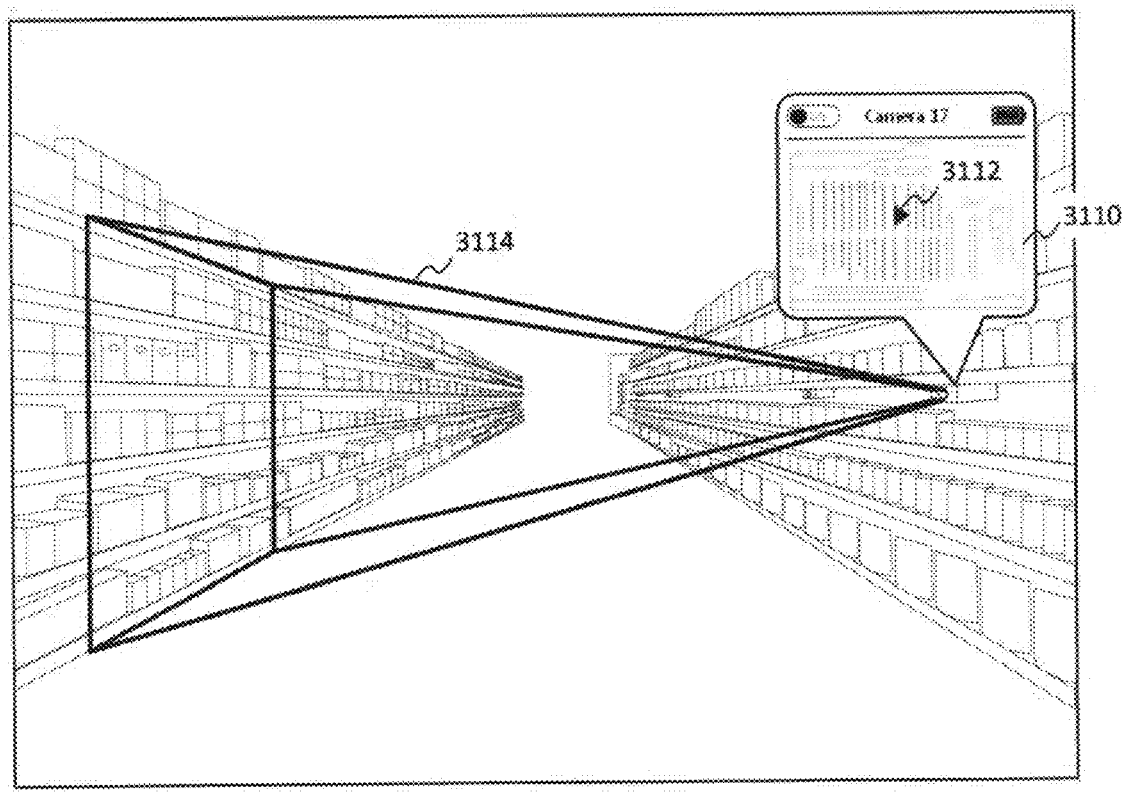
FIGS. 31A, 31B, 31C, and 31D illustrate example visual representations of a field of view of one or more cameras in an extended reality environment, consistent with the disclosed embodiments.

According to some embodiments, the visual representation of a field of view of a camera may include a two-dimensional map view of the camera field of view relative to the retail store. For example, as shown in FIG. 31A, extended reality device 3010 may display a two-dimensional map 3110 which may represent a layout of a retail store (e.g., an overhead view) in which camera 3020 is placed. Two-dimensional map 3110 may also include a location indicator 3112, which may be an icon, shape, or other visual element overlaid on two-dimensional map 3110 to represent a location of a field of view of camera 3020 relative to the retail store. Alternatively or additionally, the visual representation of the field of view of a camera may include a visual indication of a physical portion of the retail store corresponding to the camera field of view. For example, this may include a three-dimensional shape 3114 presented in an extended reality environment allowing a user of extended reality device 3010 to visualize a field of view of camera 3020. In the example shown in FIG. 31A, three-dimensional shape 3114 may be a set of edges defining the boundaries of a field of view of camera 3020. While three-dimensional shape 3114 is shown as a set of edges in FIG. 31A, three-dimensional shape 3114 may be represented in various other ways, including an opaque or semi-opaque object, a shaded region of view 3000, or the like.

Figure 31B:
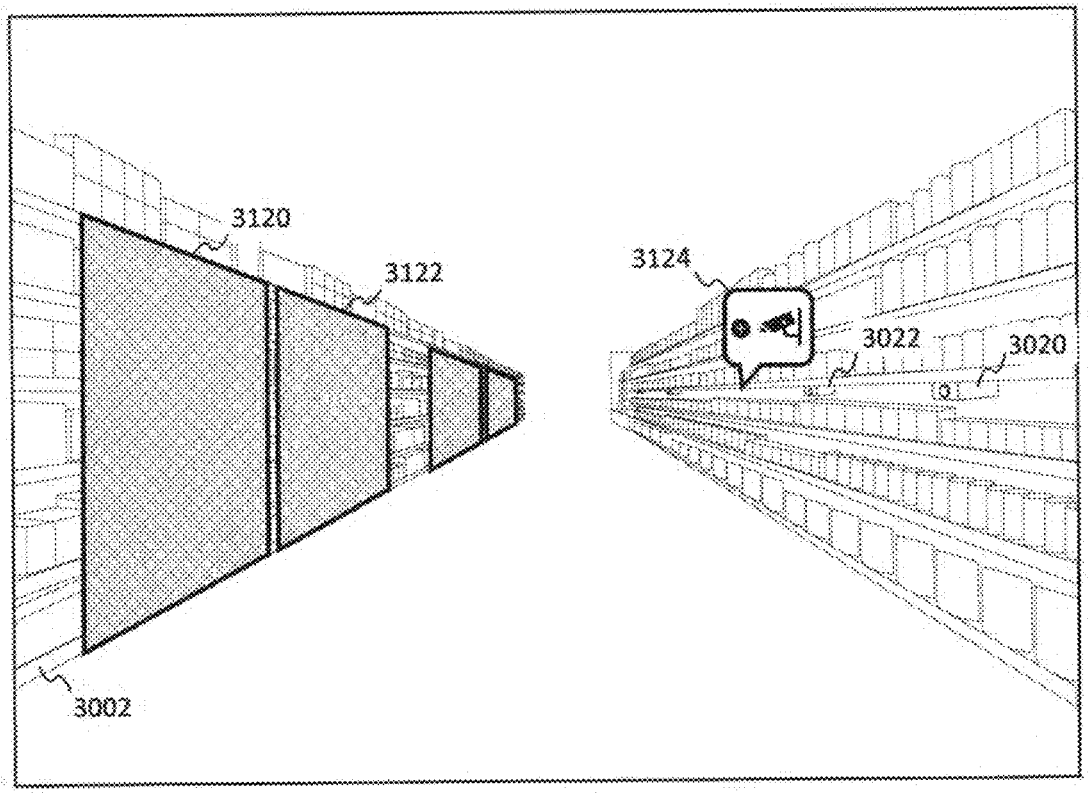

In some embodiments, the visual representation of the field of view of a camera may include a visual indication in an extended reality environment of a portion of a surface area of a physical object in the retail store corresponding to the camera field of view. For example, extended reality device 3010 may display a visual indication identifying a portion 3120 of a surface of a shelving 3002 included in a field of view of camera 3020. Similarly, extended reality device 3010 may display a portion 3122 of a surface of a shelving 3002 included in a field of view of camera 3022. This may allow a user of extended reality device 3010 to easily view which portions of shelving 3002 is within the field of view of a camera. Accordingly, the user of extended reality device 3010 may easily identify areas where additional cameras need to be placed, identify existing cameras need to be adjusted, upgraded, or otherwise reconfigured, or the like. Portions 3120 and 3122 may be represented as two-dimensional shapes placed on the surface of shelving 3002 or any other surface in a retail store. In FIG. 31B, portions 3120 and 3122 are displayed as opaque shapes, however, they may be represented in various other ways, including a semi-transparent shape, an outline, or the like. In some embodiments, portions 3120 and 3122 may include an image captured by cameras 3020 and 3022, respectively, similar to image 3070. This may allow a user to verify the accuracy of portions 3120 and 3122 by comparing the displayed image to the surrounding environment.

In some embodiments, extended reality device 3010 may be display a proposed location for an installation of an additional camera. For example, this may include displaying a visual indicator 3124 of a proposed location for placing an additional camera in the retail store. The proposed location may be selected to ensure that proper coverage is provided by the cameras. For example, as shown in FIG. 31B, shelving 3002 may include a gap that is not covered by the cameras in the retail store. Accordingly, visual indicator 3124 may indicate a proposed location that would ensure this gap is captured. As shown in FIG. 31B, visual indicator 3124 may be a pointer, an icon, or another indicator specifying the proposed location. In some embodiments visual indicator 3124 may also include proposed technical specifications that would address the coverage gap, similar to status indicator 3030. The proposed location may be presented in various other ways, including a 3D rendering of the proposed camera, a bounding box or shape, a colored highlight, or the like. The proposed locations may be determined by server 135 (and included in the digital signal), by extended reality device 3010, or by various other devices in system 100.

Consistent with some embodiments of the present disclosure, the field of view of a camera may be determined at least in part based on a location of a physical object in the retail store. For example, the object may obstruct a portion of the field of view of a camera and this obstruction may be reflected in the visual representation of the field of view of the camera. The location of objects may be determined in various ways. In some embodiments, the locations of objects may be stored in a database (e.g., database 140) or another storage location. As another example, the objects may be detected in one or more images captured using cameras in the retail store and the location of the objects may be determined from the image data.

Figure 31C:
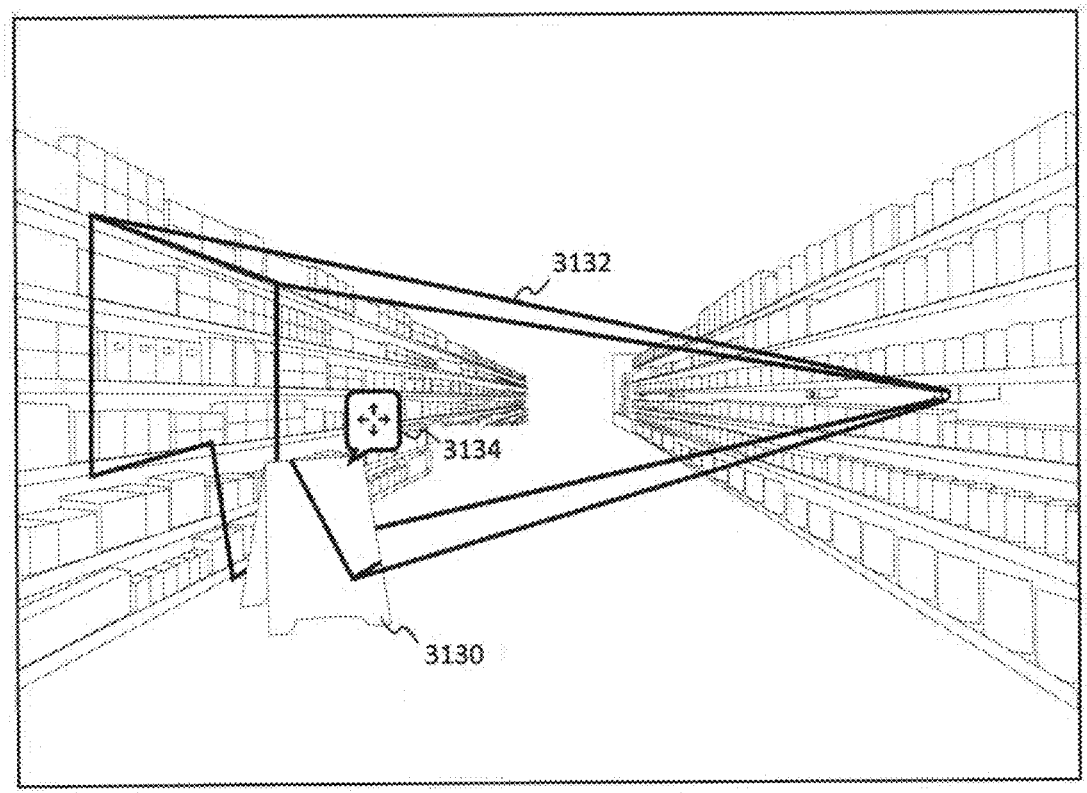
Figure 31D:
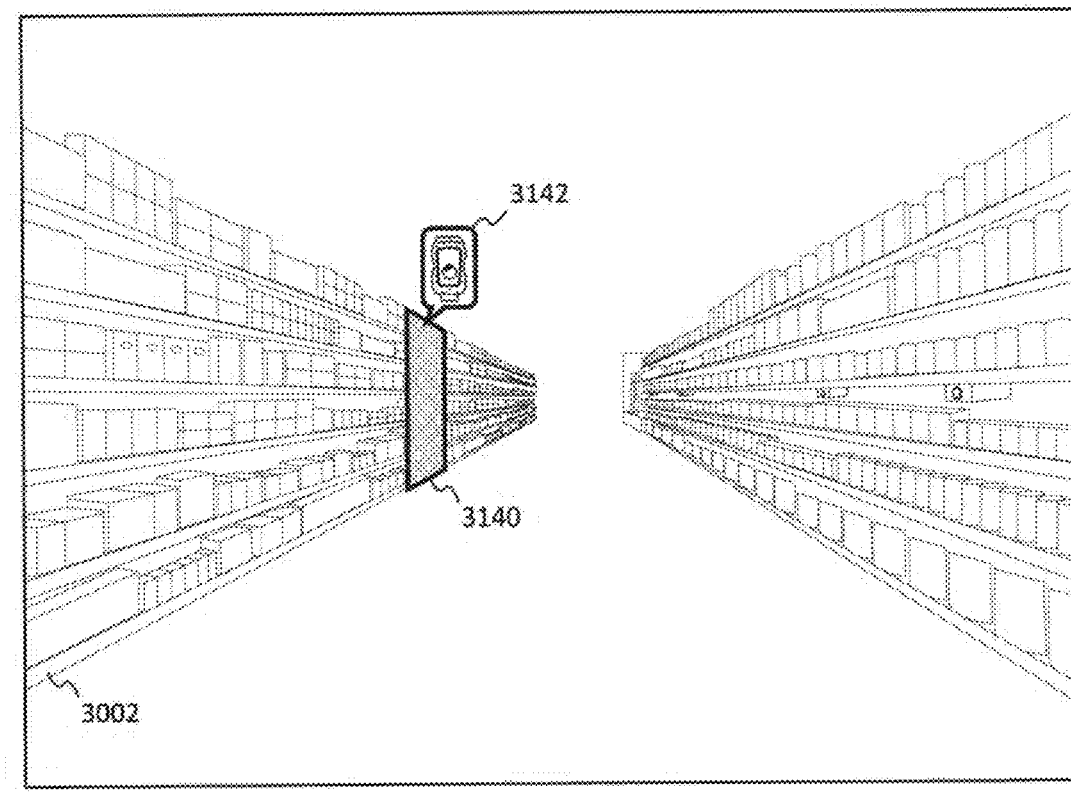

FIG. 31C illustrates an example field of view represented as three-dimensional shape 3132, which may be affected by an object 3130 in the retail store. In this example, object 3130 may be a promotional sign, a caution sign, or another form of sign that may be displayed in a retail store. The location of object 3130 may be obtained based on analysis of images captured using camera 3020, based on stored location information, or the like, as described above. As shown in FIG. 31C, the field of view of camera 3020 may be determined using the location of object 3130, and three-dimensional shape 3132 may indicate that at least a portion of the field of view of camera 3020 is obstructed. The field of view may be displayed as a portion of a surface of an object (similar to portion 3120), or with various other visual elements. In some embodiments, extended reality device 3010 may display a recommendation to relocate the object to thereby extend the camera field of view. For example, this may include displaying an indicator 3134 recommending object 3130 be relocated. Indicator 3134 may be displayed in various other manners, including a bounding box, a highlighting, or the like. In some embodiments, the recommendation may be determined based on an object type associated with the physical object. For example, this may include refraining from providing recommendations to move stationary objects (e.g., structural supports, etc.), objects placed according to contractual obligations (e.g., promotional displays, etc.), or various other categories or properties of products that may affect whether the object should be moved.

According to some embodiments, extended reality device 3010 may display a visual indication of at least one physical portion of the retail store not covered by the plurality of cameras. For example, this may include displaying portion 3140 representing a surface of shelving 3002 not covered by cameras of the retail store. Portion 3140 may correspond to a gap in coverage as illustrated in FIG. 31B and described above. While portion 3140 is shown as a portion of a surface in FIG. 31D, portion 3140 may be presented in various other ways, such as a three-dimensional shape, or the like. In some embodiments, extended reality device 3010 may further include a visual indicator of a proposed location of a camera that would address portion 3140, such as visual indicator 3124 described above. In some embodiments, the portion of the retail store represented by portion 3140 may represent a portion of the physical portion of the retail store not covered by the plurality of cameras. Accordingly, portion 3140 may be selected in various ways. In some embodiments, portion 3140 may be selected based on a product type or product category associated with the physical portion of the retail store. For example, this may include prioritizing some types or categories of products over others when displaying portions not covered by the plurality of cameras. Accordingly, portion 3140 may represent a portion of a store associated with a certain product that is not covered by a camera. In some embodiments, extended reality device 3010 may display an indication of the product time, for example through an indicator 3142.

As another example, portion 3140 may be selected based on sales data associated with products associated with the physical portion of the retail store. For example, the system may prioritize more popular or profitable products over other products. Similarly, portion 3140 may be selected based on a price associated with products associated with the physical portion of the retail store. For example, the system may prioritize ensuring that higher-priced items are included in a field of view of a camera relative to lower-priced items. As another example, portion 3140 may be selected based on a planogram associated with the physical portion of the retail store. For example, the system may highlight portions of the retail store associated with a particular planogram that are not covered by a camera field of view. Various other characteristics of the retail store or products may be used to select the portion of the retail store not covered by the plurality of cameras that is represented by portion 3140.

Figure 32:
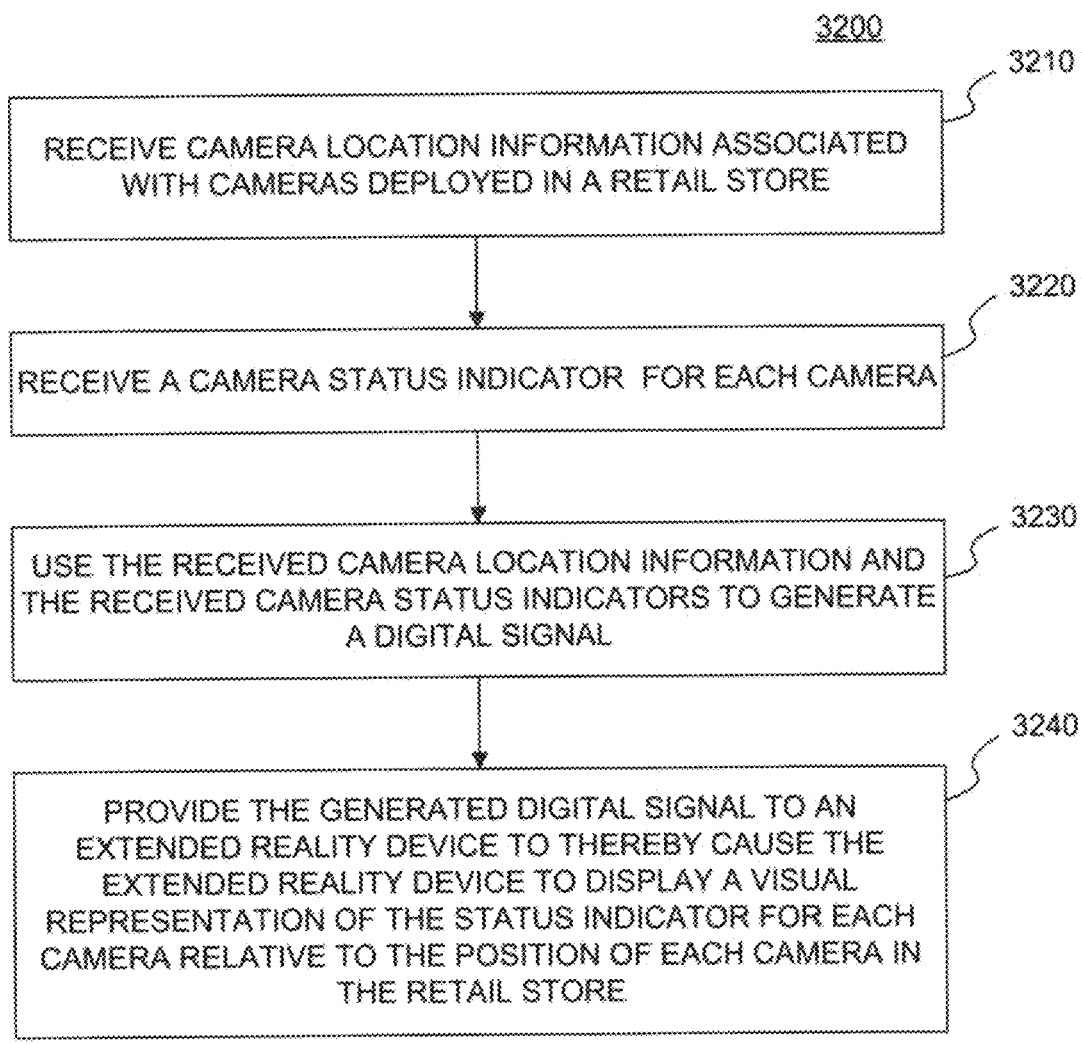
FIG. 32 is a flowchart of an exemplary process for facilitating camera system inspection in an extended reality environment, consistent with the present disclosure.

FIG. 32 is a flowchart of an exemplary process 3200 for facilitating camera system inspection in an extended reality environment, consistent with the present disclosure. Process 3200 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 3200. Further, process 3200 is not necessarily limited to the steps shown in FIG. 32, and any steps or processes of the various embodiments described throughout the present disclosure may also be included in process 3200.

In step 3210, process 3200 includes receiving camera location information associated with a plurality of cameras deployed in a retail store. As described further above, the camera location information being indicative of an actual position of each camera of the plurality of cameras. For example, this may include receiving camera location information indicating a physical location of cameras 3020, 3022, and 3024. The camera location information may be retrieved from a database, received from a store system, or various other sources within system 100.

In step 3220, process 3200 includes receiving, for each camera of the plurality of cameras, at least one camera status indicator. For example, this may include receiving a camera status indicator for cameras 3020, 3022, and 3024. As described in further detail above, the camera status indicator may include various types of information associated with a camera. For example, this may include power information, connectivity information, camera operating parameters, camera operating modes, captured image data, or any other forms of status information as described above.

In step 3230, process 3200 includes using the received camera location information and the received camera status indicators to generate a digital signal. In some embodiments, generating the digital signal may include processing the received camera location information and the received camera status indicators to provide the information in a format recognized by extended reality device 3010, filtering relevant information, or the like. Alternatively or additionally, the digital signal may include the received camera location information and the received camera status indicators, which may be processed further by extended reality device 3010.

In step 3240, process 3200 includes providing the generated digital signal to an extended reality device to thereby cause the extended reality device to display a visual representation of the at least one status indicator for each camera of the plurality of cameras relative to the actual position of the camera in the retail store. For example, this may include providing the generated digital signal to extended reality device 3010 described above. Accordingly, the extended reality device may include a handheld device (e.g., having a video see-through display) or a device having an optical see-through display. In some embodiments, the extended reality device may include a head mounted device, such as a pair of smart glasses, a helmet, one or more smart contact lenses, or the like.

The digital signal may cause extended reality device 3010 to display various visual representations of the at least one status indicator for each camera, as described above. In some embodiments, the visual representation of the at least one status indicator may convey at least one of a camera battery level or a camera power on status. For example, this may include displaying power status 3034 and battery level 3036, as described above. As another example, the visual representation of the at least one status indicator may convey at least one of a camera frame rate identifier, a camera resolution identifier, a camera angular direction identifier, or other camera information. For example, this may include camera frame rate identifier 3042, camera resolution identifier 3044, camera angular direction identifier 3046, and/or direction indicator 3048, as described above. As another example, the visual representation of the at least one status indicator for a particular camera may include a sample image captured by the particular camera, such as image 3070.

In some embodiments, providing the generated digital signal to the extended reality device may further cause the extended reality device to display in an extended reality environment virtual position indicators of the actual positions of the cameras in the retail store. For example, this may include a color highlight, such as shape 3060, a bounding box, such as bounding box 3050, a pointer, an icon, or a similar visual indicator. As another example, providing the generated digital signal to the extended reality device may further cause the extended reality device to display in the extended reality environment a visual indication of a proposed location for an installation of an additional camera. For example, this may include displaying visual indicator 3124 of a proposed location for placing an additional camera in the retail store, as described above.

In some embodiments, the visual representation of the at least one status indicator may provide a visual representation of a camera field of view. The visual representation of the camera field of view may be displayed in various forms as described above. For example, the visual representation of the camera field of view may include a two-dimensional map view of the camera field of view relative to the retail store, such as two-dimensional map view 3110. This may also include a graphical representation of the field of view as shown in FIG. 31A. As another example, the visual representation of the camera field of view may include a visual indication in an extended reality environment of a physical portion of the retail store corresponding to the camera field of view. For example, this may include displaying a three-dimensional shape 3114 representing the camera field of view, as described in further detail above. In some embodiments, the visual representation of the camera field of view may include a visual indication in an extended reality environment of a portion of a surface area of a physical object in the retail store corresponding to the camera field of view. For example, this may include portions 3120 and 3122, as described above, which may indicate a portion of a surface of shelving 3002 that corresponds to the field of view of cameras 3020 and 3022, respectively.

In some embodiments, the field of view may account for the presence of objects or other obstacles in the view of cameras of the retail store. Accordingly, process 3200 may further include receiving object location information associated with a physical object in the retail store and using the object location information to determine the camera field of view. For example, this may include receiving a location of object 3130, as described above, which may be used to determine the field of view represented by three-dimensional shape 3132. As described above, process 3200 may further include providing, through the extended reality device, a recommendation to relocate the object to thereby extend the camera field of view. For example, this may include displaying an indicator 3134 recommending that object 3130 be relocated. According to some embodiments, the recommendation may be determined based on an object type associated with the physical object.

Consistent with the disclosed embodiments, providing the generated digital signal to the extended reality device may further include causing the extended reality device to display in an extended reality environment a visual indication of at least one physical portion of the retail store not covered by the plurality of cameras. The at least one physical portion of the retail store not covered by the plurality of cameras may be selected according to various criteria. For example, the at least one physical portion of the retail store not covered by the plurality of cameras may be selected from a physical portion of the retail store not covered by the plurality of cameras based on a product type associated with the at least one physical portion of the retail store (e.g., product types may be ranked by importance by a user or an automated process, and at least one physical portion of the retail store associated with the highest ranking product type that is not covered by the plurality of cameras may be selected), a product category associated with the at least one physical portion of the retail store (e.g., product categories may be ranked by importance by a user or an automated process, and at least one physical portion of the retail store associated with the highest ranking product category that is not covered by the plurality of cameras may be selected), a planogram associated with the at least one physical portion of the retail store (e.g., at least one physical portion of the retail store associated with the planogram or with a selected portion of the planogram may be selected), a sales data associated with products associated with the at least one physical portion of the retail store (e.g., at least one physical portion of the retail store associated with highest sales numbers and not covered by the plurality of cameras may be selected), a price associated with products associated with the at least one physical portion of the retail store (e.g., at least one physical portion of the retail store associated with highest prices and not covered by the plurality of cameras may be selected), or various other information associated with a retail store. In some examples, a model of the retail store may be analyzed, for example based on fields of view of the plurality of cameras, to determine portions of the retail store that are covered by the plurality of cameras, and a model of the retail store may be analyzed based on the determined portions of the retail store that are covered by the plurality of cameras to determine the at least one physical portion of the retail store not covered by the plurality of cameras, for example by selecting a physical portion of the retail store that correspond to a portion of the model that does not correspond to any of the determined portions of the retail store that are covered by the plurality of cameras. In some examples, images captured using the plurality of cameras may be analyzed to determine portions of the retail store that are covered by the plurality of cameras, and a model of the retail store may be analyzed based on the determined portions of the retail store that are covered by the plurality of cameras to determine the at least one physical portion of the retail store not covered by the plurality of cameras, for example by selecting a physical portion of the retail store that correspond to a portion of the model that does not correspond to any of the determined portions of the retail store that are covered by the plurality of cameras. In some examples, images captured using the plurality of cameras may be received, and an image captured using the extended reality device may be analyzed to identify in the image captured using the extended reality device a portion that is not included in the images captured using the plurality of cameras, for example by comparing the content of the image captured using the extended reality device to the content of the received images captured using plurality of cameras. In some examples, images captured using the plurality of cameras may be analyzed using a product recognition algorithm to determine product types covered by the plurality of cameras, and the at least one physical portion of the retail store not covered by the plurality of cameras may be selected to include an area of the retail store corresponding to one or more product types not covered by the plurality of cameras. In some examples, images captured using the plurality of cameras may be analyzed using a visual classification algorithm to determine product categories covered by the plurality of cameras, and the at least one physical portion of the retail store not covered by the plurality of cameras may be selected to include an area of the retail store corresponding to one or more product categories not covered by the plurality of cameras.

A primary hurdle a retail store experiences in managing its inventory is keeping shelves stocked when products are in high demand. Point of sale data can assist in the management of store inventory, but additional problems can quickly develop as unexpected or anomalous transactions occur that deviate from expected sales patterns. For instance, point of sale data for a given customer demographic may suggest that a customer of a certain age, gender, or historical shopping experience is likely to purchase a product of a particular type. However, a customer may instead, from time to time, go against that historical trend or demographic pattern and purchase a product of a different type. This may occur for a variety of reasons. As such, a retail store may not be able to anticipate an anomalous transaction based on previous point of sale data.

To address anomalous transactions, receipt of the point of sale data may cause image data capturing technology in the store to capture additional information about the anomalous condition for analysis and to ultimately determine its cause. For example, if a customer purchases an unexpected product type such as white bread when previous sales data suggests that customer traditionally purchases wheat bread, that sale could be considered an anomalous transaction. After identifying the anomalous transaction (e.g., by point of sale data reflecting a purchase of white bread), the disclosed systems and methods may cause cameras or other technology installed in the retail store to capture information that can be used to determine the cause of the anomalous transaction. For example, the captured image data may show that the shelves are currently out of stock of wheat bread, or perhaps the quality of the wheat bread appears lacking (e.g., stock is in poor condition, past an expiration date, etc.), or perhaps a sale on white bread caused the customer to purchase white bread instead of wheat bread. Depending on the information determined from the captured image data, additional actions or notifications may be generated to rectify or correct the store's inventory of wheat bread. This action or information may cause anything from a notification to a retail store associate about the anomalous condition that led to the anomalous transaction to an automated response, such as deployment of a robot or drone to restock shelves. The disclosed systems and methods, described in further detail below, seeks to seamlessly and accurately manage the inventory of a retail store and address anomalous transactions.

In an embodiment, a non-transitory computer-readable medium may include instructions that when executed by at least one processor cause the at least one processor to perform a method for triggering actions in response to point of sales data. The non-transitory computer-readable medium may include a memory device of a server, laptop, personal desktop computer, smart phone, tablet, or similar data processing machine. Further details regarding the method are described below in connection with FIGS. 33, 34, and 35.

Figure 33:
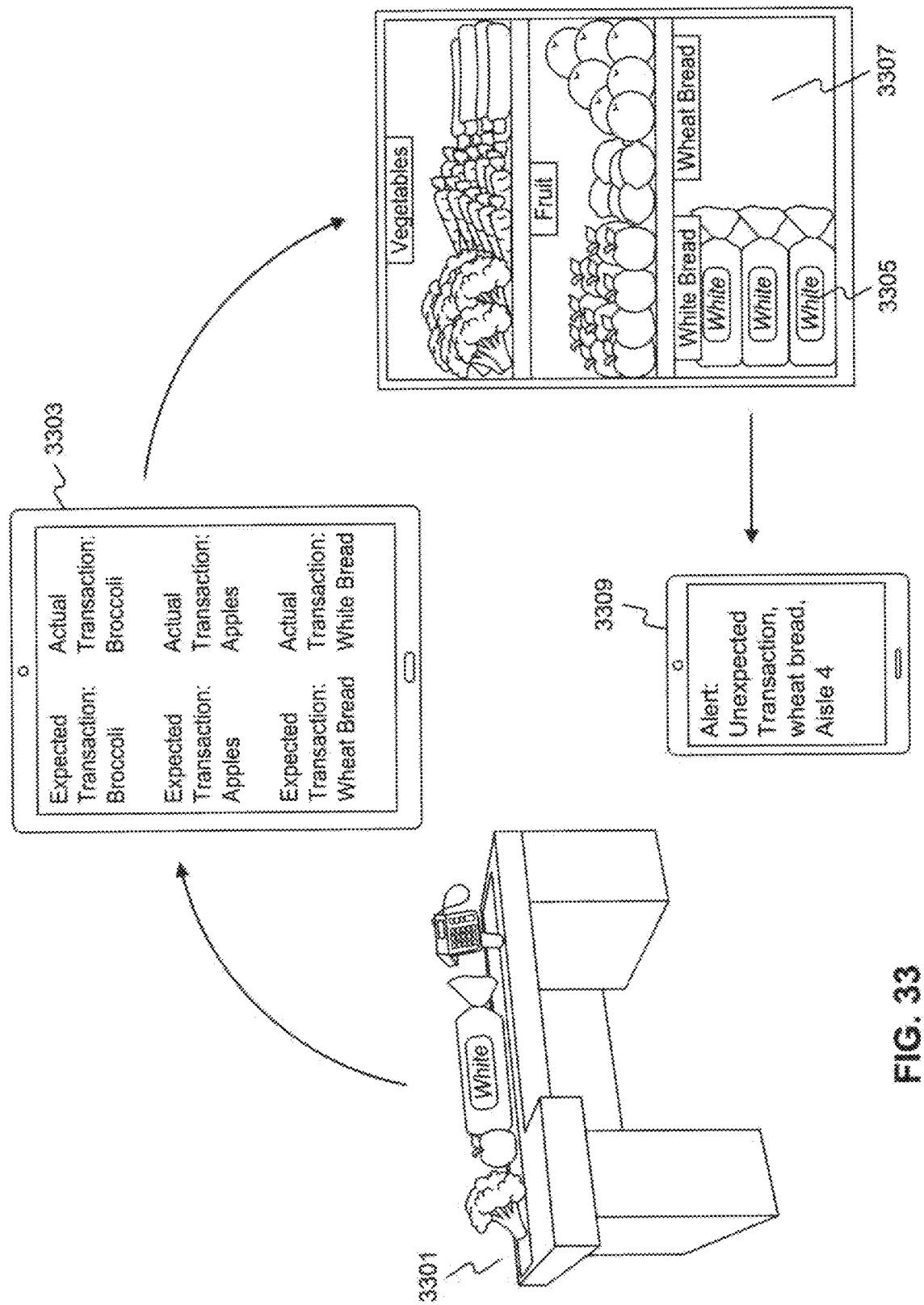
FIG. 33 is an example of an anomalous transaction processed by image analysis, consistent with the present disclosure.

FIG. 33 shows an example of an anomalous transaction processed by image analysis, consistent with the present disclosure. After a customer completes a transaction that is different than expected based on a variety of factors based on information available about that customer, the image analysis system may cause an action to take place relating to that anomalous transaction. For example, when a customer's purchases items are scanned or otherwise entered as part of a check-out process at a point of sale terminal 3301, point of sale terminal 3301 may generate sale information relating to each of the purchases. The point of sale information generated at point of sale terminal 3301 may include identifiers of the purchased items and other information such as price, quantity, brand, or similar objective measures.

After the point of sale data is generated at point of sale terminal 3301, the point of sale data may be transferred to a system 3303 designed to process the point of sale data produced at point of sale terminal 3301 and compare that point of sale data to demographic or historical information relating to the customer making the purchase to determine whether an anomalous transaction has occurred. For example, this may include determining that the customer historically purchased broccoli, and the customer indeed purchased broccoli, confirming an expected transaction. As another example, the customer typically purchases apples, and indeed the customer decided to purchase apples, confirming another expected transaction. Then, in what would be determined to be an anomalous transaction when compared to what the customer has historically purchased, the customer chose to purchase white bread. However, the customer's historical purchase behavior (e.g., collected from past sales data, social network information, customer profile information, etc.) suggests the customer normally purchases wheat bread. After system 3303 has categorized this transaction an anomalous transaction, system 3303 may cause image capture equipment (e.g., capturing device 125 and image processing unit 130) to capture information related to the anomalous transaction.

For example, system 3303 may trigger capturing device 125 to capture image data related to the anomalous transaction of the purchase of white bread, and image data may be captured of the shelves where wheat bread and white bread are expected to be stocked in the retail store. System 3303 may analyze the image data captured by capturing device 125 to identify the current condition or status (e.g., in stock or not) of white bread 2205 and wheat bread 3307. In this example, analyzing the image data may determine a possible cause of the anomalous transaction: wheat bread 3307 is out of stock while white bread 3305 is currently in stock. Based on the result of this analysis of the image data, system 3303 may generate and cause transmission of, for example, a notification to a handheld device 3309 used by a retail store associate or other person associated with the retail store. The notification may include information regarding the anomalous transaction and a likely cause of the anomalous transaction (e.g., white bread 3305 is currently in stock on aisle 4 and wheat bread is currently out of stock in aisle 4). Additionally or alternatively to providing the notification, system 3303 may additionally initiate actions that are manual or automated, e.g., activating a robot or drone as demonstrated in FIG. 4A, FIG. 4B, and FIG. 4C.

Figure 34:
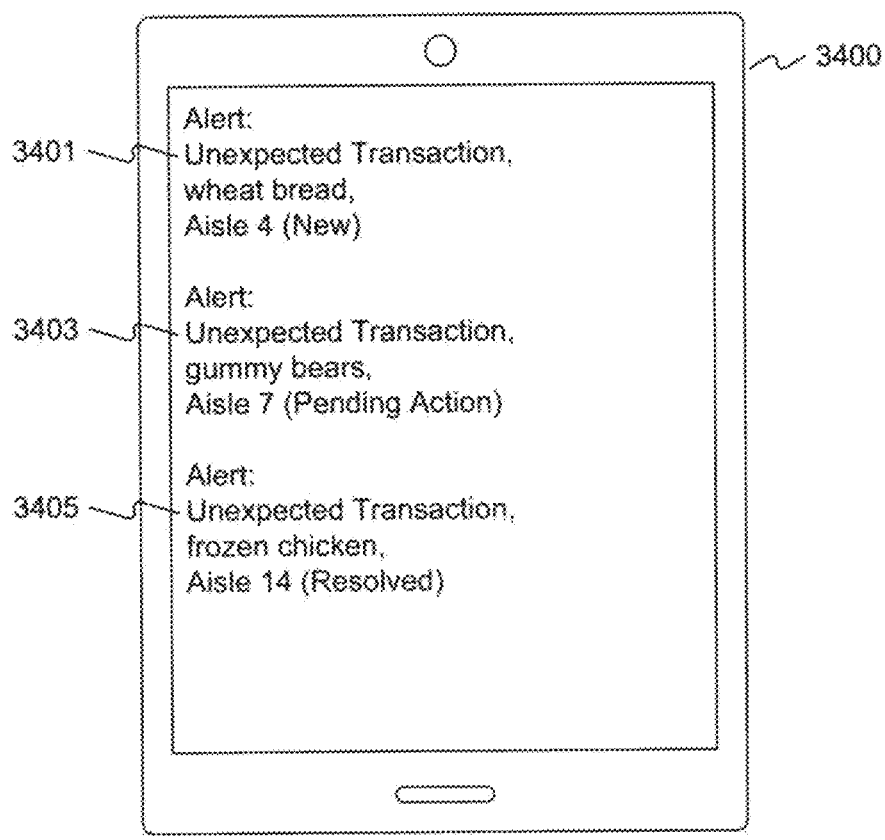
FIG. 34 is an example of information generated to notify a user of anomalous transactions, consistent with the present disclosure.

FIG. 34 shows an example of a handheld device 3400 (e.g., a tablet, smartphone, etc.) displaying information generated to notify a user of anomalous transactions, consistent with disclosed embodiments. Device 3400 may have capabilities similar to those described in reference to, for example, FIG. 4A. Device 3400 may display various information to, for example, a store associate or other person associated with a retail store. The information may include new anomalous transactions, such as the unexpected transaction of wheat bread out of stock in aisle 4 as shown at 3401. The system may additionally show pending anomalous transactions as shown at 3403. In this instance, the alert or notification may show similar information as the information provided at 3401 such as details regarding the anomalous transaction (e.g., product, product type, brand, price, etc.) and a location (e.g., a store aisle) associated with the purchased product, but may differ in display, e.g., to demonstrate that the system or a store associate is in the process of taking an action, thus making the resolution of the anomalous transaction pending. A notification that has been resolved by a store associate or automated process as described above may show that the anomalous transaction has been resolved in notification 3405. Additional information may be displayed to a store associate or other user in other formats, including the, for example, as color-coded alerts (e.g., red requiring attention, green signifying resolved, yellow representing pending, etc.). Additionally or alternatively, the alerts may include information such as a date and/or time of an alert or other information to aid a user to effectively manage the store's inventory.

Figure 35:
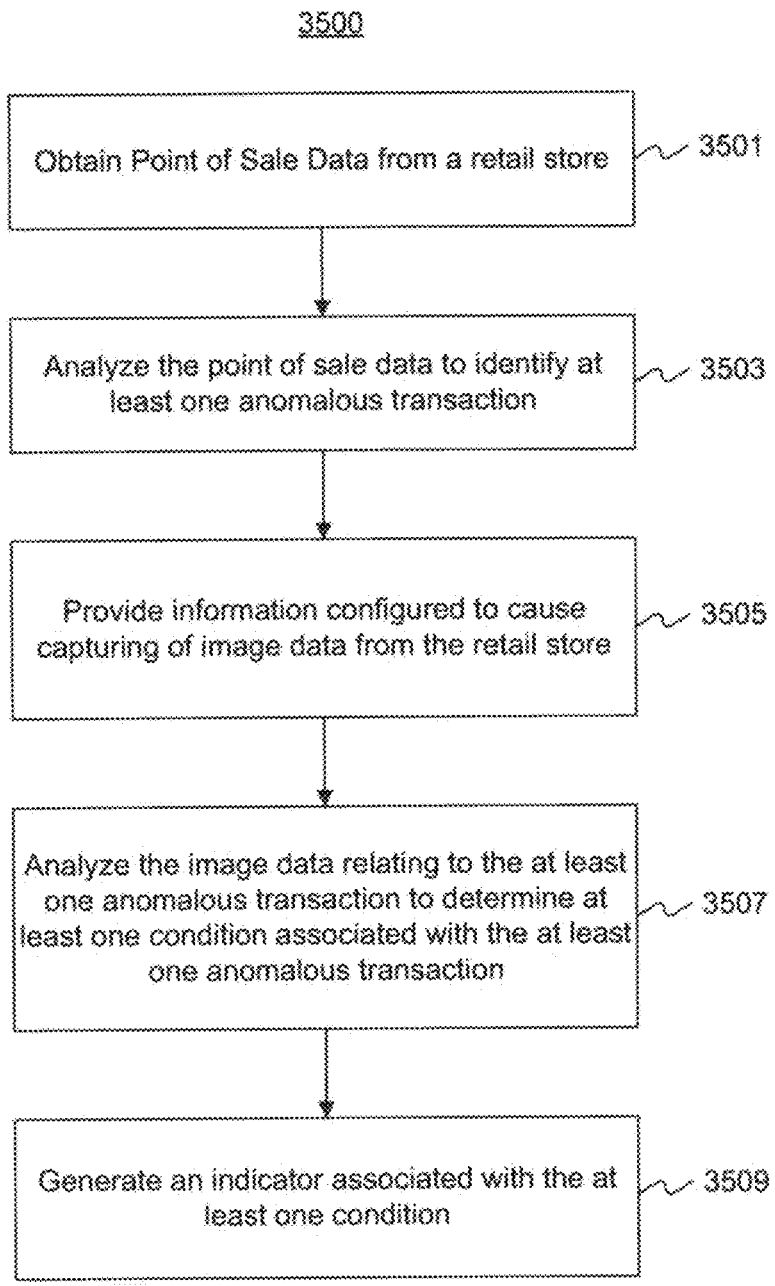
FIG. 35 is a flowchart of a method for processing anomalous transactions, consistent with the present disclosure.

FIG. 35 is a flowchart of an exemplary process 3500 for triggering actions in response to point of sales data, consistent with the present disclosure. Process 3500 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 3500. Further, process 3500 is not necessarily limited to the steps shown in FIG. 35, and any steps or processes of the various embodiments described throughout the present disclosure may also be included in process 3500.

In step 3501, process 3500 includes obtaining point of sale data from a retail store. The point of sale data may be generated at an automated or self-checkout system operated by a customer or an in-store associate checking out a customer's purchases such as point of sale terminal 3301. The point of sale data may include information such as price, quantity, or similar objective measures of products purchased by a customer, as discussed above in reference to FIG. 33.

In step 3503, process 3500 includes analyzing the point of sale data to identify at least one anomalous transaction. Point of sale data may constitute at least one anomalous transaction when at least one purchased product differs from expectations in respect to one or more of brand, periodicity, or amount of product being purchased.

In some embodiments, the at least one anomalous transaction may be identified based on analysis of information relating to at least one of historic shopping activities of a customer or demographic information associated with the customer. For example, the identification of an anomalous transaction may include analysis of the transaction based on one or more factors relating to the historical shopping activities (e.g., past purchases or preferences) of the customer involved in the transaction or demographic information relating to the customer as discussed above in connection with FIG. 33.

In some embodiments, the at least one anomalous transaction may include a detection of a customer purchasing a first product type rather than a second product type, wherein the first product type and the second product type are included in a common product category. In the example discussed above in connection with FIG. 33, the first product type may be white bread (the product ultimately purchased by the customer) and the second product type may be wheat bread (the expected preference or historical purchase preference of the customer, and both the first product and the second product type are bread types (i.e., a common product category).

In some embodiments, a promotion may apply to the first product type, but not to the second product type. A promotion may include a special deal or discount applicable to the first product resulting in a reduced price, rebate, free gift, or other incentive applicable to purchases of products of the first product type. Accordingly, in such situations, the promotion may cause first product type to be preferable to a customer as compared to the second product type.

In some embodiments, a first promotion may apply to the first product type and a second promotion may apply to the second product type, wherein the first promotion differs from the second promotion in at least one aspect. The promotions may differ in price of the promotion, amount offered in each respective promotion, length of time the promotion is being offered, or similar details differ so as to make one promotion preferable or different over another.

In some embodiments, the customer may be expected to prefer products of the second product type over the first product type based on an analysis of historic shopping activities of the customer. The historic shopping activities may include previous purchases of one or both product types, the frequency of such purchases, the amount purchased in a given transaction, or similar differences between historical purchases of the first product type and/or second product type.

In some embodiments, the customer may be expected to prefer products of the second product type over the first product type based on demographic information associated with the customer. Demographic information associated with the customer may include information such as age, gender, education, geographic location, occupation, or other categorical demographic information of the customer.

In some embodiments, the customer may be expected to prefer products of the second product type over the first product type based on purchases of related products. The related products may include products produced by the same company, products in the same or similar categories of product types (e.g., dinner rolls may be considered to be a similar product to bread) or other relationships between product types.

In some embodiments, the identified at least one anomalous transaction may correspond to a selection of a first product type for purchase, wherein the selection of the first product type occurs after an idle period, since a previous selection of the first product type for purchase, of greater than a predetermined threshold. The predetermined threshold may be an expected periodicity based on the historical shopping activity of the customer or the expected duration of use of the first product type. The predetermined threshold may be automatically calculated, predetermined based on historical data, or manually assigned to a customer based on information gathered about the customer.

In some embodiments, the identified at least one anomalous transaction may include a selection of a first product type for purchase at a rate less frequent than predicted. The predicted rate of purchase may be calculated automatically by the system or may be determined and entered manually by a sales associate. The prediction may be based on historical shopping activity or another metric that qualitatively or quantitatively determines a customer's rate or purchase periodicity.

In step 3505, in response to the identified at least one anomalous transaction, process 3500 includes providing information configured to cause capturing of image data from the retail store. For example, after identifying at least one anomalous transaction, the disclosed systems and method may determine, based on the transaction, possible locations in the retail store of the product to be analyzed, the image capturing devices that may be able to provide image data regarding the product of the anomalous transaction, and the amount of image data required to assess the cause of an anomalous transaction. For example, one or more cameras may capture image data of the product from one or more angles and the captured image data may be analyzed to assess potential causes of the anomalous transaction.

In some embodiments, the image data may include representations of products of both the first product type and the second product type. For example, the image data may include a still image or video of representations of the first product type and the second product type, and the system may analyze the image data to determine the amount of products available in either or both of the first product type and second product type or the presence or lack thereof for one or both product types.

In some embodiments, the image data may include a representation of text conveying a promotion associated with products of the first of products or the second type. For example, the image data may include a representation of a display a sign or similar indication that the first or second product includes a promotional offering of the product similar to the above determined promotion.

In some embodiments, the image data may include a representation of at least one shelf associated with the retail store. For example, the image data may include visual or textual representations associating the shelf located in the image data corresponds with the retail store.

In step 3507, process 3500 includes analyzing the image data relating to the at least one anomalous transaction to determine at least one condition associated with the at least one anomalous transaction in the retail store. For example, system 3303 may apply one or more image analysis techniques to identify shapes, text, and/or objects represented in the image data in order to determine at least one condition associated with the at least one anomalous transaction.

In some embodiments, analyzing the image data may include using a machine learning model trained using training examples to analyze the image data and determine the at least one condition associated with the at least one anomalous transaction in the retail store. The training examples may be included in an initial training set that may then be adopted, adjusted, and corrected, for example, to address any issues of overfit, underfit, or similar statistical modeling issues, and/or may be adjusted to a particular retail store, to a particular group of retail stores, to a particular region of retail stores, and so forth. One example of a training example may include sample image data related to a sample anomalous transaction, together with a label indicating a condition associated with the sample anomalous transaction. In one example, the trained machine learning model may be a visual classification model configured to classify images and/or videos to different classes, each class may correspond to a different condition, and the image data may be classified to a particular class, thereby determining the at least one condition.

In some embodiments, analyzing the image data may include calculating a convolution of at least part of the image data thereby obtaining a result value of the calculated convolution, in response to the result value of the calculated convolution being a first value, including a first condition in the determined at least one condition, and in response to the result value of the calculated convolution being a second value, including a second condition in the determined at least one condition, the second condition differs from the first condition. A convolution value based on the image data may include a portion or all pixels of the obtained image data. In analyzing the convolution model and assigning a first value to the convolution results, the convolution model may further determine a first condition as previously discussed for a first product type and a second condition determined to be a second convolution value based on a second condition, and may further determine that the first condition differs in a qualitative or quantitative amount from the second condition.

In some embodiments, the at least one condition may include an out-of-stock inventory status for products of the second product type. For example, an out-of-stock inventory status may indicate that a particular product, such as wheat bread, which is of a bread product type, is not in stock.

In some embodiments, the at least one condition may include a low-stock inventory status for products of the second product type. A low-stock inventory status may include an inventory of a product stocked lower than expected, lower than required to maintain a shelf fully stocked, or a preset amount of inventory as determined by a sales associate, manager, and/or automated system (e.g., via image analysis of shelving units).

In some embodiments, the at least one condition may include a promotional offer associated with the first product type. The promotional offer may include a reduced price, an extra product of the first type offered with purchase of the first product type, or similarly attractive sale or promotion of a first product type that encourages a customer to purchase products of the first type.

In some embodiments, the at least one condition may include non-compliance with at least one planogram associated with the second product type. The planogram may be a diagram or model that indicates the placement of product types on shelves, and non-compliance may include deviating from the planogram such that a particular shelving unit or display specified by the planogram lacks one or more products of the second product type.

In some embodiments, the at least one condition may include a relative shelf location between the second product type and the first product type. The relative shelf location may specify a location (e.g., adjacent, above, below, two shelves above, two shelves below, etc.) of a shelf of the second product type relative to a shelf of the first product.

In step 3509, based on the analyzed image data relating to the at least one anomalous transaction, process 3500 includes generating an indicator associated with the at least one condition. The generated indicator may be displayed on a sales associate device such as a point of sale terminal, smart phone, tablet, or similar data processing device. The indication may include information relating to the existence of an anomalous transaction, the product purchased in the anomalous transaction, the product expected to be purchased in an expected transaction, the location of the product involved in the anomalous transaction, the location of the product expected to be purchased in an expected transaction, or image data relating to the anomalous product, an expected product involved in the anomalous transaction, and so forth.

In some embodiments, the indicator of the at least one condition may be configured to prompt initiation of an action to address the at least one condition. The action may include a customer associate restocking the product type or ordering more of a particular product or product type from a supplier in order to correct the deficiency that causes the at least one condition.

In some embodiment, the action may be performed by at least one employee of the retail store. The employee may be engaged solely in this activity or may be one of many roles performed by the employee of the retail store. In other embodiments, the at least one action may be taken by another individual (e.g., a contractor) on behalf of the retail store.

In some embodiments, the action may be automatically performed by at least one robotic unit associated with the retail store. The robot may include drones and/or ground-based robots, and may be designed and programmed to carry out the functions necessary to correct conditions and to return to a docking station or similar storage location or to be continuously operating throughout the store fulfilling and correcting conditions developed due to anomalous conditions.

In some embodiments, the action may be taken by a user of the retail store in response to an incentive offer made to the user. For example, the user may receive an incentive offer via a device (e.g., a smartphone, tablet, smartwatch, etc.) while shopping in the retail store. The inventive offer may include a discount, promotion, rebate, free gift, etc., in exchange for the user taking the action to address the at least one condition.

Retail environments face challenges when demand and inventory shift as products become more or less popular. These changes may be due to various causes ranging from sales or promotions, price increases, advertising, and supply shortages, all of which may cause the supply and demand of a given product to fluctuate. As supply and demand fluctuates, retail stores have sought solutions to manage inventory more accurately and efficiently.

To keep pace with evolving changes, a retailer store will need to respond to point of sale information that contradicts a status of inventory available on shelves at a given point in time. For example, analysis of image data captured from one or more cameras in the retail store may suggest that a given product or product type is currently out of stock. This out of stock condition may cause an inventory management system to initiate an automated process to resolve the out of stock inventory by, restocking the shelf represented in the image data using available reserve stock or placing an order for additional products. However, in some cases, the product or product type that has been determined to be out of stock is not, in fact, out of stock. The product may be in stock in spite of captured image data suggesting the product is out of stock for a variety of reasons. For example, the product may be shelved in atypical location, customer or sales associate feedback may have incorrectly indicated that the product is not in stock (e.g., the customer of sales associate looked for the product in the wrong aisle, overlooked the product, etc.), a store associate may have already restocked a shelf after the image data was captured, and so forth. If point of sale information indicates that an out of stock condition does not exist before a restocking action is completed, the disclosed systems and methods may override the initiated restocking action, thus enabling store resources to focus on other tasks.

In an embodiment, a non-transitory computer-readable medium may include instructions that when executed by at least one processor cause the at least one processor to perform a method for automatically maintaining a retail space. The non-transitory computer-readable medium may include a memory device of a server, laptop, personal desktop computer, smart phone, tablet, or similar data processing machine. Further details regarding the method are described below in connection with FIGS. 36, 37, and 38.

Figure 36:
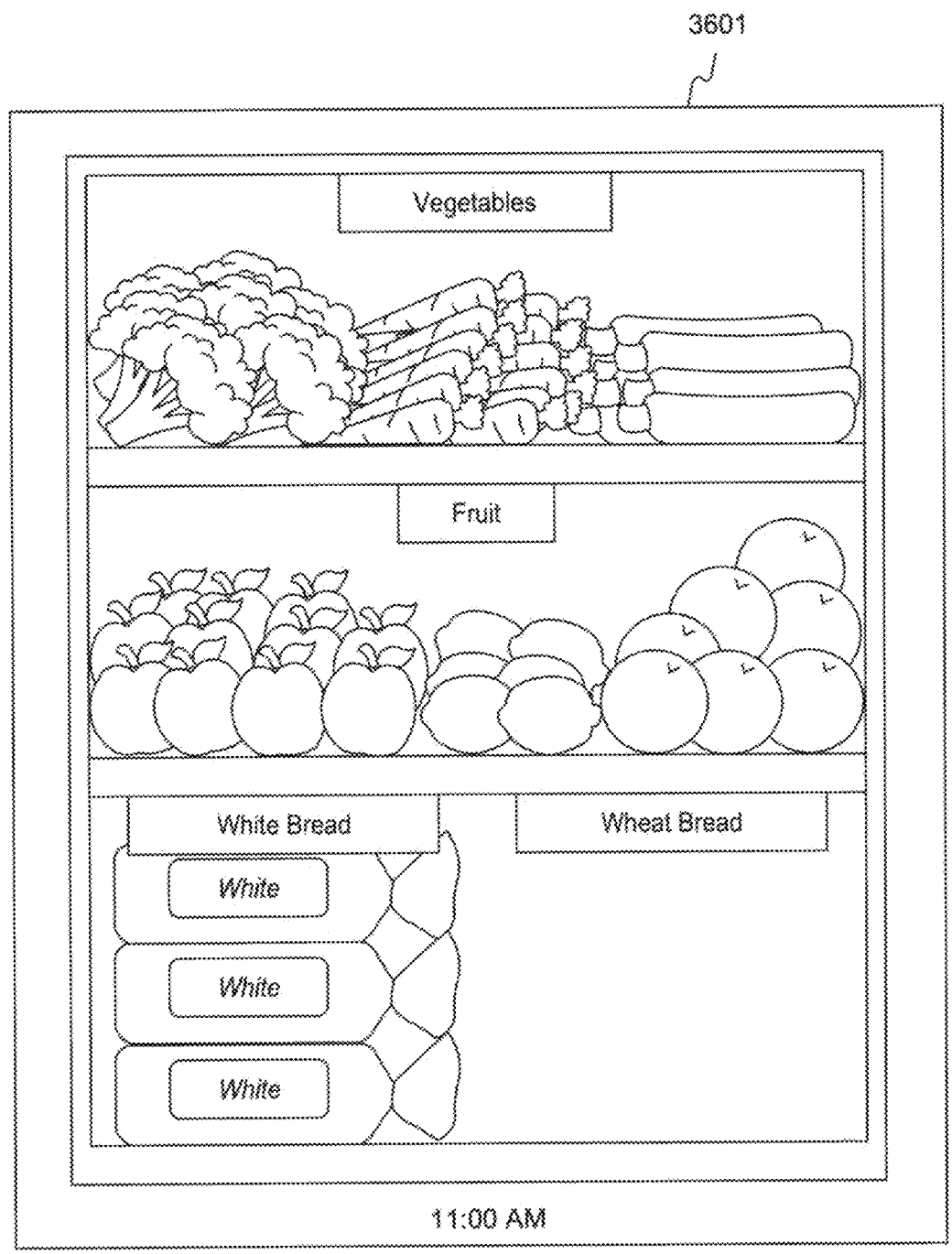
FIG. 36 is an example image including a representation of a shelving unit, consistent with the present disclosure.

FIG. 36 depicts an image 3601 captured from a retail store, consistent with the present disclosure. Image 3601 may be captured by a camera system such as those described in FIGS. 5A-5C and located at various positions in a retail store as described in FIGS. 6A-6C. Image data may be captured in the retail store based on various triggers or schedules. For example, the disclosed systems and methods may capture image date at predetermined time intervals, on demand due to customer feedback that a product is out of stock, after a sales transaction occurs indicating that the inventory of a product is low or depleted, or in response to other similar information causing the disclosed systems and methods to initiate the capture of image data.

The captured image data may include or be associated with data (e.g., metadata) that provides context for when and where an image (or video stream) was taken. This information may include one or more of a date, time, identifier of an image capture device, or a location (e.g., a store aisle number) of an image capture device that obtained the image data. Such information regarding the context of captured image data may be stored in a database (e.g., database 140) in association with the captured image data. At least one processor (e.g., image processing unit 130) may analyze the captured image data to determine that a product type is out of stock by determining no products exist on a designated shelf for the products. For example, as shown in FIG. 36, wheat bread is not stocked on the shelving or display space designated for this product type. Additionally, a time stamp of 11:00 AM indicates a capture time when image 3601 was captured. Although only a time is depicted in FIG. 36, image 3601 may include or otherwise be associated with other information, such as date, location, etc., as discussed above.

When the disclosed systems and methods identify, based on image 3601, that a product is out of stock at a designated shelf or display location, certain actions may be automated or initiated. For example, after processing and analyzing captured image data, the disclosed systems and methods may initiate a manual or automatic action to restock an out of stork product. These actions may include activating a robot or drone or transmitting a notification of the out of stock event to a device associated with a retail associate.

Figure 37:
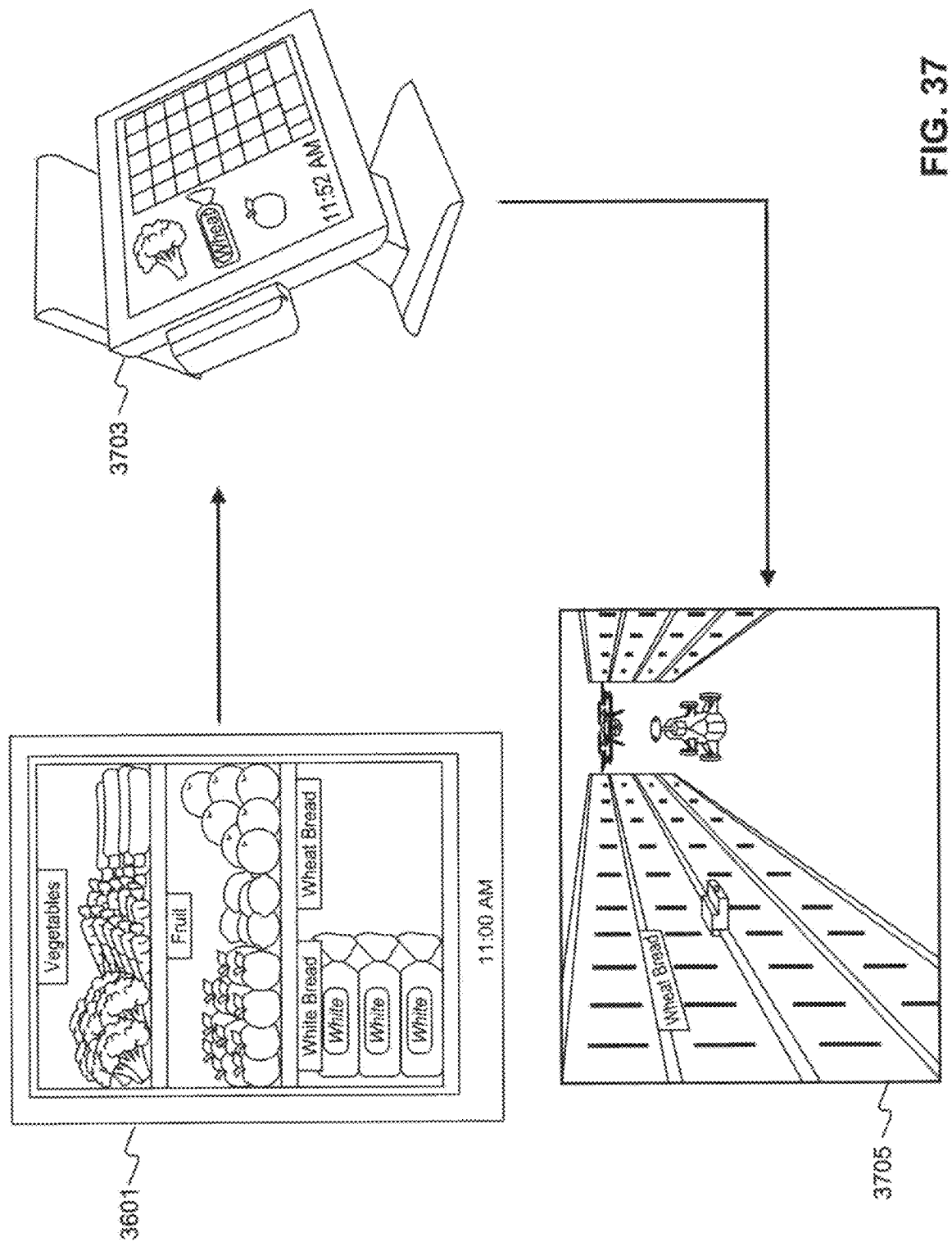
FIG. 37 is example of using point of sale data to cancel an action related to an out of stock condition in a retail store, consistent with the present disclosure.

FIG. 37 shows an example of using point of sale data to cancel an action related to an out of stock condition in a retail store, consistent with the present disclosure. As discussed in connection FIG. 36, analysis of image 3601 has indicated that wheat bread is out of stock. In response to an out of stock condition of wheat bread, the disclosed systems and methods may generate information configured to cause an action to remedy the out of stock condition. In this example, the action may include the manual or automatic restocking of wheat bread in the retail store. An automated response may include the deployment of a robot or drone to accomplish the restocking, and, a manual response may include transmitting a notification to store associate providing instructions to restock the product (e.g., restock wheat bread at aisle 4).

However, after generating information configured to cause the action (e.g., a restocking event), the disclosed systems and methods may receive point of sale data from point of sale terminal 3703 indicating that a purchase of wheat bread occurred after image 3601 was captured, but before initiation of the restocking action. For example, as shown in FIG. 37, wheat bread was purchased at 11:52 AM (i.e., after image 3601 was captured at 11:02 AM). A particular product (wheat bread in this example) may be found to be in stock through analysis of point of sales data for a variety of reasons. For example, the system may have analyzed a captured image and incorrectly concluded that a product is out of stock due to poor image quality (e.g., a low light level), an obstruction (e.g., wheat bread was indeed available and on an expected shelf but obscured by a shopping cart, a customer, a freestanding product display, a shipping container, etc.), the product was restocked after the image was captured (e.g., wheat bread was temporarily stocked at a wrong location but returned to its proper shelf by a store associate after the image was taken), and so forth. Accordingly, in response to the received point of sales data, the system may generate an order to cancel the action. In the case of a restocking order using automated restocking technology, the order may cancel a robot and/or drone from proceeding to the shelf and cause the robot and/or drone to be rerouted. For example, as shown at 3705, the order may cause a drone and robot to turn around and from an aisle where wheat bread is stocked and be deployed to another area of the retail store. In the case of a restocking order transmitted to a store associate with a task specifying a product or product type for restocking, the order may cancel the task (e.g., the store associate may receive a cancelation message on a device such as a tablet, smartphone, smartwatch, etc.).

Figure 38:
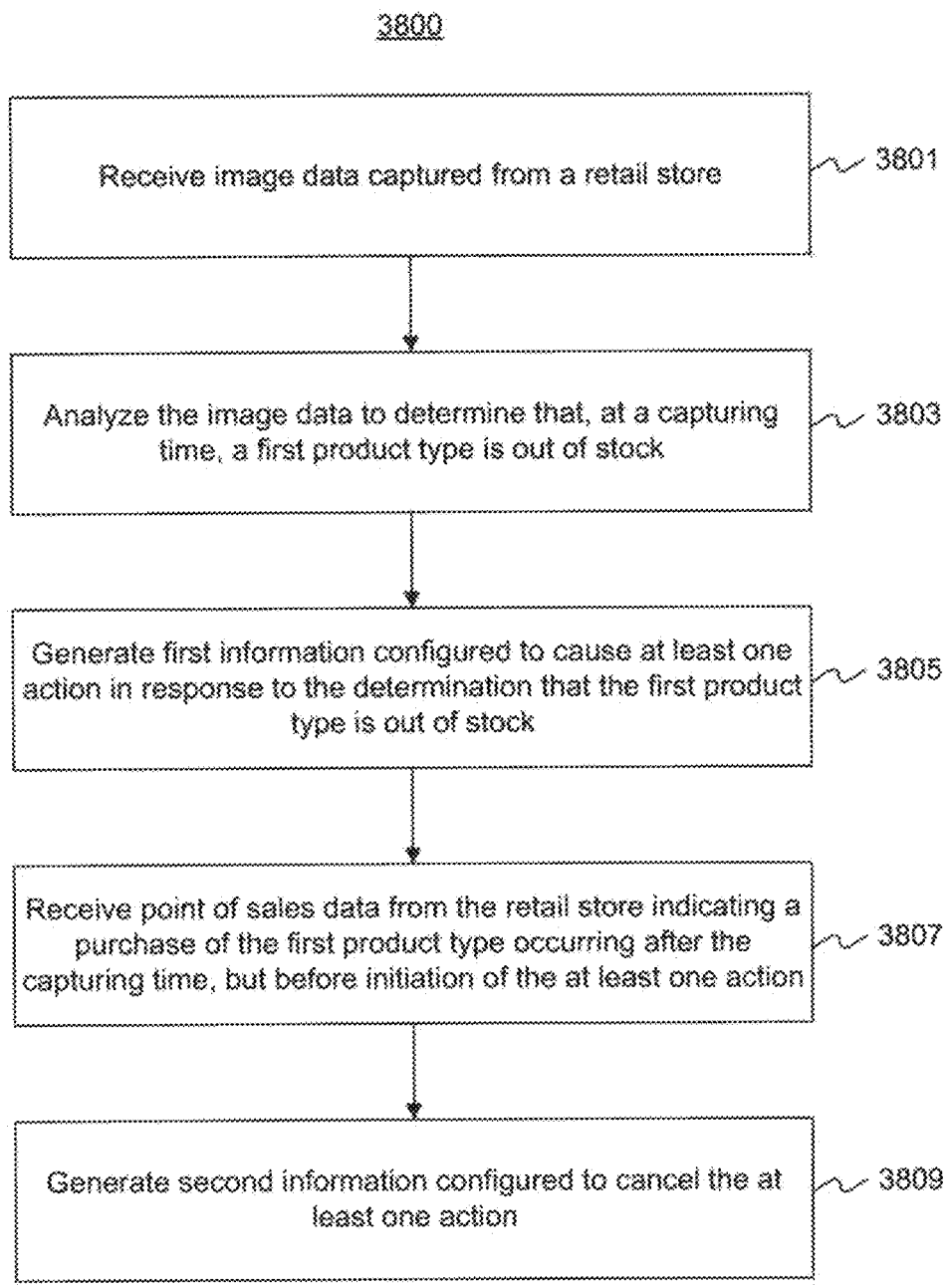
FIG. 38 is a flowchart of a method for automatically maintaining a retail space, consistent with the present disclosure.

FIG. 38 is a flowchart of an exemplary process 3800 for automatically maintaining a retail space, consistent with the present disclosure. Process 3800 may be performed by at least one processor or at least one processing unit, such as processing unit 130 or processing device 202. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 3800. Further, process 3800 is not necessarily limited to the steps shown in FIG. 38, and any steps or processes of the various embodiments described throughout the present disclosure may also be included in process 3800.

In step 3801, process 3800 includes receiving image data captured form a retail store. For example, the image data may be captured by a capturing device 125 that is fixed or mounted to a particular location in a retail store. The captured image data may include one or more images (e.g., still images or video).

In some embodiments, the image data may be representative of one or more locations associated with the retail store. For example, the image data may include representations of one or more aisles in the retail store. Further, process 3800 may determine a location in the retail store corresponding to captured image data based on a known location of an installed camera (e.g., capturing device 125). Alternatively or additionally, analyzing the image data may corroborate one or more locations by analyzing text or images on signage and/or displays.

In step 3803, process 3800 includes analyzing the received image data to determine that, at a capturing time, a first product type is out of stock. This may include application of an image processing algorithm to identify, for example, edges or shapes, and/or the use of text recognition to identify text on product packaging and/or product displays (e.g., advertisements or price tags). The received image data may include one or more of metadata, time stamps, or other information to contextualize the received image data. The capturing time (e.g., a time stamp) may correspond to a time at which the image data was captured by an image capture device (e.g., image capture device 125). For example, as shown in FIG. 36, image 3601 was captured at 11:00 AM, the first product type corresponds to wheat bread, and the first product type is out of stock because items are vacant from the shelf. In some embodiments, the capturing time may include a date or a time, and in other embodiments, the capturing time may include a date and time.

In some embodiments, the image data may be representative of a shelf in the retail store associated with products of the first product type. For example, the image data may include a representation of shelves designated for a particular product (e.g., wheat bread). In some cases, process 3800 may determine that the image data is representative of a particular shelf (e.g., a shelf designated for wheat bread) in the retail store based on one or more of metadata (e.g., an identifier of a camera that captured the image data) and/or analysis of the image data to identify one or more of signage, display stands, price tags, or product packaging (e.g., via text recognition).

In some embodiments, analyzing the received image data may include using a machine learning model trained using training examples to analyze the image data and to determine that, at the capturing time, the first product is out of stock. The machine learning model (e.g., a trained neural network) may apply training examples (e.g., previously captured images) to determine that the first product is out of stock.

In some embodiments, analyzing the received image data may include calculating a convolution of at least part of the image data to thereby obtain a result value of the calculated convolution, and using the result value of the calculated convolution to determine that, at the capturing time, the first product is out of stock. A convolution value based on the image data may include any or all pixels of the obtained image data. In analyzing the convolution model and assigning a first value to the convolution results, the convolution model may further determine a first condition for a first product type and a second condition determined to be a second convolution value based on a second condition, and may be further modeled to determine the first condition differs in some qualitative or quantitative amount from the second condition.

In step 3805, in response to the determination that the first product type is out of stock at the capturing time, process 3800 includes generating first information configured to cause at least one action in response to the determination that the first product type is out of stock. The first information configured to cause at least one action in response to the determination that the first product type is out of stock may include, activating automated systems such as a drone or robot and/or notifying an associate or manager of the condition. The at least one action may include restocking the first product type with inventory not currently on shelves, moving the first product type from an incorrect shelf to a correct shelf, reordering an out of stock product, or other corrective action.

In some embodiments, the first information may be configured to automatically cause generation of one or more tasks associated with a task management system. For example, the one or more tasks may be ranked according to how immediate the one or more tasks must be completed, by the periodicity required to keep a first product type in-stock and shelved, the popularity of the first product type to consumers, or any similar metric describing how quickly a task must be completed.

In some embodiments, the one or more tasks may include a request to extract products of the first product type from a current inventory and to restock a retail shelf with the extracted products of the first product type. For example, the one or more tasks may cause an automated response from a robot or drone and may include locating the first product type in a secondary or storage location, retrieving the item and confirming it matches the first product type requested or commanded by the task, and moving the confirmed first product type from the inventory location to the tasks desired location (e.g., an appropriate shelf or display).

In some embodiments, the one or more tasks may include a request to generate a re-supply order for products of the first product type. For example, after determining that products of the first product type are out of stock, the disclosed system may generate a re-supply order to replenish the first product type in order to obtain new inventory.

In some embodiments, the at least one action may include extracting products of the first product type from a current inventory and restocking of a retail shelf with the extracted products of the first product type. For example, the one or more action may cause an automated response from a robot or drone and may include locating the first product type in a secondary or storage location, retrieving the item and confirming it matches the first product type requested by the action, and moving the confirmed first product type from the inventory location to the tasks desired location (e.g., an appropriate shelf or display).

In some embodiments, the at least one action may include placing an order for additional products of the first product type. For example, the system may transmit the order over one or more networks to a vendor for fulfillment of new products.

In step 3807, process 3800 includes receiving point of sales data from the retail store, wherein the point of sales data indicates a purchase of the first product type occurring after the capturing time, but before initiation of the at least one action. For example, as discussed above, process 3800 may receive point of sale data from point of sale terminal 3703 indicating that a purchase of the first product type (e.g., wheat bread) occurred after the capturing time (e.g., after image 3601 was captured), but before initiation of the at least one action (e.g., a restocking action). For example, as shown in FIG. 37, wheat bread was purchased at 11:52 AM (i.e., after image 3601 was captured), yet wheat bread was found to be in stock through point of sales data.

In some embodiments, process 3800 may include triggering the capture of additional image data in response to the received point of sale data. For example, the system may have analyzed a captured image and incorrectly concluded that a product is out of stock due to poor image quality (e.g., a low light level, interruption of an image feed, etc.), an obstruction (e.g., wheat bread was indeed available and on an expected shelf be obscured by a shopping cart, a customer, a freestanding product display, a shipping container, etc.), the product was restocked after the image was captured (e.g., wheat bread was temporarily stocked at a wrong location but returned to the proper shelf by a store associate after the image was taken), and so forth. Accordingly, to validate or verify the previously captured image data, process 3800 may capture additional image data from another location (e.g., a capturing device from another position) and/or at a later time. In some embodiments, the generation of the second information may be based on an analysis of the additional image data. For example, in response to a first content of the additional image data, a first version of the second information may be generated, and in response to a second content of the additional image data, a second version of the second information may be generated, the second version may differ from the first version. In another example, in response to a first content of the additional image data, the second information may be generated, and in response to a second content of the additional image data, generating the second information may be avoided. For example, when the additional image data shows that the first product type is not out of stock, the first second may be generated, and when the additional image data confirms that the first product type is out of stock, generating the second information may be avoided. In another example, when the additional image data shows that the visual appearance of the first product type changed, the second information may be generated to cause an update to a visual recognition model associated with the first product type in addition to canceling the at least one action, and when the additional image data shows that the visual appearance of the first product type has not changed, the second information may be generated to cause the canceling the at least one action but not to cause the update to a visual recognition model associated with the first product type.

In step 3809, in response to the received point of sales data, process 3800 includes generating second information configured to cancel the at least one action. In a restocking action using automated technology, when the point of sales data reveals that the first product type is in fact in stock, the second information may cause a robot and/or drone to retain from proceeding to the shelf or may cause the robot and/or drone that may be in route to the shelf to be rerouted. For example, as shown at 3705, the order may cause a drone and robot to depart from an aisle where wheat bread is stocked and be deployed to another area of the retail store. In a restocking action where a store associate was tasked to restock wheat bread, the order may cancel the task. In some examples, step 3809 may generate the second information when the point of sales data indicates that a number of purchases of the first product type occurring after the capturing time exceeds a predetermined threshold. For example, when the number of purchases of the first product type occurring after the capturing time does not exceed a predetermined threshold, the generation of the second information may be withheld. In some examples, step 3809 may generate the second information when the point of sales data indicates that the purchase of the first product type occurring after the capturing time is associated with a customer that entered the retail store after the capturing time. For example, a customer that entered the retail store before the capturing time may have picked the first product type before the capturing time, and therefore purchases made by this customer may be discarded as a trigger to the generation of the second information. In some examples, step 3809 may generate the second information when the point of sales data indicates that the purchase of the first product type occurring after the capturing time occurred at least a predetermined time period after the capturing time. For example, the predetermined time period may be selected based on locations in the retail store associated with the first product type and the point of sale, based on a distance from the location in the retail store associated with the first product type and the location in the retail store associated with the point of sale, and so forth.

In some embodiments, the second information may be configured to cause removal from an instruction queue of the first information. The second information may include, among other things, a command to a central system to forego, delete, or cancel the command generated by the first information.

In some embodiments, the second information may be configured to automatically cause at least one of deletion or deactivation of at least one previously generated task associated with the task management system. Deletion or deactivation may involve causing the automated action to be terminated.

In some embodiments, the second information may be further configured to cause a second action different from the at least one action. For example, the second action may include an update to a planogram associated with the retail store and the first product type. In another example, the second action may include initiating capturing of one or more images of one or more products of the first product type for updating a visual recognition model associated with the first product type. For example, the visual recognition model may be a machine learning model trained using a dataset, and the visual recognition model may be updated by updating the dataset based on the captured one or more images of the one or more products of the first product type and retraining the visual recognition model. In another example, the visual recognition model may be an online machine learning model trained using a dataset, and the visual recognition model may be updated by using the one or more images of the one or more products of the first product type as new training examples.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium including instructions that when executed by at least one processor cause the at least one processor to perform a method for facilitating camera system inspection in an extended reality environment, the method comprising:
    receiving camera location information associated with a plurality of cameras deployed in a retail store, the camera location information being indicative of an actual position of each camera of the plurality of cameras;
    receiving, for each camera of the plurality of cameras, at least one camera status indicator;
    using the received camera location information and the received camera status indicators to generate a digital signal; and
    providing the generated digital signal to an extended reality device to thereby cause the extended reality device to display a visual representation of the at least one camera status indicator for each camera of the plurality of cameras relative to the actual position of each camera of the plurality of cameras in the retail store, wherein the visual representation of the at least one camera status indicator provides a visual representation of a camera field of view, the visual representation of the camera field of view including a two-dimensional map view of the camera field of view relative to the retail store.

2. The non-transitory computer-readable medium of claim 1, wherein the visual representation of the at least one camera status indicator conveys at least one of a camera frame rate identifier, a camera resolution identifier, or a camera angular direction identifier.

3. The non-transitory computer-readable medium of claim 1, wherein the visual representation of the at least one camera status indicator for a particular camera includes a sample image captured by the particular camera.

4. The non-transitory computer-readable medium of claim 1, wherein the visual representation of the camera field of view includes a visual indication in the extended reality environment of a physical portion of the retail store corresponding to the camera field of view.

5. The non-transitory computer-readable medium of claim 1, wherein the visual representation of the camera field of view includes a visual indication in the extended reality environment of a portion of a surface area of a physical object in the retail store corresponding to the camera field of view.

6. The non-transitory computer-readable medium of claim 1, the method further comprising:
    receiving object location information associated with a physical object in the retail store; and
    using the object location information to determine the camera field of view.

7. The non-transitory computer-readable medium of claim 6, the method further comprising providing, through the extended reality device, a recommendation to relocate the physical object to thereby extend the camera field of view.

8. The non-transitory computer-readable medium of claim 7, wherein the recommendation is determined based on an object type associated with the physical object.

9. The non-transitory computer-readable medium of claim 1, wherein providing the generated digital signal to the extended reality device further causes the extended reality device to display in the extended reality environment virtual position indicators of the actual positions of the plurality of cameras in the retail store.

10. The non-transitory computer-readable medium of claim 1, wherein providing the generated digital signal to the extended reality device further causes the extended reality device to display in the extended reality environment a visual indication of at least one physical portion of the retail store not covered by the plurality of cameras.

11. The non-transitory computer-readable medium of claim 10, wherein the at least one physical portion of the retail store not covered by the plurality of cameras is selected from a physical portion of the retail store not covered by the plurality of cameras based on a product type associated with the at least one physical portion of the retail store.

12. The non-transitory computer-readable medium of claim 10, wherein the at least one physical portion of the retail store not covered by the plurality of cameras is selected from a physical portion of the retail store not covered by the plurality of cameras based on a product category associated with the at least one physical portion of the retail store.

13. The non-transitory computer-readable medium of claim 10, wherein the at least one physical portion of the retail store not covered by the plurality of cameras is selected from a physical portion of the retail store not covered by the plurality of cameras based on a planogram associated with the at least one physical portion of the retail store.

14. The non-transitory computer-readable medium of claim 10, wherein the at least one physical portion of the retail store not covered by the plurality of cameras is selected from a physical portion of the retail store not covered by the plurality of cameras based on a sales data associated with products associated with the at least one physical portion of the retail store.

15. The non-transitory computer-readable medium of claim 10, wherein the at least one physical portion of the retail store not covered by the plurality of cameras is selected from a physical portion of the retail store not covered by the plurality of cameras based on a price associated with products associated with the at least one physical portion of the retail store.

16. The non-transitory computer-readable medium of claim 1, wherein providing the generated digital signal to the extended reality device further causes the extended reality device to display in the extended reality environment a visual indication of a proposed location for an installation of an additional camera.

17. A method for facilitating camera system inspection in an extended reality environment, the method comprising:
    receiving camera location information associated with a plurality of cameras deployed in a retail store, the camera location information being indicative of an actual position of each camera of the plurality of cameras;
    receiving, for each camera of the plurality of cameras, at least one camera status indicator;
    using the received camera location information and the received camera status indicators to generate a digital signal; and
    providing the generated digital signal to an extended reality device to thereby cause the extended reality device to display a visual representation of the at least one camera status indicator for each camera of the plurality of cameras relative to the actual position of each camera of the plurality of cameras in the retail store, wherein the visual representation of the at least one camera status indicator provides a visual representation of a camera field of view, the visual representation of the camera field of view including a two-dimensional map view of the camera field of view relative to the retail store.

18. A system for facilitating camera system inspection in an extended reality environment, the system comprising at least one processing device and a memory storing instructions that when executed by the at least one processing device cause the at least one processing device to:
    receive camera location information associated with a plurality of cameras deployed in a retail store, the camera location information being indicative of an actual position of each camera of the plurality of cameras;
    receive, for each camera of the plurality of cameras, at least one camera status indicator;
    use the received camera location information and the received camera status indicators to generate a digital signal; and
    provide the generated digital signal to an extended reality device to thereby cause the extended reality device to display a visual representation of the at least one camera status indicator for each camera of the plurality of cameras relative to the actual position of each camera of the plurality of cameras in the retail store, wherein the visual representation of the at least one camera status indicator provides a visual representation of a camera field of view, the visual representation of the camera field of view including a two-dimensional map view of the camera field of view relative to the retail store.

19. A non-transitory computer-readable medium including instructions that when executed by at least one processor cause the at least one processor to perform a method for facilitating camera system inspection in an extended reality environment, the method comprising:
    receiving camera location information associated with a plurality of cameras deployed in a retail store, the camera location information being indicative of an actual position of each camera of the plurality of cameras;
    receiving, for each camera of the plurality of cameras, at least one camera status indicator;
    receiving object location information associated with a physical object in the retail store;
    using the received camera location information and the received camera status indicators to generate a digital signal;
    using the object location information to determine a camera field of view of each camera of the plurality of cameras; and
    providing the generated digital signal to an extended reality device to thereby cause the extended reality device to display a visual representation of the at least one camera status indicator for each camera of the plurality of cameras relative to the actual position of each camera of the plurality of cameras in the retail store, wherein the visual representation of the at least one camera status indicator provides a visual representation of the camera field of view.

* * * * *